US012563299B2

(12) United States Patent
Manzari et al.

(10) Patent No.: US 12,563,299 B2
(45) Date of Patent: Feb. 24, 2026

(54) USER INTERFACES FOR CAMERA SHARING

(71) Applicant: Apple Inc., Cupertino, CA (US)

(72) Inventors: Johnnie B. Manzari, San Francisco, CA (US); Jae Woo Chang, Cupertino, CA (US); Brandon J. Corey, Palo Alto, CA (US); Craig M. Federighi, Los Altos Hills, CA (US); Bradley D. Ford, San Jose, CA (US); Aaron Moring, Fremont, CA (US); Fiona P. O'Leary, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 18/077,154

(22) Filed: Dec. 7, 2022

(65) Prior Publication Data

US 2023/0319413 A1    Oct. 5, 2023

Related U.S. Application Data

(60) Provisional application No. 63/327,279, filed on Apr. 4, 2022.

(51) Int. Cl.
*H04N 23/69*      (2023.01)
*H04N 23/61*      (2023.01)
*H04N 23/63*      (2023.01)

(52) U.S. Cl.
CPC ............. *H04N 23/69* (2023.01); *H04N 23/61* (2023.01); *H04N 23/632* (2023.01)

(58) Field of Classification Search
CPC ........ H04N 23/69; H04N 23/66; H04N 23/90; H04N 23/631; H04N 23/632
See application file for complete search history.

(56) References Cited

U.S. PATENT DOCUMENTS 102,663   A    5/1870   Dillen
5,202,961 A    4/1993   Mills et al.
(Continued)

FOREIGN PATENT DOCUMENTS

AR        060465 A1     6/2008
AU    2007100826 A4     9/2007
(Continued)

OTHER PUBLICATIONS

Applicant-Initiated Interview Summary received for U.S. Appl. No. 17/950,868, mailed on Sep. 10, 2024, 3 pages.
(Continued)

*Primary Examiner* — Xi Wang
(74) *Attorney, Agent, or Firm* — YHE Law LLP

(57)      ABSTRACT

The present disclosure generally relates to techniques for managing camera sharing between devices. In some embodiments, a first computer system displays a system interface with a set of camera options for a second computer system and an option to select a camera of a second computer system for generating a video feed at the first computer system. In some embodiments, a first computer system is in a first mode of operation in which video information is provided to a second computer system, and the first computer system receives an input and switches to a second mode of operation and ceases providing the video information to the second computer system. In some embodiments, a first computer system determines whether or not to automatically set a camera of a second computer system as a system camera for the first computer system based on device proximity.

38 Claims, 42 Drawing Sheets

(56)                References Cited

U.S. PATENT DOCUMENTS

| | | | |
|---|---|---|---|
| 5,617,526 | A | 4/1997 | Oran et al. |
| 5,745,116 | A | 4/1998 | Pisutha-Arnond |
| 5,958,006 | A | 9/1999 | Eggleston et al. |
| 6,025,871 | A | 2/2000 | Kantor et al. |
| 6,219,047 | B1 | 4/2001 | Bell |
| 6,323,846 | B1 | 11/2001 | Westerman et al. |
| 6,333,973 | B1 | 12/2001 | Smith et al. |
| 6,346,962 | B1 | 2/2002 | Goodridge |
| 6,393,462 | B1 | 5/2002 | Mullen-schultz |
| 6,504,934 | B1 | 1/2003 | Kasai et al. |
| 6,515,988 | B1 | 2/2003 | Eldridge et al. |
| 6,570,557 | B1 | 5/2003 | Westerman et al. |
| 6,677,932 | B1 | 1/2004 | Westerman |
| 6,726,094 | B1 | 4/2004 | Rantze et al. |
| 6,728,784 | B1 | 4/2004 | Mattaway |
| 6,731,308 | B1 | 5/2004 | Tang et al. |
| 6,922,147 | B1 | 7/2005 | Viksnins et al. |
| 7,081,905 | B1 | 7/2006 | Raghunath |
| 7,102,663 | B2 | 9/2006 | Crook |
| 7,148,911 | B1 | 12/2006 | Mitsui et al. |
| 7,185,054 | B1 | 2/2007 | Ludwig et al. |
| 7,343,561 | B1 | 3/2008 | Stochosky et al. |
| 7,370,244 | B2 | 5/2008 | Breitling et al. |
| 7,415,720 | B2 | 8/2008 | Jung |
| 7,454,192 | B1 | 11/2008 | Zhu |
| 7,526,728 | B2 | 4/2009 | Apparao et al. |
| 7,546,470 | B2 | 6/2009 | Schultz |
| 7,571,014 | B1 | 8/2009 | Lambourne et al. |
| 7,593,749 | B2 | 9/2009 | Vallström et al. |
| 7,801,971 | B1 | 9/2010 | Amidon et al. |
| 7,860,936 | B1 | 12/2010 | Newstadt et al. |
| 7,876,996 | B1 | 1/2011 | Herz |
| 7,903,171 | B2 | 3/2011 | Takabatake et al. |
| 7,982,762 | B2 | 7/2011 | Chatting et al. |
| 8,028,323 | B2 | 9/2011 | Weel |
| 8,042,157 | B2 | 10/2011 | Bennett et al. |
| 8,060,571 | B2 | 11/2011 | Rao |
| 8,077,157 | B2 | 12/2011 | Sengupta et al. |
| 8,169,463 | B2 | 5/2012 | Enstad et al. |
| 8,171,137 | B1 | 5/2012 | Parks et al. |
| RE43,462 | E | 6/2012 | Washino et al. |
| 8,224,894 | B1 | 7/2012 | Parks et al. |
| 8,225,191 | B1 | 7/2012 | Kalman |
| 8,260,879 | B2 | 9/2012 | Chan |
| 8,274,544 | B2 | 9/2012 | Kurtz et al. |
| 8,290,603 | B1 | 10/2012 | Lambourne |
| 8,370,448 | B2 | 2/2013 | Galchev |
| 8,386,563 | B2 | 2/2013 | Parks et al. |
| 8,392,259 | B2 | 3/2013 | Macgillivray et al. |
| 8,392,617 | B1 | 3/2013 | Weber et al. |
| 8,427,303 | B1 | 4/2013 | Brady et al. |
| 8,434,133 | B2 | 4/2013 | Kulkarni et al. |
| 8,458,780 | B1 | 6/2013 | Takkallapally et al. |
| 8,462,961 | B1 | 6/2013 | Bywaters et al. |
| 8,467,766 | B2 | 6/2013 | Rackley, III et al. |
| 8,478,363 | B2 | 7/2013 | Levien et al. |
| 8,478,816 | B2 | 7/2013 | Parks et al. |
| 8,502,856 | B2 | 8/2013 | Jeong et al. |
| 8,542,265 | B1 | 9/2013 | Dodd et al. |
| 8,613,070 | B1 | 12/2013 | Borzycki et al. |
| 8,624,836 | B1 | 1/2014 | Miller et al. |
| 8,624,952 | B2 | 1/2014 | Currivan et al. |
| 8,718,556 | B2 | 5/2014 | Lee et al. |
| 8,725,880 | B2 | 5/2014 | Santamaria et al. |
| 8,738,090 | B2 | 5/2014 | Kanda et al. |
| 8,769,624 | B2 | 7/2014 | Cotterill |
| 8,799,406 | B1 | 8/2014 | Slonh |
| 8,811,951 | B1 | 8/2014 | Faaborg et al. |
| 8,812,601 | B2 | 8/2014 | Hsieh et al. |
| 8,826,415 | B2 | 9/2014 | Last |
| 8,856,105 | B2 | 10/2014 | Gargi |
| 8,884,874 | B1 | 11/2014 | Kim et al. |
| 8,886,710 | B2 | 11/2014 | Evans et al. |
| 8,914,752 | B1 | 12/2014 | Spiegel |
| 8,914,840 | B2 | 12/2014 | Reisman |
| 9,002,322 | B2 | 4/2015 | Cotterill |
| 9,042,556 | B2 | 5/2015 | Kallai et al. |
| 9,071,945 | B1 | 6/2015 | Rubin et al. |
| 9,080,736 | B1 | 7/2015 | Salzinger et al. |
| 9,084,003 | B1 | 7/2015 | Sanio et al. |
| 9,095,779 | B2 | 8/2015 | Chan et al. |
| 9,100,944 | B2 | 8/2015 | Sauhta et al. |
| 9,112,849 | B1 | 8/2015 | Werkelin Ahlin et al. |
| 9,134,902 | B2 | 9/2015 | Kang et al. |
| 9,185,062 | B1 | 11/2015 | Yang et al. |
| 9,191,988 | B2 | 11/2015 | Newham |
| 9,202,509 | B2 | 12/2015 | Kallai et al. |
| 9,247,363 | B2 | 1/2016 | Triplett et al. |
| 9,251,787 | B1 | 2/2016 | Hart et al. |
| 9,253,531 | B2 | 2/2016 | Relyea et al. |
| 9,253,631 | B1 | 2/2016 | White et al. |
| 9,269,083 | B1 | 2/2016 | Jarajapu et al. |
| 9,294,476 | B1 | 3/2016 | Lurey et al. |
| 9,294,853 | B1 | 3/2016 | Dhaundiyal |
| 9,319,782 | B1 | 4/2016 | Crump et al. |
| 9,374,607 | B2 | 6/2016 | Bates et al. |
| 9,380,264 | B1 | 6/2016 | Vakalapudi |
| 9,400,489 | B2 | 7/2016 | Kim et al. |
| 9,406,103 | B1 | 8/2016 | Gray et al. |
| 9,431,021 | B1 | 8/2016 | Scalise et al. |
| 9,445,048 | B1 | 9/2016 | Nariyawala et al. |
| 9,450,812 | B2 | 9/2016 | Lee et al. |
| 9,459,786 | B2 | 10/2016 | Thakur et al. |
| 9,462,017 | B1 | 10/2016 | Siracusano, Jr. |
| 9,477,208 | B2 | 10/2016 | Park et al. |
| 9,519,413 | B2 | 12/2016 | Bates |
| 9,549,323 | B2 | 1/2017 | Lee et al. |
| 9,588,661 | B1 | 3/2017 | Jauhal et al. |
| 9,628,414 | B1 | 4/2017 | Umapathy et al. |
| 9,635,314 | B2 | 4/2017 | Barkley et al. |
| 9,680,927 | B2 | 6/2017 | Miller et al. |
| 9,703,369 | B1 | 7/2017 | Mullen |
| 9,710,639 | B1 | 7/2017 | Saini |
| 9,727,749 | B2 | 8/2017 | Tzeng et al. |
| 9,787,938 | B2 | 10/2017 | Cranfill et al. |
| 9,794,720 | B1 | 10/2017 | Kadri |
| 9,800,951 | B1 | 10/2017 | Carlson et al. |
| 9,819,877 | B1 | 11/2017 | Faulkner et al. |
| 9,820,323 | B1 | 11/2017 | Young et al. |
| 9,846,685 | B2 | 12/2017 | Li |
| 9,847,999 | B2 | 12/2017 | Van Os et al. |
| 9,898,250 | B1 | 2/2018 | Williams et al. |
| 9,922,317 | B2 | 3/2018 | Bak et al. |
| 9,954,989 | B2 | 4/2018 | Zhou |
| 9,967,401 | B2 | 5/2018 | Coffman et al. |
| 9,992,450 | B1 | 6/2018 | Yuan et al. |
| 10,089,607 | B2 | 10/2018 | Ziat et al. |
| 10,096,015 | B2 | 10/2018 | Bak et al. |
| 10,104,089 | B2 | 10/2018 | Kim et al. |
| 10,129,044 | B2 | 11/2018 | Kangshang et al. |
| 10,157,040 | B2 | 12/2018 | Ballinger et al. |
| 10,178,234 | B2 | 1/2019 | Coffman et al. |
| 10,194,189 | B1 | 1/2019 | Goetz et al. |
| 10,198,563 | B2 | 2/2019 | Wang et al. |
| 10,225,711 | B2 | 3/2019 | Parks et al. |
| 10,248,779 | B2 | 4/2019 | Song et al. |
| 10,270,983 | B1 | 4/2019 | Van Os et al. |
| 10,284,812 | B1 | 5/2019 | Van Os et al. |
| 10,284,980 | B1 | 5/2019 | Woo et al. |
| 10,300,394 | B1 | 5/2019 | Evans et al. |
| 10,303,422 | B1 | 5/2019 | Woo et al. |
| 10,334,054 | B2 | 6/2019 | Van Os et al. |
| 10,339,769 | B2 | 7/2019 | Mixter et al. |
| 10,353,532 | B1 | 7/2019 | Holz et al. |
| 10,362,272 | B1 | 7/2019 | Van Os et al. |
| 10,374,804 | B2 | 8/2019 | Lee et al. |
| 10,386,994 | B2 | 8/2019 | Singal et al. |
| 10,389,977 | B1 | 8/2019 | Van Os et al. |
| 10,410,426 | B2 | 9/2019 | Kamini et al. |
| 10,417,037 | B2 | 9/2019 | Gruber et al. |
| 10,523,625 | B1 | 12/2019 | Allen et al. |
| 10,523,976 | B2 | 12/2019 | Hemmati et al. |
| 10,585,472 | B2 | 3/2020 | Tokubo et al. |
| 10,645,294 | B1 | 5/2020 | Manzari et al. |

(56) References Cited

U.S. PATENT DOCUMENTS

| | | |
|---|---|---|
| 10,701,067 B1 | 6/2020 | Ziraknejad et al. |
| 10,713,699 B1 | 7/2020 | Lien et al. |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,749,967 B2 | 8/2020 | Van Os et al. |
| 10,757,366 B1 | 8/2020 | Kwatra et al. |
| 10,771,740 B1 | 9/2020 | Reynolds et al. |
| 10,771,741 B1 | 9/2020 | Reynolds et al. |
| 10,783,883 B2 | 9/2020 | Mixter et al. |
| 10,824,299 B2 | 11/2020 | Bai |
| 10,833,887 B2 | 11/2020 | Wu |
| 10,909,586 B2 | 2/2021 | Avedissian et al. |
| 10,924,446 B1 | 2/2021 | Paul |
| 10,929,099 B2 | 2/2021 | Querze et al. |
| 10,963,145 B1 | 3/2021 | Voss et al. |
| 10,972,655 B1 | 4/2021 | Ostap et al. |
| 11,012,575 B1 | 5/2021 | Leblang et al. |
| 11,024,303 B1 | 6/2021 | Devaraj et al. |
| 11,064,256 B1 | 7/2021 | Voss et al. |
| 11,079,913 B1 | 8/2021 | Kim et al. |
| 11,144,885 B2 | 10/2021 | Rosenberg |
| 11,157,143 B2 | 10/2021 | Yang et al. |
| 11,164,113 B2 | 11/2021 | Howard |
| 11,164,580 B2 | 11/2021 | Kraker |
| 11,176,940 B1 | 11/2021 | Zhong et al. |
| 11,212,449 B1 | 12/2021 | Manzari et al. |
| 11,258,619 B2 | 2/2022 | Libin |
| 11,283,916 B2 | 3/2022 | Coffman et al. |
| 11,290,687 B1 | 3/2022 | Becchetti |
| 11,316,709 B2 | 4/2022 | Brown et al. |
| 11,343,370 B1 | 5/2022 | Gordon et al. |
| 11,343,613 B2 | 5/2022 | Gordon et al. |
| 11,360,634 B1 | 6/2022 | Chang et al. |
| 11,431,834 B1 | 8/2022 | Gordon et al. |
| 11,449,188 B1 | 9/2022 | Chang et al. |
| 11,449,212 B2 | 9/2022 | Roard et al. |
| 11,463,576 B1 | 10/2022 | Gordon et al. |
| 11,500,510 B2 | 11/2022 | Tokuchi et al. |
| 11,523,166 B1 | 12/2022 | Tu et al. |
| 11,589,184 B1 | 2/2023 | Mont-Reynaud |
| 11,621,979 B1 | 4/2023 | Slotznick |
| 11,671,697 B2 | 6/2023 | O'Leary et al. |
| 11,726,647 B2 | 8/2023 | Kim |
| 11,770,600 B2 | 9/2023 | O'Leary et al. |
| 11,900,015 B2 | 2/2024 | Kim et al. |
| 11,955,025 B2 | 4/2024 | Aoki et al. |
| 12,014,118 B2 | 6/2024 | Gruber et al. |
| 12,085,421 B2 | 9/2024 | Yedid et al. |
| 12,170,883 B2 | 12/2024 | Marculescu et al. |
| 12,218,944 B1 | 2/2025 | Hadley et al. |
| 2001/0021649 A1 | 9/2001 | Kinnunen et al. |
| 2001/0030597 A1 | 10/2001 | Inoue et al. |
| 2001/0031622 A1 | 10/2001 | Kivela et al. |
| 2001/0039497 A1 | 11/2001 | Hubbard |
| 2001/0041007 A1 | 11/2001 | Aoki |
| 2001/0049627 A1 | 12/2001 | Simpson |
| 2002/0002039 A1 | 1/2002 | Qureshey et al. |
| 2002/0015024 A1 | 2/2002 | Westerman et al. |
| 2002/0059295 A1 | 5/2002 | Ludtke et al. |
| 2002/0068600 A1 | 6/2002 | Chihara et al. |
| 2002/0093531 A1 | 7/2002 | Barile |
| 2002/0101446 A1 | 8/2002 | Tang et al. |
| 2002/0115478 A1 | 8/2002 | Fujisawa et al. |
| 2002/0116276 A1 | 8/2002 | Ottley |
| 2002/0142734 A1 | 10/2002 | Wickstead |
| 2002/0168938 A1 | 11/2002 | Chang |
| 2003/0028639 A1 | 2/2003 | Yamamoto et al. |
| 2003/0055977 A1 | 3/2003 | Miller |
| 2003/0076298 A1 | 4/2003 | Rosenberg |
| 2003/0079057 A1 | 4/2003 | Ruskin et al. |
| 2003/0081506 A1 | 5/2003 | Karhu et al. |
| 2003/0097413 A1 | 5/2003 | Vishik et al. |
| 2003/0112938 A1 | 6/2003 | Kanakubo et al. |
| 2003/0158886 A1 | 8/2003 | Walls et al. |
| 2003/0180861 A1 | 9/2003 | Eaton et al. |
| 2003/0188183 A1 | 10/2003 | Lee et al. |
| 2003/0217096 A1 | 11/2003 | Mckelvie et al. |
| 2003/0225836 A1 | 12/2003 | Lee et al. |
| 2003/0229900 A1 | 12/2003 | Reisman |
| 2004/0003040 A1 | 1/2004 | Beavers et al. |
| 2004/0032955 A1 | 2/2004 | Hashimoto et al. |
| 2004/0046638 A1 | 3/2004 | Kawasaki |
| 2004/0048601 A1 | 3/2004 | Lee et al. |
| 2004/0048612 A1 | 3/2004 | Virtanen et al. |
| 2004/0073432 A1 | 4/2004 | Stone |
| 2004/0102225 A1 | 5/2004 | Furuta et al. |
| 2004/0162877 A1 | 8/2004 | Van Dok et al. |
| 2004/0181695 A1 | 9/2004 | Walker |
| 2004/0218035 A1 | 11/2004 | Crook |
| 2004/0239763 A1 | 12/2004 | Notea et al. |
| 2004/0242200 A1 | 12/2004 | Maeoka et al. |
| 2004/0261010 A1 | 12/2004 | Matsuishi |
| 2004/0264916 A1 | 12/2004 | Van De Sluis et al. |
| 2005/0015286 A1 | 1/2005 | Rudnik et al. |
| 2005/0071188 A1 | 3/2005 | Thuerk |
| 2005/0093868 A1 | 5/2005 | Hinckley |
| 2005/0096009 A1 | 5/2005 | Ackley |
| 2005/0099492 A1 | 5/2005 | Orr |
| 2005/0117752 A1 | 6/2005 | Ilma et al. |
| 2005/0120306 A1 | 6/2005 | Klassen et al. |
| 2005/0124365 A1 | 6/2005 | Balasuriya et al. |
| 2005/0138122 A1 | 6/2005 | Boehringer et al. |
| 2005/0144247 A1 | 6/2005 | Christensen et al. |
| 2005/0144452 A1 | 6/2005 | Lynch et al. |
| 2005/0220304 A1 | 10/2005 | Lenoir et al. |
| 2005/0233780 A1 | 10/2005 | Jani et al. |
| 2005/0239512 A1 | 10/2005 | Hasegawa et al. |
| 2005/0278587 A1 | 12/2005 | Breitling et al. |
| 2006/0002315 A1 | 1/2006 | Theurer et al. |
| 2006/0002523 A1 | 1/2006 | Bettis et al. |
| 2006/0019649 A1 | 1/2006 | Feinleib et al. |
| 2006/0056837 A1 | 3/2006 | Vapaakoski |
| 2006/0098085 A1 | 5/2006 | Nichols et al. |
| 2006/0098634 A1 | 5/2006 | Umemoto et al. |
| 2006/0129947 A1 | 6/2006 | Hamzy et al. |
| 2006/0132456 A1 | 6/2006 | Anson |
| 2006/0149399 A1 | 7/2006 | Norhammar et al. |
| 2006/0158730 A1 | 7/2006 | Kira |
| 2006/0160090 A1 | 7/2006 | Macina et al. |
| 2006/0161621 A1 | 7/2006 | Rosenberg |
| 2006/0185005 A1 | 8/2006 | Graves et al. |
| 2006/0206709 A1 | 9/2006 | Labrou et al. |
| 2006/0210092 A1 | 9/2006 | Navid |
| 2006/0217104 A1 | 9/2006 | Cho |
| 2006/0224882 A1 | 10/2006 | Chin |
| 2006/0250578 A1 | 11/2006 | Pohl et al. |
| 2006/0256188 A1 | 11/2006 | Mock et al. |
| 2006/0258289 A1 | 11/2006 | Dua |
| 2006/0288226 A1 | 12/2006 | Kowal |
| 2007/0004389 A1 | 1/2007 | Wallace et al. |
| 2007/0015519 A1 | 1/2007 | Casey |
| 2007/0027682 A1 | 2/2007 | Bennett |
| 2007/0040898 A1 | 2/2007 | Lee et al. |
| 2007/0064112 A1 | 3/2007 | Chatting et al. |
| 2007/0073649 A1 | 3/2007 | Kikkoji et al. |
| 2007/0113294 A1 | 5/2007 | Field et al. |
| 2007/0115349 A1 | 5/2007 | Currivan et al. |
| 2007/0115933 A1 | 5/2007 | Muhamed et al. |
| 2007/0124783 A1 | 5/2007 | Ahiska et al. |
| 2007/0143495 A1 | 6/2007 | Porat |
| 2007/0150842 A1 | 6/2007 | Chaudhri et al. |
| 2007/0156910 A1 | 7/2007 | Alfke et al. |
| 2007/0157089 A1 | 7/2007 | Van Os et al. |
| 2007/0157097 A1 | 7/2007 | Peters et al. |
| 2007/0157103 A1 | 7/2007 | Arneson et al. |
| 2007/0162963 A1 | 7/2007 | Penet et al. |
| 2007/0177025 A1 | 8/2007 | Kopet et al. |
| 2007/0180492 A1 | 8/2007 | Hassan et al. |
| 2007/0186106 A1 | 8/2007 | Ting et al. |
| 2007/0211141 A1 | 9/2007 | Christiansen |
| 2007/0226778 A1 | 9/2007 | Pietruszka |
| 2007/0229221 A1 | 10/2007 | Saotome |
| 2007/0260547 A1 | 11/2007 | Little |

(56) References Cited

U.S. PATENT DOCUMENTS

| | | |
|---|---|---|
| 2007/0264977 A1 | 11/2007 | Zinn et al. |
| 2007/0279482 A1 | 12/2007 | Oswald et al. |
| 2007/0283011 A1 | 12/2007 | Rakowski et al. |
| 2007/0291736 A1 | 12/2007 | Furlong et al. |
| 2007/0294182 A1 | 12/2007 | Hammad |
| 2008/0010387 A1 | 1/2008 | Curtis et al. |
| 2008/0011827 A1 | 1/2008 | Little et al. |
| 2008/0016368 A1 | 1/2008 | Adams |
| 2008/0016537 A1 | 1/2008 | Little et al. |
| 2008/0017721 A1 | 1/2008 | Zehnacker |
| 2008/0027947 A1 | 1/2008 | Pritchett et al. |
| 2008/0032704 A1 | 2/2008 | Oneil et al. |
| 2008/0036849 A1 | 2/2008 | Oh et al. |
| 2008/0040786 A1 | 2/2008 | Chang et al. |
| 2008/0042866 A1 | 2/2008 | Morse et al. |
| 2008/0055263 A1 | 3/2008 | Lemay et al. |
| 2008/0057926 A1 | 3/2008 | Forstall et al. |
| 2008/0063389 A1 | 3/2008 | Fang et al. |
| 2008/0068447 A1 | 3/2008 | Mattila et al. |
| 2008/0074049 A1 | 3/2008 | Kital et al. |
| 2008/0074550 A1 | 3/2008 | Park |
| 2008/0081558 A1 | 4/2008 | Dunko et al. |
| 2008/0084482 A1 | 4/2008 | Hansson et al. |
| 2008/0091717 A1 | 4/2008 | Garbow et al. |
| 2008/0094370 A1 | 4/2008 | Ording et al. |
| 2008/0100693 A1 | 5/2008 | Jobs et al. |
| 2008/0114678 A1 | 5/2008 | Bennett et al. |
| 2008/0114716 A1 | 5/2008 | Mock |
| 2008/0114980 A1 | 5/2008 | Sridhar |
| 2008/0117876 A1 | 5/2008 | Hidaka et al. |
| 2008/0122796 A1 | 5/2008 | Jobs et al. |
| 2008/0129816 A1 | 6/2008 | Mattila et al. |
| 2008/0129844 A1 | 6/2008 | Cusack et al. |
| 2008/0134088 A1 | 6/2008 | Tse et al. |
| 2008/0140488 A1 | 6/2008 | Oral et al. |
| 2008/0160974 A1 | 7/2008 | Vartiainen et al. |
| 2008/0165388 A1 | 7/2008 | Serlet |
| 2008/0201454 A1 | 8/2008 | Soffer |
| 2008/0208762 A1 | 8/2008 | Arthur et al. |
| 2008/0220752 A1 | 9/2008 | Forstall et al. |
| 2008/0229409 A1 | 9/2008 | Miller et al. |
| 2008/0246778 A1 | 10/2008 | Ham et al. |
| 2008/0259829 A1 | 10/2008 | Rosenblatt |
| 2008/0273712 A1 | 11/2008 | Eichfeld et al. |
| 2008/0273713 A1 | 11/2008 | Hartung et al. |
| 2008/0282202 A1 | 11/2008 | Sunday |
| 2008/0285772 A1 | 11/2008 | Haulick et al. |
| 2008/0292074 A1 | 11/2008 | Boni et al. |
| 2008/0305742 A1 | 12/2008 | Basir |
| 2008/0306997 A1 | 12/2008 | Keohane et al. |
| 2008/0307323 A1 | 12/2008 | Coffman et al. |
| 2008/0313257 A1 | 12/2008 | Allen et al. |
| 2008/0313278 A1 | 12/2008 | Hochberg |
| 2008/0316183 A1 | 12/2008 | Westerman et al. |
| 2008/0316295 A1 | 12/2008 | King et al. |
| 2009/0005011 A1 | 1/2009 | Christie et al. |
| 2009/0006846 A1 | 1/2009 | Rosenblatt |
| 2009/0007017 A1 | 1/2009 | Anzures et al. |
| 2009/0031375 A1 | 1/2009 | Sullivan et al. |
| 2009/0033737 A1 | 2/2009 | Goose et al. |
| 2009/0046075 A1 | 2/2009 | Kim et al. |
| 2009/0049446 A1 | 2/2009 | Merten et al. |
| 2009/0051649 A1 | 2/2009 | Rondel |
| 2009/0054044 A1 | 2/2009 | Ikemori et al. |
| 2009/0055377 A1 | 2/2009 | Hedge et al. |
| 2009/0060170 A1 | 3/2009 | Coughlan et al. |
| 2009/0063851 A1 | 3/2009 | Nijdam |
| 2009/0066648 A1 | 3/2009 | Kerr et al. |
| 2009/0094681 A1 | 4/2009 | Sadler et al. |
| 2009/0100383 A1 | 4/2009 | Sunday et al. |
| 2009/0109276 A1 | 4/2009 | Kim |
| 2009/0117936 A1 | 5/2009 | Maeng |
| 2009/0119754 A1 | 5/2009 | Schubert |
| 2009/0122149 A1 | 5/2009 | Ishii |
| 2009/0125571 A1 | 5/2009 | Kiilerich et al. |
| 2009/0135678 A1 | 5/2009 | Godat |
| 2009/0140960 A1 | 6/2009 | Mahowald et al. |
| 2009/0144451 A1 | 6/2009 | Cabezas et al. |
| 2009/0153466 A1 | 6/2009 | Tilley |
| 2009/0158390 A1 | 6/2009 | Guan |
| 2009/0164322 A1 | 6/2009 | Khan et al. |
| 2009/0164581 A1 | 6/2009 | Bove et al. |
| 2009/0164587 A1 | 6/2009 | Gavita et al. |
| 2009/0165107 A1 | 6/2009 | Tojo et al. |
| 2009/0174680 A1 | 7/2009 | Anzures et al. |
| 2009/0174763 A1 | 7/2009 | Bengtsson et al. |
| 2009/0177981 A1 | 7/2009 | Christie et al. |
| 2009/0183125 A1 | 7/2009 | Magal et al. |
| 2009/0187423 A1 | 7/2009 | Kim |
| 2009/0193514 A1 | 7/2009 | Adams et al. |
| 2009/0195497 A1 | 8/2009 | Fitzgerald et al. |
| 2009/0199130 A1 | 8/2009 | Tsern et al. |
| 2009/0199188 A1 | 8/2009 | Fujimaki |
| 2009/0228322 A1 | 9/2009 | van Os et al. |
| 2009/0228820 A1 | 9/2009 | Kim et al. |
| 2009/0228825 A1 | 9/2009 | Van Os et al. |
| 2009/0228938 A1 | 9/2009 | White et al. |
| 2009/0231960 A1 | 9/2009 | Hutcheson |
| 2009/0232129 A1 | 9/2009 | Wong et al. |
| 2009/0241169 A1 | 9/2009 | Dhand et al. |
| 2009/0244015 A1 | 10/2009 | Sengupta et al. |
| 2009/0248737 A1 | 10/2009 | Shukla et al. |
| 2009/0249244 A1 | 10/2009 | Robinson et al. |
| 2009/0256780 A1 | 10/2009 | Small et al. |
| 2009/0262200 A1 | 10/2009 | Takabatake et al. |
| 2009/0262206 A1 | 10/2009 | Park |
| 2009/0271744 A1 | 10/2009 | Anders |
| 2009/0287790 A1 | 11/2009 | Upton et al. |
| 2009/0304205 A1 | 12/2009 | Hardacker et al. |
| 2009/0304359 A1 | 12/2009 | Lemay et al. |
| 2009/0305679 A1 | 12/2009 | Kim |
| 2009/0305732 A1 | 12/2009 | Marcellino et al. |
| 2009/0307633 A1 | 12/2009 | Haughay, Jr. et al. |
| 2009/0309897 A1 | 12/2009 | Morita et al. |
| 2009/0311993 A1 | 12/2009 | Horodezky |
| 2010/0004031 A1 | 1/2010 | Kim |
| 2010/0009719 A1 | 1/2010 | Oh et al. |
| 2010/0011065 A1 | 1/2010 | Scherpa et al. |
| 2010/0017474 A1 | 1/2010 | Kandekar et al. |
| 2010/0023449 A1 | 1/2010 | Skowronek et al. |
| 2010/0039498 A1 | 2/2010 | Liu et al. |
| 2010/0040292 A1 | 2/2010 | Clarkson |
| 2010/0042835 A1 | 2/2010 | Lee et al. |
| 2010/0050086 A1 | 2/2010 | Sherrard et al. |
| 2010/0053212 A1 | 3/2010 | Kang et al. |
| 2010/0058231 A1 | 3/2010 | Duarte et al. |
| 2010/0070490 A1 | 3/2010 | Amidon et al. |
| 2010/0073454 A1 | 3/2010 | Lovhaugen et al. |
| 2010/0073455 A1 | 3/2010 | Iwabuchi et al. |
| 2010/0075656 A1 | 3/2010 | Howarter et al. |
| 2010/0082481 A1 | 4/2010 | Lin et al. |
| 2010/0085416 A1 | 4/2010 | Hegde et al. |
| 2010/0087230 A1 | 4/2010 | Peh et al. |
| 2010/0097438 A1 | 4/2010 | Ujii |
| 2010/0106647 A1 | 4/2010 | Raman |
| 2010/0107229 A1 | 4/2010 | Najafi et al. |
| 2010/0109864 A1 | 5/2010 | Haartsen et al. |
| 2010/0121636 A1 | 5/2010 | Burke et al. |
| 2010/0123724 A1 | 5/2010 | Moore et al. |
| 2010/0125785 A1 | 5/2010 | Moore et al. |
| 2010/0125811 A1 | 5/2010 | Moore et al. |
| 2010/0138780 A1 | 6/2010 | Marano et al. |
| 2010/0146384 A1 | 6/2010 | Peev et al. |
| 2010/0146463 A1 | 6/2010 | Cho et al. |
| 2010/0159994 A1 | 6/2010 | Stallings et al. |
| 2010/0159995 A1 | 6/2010 | Stallings et al. |
| 2010/0162171 A1 | 6/2010 | Felt et al. |
| 2010/0169435 A1 | 7/2010 | Osullivan et al. |
| 2010/0174644 A1 | 7/2010 | Rosano et al. |
| 2010/0177156 A1 | 7/2010 | Kim et al. |
| 2010/0178873 A1 | 7/2010 | Lee et al. |
| 2010/0189096 A1 | 7/2010 | Flynn et al. |
| 2010/0223542 A1 | 9/2010 | Vuong et al. |
| 2010/0238262 A1 | 9/2010 | Kurtz et al. |

(56)                References Cited

U.S. PATENT DOCUMENTS

| 2010/0246571 A1 | 9/2010 | Geppert et al. |
| 2010/0247077 A1 | 9/2010 | Yamamoto et al. |
| 2010/0248823 A1 | 9/2010 | Smith |
| 2010/0250376 A1 | 9/2010 | Nandiraju |
| 2010/0251119 A1 | 9/2010 | Geppert et al. |
| 2010/0251158 A1 | 9/2010 | Geppert et al. |
| 2010/0257466 A1 | 10/2010 | Wroblewski et al. |
| 2010/0257490 A1 | 10/2010 | Lyon et al. |
| 2010/0262714 A1 | 10/2010 | Hiie |
| 2010/0269069 A1 | 10/2010 | Paila et al. |
| 2010/0269156 A1 | 10/2010 | Hohlfeld et al. |
| 2010/0272250 A1 | 10/2010 | Yap et al. |
| 2010/0284389 A1 | 11/2010 | Ramsay et al. |
| 2010/0293598 A1 | 11/2010 | Collart et al. |
| 2010/0295803 A1 | 11/2010 | Kim et al. |
| 2010/0296678 A1 | 11/2010 | Kuhn-Rahloff et al. |
| 2010/0299436 A1 | 11/2010 | Khalid et al. |
| 2010/0299639 A1 | 11/2010 | Ramsay et al. |
| 2010/0304729 A1 | 12/2010 | Sabotta et al. |
| 2010/0309284 A1 | 12/2010 | Samadani et al. |
| 2010/0311336 A1 | 12/2010 | Huotari et al. |
| 2010/0318928 A1 | 12/2010 | Neuman et al. |
| 2010/0318939 A1 | 12/2010 | Moon |
| 2010/0321201 A1 | 12/2010 | Huang et al. |
| 2011/0003587 A1 | 1/2011 | Belz et al. |
| 2011/0010470 A1 | 1/2011 | Hulbert et al. |
| 2011/0029750 A1 | 2/2011 | Jang et al. |
| 2011/0029891 A1 | 2/2011 | Kim et al. |
| 2011/0030324 A1 | 2/2011 | Higgins |
| 2011/0032324 A1 | 2/2011 | George et al. |
| 2011/0035799 A1 | 2/2011 | Handler |
| 2011/0041102 A1 | 2/2011 | Kim |
| 2011/0054268 A1 | 3/2011 | Fidacaro et al. |
| 2011/0059769 A1 | 3/2011 | Brunolli |
| 2011/0065384 A1 | 3/2011 | Cader et al. |
| 2011/0081889 A1 | 4/2011 | Gao et al. |
| 2011/0081923 A1 | 4/2011 | Bednar et al. |
| 2011/0085017 A1 | 4/2011 | Robinson et al. |
| 2011/0087431 A1 | 4/2011 | Gupta et al. |
| 2011/0087970 A1 | 4/2011 | Swink et al. |
| 2011/0088086 A1 | 4/2011 | Swink et al. |
| 2011/0105096 A1 | 5/2011 | Dods et al. |
| 2011/0106671 A1 | 5/2011 | Minnis et al. |
| 2011/0106921 A1 | 5/2011 | Brown et al. |
| 2011/0107216 A1 | 5/2011 | Bi |
| 2011/0111735 A1 | 5/2011 | Pietrow |
| 2011/0115875 A1 | 5/2011 | Sadwick et al. |
| 2011/0115876 A1 | 5/2011 | Khot et al. |
| 2011/0115945 A1* | 5/2011 | Takano .................. G03B 17/20 |
| | | 348/E5.031 |
| 2011/0117898 A1 | 5/2011 | Pereira et al. |
| 2011/0126148 A1 | 5/2011 | Krishnaraj et al. |
| 2011/0130168 A1 | 6/2011 | Vendrow et al. |
| 2011/0138166 A1 | 6/2011 | Peszek et al. |
| 2011/0138295 A1 | 6/2011 | Momchilov et al. |
| 2011/0142234 A1 | 6/2011 | Rogers |
| 2011/0149874 A1 | 6/2011 | Reif |
| 2011/0157046 A1 | 6/2011 | Lee et al. |
| 2011/0161836 A1 | 6/2011 | Mu et al. |
| 2011/0164032 A1 | 7/2011 | Shadmi |
| 2011/0164269 A1 | 7/2011 | Kamishiro |
| 2011/0167357 A1 | 7/2011 | Benjamin et al. |
| 2011/0170004 A1 | 7/2011 | Nunes |
| 2011/0178811 A1 | 7/2011 | Sheridan |
| 2011/0179386 A1 | 7/2011 | Shaffer et al. |
| 2011/0183650 A1 | 7/2011 | Mckee |
| 2011/0184768 A1 | 7/2011 | Norton et al. |
| 2011/0187497 A1 | 8/2011 | Chin |
| 2011/0191695 A1 | 8/2011 | Dinka et al. |
| 2011/0193995 A1 | 8/2011 | Goh et al. |
| 2011/0205333 A1 | 8/2011 | Wu et al. |
| 2011/0209201 A1 | 8/2011 | Chollat |
| 2011/0214158 A1 | 9/2011 | Pasquero et al. |
| 2011/0215921 A1 | 9/2011 | Ben et al. |
| 2011/0225426 A1 | 9/2011 | Agarwal et al. |
| 2011/0231914 A1 | 9/2011 | Hung |
| 2011/0234746 A1 | 9/2011 | Saleh et al. |
| 2011/0235549 A1 | 9/2011 | Ahlers et al. |
| 2011/0242356 A1 | 10/2011 | Aleksic et al. |
| 2011/0249073 A1 | 10/2011 | Cranfill et al. |
| 2011/0249074 A1 | 10/2011 | Cranfill et al. |
| 2011/0249086 A1 | 10/2011 | Guo et al. |
| 2011/0250895 A1 | 10/2011 | Wohlert et al. |
| 2011/0252146 A1 | 10/2011 | Santamaria et al. |
| 2011/0254683 A1 | 10/2011 | Soldan et al. |
| 2011/0273526 A1 | 11/2011 | Mehin et al. |
| 2011/0275358 A1 | 11/2011 | Faenger |
| 2011/0279852 A1 | 11/2011 | Oda et al. |
| 2011/0281568 A1 | 11/2011 | Le |
| 2011/0283334 A1 | 11/2011 | Choi et al. |
| 2011/0291971 A1 | 12/2011 | Masaki et al. |
| 2011/0296163 A1 | 12/2011 | Abernethy et al. |
| 2011/0306393 A1 | 12/2011 | Goldman et al. |
| 2011/0314398 A1 | 12/2011 | Yano et al. |
| 2011/0319056 A1 | 12/2011 | Toy et al. |
| 2011/0320450 A1 | 12/2011 | Liu et al. |
| 2012/0002001 A1 | 1/2012 | Prentice |
| 2012/0004920 A1 | 1/2012 | Kelly et al. |
| 2012/0016678 A1 | 1/2012 | Gruber et al. |
| 2012/0019610 A1 | 1/2012 | Hornyak et al. |
| 2012/0024947 A1 | 2/2012 | Naelon et al. |
| 2012/0033028 A1 | 2/2012 | Murphy et al. |
| 2012/0036556 A1 | 2/2012 | Lebeau et al. |
| 2012/0040719 A1 | 2/2012 | Lee et al. |
| 2012/0044062 A1 | 2/2012 | Jersa et al. |
| 2012/0050185 A1 | 3/2012 | Davydov et al. |
| 2012/0054278 A1 | 3/2012 | Taleb et al. |
| 2012/0059813 A1 | 3/2012 | Sejnoha et al. |
| 2012/0062784 A1 | 3/2012 | Van Heugten et al. |
| 2012/0066731 A1 | 3/2012 | Vasquez et al. |
| 2012/0079126 A1 | 3/2012 | Evans et al. |
| 2012/0081375 A1 | 4/2012 | Robert et al. |
| 2012/0084691 A1 | 4/2012 | Yun |
| 2012/0092436 A1 | 4/2012 | Pahud et al. |
| 2012/0096069 A1 | 4/2012 | Chan |
| 2012/0096076 A1 | 4/2012 | Chan et al. |
| 2012/0096386 A1 | 4/2012 | Baumann et al. |
| 2012/0105358 A1 | 5/2012 | Momeyer et al. |
| 2012/0114108 A1 | 5/2012 | Katis et al. |
| 2012/0129496 A1 | 5/2012 | Park et al. |
| 2012/0136998 A1 | 5/2012 | Hough et al. |
| 2012/0143694 A1 | 6/2012 | Zargahi et al. |
| 2012/0173383 A1 | 7/2012 | Badawiyeh et al. |
| 2012/0178431 A1 | 7/2012 | Gold |
| 2012/0182381 A1 | 7/2012 | Abate et al. |
| 2012/0185355 A1 | 7/2012 | Kilroy |
| 2012/0185542 A1 | 7/2012 | Vyrros et al. |
| 2012/0188394 A1 | 7/2012 | Park et al. |
| 2012/0201479 A1 | 8/2012 | Zhang et al. |
| 2012/0210226 A1 | 8/2012 | Mccoy et al. |
| 2012/0214458 A1 | 8/2012 | Levien et al. |
| 2012/0218177 A1 | 8/2012 | Pang et al. |
| 2012/0222092 A1 | 8/2012 | Rabii |
| 2012/0223890 A1 | 9/2012 | Borovsky et al. |
| 2012/0229591 A1 | 9/2012 | Lee |
| 2012/0233239 A1 | 9/2012 | Urim et al. |
| 2012/0257095 A1* | 10/2012 | Velazquez .............. H04N 23/51 |
| | | 348/370 |
| 2012/0260169 A1 | 10/2012 | Schwartz et al. |
| 2012/0272230 A1 | 10/2012 | Lee |
| 2012/0284185 A1 | 11/2012 | Mettler et al. |
| 2012/0284256 A1 | 11/2012 | Mahajan et al. |
| 2012/0284297 A1 | 11/2012 | Aguera-Arcas et al. |
| 2012/0284673 A1 | 11/2012 | Lamb et al. |
| 2012/0289217 A1 | 11/2012 | Riemer et al. |
| 2012/0290653 A1 | 11/2012 | Sharkey |
| 2012/0290657 A1 | 11/2012 | Parks et al. |
| 2012/0290943 A1 | 11/2012 | Toney et al. |
| 2012/0290950 A1 | 11/2012 | Rapaport et al. |
| 2012/0293605 A1 | 11/2012 | Seferian et al. |
| 2012/0294118 A1 | 11/2012 | Haulick et al. |
| 2012/0296972 A1 | 11/2012 | Backer |
| 2012/0297017 A1 | 11/2012 | Livshits et al. |
| 2012/0304079 A1 | 11/2012 | Rideout et al. |

(56) References Cited

U.S. PATENT DOCUMENTS

| | | |
|---|---|---|
| 2012/0320141 A1 | 12/2012 | Bowen et al. |
| 2012/0322508 A1 | 12/2012 | Forstall et al. |
| 2013/0005487 A1 | 1/2013 | Frazzini et al. |
| 2013/0007203 A1 | 1/2013 | Szu |
| 2013/0007665 A1 | 1/2013 | Chaudhri et al. |
| 2013/0016818 A1 | 1/2013 | Cohn |
| 2013/0017846 A1 | 1/2013 | Schoppe |
| 2013/0022221 A1 | 1/2013 | Kallai et al. |
| 2013/0024932 A1 | 1/2013 | Toebes et al. |
| 2013/0026293 A1 | 1/2013 | Schneider et al. |
| 2013/0027289 A1 | 1/2013 | Choi et al. |
| 2013/0027341 A1 | 1/2013 | Mastandrea |
| 2013/0031217 A1 | 1/2013 | Rajapakse |
| 2013/0041790 A1 | 2/2013 | Murugesan et al. |
| 2013/0046893 A1 | 2/2013 | Hauser et al. |
| 2013/0047084 A1 | 2/2013 | Sanders et al. |
| 2013/0047233 A1 | 2/2013 | Fisk et al. |
| 2013/0051755 A1 | 2/2013 | Brown et al. |
| 2013/0053107 A1 | 2/2013 | Kang et al. |
| 2013/0054697 A1 | 2/2013 | Cha et al. |
| 2013/0055113 A1 | 2/2013 | Chazin et al. |
| 2013/0060687 A1 | 3/2013 | Bak et al. |
| 2013/0061155 A1 | 3/2013 | Hon |
| 2013/0063364 A1 | 3/2013 | Moore |
| 2013/0070046 A1 | 3/2013 | Wolf et al. |
| 2013/0073286 A1 | 3/2013 | Bastea-Forte et al. |
| 2013/0073584 A1 | 3/2013 | Kuper et al. |
| 2013/0073989 A1 | 3/2013 | Harris et al. |
| 2013/0074194 A1 | 3/2013 | White et al. |
| 2013/0080177 A1 | 3/2013 | Chen |
| 2013/0080516 A1 | 3/2013 | Bologh |
| 2013/0080525 A1 | 3/2013 | Aoki et al. |
| 2013/0080923 A1 | 3/2013 | Anzures et al. |
| 2013/0080955 A1 | 3/2013 | Reimann et al. |
| 2013/0082819 A1 | 4/2013 | Cotterill |
| 2013/0086637 A1 | 4/2013 | Cotterill et al. |
| 2013/0088413 A1 | 4/2013 | Raffle et al. |
| 2013/0091205 A1 | 4/2013 | Kotler et al. |
| 2013/0091214 A1 | 4/2013 | Kellerman et al. |
| 2013/0091429 A1 | 4/2013 | Weng et al. |
| 2013/0094666 A1 | 4/2013 | Haaff et al. |
| 2013/0094770 A1 | 4/2013 | Lee et al. |
| 2013/0102281 A1 | 4/2013 | Kanda et al. |
| 2013/0102298 A1 | 4/2013 | Goodman et al. |
| 2013/0103797 A1 | 4/2013 | Park et al. |
| 2013/0111603 A1 | 5/2013 | Sakai et al. |
| 2013/0115932 A1 | 5/2013 | Williams et al. |
| 2013/0120106 A1 | 5/2013 | Cauwels et al. |
| 2013/0120254 A1 | 5/2013 | Mun et al. |
| 2013/0124207 A1 | 5/2013 | Sarin et al. |
| 2013/0132865 A1 | 5/2013 | Li |
| 2013/0141514 A1 | 6/2013 | Chao et al. |
| 2013/0145295 A1 | 6/2013 | Bocking et al. |
| 2013/0145303 A1 | 6/2013 | Prakash et al. |
| 2013/0151623 A1 | 6/2013 | Weiser et al. |
| 2013/0159858 A1 | 6/2013 | Joffray et al. |
| 2013/0162781 A1 | 6/2013 | Hubner et al. |
| 2013/0166332 A1 | 6/2013 | Hammad |
| 2013/0166580 A1 | 6/2013 | Maharajh et al. |
| 2013/0169742 A1 | 7/2013 | Wu et al. |
| 2013/0173699 A1 | 7/2013 | Parks et al. |
| 2013/0173794 A1 | 7/2013 | Agerbak et al. |
| 2013/0174044 A1 | 7/2013 | Hill |
| 2013/0185650 A1 | 7/2013 | Gutowitz |
| 2013/0187753 A1 | 7/2013 | Chiriyankandath |
| 2013/0189963 A1 | 7/2013 | Epp et al. |
| 2013/0191454 A1 | 7/2013 | Oliver et al. |
| 2013/0191911 A1 | 7/2013 | Dellinger et al. |
| 2013/0194476 A1 | 8/2013 | Shimosato |
| 2013/0205375 A1 | 8/2013 | Woxblom et al. |
| 2013/0212212 A1 | 8/2013 | Addepalli et al. |
| 2013/0216206 A1 | 8/2013 | Dubin et al. |
| 2013/0219276 A1 | 8/2013 | Shan |
| 2013/0219332 A1 | 8/2013 | Woley et al. |
| 2013/0222270 A1 | 8/2013 | Winkler et al. |
| 2013/0225140 A1 | 8/2013 | Greisson |
| 2013/0230293 A1* | 9/2013 | Boyle .................... H04N 23/66 |
| | | 386/224 |
| 2013/0231127 A1 | 9/2013 | Kildal et al. |
| 2013/0234924 A1 | 9/2013 | Janefalkar et al. |
| 2013/0239202 A1 | 9/2013 | Adams et al. |
| 2013/0243924 A1 | 9/2013 | Bhandari et al. |
| 2013/0244615 A1 | 9/2013 | Miller |
| 2013/0244633 A1 | 9/2013 | Jacobs et al. |
| 2013/0246522 A1 | 9/2013 | Bilinski et al. |
| 2013/0246916 A1 | 9/2013 | Reimann et al. |
| 2013/0254574 A1 | 9/2013 | Zacchio et al. |
| 2013/0256403 A1 | 10/2013 | Mackinnon Keith |
| 2013/0262298 A1 | 10/2013 | Morley et al. |
| 2013/0262857 A1 | 10/2013 | Neuman et al. |
| 2013/0268593 A1 | 10/2013 | Parekh |
| 2013/0275881 A1 | 10/2013 | Hahm et al. |
| 2013/0282180 A1 | 10/2013 | Layton |
| 2013/0283199 A1 | 10/2013 | Selig et al. |
| 2013/0283283 A1 | 10/2013 | Wang et al. |
| 2013/0290058 A1 | 10/2013 | Gray et al. |
| 2013/0293777 A1 | 11/2013 | Huber et al. |
| 2013/0298024 A1 | 11/2013 | Rhee et al. |
| 2013/0304758 A1 | 11/2013 | Gruber et al. |
| 2013/0305354 A1 | 11/2013 | King et al. |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0314302 A1 | 11/2013 | Jeung et al. |
| 2013/0318158 A1 | 11/2013 | Teng et al. |
| 2013/0318249 A1 | 11/2013 | Mcdonough et al. |
| 2013/0322634 A1 | 12/2013 | Bennett et al. |
| 2013/0324081 A1 | 12/2013 | Gargi et al. |
| 2013/0325949 A1 | 12/2013 | Virani et al. |
| 2013/0325967 A1 | 12/2013 | Parks et al. |
| 2013/0328770 A1 | 12/2013 | Parham |
| 2013/0328997 A1 | 12/2013 | Desai |
| 2013/0329924 A1 | 12/2013 | Fleizach et al. |
| 2013/0332162 A1 | 12/2013 | Keen |
| 2013/0332560 A1 | 12/2013 | Knight et al. |
| 2013/0332826 A1 | 12/2013 | Karunamuni et al. |
| 2013/0332856 A1 | 12/2013 | Sanders et al. |
| 2013/0333006 A1 | 12/2013 | Tapling et al. |
| 2013/0346068 A1 | 12/2013 | Solem et al. |
| 2013/0346859 A1 | 12/2013 | Bates et al. |
| 2013/0346882 A1 | 12/2013 | Shiplacoff et al. |
| 2013/0346892 A1 | 12/2013 | Wren et al. |
| 2013/0346922 A1 | 12/2013 | Shiplacoff et al. |
| 2013/0347022 A1 | 12/2013 | Bates et al. |
| 2014/0003597 A1 | 1/2014 | Lazaridis et al. |
| 2014/0006562 A1 | 1/2014 | Handa et al. |
| 2014/0018053 A1 | 1/2014 | Cho et al. |
| 2014/0024340 A1 | 1/2014 | Raleigh |
| 2014/0026074 A1 | 1/2014 | Cortes et al. |
| 2014/0026188 A1 | 1/2014 | Gubler |
| 2014/0032706 A1 | 1/2014 | Kuscher et al. |
| 2014/0037107 A1 | 2/2014 | Marino et al. |
| 2014/0043424 A1 | 2/2014 | Gava et al. |
| 2014/0045463 A1 | 2/2014 | Hsieh et al. |
| 2014/0046464 A1 | 2/2014 | Reimann |
| 2014/0047020 A1 | 2/2014 | Matus et al. |
| 2014/0047382 A1 | 2/2014 | Kim et al. |
| 2014/0049447 A1 | 2/2014 | Choi |
| 2014/0053281 A1 | 2/2014 | Benoit et al. |
| 2014/0055426 A1 | 2/2014 | Park et al. |
| 2014/0058860 A1 | 2/2014 | Roh et al. |
| 2014/0058941 A1 | 2/2014 | Moon et al. |
| 2014/0063176 A1 | 3/2014 | Modai et al. |
| 2014/0064155 A1 | 3/2014 | Evans et al. |
| 2014/0068751 A1 | 3/2014 | Last |
| 2014/0073256 A1 | 3/2014 | Newham et al. |
| 2014/0075130 A1 | 3/2014 | Bansal et al. |
| 2014/0080416 A1 | 3/2014 | Seo et al. |
| 2014/0082136 A1 | 3/2014 | Garcia Puga et al. |
| 2014/0082715 A1 | 3/2014 | Grajek et al. |
| 2014/0089196 A1 | 3/2014 | Paya et al. |
| 2014/0089857 A1 | 3/2014 | Wang et al. |
| 2014/0095965 A1 | 4/2014 | Li |
| 2014/0099004 A1 | 4/2014 | Dibona et al. |

(56) References Cited

U.S. PATENT DOCUMENTS

| | | |
|---|---|---|
| 2014/0101768 A1 | 4/2014 | Miller et al. |
| 2014/0104178 A1 | 4/2014 | Jo |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0114966 A1 | 4/2014 | Bilinski et al. |
| 2014/0118272 A1 | 5/2014 | Gunn |
| 2014/0119531 A1 | 5/2014 | Tuchman et al. |
| 2014/0122730 A1 | 5/2014 | Burch et al. |
| 2014/0123257 A1 | 5/2014 | Gordon et al. |
| 2014/0136481 A1 | 5/2014 | Quan et al. |
| 2014/0136986 A1 | 5/2014 | Martin et al. |
| 2014/0149884 A1 | 5/2014 | Flynn et al. |
| 2014/0155031 A1 | 6/2014 | Lee et al. |
| 2014/0155123 A1 | 6/2014 | Lee et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0171156 A1 | 6/2014 | Pattikonda et al. |
| 2014/0173447 A1 | 6/2014 | Das et al. |
| 2014/0176298 A1 | 6/2014 | Kumar et al. |
| 2014/0181183 A1 | 6/2014 | Yamamoto et al. |
| 2014/0181202 A1 | 6/2014 | Gossain |
| 2014/0181654 A1 | 6/2014 | Kumar et al. |
| 2014/0181658 A1 | 6/2014 | Kumar et al. |
| 2014/0189524 A1 | 7/2014 | Murarka et al. |
| 2014/0189589 A1 | 7/2014 | Kim et al. |
| 2014/0201126 A1 | 7/2014 | Zadeh et al. |
| 2014/0201527 A1 | 7/2014 | Krivorot |
| 2014/0201632 A1 | 7/2014 | Kunigita et al. |
| 2014/0207707 A1 | 7/2014 | Na et al. |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0223490 A1 | 8/2014 | Pan et al. |
| 2014/0229835 A1 | 8/2014 | Ravine |
| 2014/0233755 A1 | 8/2014 | Kim et al. |
| 2014/0237361 A1 | 8/2014 | Martin et al. |
| 2014/0247229 A1 | 9/2014 | Cho et al. |
| 2014/0247368 A1 | 9/2014 | Chinn |
| 2014/0258292 A1 | 9/2014 | Thramann et al. |
| 2014/0267002 A1 | 9/2014 | Luna |
| 2014/0267911 A1 | 9/2014 | Grant et al. |
| 2014/0270183 A1 | 9/2014 | Luna |
| 2014/0280812 A1 | 9/2014 | Bealkowski et al. |
| 2014/0282084 A1 | 9/2014 | Murarka et al. |
| 2014/0282103 A1 | 9/2014 | Jerry |
| 2014/0282233 A1 | 9/2014 | Sandler et al. |
| 2014/0282240 A1 | 9/2014 | Flynn et al. |
| 2014/0283018 A1 | 9/2014 | Dadu et al. |
| 2014/0298432 A1 | 10/2014 | Brown |
| 2014/0310348 A1 | 10/2014 | Keskitalo et al. |
| 2014/0310643 A1 | 10/2014 | Karmanenko et al. |
| 2014/0317532 A1 | 10/2014 | Ma et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0331149 A1 | 11/2014 | Labey |
| 2014/0334644 A1 | 11/2014 | Selig et al. |
| 2014/0335789 A1 | 11/2014 | Cohen et al. |
| 2014/0335827 A1 | 11/2014 | Tsuda |
| 2014/0337931 A1 | 11/2014 | Cotterill |
| 2014/0344904 A1 | 11/2014 | Venkataramani et al. |
| 2014/0349754 A1 | 11/2014 | Kaneoka et al. |
| 2014/0354759 A1 | 12/2014 | Cranfill et al. |
| 2014/0359140 A1 | 12/2014 | Shankarraman |
| 2014/0359454 A1 | 12/2014 | Lee et al. |
| 2014/0359637 A1 | 12/2014 | Yan |
| 2014/0359709 A1 | 12/2014 | Nassar et al. |
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2014/0366158 A1 | 12/2014 | Han et al. |
| 2014/0368547 A1 | 12/2014 | Elings |
| 2014/0368600 A1 | 12/2014 | Do et al. |
| 2014/0368719 A1 | 12/2014 | Kaneko et al. |
| 2014/0372309 A1 | 12/2014 | Bullard et al. |
| 2014/0373081 A1 | 12/2014 | Dodson et al. |
| 2014/0375577 A1 | 12/2014 | Yeh et al. |
| 2014/0375747 A1 | 12/2014 | Martinez et al. |
| 2014/0378099 A1 | 12/2014 | Huang et al. |
| 2014/0380187 A1 | 12/2014 | Gardenfors et al. |
| 2015/0004945 A1 | 1/2015 | Steeves et al. |
| 2015/0012435 A1 | 1/2015 | Wright et al. |
| 2015/0019944 A1 | 1/2015 | Kalgi |
| 2015/0019966 A1 | 1/2015 | Jeon et al. |
| 2015/0020081 A1 | 1/2015 | Cho et al. |
| 2015/0032812 A1 | 1/2015 | Dudley |
| 2015/0033149 A1 | 1/2015 | Kuchoor |
| 2015/0033361 A1 | 1/2015 | Choi et al. |
| 2015/0039494 A1 | 2/2015 | Sinton et al. |
| 2015/0040012 A1 | 2/2015 | Faaborg et al. |
| 2015/0046828 A1 | 2/2015 | Desai et al. |
| 2015/0049591 A1 | 2/2015 | Adams et al. |
| 2015/0051913 A1 | 2/2015 | Choi |
| 2015/0052222 A1 | 2/2015 | Farrell et al. |
| 2015/0058413 A1 | 2/2015 | Ge |
| 2015/0062158 A1 | 3/2015 | Hildreth et al. |
| 2015/0067521 A1 | 3/2015 | Heo et al. |
| 2015/0067541 A1 | 3/2015 | Owens et al. |
| 2015/0067803 A1 | 3/2015 | Alduaiji |
| 2015/0070272 A1 | 3/2015 | Kim et al. |
| 2015/0078680 A1 | 3/2015 | Shakib et al. |
| 2015/0082255 A1 | 3/2015 | Devries et al. |
| 2015/0082446 A1 | 3/2015 | Flowers et al. |
| 2015/0085057 A1 | 3/2015 | Ouyang et al. |
| 2015/0086041 A1 | 3/2015 | Reimann |
| 2015/0089359 A1 | 3/2015 | Brisebois |
| 2015/0094120 A1 | 4/2015 | Suh et al. |
| 2015/0095175 A1 | 4/2015 | Dua |
| 2015/0095804 A1 | 4/2015 | Grossman et al. |
| 2015/0098309 A1 | 4/2015 | Adams et al. |
| 2015/0100623 A1 | 4/2015 | Gudell et al. |
| 2015/0106720 A1 | 4/2015 | Backer |
| 2015/0109966 A1 | 4/2015 | Hong et al. |
| 2015/0111559 A1 | 4/2015 | Leaver et al. |
| 2015/0113407 A1 | 4/2015 | Hoffert et al. |
| 2015/0116353 A1 | 4/2015 | Miura et al. |
| 2015/0116363 A1 | 4/2015 | Monte et al. |
| 2015/0116464 A1* | 4/2015 | Tanaka ................ H04N 13/271 382/154 |
| 2015/0120545 A1 | 4/2015 | Fiore et al. |
| 2015/0121267 A1 | 4/2015 | Wu et al. |
| 2015/0121312 A1 | 4/2015 | Li |
| 2015/0130737 A1 | 5/2015 | Im et al. |
| 2015/0130892 A1 | 5/2015 | Whynot et al. |
| 2015/0135098 A1 | 5/2015 | Geppert et al. |
| 2015/0135282 A1 | 5/2015 | Kong et al. |
| 2015/0138101 A1 | 5/2015 | Park et al. |
| 2015/0143419 A1 | 5/2015 | Bhagwat et al. |
| 2015/0149599 A1 | 5/2015 | Caunter et al. |
| 2015/0154589 A1 | 6/2015 | Li |
| 2015/0154676 A1 | 6/2015 | Matousek et al. |
| 2015/0160832 A1 | 6/2015 | Walkin et al. |
| 2015/0163188 A1 | 6/2015 | Faaborg et al. |
| 2015/0172552 A1 | 6/2015 | Kim |
| 2015/0177914 A1 | 6/2015 | Coyner et al. |
| 2015/0179008 A1 | 6/2015 | Sung et al. |
| 2015/0186892 A1 | 7/2015 | Zhang et al. |
| 2015/0189426 A1 | 7/2015 | Pang |
| 2015/0193069 A1 | 7/2015 | Di Censo et al. |
| 2015/0193196 A1 | 7/2015 | Lin et al. |
| 2015/0193392 A1 | 7/2015 | Greenblatt et al. |
| 2015/0195133 A1 | 7/2015 | Sheets et al. |
| 2015/0199967 A1 | 7/2015 | Reddy et al. |
| 2015/0200715 A1 | 7/2015 | Oiwa et al. |
| 2015/0205353 A1 | 7/2015 | Feng et al. |
| 2015/0205971 A1 | 7/2015 | Sanio et al. |
| 2015/0206529 A1 | 7/2015 | Kwon et al. |
| 2015/0208158 A1 | 7/2015 | Sanders |
| 2015/0212681 A1 | 7/2015 | Shinozaki et al. |
| 2015/0213542 A1 | 7/2015 | Wallaja |

(56) References Cited

U.S. PATENT DOCUMENTS

| | | |
|---|---|---|
| 2015/0215128 A1 | 7/2015 | Pal |
| 2015/0215382 A1 | 7/2015 | Arora et al. |
| 2015/0215398 A1 | 7/2015 | Murphy et al. |
| 2015/0222615 A1 | 8/2015 | Allain et al. |
| 2015/0222680 A1 | 8/2015 | Grover |
| 2015/0223005 A1 | 8/2015 | Man et al. |
| 2015/0229650 A1 | 8/2015 | Grigg et al. |
| 2015/0229750 A1 | 8/2015 | Zhou et al. |
| 2015/0229782 A1 | 8/2015 | Zuidema et al. |
| 2015/0235432 A1 | 8/2015 | Bronder et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0248167 A1 | 9/2015 | Turbell et al. |
| 2015/0248200 A1 | 9/2015 | Cho et al. |
| 2015/0248268 A1 | 9/2015 | Kumar et al. |
| 2015/0249540 A1 | 9/2015 | Khalil et al. |
| 2015/0253960 A1 | 9/2015 | Lin et al. |
| 2015/0254661 A1 | 9/2015 | Lanc |
| 2015/0256796 A1 | 9/2015 | Ma |
| 2015/0261415 A1 | 9/2015 | Lee et al. |
| 2015/0261493 A1 | 9/2015 | Lemmon et al. |
| 2015/0262183 A1 | 9/2015 | Gervais et al. |
| 2015/0264304 A1 | 9/2015 | Chastney et al. |
| 2015/0271120 A1 | 9/2015 | Langholz |
| 2015/0278799 A1 | 10/2015 | Palanisamy |
| 2015/0286360 A1 | 10/2015 | Wachter |
| 2015/0286694 A1 | 10/2015 | Kaplinger et al. |
| 2015/0286813 A1 | 10/2015 | Jakobsson |
| 2015/0288868 A1 | 10/2015 | Slavin et al. |
| 2015/0295921 A1 | 10/2015 | Cao |
| 2015/0296077 A1 | 10/2015 | Wakeyama et al. |
| 2015/0301338 A1 | 10/2015 | Van Heugten |
| 2015/0302856 A1 | 10/2015 | Kim et al. |
| 2015/0304330 A1 | 10/2015 | Soamboonsrup et al. |
| 2015/0304366 A1 | 10/2015 | Bader-Natal et al. |
| 2015/0304413 A1 | 10/2015 | Park |
| 2015/0309768 A1 | 10/2015 | Van Der Heide |
| 2015/0312299 A1 | 10/2015 | Chen |
| 2015/0319006 A1 | 11/2015 | Plummer et al. |
| 2015/0319144 A1 | 11/2015 | Barton et al. |
| 2015/0324552 A1 | 11/2015 | Beckhardt |
| 2015/0334140 A1 | 11/2015 | Singh et al. |
| 2015/0334313 A1 | 11/2015 | Chougle et al. |
| 2015/0339466 A1 | 11/2015 | Gao et al. |
| 2015/0347010 A1 | 12/2015 | Yang et al. |
| 2015/0347738 A1 | 12/2015 | Ulrich et al. |
| 2015/0348002 A1 | 12/2015 | Van Os et al. |
| 2015/0348014 A1 | 12/2015 | Van Os et al. |
| 2015/0350143 A1 | 12/2015 | Lemay et al. |
| 2015/0350296 A1 | 12/2015 | Yang et al. |
| 2015/0350297 A1 | 12/2015 | Yang et al. |
| 2015/0350448 A1 | 12/2015 | Coffman et al. |
| 2015/0350533 A1 | 12/2015 | Harris et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358304 A1 | 12/2015 | Beckhardt et al. |
| 2015/0358484 A1 | 12/2015 | Permude |
| 2015/0358584 A1 | 12/2015 | Mattson |
| 2015/0365306 A1 | 12/2015 | Chaudhri et al. |
| 2015/0365400 A1 | 12/2015 | Cox |
| 2015/0370426 A1 | 12/2015 | Carrigan et al. |
| 2015/0370455 A1 | 12/2015 | Van Os et al. |
| 2015/0373065 A1 | 12/2015 | Holmquist et al. |
| 2015/0373178 A1 | 12/2015 | Felt et al. |
| 2015/0378522 A1 | 12/2015 | Butts |
| 2016/0004417 A1 | 1/2016 | Bates |
| 2016/0005024 A1 | 1/2016 | Harrell |
| 2016/0005189 A1 | 1/2016 | Gray et al. |
| 2016/0006745 A1 | 1/2016 | Furuichi et al. |
| 2016/0011850 A1 | 1/2016 | Sheen et al. |
| 2016/0012417 A1 | 1/2016 | Mizon |
| 2016/0014059 A1 | 1/2016 | Rathod |
| 2016/0014266 A1 | 1/2016 | Bhatt |
| 2016/0014477 A1 | 1/2016 | Siders |
| 2016/0021155 A1 | 1/2016 | Sawato |
| 2016/0026429 A1 | 1/2016 | Triplett |
| 2016/0026779 A1 | 1/2016 | Grigg et al. |
| 2016/0028869 A1 | 1/2016 | Bhatt |
| 2016/0028875 A1 | 1/2016 | Brown et al. |
| 2016/0029004 A1 | 1/2016 | Campbell et al. |
| 2016/0034887 A1 | 2/2016 | Lee |
| 2016/0036996 A1 | 2/2016 | Midholt et al. |
| 2016/0037345 A1 | 2/2016 | Margadoudakis |
| 2016/0048316 A1 | 2/2016 | Bae et al. |
| 2016/0048705 A1 | 2/2016 | Yang |
| 2016/0050199 A1 | 2/2016 | Ganesan |
| 2016/0057173 A1 | 2/2016 | Singman et al. |
| 2016/0062487 A1 | 3/2016 | Foss et al. |
| 2016/0062567 A1 | 3/2016 | Yang et al. |
| 2016/0062606 A1 | 3/2016 | Vega et al. |
| 2016/0065707 A1 | 3/2016 | Yang et al. |
| 2016/0065708 A1 | 3/2016 | Yang et al. |
| 2016/0065832 A1 | 3/2016 | Kim et al. |
| 2016/0066277 A1 | 3/2016 | Yang et al. |
| 2016/0072861 A1 | 3/2016 | Woolsey et al. |
| 2016/0073185 A1 | 3/2016 | Kannappan et al. |
| 2016/0077734 A1 | 3/2016 | Buxton et al. |
| 2016/0086176 A1 | 3/2016 | Henrique et al. |
| 2016/0088039 A1 | 3/2016 | Millington et al. |
| 2016/0092072 A1 | 3/2016 | So et al. |
| 2016/0092665 A1 | 3/2016 | Cowan et al. |
| 2016/0097651 A1 | 4/2016 | Jung et al. |
| 2016/0099901 A1 | 4/2016 | Allen et al. |
| 2016/0099987 A1 | 4/2016 | Shamma |
| 2016/0110059 A1 | 4/2016 | Li et al. |
| 2016/0124614 A1 | 5/2016 | Bromberg et al. |
| 2016/0127636 A1 | 5/2016 | Ito et al. |
| 2016/0127799 A1 | 5/2016 | Alsina et al. |
| 2016/0132132 A1 | 5/2016 | Li |
| 2016/0132864 A1 | 5/2016 | Shah et al. |
| 2016/0134488 A1 | 5/2016 | Straub et al. |
| 2016/0134942 A1 | 5/2016 | Lo |
| 2016/0139785 A1 | 5/2016 | Griffin et al. |
| 2016/0142450 A1 | 5/2016 | Paul et al. |
| 2016/0150624 A1 | 5/2016 | Meerbeek et al. |
| 2016/0155443 A1 | 6/2016 | Khan et al. |
| 2016/0156687 A1 | 6/2016 | Leung |
| 2016/0156992 A1 | 6/2016 | Kuper |
| 2016/0162252 A1 | 6/2016 | Di Censo et al. |
| 2016/0171482 A1 | 6/2016 | Muncey et al. |
| 2016/0173617 A1 | 6/2016 | Allinson |
| 2016/0180259 A1 | 6/2016 | Marianko et al. |
| 2016/0183046 A1 | 6/2016 | Kwon |
| 2016/0189451 A1 | 6/2016 | Yoo et al. |
| 2016/0196042 A1 | 7/2016 | Laute et al. |
| 2016/0196106 A1 | 7/2016 | Hammer et al. |
| 2016/0210602 A1 | 7/2016 | Siddique et al. |
| 2016/0210983 A1 | 7/2016 | Amada et al. |
| 2016/0212374 A1 | 7/2016 | Usbergo et al. |
| 2016/0224966 A1 | 8/2016 | Van Os et al. |
| 2016/0227095 A1 | 8/2016 | Yoshizawa et al. |
| 2016/0231902 A1 | 8/2016 | Sirpal et al. |
| 2016/0239167 A1 | 8/2016 | Reimann et al. |
| 2016/0241543 A1 | 8/2016 | Jung et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0259528 A1 | 9/2016 | Foss et al. |
| 2016/0259656 A1 | 9/2016 | Sumner et al. |
| 2016/0259936 A1 | 9/2016 | Mukherjee et al. |
| 2016/0261653 A1 | 9/2016 | Kim |
| 2016/0266769 A1 | 9/2016 | Oursbourn et al. |
| 2016/0267319 A1 | 9/2016 | Murillo et al. |
| 2016/0267779 A1 | 9/2016 | Kuang |
| 2016/0277708 A1 | 9/2016 | Rintel et al. |
| 2016/0277903 A1 | 9/2016 | Poosala et al. |
| 2016/0291824 A1 | 10/2016 | Grossman et al. |
| 2016/0291924 A1 | 10/2016 | Bierbower et al. |
| 2016/0294896 A1 | 10/2016 | O'Driscoll et al. |

(56) References Cited

U.S. PATENT DOCUMENTS

| | | |
|---|---|---|
| 2016/0295340 A1 | 10/2016 | Baker et al. |
| 2016/0299669 A1 | 10/2016 | Bates |
| 2016/0299736 A1 | 10/2016 | Bates et al. |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0314451 A1 | 10/2016 | Martin |
| 2016/0316038 A1 | 10/2016 | Jolfaei |
| 2016/0320849 A1 | 11/2016 | Koo |
| 2016/0335041 A1 | 11/2016 | Wachter et al. |
| 2016/0336531 A1 | 11/2016 | Yokoyama |
| 2016/0342141 A1 | 11/2016 | Koumaiha et al. |
| 2016/0342386 A1 | 11/2016 | Kallai et al. |
| 2016/0344972 A1 | 11/2016 | Missig et al. |
| 2016/0345039 A1 | 11/2016 | Billmeyer |
| 2016/0345172 A1 | 11/2016 | Cotterill |
| 2016/0350839 A1 | 12/2016 | Avidor et al. |
| 2016/0351191 A1 | 12/2016 | Vilermo et al. |
| 2016/0352661 A1 | 12/2016 | Yang et al. |
| 2016/0357502 A1 | 12/2016 | Lambourne et al. |
| 2016/0360344 A1 | 12/2016 | Shim et al. |
| 2016/0364106 A1 | 12/2016 | Koum et al. |
| 2016/0364600 A1 | 12/2016 | Shah et al. |
| 2016/0366531 A1 | 12/2016 | Popova |
| 2016/0372113 A1 | 12/2016 | David et al. |
| 2016/0373884 A1 | 12/2016 | Peterson et al. |
| 2016/0378961 A1 | 12/2016 | Park |
| 2016/0379205 A1 | 12/2016 | Margadoudakis |
| 2016/0380780 A1 | 12/2016 | Stephenson et al. |
| 2016/0381476 A1 | 12/2016 | Gossain et al. |
| 2017/0003931 A1 | 1/2017 | Dvortsov et al. |
| 2017/0006162 A1 | 1/2017 | Bargetzi et al. |
| 2017/0010794 A1 | 1/2017 | Cho et al. |
| 2017/0013562 A1 | 1/2017 | Lim et al. |
| 2017/0019517 A1 | 1/2017 | Wilder et al. |
| 2017/0024100 A1 | 1/2017 | Pieper et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0031557 A1 | 2/2017 | Xiangli et al. |
| 2017/0034583 A1 | 2/2017 | Long et al. |
| 2017/0041727 A1 | 2/2017 | Reimann |
| 2017/0048817 A1 | 2/2017 | Yang et al. |
| 2017/0054731 A1 | 2/2017 | Cotterill |
| 2017/0064184 A1 | 3/2017 | Tsai |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083189 A1 | 3/2017 | Yang et al. |
| 2017/0083285 A1 | 3/2017 | Meyers et al. |
| 2017/0083494 A1 | 3/2017 | Kim et al. |
| 2017/0092085 A1 | 3/2017 | Agarwal |
| 2017/0092270 A1 | 3/2017 | Newendorp et al. |
| 2017/0093846 A1 | 3/2017 | Lopez Lecube et al. |
| 2017/0094019 A1 | 3/2017 | Ahmed et al. |
| 2017/0097621 A1 | 4/2017 | Ackmann et al. |
| 2017/0097715 A1 | 4/2017 | Kim et al. |
| 2017/0099270 A1 | 4/2017 | Anson |
| 2017/0111587 A1 | 4/2017 | Herbst et al. |
| 2017/0111595 A1 | 4/2017 | Soni et al. |
| 2017/0115940 A1 | 4/2017 | Byeon |
| 2017/0126592 A1 | 5/2017 | El Ghoul |
| 2017/0127145 A1 | 5/2017 | Rajapakse |
| 2017/0134567 A1 | 5/2017 | Jeon et al. |
| 2017/0140372 A1 | 5/2017 | Wang et al. |
| 2017/0142087 A1 | 5/2017 | Maninder et al. |
| 2017/0142584 A1 | 5/2017 | Oh et al. |
| 2017/0147129 A1 | 5/2017 | Kyoun et al. |
| 2017/0148010 A1 | 5/2017 | Bak et al. |
| 2017/0150904 A1 | 6/2017 | Park et al. |
| 2017/0192730 A1 | 7/2017 | Yang et al. |
| 2017/0193813 A1 | 7/2017 | Carroll et al. |
| 2017/0195772 A1 | 7/2017 | Han et al. |
| 2017/0206779 A1 | 7/2017 | Lee et al. |
| 2017/0212667 A1 | 7/2017 | Miyazaki |
| 2017/0220212 A1 | 8/2017 | Yang et al. |
| 2017/0227935 A1 | 8/2017 | Su et al. |
| 2017/0230585 A1 | 8/2017 | Nash et al. |
| 2017/0230705 A1 | 8/2017 | Pardue et al. |
| 2017/0235545 A1 | 8/2017 | Millington et al. |
| 2017/0235926 A1 | 8/2017 | Fyke et al. |
| 2017/0235935 A1 | 8/2017 | Song et al. |
| 2017/0242653 A1 | 8/2017 | Lang et al. |
| 2017/0244932 A1 | 8/2017 | Pistilli et al. |
| 2017/0269556 A1 | 9/2017 | Zhou |
| 2017/0270507 A1 | 9/2017 | Wang et al. |
| 2017/0280098 A1 | 9/2017 | Sethuraman et al. |
| 2017/0280494 A1 | 9/2017 | Jung et al. |
| 2017/0289249 A1 | 10/2017 | Knight et al. |
| 2017/0309174 A1 | 10/2017 | Gonzales et al. |
| 2017/0324784 A1 | 11/2017 | Taine et al. |
| 2017/0336960 A1 | 11/2017 | Chaudhri et al. |
| 2017/0339151 A1 | 11/2017 | Van Os et al. |
| 2017/0344253 A1 | 11/2017 | Zhang |
| 2017/0353508 A1 | 12/2017 | Yoakum |
| 2017/0357382 A1 | 12/2017 | Miura et al. |
| 2017/0357420 A1 | 12/2017 | Dye et al. |
| 2017/0357425 A1 | 12/2017 | Smith et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0357917 A1 | 12/2017 | Holmes et al. |
| 2017/0357973 A1 | 12/2017 | Van Os et al. |
| 2017/0359191 A1 | 12/2017 | Smith et al. |
| 2017/0359285 A1 | 12/2017 | Weinig et al. |
| 2017/0367484 A1 | 12/2017 | Salvoni et al. |
| 2017/0371496 A1 | 12/2017 | Denoue et al. |
| 2017/0371535 A1 | 12/2017 | Li et al. |
| 2017/0373868 A1 | 12/2017 | Deets, Jr. |
| 2018/0013799 A1 | 1/2018 | Davies |
| 2018/0020530 A1 | 1/2018 | Scordato et al. |
| 2018/0039916 A1 | 2/2018 | Ravindra |
| 2018/0040324 A1 | 2/2018 | Wilberding |
| 2018/0047200 A1 | 2/2018 | O'Hara et al. |
| 2018/0048820 A1 | 2/2018 | Hinkel et al. |
| 2018/0061158 A1 | 3/2018 | Greene |
| 2018/0067712 A1 | 3/2018 | Behzadi et al. |
| 2018/0067904 A1 | 3/2018 | Li |
| 2018/0070144 A1 | 3/2018 | Tang et al. |
| 2018/0070187 A1 | 3/2018 | Drinkwater et al. |
| 2018/0075439 A1 | 3/2018 | Bak et al. |
| 2018/0081522 A1 | 3/2018 | Greenberg et al. |
| 2018/0091732 A1 | 3/2018 | Wilson et al. |
| 2018/0095616 A1 | 4/2018 | Valdivia et al. |
| 2018/0095634 A1 | 4/2018 | Alexander |
| 2018/0095636 A1 | 4/2018 | Valdivia et al. |
| 2018/0096064 A1 | 4/2018 | Lennon et al. |
| 2018/0101297 A1 | 4/2018 | Yang et al. |
| 2018/0103074 A1 | 4/2018 | Rosenberg |
| 2018/0109629 A1 | 4/2018 | Van Os et al. |
| 2018/0121074 A1 | 5/2018 | Peron et al. |
| 2018/0122378 A1 | 5/2018 | Mixter et al. |
| 2018/0123986 A1 | 5/2018 | Faulkner et al. |
| 2018/0124128 A1 | 5/2018 | Faulkner et al. |
| 2018/0124359 A1 | 5/2018 | Faulkner |
| 2018/0131732 A1 | 5/2018 | Aronoff et al. |
| 2018/0131907 A1 | 5/2018 | Schmirler et al. |
| 2018/0139292 A1 | 5/2018 | Koren et al. |
| 2018/0139374 A1 | 5/2018 | Yu |
| 2018/0144590 A1 | 5/2018 | Mixter et al. |
| 2018/0150433 A1 | 5/2018 | Sowden et al. |
| 2018/0157333 A1 | 6/2018 | Ross et al. |
| 2018/0157455 A1 | 6/2018 | Troy et al. |
| 2018/0160072 A1 | 6/2018 | Cranfill et al. |
| 2018/0165002 A1 | 6/2018 | Yang et al. |
| 2018/0183849 A1* | 6/2018 | Shin ..................... H04L 65/65 |
| 2018/0190279 A1 | 7/2018 | Anderson et al. |
| 2018/0191965 A1 | 7/2018 | Faulkner et al. |
| 2018/0199164 A1 | 7/2018 | Bargetzi et al. |
| 2018/0203577 A1 | 7/2018 | Astavans et al. |
| 2018/0204111 A1 | 7/2018 | Zadeh et al. |
| 2018/0205797 A1 | 7/2018 | Faulkner |
| 2018/0213144 A1 | 7/2018 | Kim et al. |

(56) References Cited

U.S. PATENT DOCUMENTS

| 2018/0213396 A1 | 7/2018 | Segal et al. |
| 2018/0217709 A1 | 8/2018 | Hotelling |
| 2018/0227341 A1 | 8/2018 | Rizzi |
| 2018/0228003 A1 | 8/2018 | O'Driscoll et al. |
| 2018/0228006 A1 | 8/2018 | Baker et al. |
| 2018/0234549 A1 | 8/2018 | Coffman et al. |
| 2018/0249047 A1 | 8/2018 | Marlatt |
| 2018/0253152 A1 | 9/2018 | Forsblom et al. |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0293959 A1 | 10/2018 | Monga et al. |
| 2018/0295079 A1 | 10/2018 | Longo |
| 2018/0302790 A1 | 10/2018 | Cotterill |
| 2018/0308480 A1 | 10/2018 | Jang et al. |
| 2018/0309801 A1 | 10/2018 | Rathod |
| 2018/0332559 A1 | 11/2018 | Gudivada et al. |
| 2018/0335903 A1 | 11/2018 | Coffman et al. |
| 2018/0337924 A1 | 11/2018 | Graham et al. |
| 2018/0338038 A1 | 11/2018 | Ly et al. |
| 2018/0341448 A1 | 11/2018 | Behzadi et al. |
| 2018/0348764 A1 | 12/2018 | Zhang et al. |
| 2018/0351762 A1 | 12/2018 | Iyengar et al. |
| 2018/0357631 A1 | 12/2018 | Bak et al. |
| 2018/0359293 A1 | 12/2018 | Faulkner et al. |
| 2018/0364665 A1 | 12/2018 | Clymer et al. |
| 2018/0367483 A1 | 12/2018 | Rodriguez et al. |
| 2018/0367484 A1 | 12/2018 | Rodriguez et al. |
| 2018/0375676 A1 | 12/2018 | Bader-natal et al. |
| 2019/0005419 A1 | 1/2019 | Howard |
| 2019/0012069 A1 | 1/2019 | Bates |
| 2019/0012073 A1 | 1/2019 | Hwang |
| 2019/0012966 A1 | 1/2019 | Shi |
| 2019/0018586 A1 | 1/2019 | Yang et al. |
| 2019/0025943 A1 | 1/2019 | Jobs et al. |
| 2019/0028419 A1 | 1/2019 | Sullivan |
| 2019/0034849 A1 | 1/2019 | Romaine et al. |
| 2019/0037173 A1 | 1/2019 | Lee et al. |
| 2019/0058777 A1 | 2/2019 | Chen |
| 2019/0065027 A1 | 2/2019 | Hauenstein et al. |
| 2019/0068670 A1 | 2/2019 | Adam et al. |
| 2019/0074991 A1 | 3/2019 | Peterson et al. |
| 2019/0075200 A1 | 3/2019 | Seo et al. |
| 2019/0102049 A1 | 4/2019 | Anzures et al. |
| 2019/0102145 A1 | 4/2019 | Wilberding et al. |
| 2019/0110087 A1 | 4/2019 | Parasseeri et al. |
| 2019/0124021 A1 | 4/2019 | Demattei |
| 2019/0124203 A1 | 4/2019 | Coffman et al. |
| 2019/0124510 A1 | 4/2019 | Cotterill |
| 2019/0138951 A1 | 5/2019 | Brownhill et al. |
| 2019/0149768 A1 | 5/2019 | Mcardle |
| 2019/0149887 A1 | 5/2019 | Williams et al. |
| 2019/0149972 A1 | 5/2019 | Parks et al. |
| 2019/0158645 A1 | 5/2019 | Yang et al. |
| 2019/0173939 A1 | 6/2019 | Lewis et al. |
| 2019/0199963 A1 | 6/2019 | Ahn et al. |
| 2019/0199993 A1 | 6/2019 | Babu J D et al. |
| 2019/0205861 A1 | 7/2019 | Bace |
| 2019/0215503 A1 | 7/2019 | Monson et al. |
| 2019/0222775 A1 | 7/2019 | Ahn |
| 2019/0228495 A1 | 7/2019 | Tremblay et al. |
| 2019/0236142 A1 | 8/2019 | Balakrishnan et al. |
| 2019/0246238 A1 | 8/2019 | Crutchfield et al. |
| 2019/0278900 A1 | 9/2019 | Yang et al. |
| 2019/0279634 A1 | 9/2019 | Tak et al. |
| 2019/0289079 A1 | 9/2019 | Van Os et al. |
| 2019/0294406 A1 | 9/2019 | Bierbower et al. |
| 2019/0297039 A1 | 9/2019 | Rodriguez et al. |
| 2019/0303861 A1 | 10/2019 | Mathias et al. |
| 2019/0310759 A1 | 10/2019 | Stein et al. |
| 2019/0332400 A1 | 10/2019 | Spoor et al. |
| 2019/0339769 A1 | 11/2019 | Cox et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0342621 A1 | 11/2019 | Carrigan et al. |
| 2019/0347181 A1 | 11/2019 | Cranfill et al. |
| 2019/0354252 A1 | 11/2019 | Badr |
| 2019/0361575 A1 | 11/2019 | Ni et al. |
| 2019/0361694 A1 | 11/2019 | Gordon et al. |
| 2019/0361729 A1 | 11/2019 | Gruber et al. |
| 2019/0362555 A1 | 11/2019 | Chen et al. |
| 2019/0369862 A1 | 12/2019 | De Vries |
| 2019/0370805 A1 | 12/2019 | Van Os et al. |
| 2020/0004401 A1 | 1/2020 | Hwang et al. |
| 2020/0005539 A1 | 1/2020 | Hwang et al. |
| 2020/0034033 A1 | 1/2020 | Chaudhri et al. |
| 2020/0045245 A1 | 2/2020 | Van Os et al. |
| 2020/0050426 A1 | 2/2020 | Jung et al. |
| 2020/0050502 A1 | 2/2020 | Ghafourifar et al. |
| 2020/0055515 A1 | 2/2020 | Herman et al. |
| 2020/0059628 A1 | 2/2020 | Cranfill et al. |
| 2020/0104018 A1 | 4/2020 | Coffman et al. |
| 2020/0106952 A1 | 4/2020 | Missig et al. |
| 2020/0106965 A1 | 4/2020 | Malia et al. |
| 2020/0112690 A1 | 4/2020 | Harrison et al. |
| 2020/0120503 A1 | 4/2020 | Cotterill |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0143593 A1 | 5/2020 | Rudman et al. |
| 2020/0152186 A1 | 5/2020 | Koh et al. |
| 2020/0154583 A1 | 5/2020 | Lee et al. |
| 2020/0183548 A1 | 6/2020 | Anzures et al. |
| 2020/0186378 A1 | 6/2020 | Six et al. |
| 2020/0186576 A1 | 6/2020 | Gopal et al. |
| 2020/0192627 A1 | 6/2020 | Jang et al. |
| 2020/0195887 A1 | 6/2020 | Van Os et al. |
| 2020/0201491 A1 | 6/2020 | Coffman et al. |
| 2020/0201495 A1 | 6/2020 | Coffman et al. |
| 2020/0213437 A1 | 7/2020 | Bhatt |
| 2020/0213530 A1 | 7/2020 | Ahn |
| 2020/0218486 A1 | 7/2020 | Behzadi et al. |
| 2020/0225817 A1 | 7/2020 | Coffman et al. |
| 2020/0226896 A1 | 7/2020 | Robertson et al. |
| 2020/0242788 A1 | 7/2020 | Jacobs et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1 | 9/2020 | Marcinkiewicz |
| 2020/0310748 A1 | 10/2020 | Huang |
| 2020/0312318 A1 | 10/2020 | Olson et al. |
| 2020/0326811 A1 | 10/2020 | Nolan et al. |
| 2020/0335187 A1 | 10/2020 | Lefkofsky et al. |
| 2020/0366742 A1 | 11/2020 | Van Os et al. |
| 2020/0367816 A1 | 11/2020 | Panneer Selvam |
| 2020/0371673 A1 | 11/2020 | Faulkner |
| 2020/0374645 A1 | 11/2020 | Settel |
| 2020/0379711 A1 | 12/2020 | Graham et al. |
| 2020/0379714 A1 | 12/2020 | Graham et al. |
| 2020/0379729 A1 | 12/2020 | Graham et al. |
| 2020/0379730 A1 | 12/2020 | Graham et al. |
| 2020/0383157 A1 | 12/2020 | Lee et al. |
| 2020/0385116 A1 | 12/2020 | Sabripour et al. |
| 2020/0395012 A1 | 12/2020 | Kim et al. |
| 2020/0400957 A1 | 12/2020 | Van Heugten |
| 2021/0011588 A1 | 1/2021 | Coffman et al. |
| 2021/0014610 A1 | 1/2021 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0096703 A1 | 4/2021 | Anzures et al. |
| 2021/0097768 A1 | 4/2021 | Malia et al. |
| 2021/0099829 A1 | 4/2021 | Soto et al. |
| 2021/0136129 A1 | 5/2021 | Ponnusamy et al. |
| 2021/0144336 A1 | 5/2021 | Van Os et al. |
| 2021/0152503 A1 | 5/2021 | Rodriguez et al. |
| 2021/0158622 A1 | 5/2021 | Leelaphattarakij et al. |
| 2021/0158830 A1 | 5/2021 | Boehlke |
| 2021/0173431 A1 | 6/2021 | Yang et al. |
| 2021/0176204 A1 | 6/2021 | Geppert et al. |
| 2021/0182169 A1 | 6/2021 | Mardente et al. |
| 2021/0195084 A1 | 6/2021 | Olajos et al. |
| 2021/0203765 A1 | 7/2021 | Yang et al. |

(56)  References Cited

U.S. PATENT DOCUMENTS

| | | |
|---|---|---|
| 2021/0203878 A1 | 7/2021 | Lee et al. |
| 2021/0217106 A1 | 7/2021 | Hauser et al. |
| 2021/0233325 A1 | 7/2021 | Kawakami et al. |
| 2021/0255816 A1 | 8/2021 | Behzadi et al. |
| 2021/0255819 A1 | 8/2021 | Graham et al. |
| 2021/0265032 A1 | 8/2021 | Burgess et al. |
| 2021/0266274 A1 | 8/2021 | Liu et al. |
| 2021/0272118 A1 | 9/2021 | Van Os et al. |
| 2021/0306288 A1 | 9/2021 | Boyd et al. |
| 2021/0321197 A1 | 10/2021 | Annamraju |
| 2021/0323406 A1 | 10/2021 | So et al. |
| 2021/0333864 A1 | 10/2021 | Harvey et al. |
| 2021/0349680 A1 | 11/2021 | Kim et al. |
| 2021/0352172 A1 | 11/2021 | Kim et al. |
| 2021/0360192 A1 | 11/2021 | Cranfill et al. |
| 2021/0360199 A1 | 11/2021 | Oz et al. |
| 2021/0373672 A1 | 12/2021 | Schwarz et al. |
| 2021/0392223 A1 | 12/2021 | Coffman et al. |
| 2021/0409359 A1 | 12/2021 | Eirinberg et al. |
| 2022/0004356 A1 | 1/2022 | Kim et al. |
| 2022/0006946 A1 | 1/2022 | Missig et al. |
| 2022/0014715 A1* | 1/2022 | Tamura ................ H04N 23/695 |
| 2022/0021680 A1 | 1/2022 | Roedel et al. |
| 2022/0046186 A1 | 2/2022 | Fayad et al. |
| 2022/0046222 A1 | 2/2022 | Meier |
| 2022/0050578 A1 | 2/2022 | Waldman et al. |
| 2022/0053142 A1 | 2/2022 | Manzari et al. |
| 2022/0058257 A1 | 2/2022 | Cotterill |
| 2022/0086203 A1 | 3/2022 | Morris et al. |
| 2022/0100362 A1 | 3/2022 | Kim |
| 2022/0100367 A1 | 3/2022 | Carrigan et al. |
| 2022/0100841 A1 | 3/2022 | Yang et al. |
| 2022/0103784 A1 | 3/2022 | Pollefeys |
| 2022/0121342 A1 | 4/2022 | Chundi et al. |
| 2022/0122089 A1 | 4/2022 | Bonilla Kuhlmann et al. |
| 2022/0141259 A1 | 5/2022 | Copley et al. |
| 2022/0163996 A1 | 5/2022 | Yang et al. |
| 2022/0166918 A1 | 5/2022 | Burger |
| 2022/0167113 A1 | 5/2022 | Beckhardt |
| 2022/0180862 A1 | 6/2022 | Sharifi et al. |
| 2022/0199267 A1 | 6/2022 | Subramanian et al. |
| 2022/0229524 A1 | 7/2022 | McKenzie et al. |
| 2022/0244836 A1 | 8/2022 | O'Leary et al. |
| 2022/0247587 A1 | 8/2022 | Rolin et al. |
| 2022/0247918 A1 | 8/2022 | O'Leary et al. |
| 2022/0247919 A1 | 8/2022 | O'Leary et al. |
| 2022/0253136 A1 | 8/2022 | Holder et al. |
| 2022/0253195 A1 | 8/2022 | Stevens et al. |
| 2022/0254074 A1 | 8/2022 | Berliner et al. |
| 2022/0269882 A1 | 8/2022 | Proschowsky et al. |
| 2022/0278992 A1 | 9/2022 | Baker et al. |
| 2022/0279063 A1 | 9/2022 | Coffman et al. |
| 2022/0286314 A1 | 9/2022 | Meyer et al. |
| 2022/0286549 A1 | 9/2022 | Coffman et al. |
| 2022/0303150 A1 | 9/2022 | Jensen et al. |
| 2022/0303383 A1 | 9/2022 | Coffman et al. |
| 2022/0343569 A1 | 10/2022 | Karri et al. |
| 2022/0350482 A1 | 11/2022 | Carrigan et al. |
| 2022/0365643 A1 | 11/2022 | Triverio et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0374136 A1 | 11/2022 | Chang et al. |
| 2022/0375358 A1 | 11/2022 | Shimomura et al. |
| 2022/0391166 A1 | 12/2022 | Sanders |
| 2023/0004264 A1 | 1/2023 | Anzures et al. |
| 2023/0041125 A1 | 2/2023 | Kim et al. |
| 2023/0073844 A1 | 3/2023 | Coffman et al. |
| 2023/0084551 A1 | 3/2023 | Coffman et al. |
| 2023/0086248 A1 | 3/2023 | Puyol et al. |
| 2023/0092103 A1 | 3/2023 | Puyol et al. |
| 2023/0094453 A1 | 3/2023 | O'Leary et al. |
| 2023/0098395 A1 | 3/2023 | O'Leary et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |
| 2023/0109787 A1 | 4/2023 | O'Leary et al. |
| 2023/0127384 A1 | 4/2023 | Stout |
| 2023/0143275 A1 | 5/2023 | Opara et al. |
| 2023/0179700 A1 | 6/2023 | Bhatt |
| 2023/0188674 A1 | 6/2023 | Van Os et al. |
| 2023/0213764 A1 | 7/2023 | Arngren et al. |
| 2023/0224667 A1 | 7/2023 | Rodman et al. |
| 2023/0234444 A1 | 7/2023 | Derichs et al. |
| 2023/0236723 A1 | 7/2023 | Yang et al. |
| 2023/0246857 A1 | 8/2023 | Boucheron et al. |
| 2023/0262196 A1 | 8/2023 | Cranfill et al. |
| 2023/0262317 A1 | 8/2023 | O'Leary et al. |
| 2023/0266866 A1 | 8/2023 | Bates et al. |
| 2023/0291824 A1 | 9/2023 | Yang et al. |
| 2023/0370507 A1 | 11/2023 | Chang et al. |
| 2023/0386145 A1 | 11/2023 | Faulkner |
| 2023/0388357 A1 | 11/2023 | Faulkner et al. |
| 2023/0393809 A1 | 12/2023 | Carrigan et al. |
| 2023/0409191 A1 | 12/2023 | Carrigan et al. |
| 2023/0409279 A1 | 12/2023 | Reese et al. |
| 2024/0036804 A1 | 2/2024 | Chang et al. |
| 2024/0048600 A1 | 2/2024 | Yerli |
| 2024/0053953 A1 | 2/2024 | Sanders |
| 2024/0062640 A1 | 2/2024 | Carrigan et al. |
| 2024/0064270 A1 | 2/2024 | Van Os et al. |
| 2024/0064395 A1 | 2/2024 | O'Leary et al. |
| 2024/0080642 A1 | 3/2024 | Carrigan et al. |
| 2024/0103677 A1 | 3/2024 | McKenzie et al. |
| 2024/0104819 A1 | 3/2024 | Chand et al. |
| 2024/0111333 A1 | 4/2024 | Yang et al. |
| 2024/0118793 A1 | 4/2024 | Triverio et al. |
| 2024/0205628 A1 | 6/2024 | Sharifi et al. |
| 2024/0211891 A1 | 6/2024 | Kennedy et al. |
| 2024/0220009 A1 | 7/2024 | Dryer et al. |
| 2024/0259669 A1 | 8/2024 | Missig et al. |
| 2024/0263956 A1 | 8/2024 | Vashisht |
| 2024/0377922 A1 | 11/2024 | Rajam et al. |
| 2024/0406290 A1 | 12/2024 | Giuliani et al. |
| 2024/0419322 A1 | 12/2024 | Carrigan et al. |
| 2025/0039011 A1 | 1/2025 | Meyer et al. |
| 2025/0047777 A1 | 2/2025 | Bhatt |
| 2025/0054379 A1 | 2/2025 | Carrigan et al. |
| 2025/0080940 A1 | 3/2025 | White |
| 2025/0097641 A1 | 3/2025 | Maclean et al. |
| 2025/0138697 A1 | 5/2025 | Smith et al. |
| 2025/0165123 A1 | 5/2025 | Anzures et al. |
| 2025/0165216 A1 | 5/2025 | Carrigan et al. |
| 2025/0202961 A1 | 6/2025 | Triverio et al. |
| 2025/0224859 A1 | 7/2025 | Kim et al. |
| 2025/0294237 A1 | 9/2025 | Manzari et al. |
| 2025/0330554 A1 | 10/2025 | Cranfill et al. |
| 2025/0350945 A1 | 11/2025 | Yang et al. |

FOREIGN PATENT DOCUMENTS

| | | | |
|---|---|---|---|
| AU | 2008100011 A4 | 2/2008 | |
| AU | 2015100713 A4 | 6/2015 | |
| CA | 2876587 A1 | 2/2014 | |
| CA | 2845537 A1 | 9/2014 | |
| CA | 2917174 A1 | 1/2015 | |
| CN | 1452739 A | 10/2003 | |
| CN | 1473430 A | 2/2004 | |
| CN | 1525723 A | 9/2004 | |
| CN | 1558690 A | 12/2004 | |
| CN | 1663174 A | 8/2005 | |
| CN | 1689327 A | 10/2005 | |
| CN | 1741104 A | 3/2006 | |
| CN | 1801926 A | 7/2006 | |
| CN | 1846221 A | 10/2006 | |
| CN | 1863281 A | 11/2006 | |
| CN | 1890996 A | 1/2007 | |
| CN | 1908981 A | 2/2007 | |
| CN | 1985319 A | 6/2007 | |
| CN | 101075173 A | 11/2007 | |
| CN | 101268470 A | 9/2008 | |
| CN | 101296356 A | 10/2008 | |

(56) References Cited

FOREIGN PATENT DOCUMENTS

| | | | |
|---|---|---|---|
| CN | 101299694 | A | 11/2008 |
| CN | 101321156 | A | 12/2008 |
| CN | 101341718 | A | 1/2009 |
| CN | 101341727 | A | 1/2009 |
| CN | 101409743 | A | 4/2009 |
| CN | 101431564 | A | 5/2009 |
| CN | 101443727 | A | 5/2009 |
| CN | 101485128 | A | 7/2009 |
| CN | 101566866 | A | 10/2009 |
| CN | 101610155 | A | 12/2009 |
| CN | 101682622 | A | 3/2010 |
| CN | 101853132 | A | 10/2010 |
| CN | 101854247 | A | 10/2010 |
| CN | 101854261 | A | 10/2010 |
| CN | 101873386 | A | 10/2010 |
| CN | 101877748 | A | 11/2010 |
| CN | 101917529 | A | 12/2010 |
| CN | 101950236 | A | 1/2011 |
| CN | 102065148 | A | 5/2011 |
| CN | 102111454 | A | 6/2011 |
| CN | 102111505 | A | 6/2011 |
| CN | 102164213 | A | 8/2011 |
| CN | 201928419 | U | 8/2011 |
| CN | 102202192 | A | 9/2011 |
| CN | 102209321 | A | 10/2011 |
| CN | 102215217 | A | 10/2011 |
| CN | 102239740 | A | 11/2011 |
| CN | 102262506 | A | 11/2011 |
| CN | 102281294 | A | 12/2011 |
| CN | 102301323 | A | 12/2011 |
| CN | 102317887 | A | 1/2012 |
| CN | 102388355 | A | 3/2012 |
| CN | 102396205 | A | 3/2012 |
| CN | 102450040 | A | 5/2012 |
| CN | 102572369 | A | 7/2012 |
| CN | 102651731 | A | 8/2012 |
| CN | 102695302 | A | 9/2012 |
| CN | 102707994 | A | 10/2012 |
| CN | 102737313 | A | 10/2012 |
| CN | 102740146 | A | 10/2012 |
| CN | 102750086 | A | 10/2012 |
| CN | 102754071 | A | 10/2012 |
| CN | 102769705 | A | 11/2012 |
| CN | 102821180 | A | 12/2012 |
| CN | 102859480 | A | 1/2013 |
| CN | 102866828 | A | 1/2013 |
| CN | 102929917 | A | 2/2013 |
| CN | 102968267 | A | 3/2013 |
| CN | 102982401 | A | 3/2013 |
| CN | 103019681 | A | 4/2013 |
| CN | 103039064 | A | 4/2013 |
| CN | 103049274 | A | 4/2013 |
| CN | 103067625 | A | 4/2013 |
| CN | 103139370 | A | 6/2013 |
| CN | 103179283 | A | 6/2013 |
| CN | 103222247 | A | 7/2013 |
| CN | 103235688 | A | 8/2013 |
| CN | 103237191 | A | 8/2013 |
| CN | 103250138 | A | 8/2013 |
| CN | 103260079 | A | 8/2013 |
| CN | 103384235 | A | 11/2013 |
| CN | 203311163 | U | 11/2013 |
| CN | 103425451 | A | 12/2013 |
| CN | 103442774 | A | 12/2013 |
| CN | 103458215 | A | 12/2013 |
| CN | 103558916 | A | 2/2014 |
| CN | 103576902 | A | 2/2014 |
| CN | 103582873 | A | 2/2014 |
| CN | 103593154 | A | 2/2014 |
| CN | 103604272 | A | 2/2014 |
| CN | 103649985 | A | 3/2014 |
| CN | 103650522 | A | 3/2014 |
| CN | 103718152 | A | 4/2014 |
| CN | 103748610 | A | 4/2014 |
| CN | 103765385 | A | 4/2014 |
| CN | 103793075 | A | 5/2014 |
| CN | 103795866 | A | 5/2014 |
| CN | 103853328 | A | 6/2014 |
| CN | 103853493 | A | 6/2014 |
| CN | 103997366 | A | 8/2014 |
| CN | 104010158 | A | 8/2014 |
| CN | 104035663 | A | 9/2014 |
| CN | 104081335 | A | 10/2014 |
| CN | 104090720 | A | 10/2014 |
| CN | 104106036 | A | 10/2014 |
| CN | 104169855 | A | 11/2014 |
| CN | 203942537 | U | 11/2014 |
| CN | 104205785 | A | 12/2014 |
| CN | 104270597 | A | 1/2015 |
| CN | 104317516 | A | 1/2015 |
| CN | 104331246 | A | 2/2015 |
| CN | 104331796 | A | 2/2015 |
| CN | 104335234 | A | 2/2015 |
| CN | 104375741 | A | 2/2015 |
| CN | 104392352 | A | 3/2015 |
| CN | 104427288 | A | 3/2015 |
| CN | 104469143 | A | 3/2015 |
| CN | 104503689 | A | 4/2015 |
| CN | 104574054 | A | 4/2015 |
| CN | 104583998 | A | 4/2015 |
| CN | 104584061 | A | 4/2015 |
| CN | 104584488 | A | 4/2015 |
| CN | 104602133 | A | 5/2015 |
| CN | 104615430 | A | 5/2015 |
| CN | 104867004 | A | 8/2015 |
| CN | 104869046 | A | 8/2015 |
| CN | 104980578 | A | 10/2015 |
| CN | 104994106 | A | 10/2015 |
| CN | 105051676 | A | 11/2015 |
| CN | 105094957 | A | 11/2015 |
| CN | 105141498 | A | 12/2015 |
| CN | 105204846 | A | 12/2015 |
| CN | 105264473 | A | 1/2016 |
| CN | 105308634 | A | 2/2016 |
| CN | 105373920 | A | 3/2016 |
| CN | 105389173 | A | 3/2016 |
| CN | 105391778 | A | 3/2016 |
| CN | 105431855 | A | 3/2016 |
| CN | 105549947 | A | 5/2016 |
| CN | 105554429 | A | 5/2016 |
| CN | 105578111 | A | 5/2016 |
| CN | 105654286 | A | 6/2016 |
| CN | 105654287 | A | 6/2016 |
| CN | 205267230 | U | 6/2016 |
| CN | 105745863 | A | 7/2016 |
| CN | 105794231 | A | 7/2016 |
| CN | 105830015 | A | 8/2016 |
| CN | 105900376 | A | 8/2016 |
| CN | 105940678 | A | 9/2016 |
| CN | 106030700 | A | 10/2016 |
| CN | 106062810 | A | 10/2016 |
| CN | 106134209 | A | 11/2016 |
| CN | 106170783 | A | 11/2016 |
| CN | 106210855 | A | 12/2016 |
| CN | 106303648 | A | 1/2017 |
| CN | 106383645 | A | 2/2017 |
| CN | 106416142 | A | 2/2017 |
| CN | 106471793 | A | 3/2017 |
| CN | 106664389 | A | 5/2017 |
| CN | 106713946 | A | 5/2017 |
| CN | 106716954 | A | 5/2017 |
| CN | 106843626 | A | 6/2017 |
| CN | 107066523 | A | 8/2017 |
| CN | 107077288 | A | 8/2017 |
| CN | 107122049 | A | 9/2017 |
| CN | 107250949 | A | 10/2017 |
| CN | 107491257 | A | 12/2017 |
| CN | 107533417 | A | 1/2018 |
| CN | 107534656 | A | 1/2018 |
| CN | 107704177 | A | 2/2018 |
| CN | 107728876 | A | 2/2018 |
| CN | 104025538 | B | 4/2018 |
| CN | 104012150 | B | 5/2018 |
| CN | 107992248 | A | 5/2018 |

(56)            References Cited

FOREIGN PATENT DOCUMENTS

| CN | 108683798 | A | 10/2018 |
| CN | 108933965 | A | 12/2018 |
| CN | 109196825 | A | 1/2019 |
| CN | 109302531 | A | 2/2019 |
| CN | 109314795 | A | 2/2019 |
| CN | 109688442 | A | 4/2019 |
| CN | 110456971 | A | 11/2019 |
| CN | 111095165 | A | 5/2020 |
| CN | 111108740 | A | 5/2020 |
| CN | 111601065 | A | 8/2020 |
| CN | 111913630 | A | 11/2020 |
| CN | 112088530 | A | 12/2020 |
| CN | 112214275 | A | 1/2021 |
| CN | 112261338 | A | 1/2021 |
| CN | 112416223 | A | 2/2021 |
| CN | 108683798 | B | 4/2021 |
| CN | 113748408 | A | 12/2021 |
| CN | 113835583 | A | 12/2021 |
| EP | 1079371 | A1 | 2/2001 |
| EP | 1133119 | A2 | 9/2001 |
| EP | 1215575 | A2 | 6/2002 |
| EP | 1357458 | A2 | 10/2003 |
| EP | 1705883 | A1 | 9/2006 |
| EP | 1708116 | A2 | 10/2006 |
| EP | 1760584 | A1 | 3/2007 |
| EP | 1885109 | A2 | 2/2008 |
| EP | 1903791 | A2 | 3/2008 |
| EP | 1986431 | A2 | 10/2008 |
| EP | 2018032 | A1 | 1/2009 |
| EP | 2056568 | A1 | 5/2009 |
| EP | 2180665 | A1 | 4/2010 |
| EP | 2194698 | A1 | 6/2010 |
| EP | 2219105 | A1 | 8/2010 |
| EP | 2237534 | A1 | 10/2010 |
| EP | 2237536 | A1 | 10/2010 |
| EP | 2247087 | A1 | 11/2010 |
| EP | 2521080 | A2 | 11/2012 |
| EP | 2523109 | A1 | 11/2012 |
| EP | 2568693 | A2 | 3/2013 |
| EP | 2600584 | A1 | 6/2013 |
| EP | 2632193 | A2 | 8/2013 |
| EP | 2674889 | A2 | 12/2013 |
| EP | 2725473 | A1 | 4/2014 |
| EP | 2738749 | A1 | 6/2014 |
| EP | 2741190 | A2 | 6/2014 |
| EP | 2750062 | A2 | 7/2014 |
| EP | 2770673 | A1 | 8/2014 |
| EP | 2770708 | A1 | 8/2014 |
| EP | 2787465 | A1 | 10/2014 |
| EP | 2891049 | A1 | 7/2015 |
| EP | 2446619 | B1 | 10/2015 |
| EP | 2891049 | A4 | 3/2016 |
| EP | 2993909 | A1 | 3/2016 |
| EP | 2998822 | A2 | 3/2016 |
| EP | 3038427 | A1 | 6/2016 |
| EP | 2568693 | A3 | 7/2016 |
| EP | 2761582 | B1 | 3/2017 |
| EP | 3138300 | A1 | 3/2017 |
| EP | 3163495 | A1 | 5/2017 |
| EP | 2258103 | B1 | 5/2018 |
| EP | 2632193 | B1 | 10/2018 |
| EP | 3420441 | A1 | 1/2019 |
| EP | 2568693 | B1 | 12/2019 |
| EP | 3633963 | A1 | 4/2020 |
| EP | 3163866 | B1 | 5/2020 |
| EP | 4109891 | A1 | 12/2022 |
| FR | 3069679 | A1 | 2/2019 |
| GB | 2341698 | A | 3/2000 |
| GB | 2466038 | A | 6/2010 |
| GB | 2505476 | A | 3/2014 |
| IN | 1038MUM2005 | A | 6/2007 |
| IN | 201647028648 | A | 10/2016 |
| JP | 6-113297 | A | 4/1994 |
| JP | 6-276335 | A | 9/1994 |
| JP | 6-276515 | A | 9/1994 |
| JP | 6-282405 | A | 10/1994 |
| JP | 7-135594 | A | 5/1995 |
| JP | 8-279998 | A | 10/1996 |
| JP | 9-182046 | A | 7/1997 |
| JP | 9-233384 | A | 9/1997 |
| JP | 9-247655 | A | 9/1997 |
| JP | 9-265457 | A | 10/1997 |
| JP | 2000-122957 | A | 4/2000 |
| JP | 2000-200092 | A | 7/2000 |
| JP | 2000-259477 | A | 9/2000 |
| JP | 2000-283772 | A | 10/2000 |
| JP | 2001-67099 | A | 3/2001 |
| JP | 2001-169166 | A | 6/2001 |
| JP | 2001-331758 | A | 11/2001 |
| JP | 2002-251365 | A | 9/2002 |
| JP | 2002-288125 | A | 10/2002 |
| JP | 2002-320140 | A | 10/2002 |
| JP | 2002-342356 | A | 11/2002 |
| JP | 2002-351768 | A | 12/2002 |
| JP | 2002-351802 | A | 12/2002 |
| JP | 2003-030245 | A | 1/2003 |
| JP | 2003-101981 | A | 4/2003 |
| JP | 2003-134382 | A | 5/2003 |
| JP | 2003-189168 | A | 7/2003 |
| JP | 2003-274376 | A | 9/2003 |
| JP | 2003-299050 | A | 10/2003 |
| JP | 2003-299051 | A | 10/2003 |
| JP | 2003-348444 | A | 12/2003 |
| JP | 2004-104813 | A | 4/2004 |
| JP | 2004-187273 | A | 7/2004 |
| JP | 2004-193860 | A | 7/2004 |
| JP | 2004-221738 | A | 8/2004 |
| JP | 2004-356816 | A | 12/2004 |
| JP | 2005-94696 | A | 4/2005 |
| JP | 2005-159567 | A | 6/2005 |
| JP | 2005-260289 | A | 9/2005 |
| JP | 2005-286445 | A | 10/2005 |
| JP | 2005-303736 | A | 10/2005 |
| JP | 2005-332368 | A | 12/2005 |
| JP | 2006-135495 | A | 5/2006 |
| JP | 2006-166414 | A | 6/2006 |
| JP | 2006-185154 | A | 7/2006 |
| JP | 2006-222822 | A | 8/2006 |
| JP | 2006-245732 | A | 9/2006 |
| JP | 2006-246019 | A | 9/2006 |
| JP | 2006-254350 | A | 9/2006 |
| JP | 2006-319742 | A | 11/2006 |
| JP | 2007-41976 | A | 2/2007 |
| JP | 2007-88630 | A | 4/2007 |
| JP | 2007-140060 | A | 6/2007 |
| JP | 2007-150877 | A | 6/2007 |
| JP | 2007-150917 | A | 6/2007 |
| JP | 2007-150921 | A | 6/2007 |
| JP | 2007-200329 | A | 8/2007 |
| JP | 2007-201727 | A | 8/2007 |
| JP | 2007-274034 | A | 10/2007 |
| JP | 2007-282263 | A | 10/2007 |
| JP | 2007-300452 | A | 11/2007 |
| JP | 2007-304854 | A | 11/2007 |
| JP | 2008-28586 | A | 2/2008 |
| JP | 2008-099330 | A | 4/2008 |
| JP | 2008-125105 | A | 5/2008 |
| JP | 2008-136119 | A | 6/2008 |
| JP | 2008-533838 | A | 8/2008 |
| JP | 2008-289014 | A | 11/2008 |
| JP | 2009-502048 | A | 1/2009 |
| JP | 2009-159253 | A | 7/2009 |
| JP | 2009-188975 | A | 8/2009 |
| JP | 2009-232290 | A | 10/2009 |
| JP | 2009-239867 | A | 10/2009 |
| JP | 2009-265692 | A | 11/2009 |
| JP | 2009-296577 | A | 12/2009 |
| JP | 2009-296583 | A | 12/2009 |
| JP | 2009-543166 | A | 12/2009 |
| JP | 2010-15239 | A | 1/2010 |
| JP | 2010-503082 | A | 1/2010 |
| JP | 2010-109789 | A | 5/2010 |
| JP | 3162246 | U | 8/2010 |
| JP | 2010-198341 | A | 9/2010 |

(56) References Cited

FOREIGN PATENT DOCUMENTS

| | | |
|---|---|---|
| JP | 2010-206745 A | 9/2010 |
| JP | 2010-245940 A | 10/2010 |
| JP | 2010-271779 A | 12/2010 |
| JP | 2010-541398 A | 12/2010 |
| JP | 2012-244340 A | 12/2010 |
| JP | 2011-60281 A | 3/2011 |
| JP | 2011-65590 A | 3/2011 |
| JP | 2011-118662 A | 6/2011 |
| JP | 2011-209786 A | 10/2011 |
| JP | 2011-237857 A | 11/2011 |
| JP | 2012-168966 A | 9/2012 |
| JP | 2012-215938 A | 11/2012 |
| JP | 2013-25357 A | 2/2013 |
| JP | 2013-506225 A | 2/2013 |
| JP | 2013-74499 A | 4/2013 |
| JP | 2013-93699 A | 5/2013 |
| JP | 2013-105468 A | 5/2013 |
| JP | 2013-524683 A | 6/2013 |
| JP | 2013-530433 A | 7/2013 |
| JP | 2013-530458 A | 7/2013 |
| JP | 2013-175188 A | 9/2013 |
| JP | 2013-191065 A | 9/2013 |
| JP | 2014-503861 A | 2/2014 |
| JP | 2014-44483 A | 3/2014 |
| JP | 2014-44724 A | 3/2014 |
| JP | 2014-71835 A | 4/2014 |
| JP | 2014-87126 A | 5/2014 |
| JP | 2014-512044 A | 5/2014 |
| JP | 2014-110638 A | 6/2014 |
| JP | 2014-131359 A | 7/2014 |
| JP | 2014-170982 A | 9/2014 |
| JP | 2015-8001 A | 1/2015 |
| JP | 2015-11507 A | 1/2015 |
| JP | 2015-14923 A | 1/2015 |
| JP | 2015-501022 A | 1/2015 |
| JP | 2015-520456 A | 7/2015 |
| JP | 2015-524974 A | 8/2015 |
| JP | 2015-170234 A | 9/2015 |
| JP | 2015-526776 A | 9/2015 |
| JP | 2015-201087 A | 11/2015 |
| JP | 2015-533441 A | 11/2015 |
| JP | 2016-1446 A | 1/2016 |
| JP | 2016-24557 A | 2/2016 |
| JP | 2016-38615 A | 3/2016 |
| JP | 2016-53929 A | 4/2016 |
| JP | 2016-157292 A | 9/2016 |
| JP | 2016-167806 A | 9/2016 |
| JP | 2016-174282 A | 9/2016 |
| JP | 6023162 B2 | 11/2016 |
| JP | 2017-532645 A | 11/2017 |
| JP | 2017-228843 A | 12/2017 |
| JP | 2017-229060 A | 12/2017 |
| JP | 2018-7158 A | 1/2018 |
| JP | 2018-56719 A | 4/2018 |
| JP | 2018-136828 A | 8/2018 |
| JP | 2018-200624 A | 12/2018 |
| JP | 2019-114282 A | 7/2019 |
| JP | 2020-510929 A | 4/2020 |
| JP | 2021-40300 A | 3/2021 |
| KR | 1997-0031883 A | 6/1997 |
| KR | 1999-0044201 A | 6/1999 |
| KR | 10-2003-0016405 A | 2/2003 |
| KR | 10-2004-0016688 A | 2/2004 |
| KR | 10-2004-0045338 A | 6/2004 |
| KR | 10-2005-0054684 A | 6/2005 |
| KR | 10-2006-0031959 A | 4/2006 |
| KR | 10-2006-0064326 A | 6/2006 |
| KR | 10-2006-0116902 A | 11/2006 |
| KR | 10-2007-0086374 A | 8/2007 |
| KR | 10-2007-0111270 A | 11/2007 |
| KR | 10-2007-0120125 A | 12/2007 |
| KR | 10-0805341 B1 | 2/2008 |
| KR | 10-2008-0096042 A | 10/2008 |
| KR | 20-2008-0004775 U | 10/2008 |
| KR | 10-2009-0002641 A | 1/2009 |
| KR | 10-2009-0004176 A | 1/2009 |
| KR | 10-2009-0017901 A | 2/2009 |
| KR | 10-2009-0017906 A | 2/2009 |
| KR | 10-2009-0036226 A | 4/2009 |
| KR | 10-2009-0042499 A | 4/2009 |
| KR | 10-0891449 B1 | 4/2009 |
| KR | 10-2009-0089472 A | 8/2009 |
| KR | 10-2009-0122805 A | 12/2009 |
| KR | 10-2009-0126516 A | 12/2009 |
| KR | 10-2010-0036351 A | 4/2010 |
| KR | 10-2012-0003323 A | 1/2012 |
| KR | 10-2012-0088746 A | 8/2012 |
| KR | 10-2012-0100433 A | 9/2012 |
| KR | 10-1253392 B1 | 4/2013 |
| KR | 10-2013-0063019 A | 6/2013 |
| KR | 10-2013-0075783 A | 7/2013 |
| KR | 10-2013-0082190 A | 7/2013 |
| KR | 10-2013-0090244 A | 8/2013 |
| KR | 10-2013-0108563 A | 10/2013 |
| KR | 10-2013-0138150 A | 12/2013 |
| KR | 10-2013-0141688 A | 12/2013 |
| KR | 10-1342208 B1 | 12/2013 |
| KR | 10-2014-0016244 A | 2/2014 |
| KR | 10-2014-0026263 A | 3/2014 |
| KR | 10-2014-0031283 A | 3/2014 |
| KR | 10-2014-0043370 A | 4/2014 |
| KR | 10-2014-0137400 A | 12/2014 |
| KR | 10-2015-0031010 A | 3/2015 |
| KR | 10-2015-0121177 A | 10/2015 |
| KR | 10-2016-0012008 A | 2/2016 |
| KR | 10-2016-0045633 A | 4/2016 |
| KR | 10-2016-0092820 A | 8/2016 |
| KR | 10-2016-0141847 A | 12/2016 |
| KR | 10-2017-0027999 A | 3/2017 |
| KR | 10-2017-0128498 A | 11/2017 |
| KR | 10-1820573 B1 | 1/2018 |
| KR | 10-2018-0085931 A | 7/2018 |
| KR | 10-2019-0033082 A | 3/2019 |
| KR | 10-1989433 B1 | 6/2019 |
| KR | 10-2011177 B1 | 8/2019 |
| KR | 10-2020-0039030 A | 4/2020 |
| TW | I321955 B | 3/2010 |
| TW | 201131471 A | 9/2011 |
| TW | 201137722 A | 11/2011 |
| TW | 201316247 A | 4/2013 |
| TW | 201324310 A | 6/2013 |
| TW | 201409345 A | 3/2014 |
| TW | 201415345 A | 4/2014 |
| TW | 201416959 A | 5/2014 |
| WO | 1999/44114 A1 | 9/1999 |
| WO | 2001/18665 A1 | 3/2001 |
| WO | 01/27783 A1 | 4/2001 |
| WO | 2002/01864 A1 | 1/2002 |
| WO | 02/11022 A2 | 2/2002 |
| WO | 02/37848 A1 | 5/2002 |
| WO | 02/093344 A1 | 11/2002 |
| WO | 03/077553 A1 | 9/2003 |
| WO | 2004/032507 A1 | 4/2004 |
| WO | 2004/095414 A1 | 11/2004 |
| WO | 2004/104813 A1 | 12/2004 |
| WO | 2005053225 A1 | 6/2005 |
| WO | 2005/060501 A2 | 7/2005 |
| WO | 2005/086159 A2 | 9/2005 |
| WO | 2005/109829 A1 | 11/2005 |
| WO | 2006/063343 A2 | 6/2006 |
| WO | 2006/113834 A2 | 10/2006 |
| WO | 2007/008321 A2 | 1/2007 |
| WO | 2007/063922 A1 | 6/2007 |
| WO | 2007/073422 A1 | 6/2007 |
| WO | 2007/102110 A2 | 9/2007 |
| WO | 2007/142703 A1 | 12/2007 |
| WO | 2007/149731 A1 | 12/2007 |
| WO | 2008/027924 A2 | 3/2008 |
| WO | 2008/040566 A1 | 4/2008 |
| WO | 2008/051472 A1 | 5/2008 |
| WO | 2008/151229 A1 | 12/2008 |
| WO | 2009/005563 A1 | 1/2009 |
| WO | 2009/005914 A1 | 1/2009 |
| WO | 2009/010827 A2 | 1/2009 |

(56) References Cited

FOREIGN PATENT DOCUMENTS

| | | | |
|---|---|---|---|
| WO | 2009/012820 | A1 | 1/2009 |
| WO | 2009/042579 | A1 | 4/2009 |
| WO | 2009/067670 | A1 | 5/2009 |
| WO | 2009/086599 | A1 | 7/2009 |
| WO | 2010/001672 | A1 | 1/2010 |
| WO | 2010/065752 | A2 | 6/2010 |
| WO | 2010/087988 | A1 | 8/2010 |
| WO | 2010/065752 | A3 | 9/2010 |
| WO | 2010/120972 | A1 | 10/2010 |
| WO | 2010/128442 | A2 | 11/2010 |
| WO | 2010/137513 | A1 | 12/2010 |
| WO | 2011/041427 | A2 | 4/2011 |
| WO | 2011/084857 | A1 | 7/2011 |
| WO | 2011/126502 | A1 | 10/2011 |
| WO | 2011/126505 | A1 | 10/2011 |
| WO | 2011/146605 | A1 | 11/2011 |
| WO | 2011/146839 | A1 | 11/2011 |
| WO | 2011/149231 | A2 | 12/2011 |
| WO | 2011/161145 | A1 | 12/2011 |
| WO | 2012/004288 | A1 | 1/2012 |
| WO | 2012/028773 | A1 | 3/2012 |
| WO | 2012/037170 | A1 | 3/2012 |
| WO | 2012/051052 | A1 | 4/2012 |
| WO | 2012/058124 | A2 | 5/2012 |
| WO | 2012/079530 | A1 | 6/2012 |
| WO | 2012/104288 | A1 | 8/2012 |
| WO | 2012/126078 | A1 | 9/2012 |
| WO | 2012/154748 | A1 | 11/2012 |
| WO | 2012/170118 | A1 | 12/2012 |
| WO | 2012/170446 | A2 | 12/2012 |
| WO | 2012/172164 | A1 | 12/2012 |
| WO | 2013/000150 | A1 | 1/2013 |
| WO | 2013/048880 | A1 | 4/2013 |
| WO | 2013/049346 | A1 | 4/2013 |
| WO | 2013/097882 | A1 | 7/2013 |
| WO | 2013/097895 | A1 | 7/2013 |
| WO | 2013/097896 | A1 | 7/2013 |
| WO | 2013/114821 | A1 | 8/2013 |
| WO | 2013111239 | A1 | 8/2013 |
| WO | 2013/132144 | A1 | 9/2013 |
| WO | 2013/135270 | A1 | 9/2013 |
| WO | 2013/137503 | A1 | 9/2013 |
| WO | 2013/153405 | A2 | 10/2013 |
| WO | 2013/169842 | A2 | 11/2013 |
| WO | 2013/173504 | A1 | 11/2013 |
| WO | 2013/173838 | A2 | 11/2013 |
| WO | 2013/176847 | A1 | 11/2013 |
| WO | 2014/004180 | A1 | 1/2014 |
| WO | 2014/004182 | A1 | 1/2014 |
| WO | 2014/004524 | A2 | 1/2014 |
| WO | 2014/018242 | A1 | 1/2014 |
| WO | 2014/021967 | A1 | 2/2014 |
| WO | 2014/030320 | A1 | 2/2014 |
| WO | 2014/032461 | A1 | 3/2014 |
| WO | 2014/052871 | A1 | 4/2014 |
| WO | 2014/057795 | A1 | 4/2014 |
| WO | 2014/058937 | A1 | 4/2014 |
| WO | 2014/077987 | A1 | 5/2014 |
| WO | 2014/078965 | A1 | 5/2014 |
| WO | 2014/092980 | A1 | 6/2014 |
| WO | 2014/101527 | A1 | 7/2014 |
| WO | 2014/105274 | A1 | 7/2014 |
| WO | 2014/105276 | A1 | 7/2014 |
| WO | 2014/107469 | A2 | 7/2014 |
| WO | 2014/115605 | A1 | 7/2014 |
| WO | 2014/143776 | A2 | 9/2014 |
| WO | 2014/147297 | A1 | 9/2014 |
| WO | 2014/151089 | A1 | 9/2014 |
| WO | 2014/160327 | A1 | 10/2014 |
| WO | 2014/168616 | A1 | 10/2014 |
| WO | 2013/173504 | A8 | 12/2014 |
| WO | 2014/197279 | A1 | 12/2014 |
| WO | 2014/200730 | A1 | 12/2014 |
| WO | 2014/204960 | A1 | 12/2014 |
| WO | 2015/062410 | A1 | 5/2015 |
| WO | 2015/076930 | A1 | 5/2015 |
| WO | 2015/102572 | A1 | 7/2015 |
| WO | 2015/124831 | A1 | 8/2015 |
| WO | 2015/134692 | A1 | 9/2015 |
| WO | 2016/033400 | A1 | 3/2016 |
| WO | 2016/040405 | A1 | 3/2016 |
| WO | 2016/040535 | A1 | 3/2016 |
| WO | 2016/046589 | A1 | 3/2016 |
| WO | 2016/057117 | A1 | 4/2016 |
| WO | 2016/130230 | A1 | 8/2016 |
| WO | 2016/168154 | A1 | 10/2016 |
| WO | 2017/038261 | A1 | 3/2017 |
| WO | 2017/058442 | A1 | 4/2017 |
| WO | 2017/173155 | A1 | 10/2017 |
| WO | 2017/218143 | A1 | 12/2017 |
| WO | 2017/218153 | A1 | 12/2017 |
| WO | 2017/218192 | A1 | 12/2017 |
| WO | 2017/218199 | A1 | 12/2017 |
| WO | 2018/057272 | A1 | 3/2018 |
| WO | 2018/213401 | A1 | 11/2018 |
| WO | 2018/213415 | A1 | 11/2018 |
| WO | 2018/213844 | A1 | 11/2018 |
| WO | 2018/232333 | A1 | 12/2018 |
| WO | 2019/067131 | A1 | 4/2019 |
| WO | 2019/217009 | A1 | 11/2019 |
| WO | 2019/217477 | A1 | 11/2019 |
| WO | 2020/243691 | A1 | 12/2020 |
| WO | 2021/010993 | A1 | 1/2021 |
| WO | 2021/112983 | A1 | 6/2021 |

OTHER PUBLICATIONS

Decision to Grant received for Japanese Patent Application No. 2023-571312, mailed on Aug. 29, 2024, 3 pages (1 page of English Translation and 2 pages of Official Copy).

Decision to Grant received for Japanese Patent Application No. 2024-003876, mailed on Sep. 2, 2024, 3 pages (1 page of English Translation and 2 pages of Official Copy).

Final Office Action received for U.S. Appl. No. 17/970,417, mailed on Sep. 18, 2024, 24 pages.

Notice of Allowance received for U.S. Appl. No. 17/684,843, mailed on Sep. 17, 2024, 5 pages.

Office Action received for Chinese Patent Application No. 202410030102.1, mailed on Jul. 23, 2024, 18 pages (9 pages of English Translation and 9 pages of Official Copy).

"6. Voice chat with friends through QQ", Online available at: https://v.qq.com/x/page/a0166p7xrt0.html, Sep. 22, 2015, 1 page.

Jiutian Technology, "Windows 8 Chinese version from entry to proficiency", Jan. 1, 2014, 5 pages.

Song Jianhua, "Guidelines for Network", Feb. 29, 2008, 11 pages.

Advisory Action received for U.S. Appl. No. 17/479,974, mailed on Apr. 25, 2024, 4 pages.

Applicant-Initiated Interview Summary received for U.S. Appl. No. 17/978,930, mailed on Apr. 26, 2024, 4 pages.

Corrected Notice of Allowance received for U.S. Appl. No. 17/903,946, mailed on Apr. 22, 2024, 2 pages.

Non-Final Office Action received for U.S. Appl. No. 17/950,868, mailed on Apr. 24, 2024, 16 pages.

Non-Final Office Action received for U.S. Appl. No. 18/138,348, mailed on Apr. 30, 2024, 16 pages.

Notice of Acceptance received for Australian Patent Application No. 2023204396, mailed on Apr. 15, 2024, 3 pages.

Office Action received for Australian Patent Application No. 2022218517, mailed on Apr. 24, 2024, 4 pages.

Office Action received for Indian Patent Application No. 202118049678, mailed on Apr. 18, 2024, 8 pages.

Shangmeng, Li, "The Design and Implementation of Mobile Terminal System of Multimedia Conference Based on Symbian Operating System", China Academic Journal Electronic Publishing House, Online available at: http://www.cnki.net, 2011, 66 pages.

Corrected Notice of Allowance received for U.S. Appl. No. 17/666,971, mailed on Jan. 16, 2024, 2 pages.

Corrected Notice of Allowance received for U.S. Appl. No. 17/732,204, mailed on Jan. 18, 2024, 5 pages.

(56)                    References Cited

OTHER PUBLICATIONS

Final Office Action received for U.S. Appl. No. 17/479,974, mailed on Jan. 19, 2024, 16 pages.
Office Action received for Australian Patent Application No. 2023204396, mailed on Jan. 8, 2024, 5 pages.
Applicant-Initiated Interview Summary received for U.S. Appl. No. 17/479,974, mailed on Mar. 14, 2024, 2 pages.
Applicant-Initiated Interview Summary received for U.S. Appl. No. 17/978,930, mailed on Mar. 13, 2024, 3 pages.
Applicant-Initiated Interview Summary received for U.S. Appl. No. 18/067,350, mailed on Mar. 13, 2024, 4 pages.
International Search Report and Written Opinion received for PCT Patent Application No. PCT/US2023/032084, mailed on Nov. 27, 2023, 10 pages.
Office Action received for Chinese Patent Application No. 201910704856.X, mailed on Mar. 8, 2024, 13 pages (7 pages of English Translation and 6 pages of Official Copy).
Office Action received for Chinese Patent Application No. 202010728844.3, mailed on Jan. 27, 2024, 16 pages (8 pages of English Translation and 8 pages of Official Copy).
Office Action received for European Patent Application No. 22188377.0, mailed on Mar. 7, 2024, 7 pages.
Office Action received for European Patent Application No. 22201007.6, mailed on Mar. 13, 2024, 4 pages.
Office Action received for Korean Patent Application No. 10-2023-7018775, mailed on Feb. 28, 2024, 9 pages (4 pages of English Translation and 5 pages of Official Copy).
Advisory Action received for U.S. Appl. No. 17/181,089, mailed on Dec. 8, 2023, 3 pages.
Applicant-Initiated Interview Summary received for U.S. Appl. No. 17/181,089, mailed on Nov. 28, 2023, 3 pages.
Applicant-Initiated Interview Summary received for U.S. Appl. No. 17/181,089, mailed on Sep. 18, 2023, 3 pages.
Applicant-Initiated Interview Summary received for U.S. Appl. No. 17/476,404, mailed on Oct. 31, 2023, 4 pages.
Applicant-Initiated Interview Summary received for U.S. Appl. No. 17/479,974, mailed on Nov. 1, 2023, 2 pages.
Applicant-Initiated Interview Summary received for U.S. Appl. No. 17/484,899, mailed on Sep. 12, 2023, 6 pages.
Applicant-Initiated Interview Summary received for U.S. Appl. No. 17/684,843, mailed on Oct. 5, 2023, 4 pages.
Applicant-Initiated Interview Summary received for U.S. Appl. No. 18/067,350, mailed on Sep. 11, 2023, 4 pages.
Applicant-Initiated Interview Summary received for U.S. Appl. No. 18/088,309, mailed on Oct. 27, 2023, 2 pages.
Corrected Notice of Allowance received for U.S. Appl. No. 17/320,900, mailed on Sep. 18, 2023, 5 pages.
Corrected Notice of Allowance received for U.S. Appl. No. 17/666,971, mailed on Sep. 29, 2023, 2 pages.
Corrected Notice of Allowance received for U.S. Appl. No. 17/732,204, mailed on Dec. 4, 2023, 5 pages.
Corrected Notice of Allowance received for U.S. Appl. No. 17/732,204, mailed on Nov. 16, 2023, 6 pages.
Corrected Notice of Allowance received for U.S. Appl. No. 17/872,736, mailed on Oct. 13, 2023, 4 pages.
Corrected Notice of Allowance received for U.S. Appl. No. 17/950,922, mailed on Oct. 2, 2023, 3 pages.
Decision to Grant received for European Patent Application No. 18728002.9, mailed on Aug. 31, 2023, 4 pages.
Decision to Grant received for European Patent Application No. 19203942.8, mailed on Nov. 16, 2023, 2 pages.
Extended European Search Report received for European Patent Application No. 23172038.4, mailed on Oct. 11, 2023, 10 pages.
Extended European Search Report received for European Patent Application No. 23190753.6, mailed on Nov. 22, 2023, 13 pages.
Extended European Search Report received for European patent Application No. 231913799, mailed on Sep. 18, 2023. 8 pages.
Final Office Action received for U.S. Appl. No. 17/181,089, mailed on Oct. 13, 2023, 15 pages.

Final Office Action received for U.S. Appl. No. 17/476,404, mailed on Sep. 12, 2023, 30 pages.
Final Office Action received for U.S. Appl. No. 17/484,899, mailed on Nov. 6, 2023, 39 pages.
International Preliminary Report on Patentabiiity received for PCT Patent Application No. PCT/US2022/029261, mailed on Nov. 30, 2023, 12 pages.
International Preliminary Report on Patentability received for PCT Patent Application No. PCT/US2022/029273, mailed on Nov. 30, 2023, 14 pages.
International Preliminary Report on Patentability received for PCT Patent Application No. PCT/US2022/029580, mailed on Nov. 30, 2023, 14 pages.
International Search Report and Written Opinion received for PCT Patent Application No. PCT/US2023/020569, mailed on Nov. 13, 2023, 23 pages.
Invitation to Pay Additional Fees and Partial International Search Report received for PCT Patent Application No. PCT/US2023/020569, mailed on Sep. 21, 2023, 14 pages.
Non-Final Office Action received for U.S. Appl. No. 18/067,350, mailed on Aug. 3, 2023, 41 pages.
Non-Final Office Action received for U.S. Appl. No. 17/479,974, mailed on Oct. 10, 2023, 20 pages.
Non-Final Office Action received for U.S. Appl. No. 17/483,679, mailed on Sep. 13, 2023, 32 pages.
Non-Final Office Action received for U.S. Appl. No. 18/088,309, mailed on Sep. 21, 2023, 11 pages.
Notice of Acceptance received for Australian Patent Application No. 2022218540, mailed on Oct. 16, 2023, 3 pages.
Notice of Acceptance received for Australian Patent Application No. 2022241590, mailed on Nov. 14, 2023, 3 pages.
Notice of Allowance received for Chinese Patent Application No. 202111483033.2. mailed on Oct. 7, 2023, 4 pages (1 page of English Translation and 3 pages of Official Copy).
Notice of Allowance received for Japanese Patent Application No. 2020-184605, mailed on Oct. 10, 2023, 4 pages (1 page of English Translation and 3 pages of Official Copy).
Notice of Allowance received for Korean Patent Application No. 10-2022-7033655, mailed on Nov. 29, 2023, 6 pages (2 pages of English Translation and 4 pages of Official Copy).
Notice of Allowance received for Korean Patent Application No. 10-2023-7024157, mailed on Sep. 19, 2023, 7 pages (2 pages of English Transiation and 5 pages of Official Copy).
Notice of Allowance received for U.S. Appl. No. 17/320,900, mailed on Nov. 6, 2023, 9 pages.
Notice of Allowance received for U.S. Appl. No. 17/479,897, mailed on Oct. 3, 2023, 5 pages.
Notice of Allowance received for U.S. Appl. No. 17/732,204, mailed on Oct. 12, 2023, 8 pages.
Notice of Allowance received for U.S. Appl. No. 17/740,104, mailed on Oct. 4, 2023, 5 pages.
Notice of Allowance received for U.S. Appl. No. 17/950,922, mailed on Sep. 20, 2023, 6 pages.
Notice of Allowance received for U.S. Appl. No. 18/077,891, mailed on Oct. 19, 2023, 18 pages.
Notice of Hearing received for Indian Patent Application No. 201814036860, mailed on Sep. 8, 2023, 2 pages.
Office Action received for Australian Patent Application No. 2023248185, mailed on Nov. 22, 2023, 2 pages.
Office Action received for Australian Patent Application No. 2023248185, mailed on Oct. 20, 2023, 3 pages.
Office Action received for European Patent Application No. 20166552.8, mailed on Nov. 3, 2023, 3 pages.
Office Action received for European Patent Application No. 22201007.6, mailed on Oct. 9, 2023, 5 pages.
Office Action received for Japanese Patent Application No. 2022-116534, mailed on Aug. 28, 2023, 10 pages (5 pages of English Translation and 5 pages of Official Copy).
Office Action received for Japanese Patent Application No. 2022-129377, mailed on Nov. 10, 2023, 6 pages (3 pages of English Translation and 3 pages of Official Copy).

(56)                  References Cited

OTHER PUBLICATIONS

Office Action received for Korean Patent Application No. 10-2022-0053111, mailed on Oct. 23, 2023, 10 pages (5 pages of English Translation and 5 pages of Official Copy).
Office Action received for Korean Patent Application No. 10-2023-0001668, mailed on Nov. 3, 2023, 5 pages (2 pages of English Translation and 3 pages of Official Copy).
Office Action received for Korean Patent Application No. 10-2023-7008877, mailed on Nov. 29, 2023, 7 pages (3 pages of English Translation and 4 pages of Official Copy).
Result of Consultation received for European Patent Application No. 21207736.6, mailed on Nov. 23, 2023, 5 pages.
Summons to Attend Oral Proceedings received for European Patent Application No. 21197457.1, mailed on Nov. 23, 2023, 12 pages.
Non-Final Office Action received for U.S. Appl. No. 18/067,350, mailed on May 28, 2024, 43 pages.
Non-Final Office Action received for U.S. Appl. No. 18/200,480, mailed on May 20, 2024, 19 pages.
Notice of Allowance received for Chinese Patent Application No. 202311042451.7, mailed on May 15, 2024, 4 pages (1 page of English Translation and 3 pages of Official Copy).
Office Action received for Chinese Patent Application No. 202211081603.X, mailed on Apr. 29, 2024, 6 pages (3 pages of English Translation and 3 pages of Official Copy).
Office Action received for Chinese Patent Application No. 202211110081.1, mailed on Apr. 28, 2024, 6 pages (3 pages of English Translation and 3 pages of Official Copy).
Office Action received for European Patent Application No. 21789897.2, mailed on May 23, 2024, 12 pages.
Applicant-Initiated Interview Summary received for U.S. Appl. No. 16/259,954, mailed on Mar. 23, 2020, 3 pages.
Applicant-Initiated Interview Summary received for U.S. Appl. No. 17/013,778, mailed on Feb. 28, 2022, 2 pages.
Applicant-Initiated Interview Summary received for U.S. Appl. No. 18/088,309, mailed on Feb. 28, 2024, 2 pages.
Board Decision received for Chinese Patent Application No. 201580046788.2, mailed on Jun. 6, 2022, 17 pages (1 page of English Translation and 16 pages of Official Copy).
Board Opinion received for Chinese Patent Application No. 201580046788.2, mailed on Dec. 29, 2021, 10 pages (4 pages of English Translation and 6 pages of Official Copy).
Brief Communication Regarding Oral Proceedings received for European Patent Application No. 15760008.1, mailed on Sep. 13, 2021, 8 pages.
Corrected Notice of Allowance received for U.S. Appl. No. 14/841,614, mailed on Jan. 8, 2019, 3 pages.
Corrected Notice of Allowance received for U.S. Appl. No. 17/013,778, mailed on Mar. 7, 2023, 5 pages.
Corrected Notice of Allowance received for U.S. Appl. No. 17/684,843, mailed on Mar. 4, 2024, 2 pages.
Decision to Grant received for European Patent Application No. 15760008.1, mailed on Aug. 11, 2022, 2 pages.
Examiner's Answer to Appeal Brief received for U.S. Appl. No. 17/013,778, mailed on Dec. 20, 2022, 9 pages.
Extended European Search Report received for European Patent Application No. 22169639.6, mailed on Jul. 19, 2022, 14 pages.
Extended European Search Report received for European Patent Application No. 23158566.2, mailed on Jun. 14, 2023, 10 pages.
Final Office Action received for U.S. Appl. No. 14/841,614, mailed on May 10, 2018, 13 pages.
Final Office Action received for U.S. Appl. No. 14/841,623, mailed on Sep. 5, 2017, 16 pages.
Final Office Action received for U.S. Appl. No. 17/013,778, mailed on Apr. 1, 2022, 11 pages.
Intention to Grant received for European Patent Application No. 15760008.1, mailed on Apr. 6, 2022, 11 pages.
Intention to Grant received for European Patent Application No. 15760008.1, mailed on Oct. 5, 2021, 11 pages.

International Preliminary Report on Patentability received for PCT Patent Application No. PCT/US2015/046787, mailed on Mar. 16, 2017., 19 pages.
International Search Report and Written Opinion received for PCT Patent Application No. PCT/US2015/046787, mailed on Apr. 1, 2016, 26 pages.
Invitation to Pay Additional Fees received for PCT Patent Application No. PCT/US2015/046787, mailed on Dec. 15, 2015, 8 pages.
Iphone, "User Guide for iOS 7.1 Software", Mar. 2014, 162 pages.
Minutes of the Oral Proceedings received for European Patent Application No. 15760008.1, mailed on Sep. 21, 2021, 6 pages.
Non-Final Office Action received for U.S. Appl. No. 17/013,778, mailed on Aug. 20, 2021, 9 pages.
Non-Final Office Action received for U.S. Appl. No. 14/841,608, mailed on Apr. 12, 2017., 9 Pages.
Non-Final Office Action received for U.S. Appl. No. 14/841,614, mailed on Jul. 27, 2017, 13 pages.
Non-Final Office Action received for U.S. Appl. No. 14/841,623, mailed on Feb. 2, 2017, 17 pages.
Non-Final Office Action received for U.S. Appl. No. 16/259,954, mailed on Feb. 5, 2020, 10 pages.
Non-Final Office Action received for U.S. Appl. No. 17/013,778, mailed on Dec. 9, 2021, 11 pages.
Non-Final Office Action received for U.S. Appl. No. 18/200,480, mailed on Feb. 29, 2024, 16 pages.
Notice of Allowance received for Korean Patent Application No. 10-2023-7008877, mailed on Feb. 20, 2024, 7 pages (2 pages of English Translation and 5 pages of Official Copy).
Notice of Allowance received for Korean Patent Application No. 10-2023-7039382, mailed on Feb. 13, 2024, 6 pages (2 pages of English Translation and 4 pages of Official Copy).
Notice of Allowance received for Korean Patent Application No. 10-2024-7000870, mailed on Feb. 13, 2024, 5 pages (2 pages of English Translation and 3 pages of Official Copy).
Notice of Allowance received for Taiwanese Patent Application No. 104128519, mailed on Nov. 20, 2017, 5 pages (2 page of English Translation and 3 pages of Official Copy).
Notice of Allowance received for U.S. Appl. No. 14/841,608, mailed on Nov. 14, 2017, 5 pages.
Notice of Allowance received for U.S. Appl. No. 14/841,614, mailed on Oct. 24, 2018, 10 pages.
Notice of Allowance received for U.S. Appl. No. 14/841,623, mailed on Feb. 23, 2018, 8 pages.
Notice of Allowance received for U.S. Appl. No. 16/259,954, mailed on May 7, 2020, 9 pages.
Notice of Allowance received for U.S. Appl. No. 17/013,778, mailed on Feb. 23, 2023, 8 pages.
Office Action received for Chinese Patent Application No. 201580046788.2, mailed on Apr. 15, 2019, 13 pages (6 pages of English Translation and 7 pages of Official Copy).
Office Action received for Chinese Patent Application No. 201580046788.2, mailed on Feb. 25, 2020, 14 pages (7 pages of English Translation and 7 pages of Official Copy).
Office Action received for Chinese Patent Application No. 201580046788.2, mailed on Mar. 25, 2021, 9 pages (4 pages of English Translation and 5 pages of Official Copy).
Office Action received for Chinese Patent Application No. 201580046788.2, mailed on Sep. 22, 2020, 10 pages (5 pages of English Translation and 5 pages of Official Copy).
Office Action received for Chinese Patent Application No. 202011083486.1, mailed on Jan. 16, 2024, 21 pages (7 pages of English Translation and 14 pages of Official Copy).
Office Action received for Chinese Patent Application No. 202211081603.X, mailed on Jan. 10, 2024, 10 pages (5 pages of English Translation and 5 pages of Official Copy).
Office Action received for Chinese Patent Application No. 202211081603.X, mailed on Oct. 20, 2023, 15 pages (7 pages of English Translation and 8 pages of Official Copy).
Office Action received for Chinese Patent Application No. 202211096369.8, mailed on Sep. 29, 2023, 13 pages (6 pages of English Translation and 7 pages of Official Copy).

(56) References Cited

OTHER PUBLICATIONS

Office Action received for Chinese Patent Application No. 202211110081.1, mailed on Jan. 8, 2024, 14 pages (6 pages of English Translation and 8 pages of Official Copy).
Office Action received for Chinese Patent Application No. 202211110081.1, mailed on Oct. 13, 2023, 16 pages (7 pages of English Translation and 9 pages of Official Copy).
Office Action received for European Patent Application No. 15760008.1, mailed on Jul. 16, 2019, 9 pages.
Office Action received for Taiwanese Patent Application No. 104128519, mailed on Mar. 29, 2017, 16 pages (7 pages of English Translation and 9 pages of Official Copy).
Result of Consultation received for European Patent Application No. 15760008.1, mailed on Sep. 9, 2021, 7 pages.
Samsung, "SM-G900F User Manual", English (EU). Rev.1.0, Mar. 2014, 249 pages.
Sony, "Sony Smartwatch 3 SWR50", User Guide, Jul. 2014, 31 pages.
Summons to Attend Oral Proceedings received for European Patent Application No. 15760008.1, mailed on Feb. 5, 2021, 11 pages.
Supplemental Notice of Allowance received for U.S. Appl. No. 14/841,608, mailed on Jan. 25, 2018, 2 pages.
Corrected Notice of Allowance received for U.S. Appl. No. 17/903,946, mailed on Sep. 3, 2024, 2 pages.
Extended European Search Report received for European Patent Application No. 24159026.4, mailed on Jul. 10, 2024, 9 pages.
Final Office Action received for U.S. Appl. No. 17/950,868, mailed on Aug. 29, 2024, 13 pages.
International Search Report and Written Opinion received for PCT Patent Application No. PCT/US2024/017017, mailed on Aug. 2, 2024, 27 pages.
Invitation to Pay Additional Fees received for PCT Patent Application No. PCT/US2024/017017, mailed on May 15, 2024, 3 pages.
Office Action received for Japanese Patent Application No. 2023-028786, mailed on Aug. 23, 2024, 10 pages (5 pages of English Translation and 5 pages of Official Copy).
Decision to Grant received for European Patent Application No. 15714698.6, mailed on Apr. 5, 2024, 2 pages.
Examiner's Answer to Appeal Brief received for U.S. Appl. No. 17/181,089, mailed on Apr. 15, 2024, 11 pages.
Final Office Action received for U.S. Appl. No. 17/978,930, mailed on Apr. 5, 2024, 28 pages.
International Preliminary Report on Patentability received for PCT Patent Application No. PCT/US2022/044592, mailed on Apr. 4, 2024, 21 pages.
Non-Final Office Action received for U.S. Appl. No. 17/970,417, mailed on Apr. 10, 2024, 16 pages.
Non-Final Office Action received for U.S. Appl. No. 18/088,309, mailed on Apr. 9, 2024, 14 pages.
Notice of Allowance received for Korean Patent Application No. 10-2023-7044044, mailed on Mar. 14, 2024, 7 pages (2 pages of English Translation and 5 pages of Official Copy).
Notice of Allowance received for U.S. Appl. No. 17/903,946, mailed on Apr. 10, 2024, 7 pages.
Office Action received for Chinese Patent Application No. 201911128105.4, mailed on Mar. 16, 2024, 7 pages (4 pages of English Translation and 3 pages of Official Copy).
Office Action received for Chinese Patent Application No. 202010728711.6, mailed on Feb. 1, 2024, 30 pages (18 pages of English Translation and 12 pages of Official Copy).
Office Action received for Chinese Patent Application No. 202311321231.8, mailed on Mar. 10, 2024, 15 pages (9 pages of English Translation and 6 pages of Official Copy).
Office Action received for European Patent Application No. 23158566.2, mailed on Apr. 9, 2024, 7 pages.
Applicant-Initiated Interview Summary received for U.S. Appl. No. 17/747,804, mailed on Mar. 17, 2023, 4 pages.
Applicant-Initiated Interview Summary received for U.S. Appl. No. 17/950,900, mailed on Jan. 26, 2023, 5 pages.

Corrected Notice of Allowance received for U.S. Appl. No. 16/922,675, mailed on Jan. 9, 2023, 3 pages.
Corrected Notice of Allowance received for U.S. Appl. No. 16/922,675, mailed on Jan. 20, 2023, 3 pages.
Decision on Opposition received for Australian Patent Application No. 2018271366, mailed on Mar. 3, 2023, 3 pages.
Dolan, Tim, "How to Make a Laptop Webcam into a Document Camera—IPEVO Mirror—Cam Review", Retrieved from the internet <https://www.youtube.com/watch?v=-K8jyZ1hbbg>, Aug. 29, 2020, 1 page.
Extended European Search Report received for European Patent Application No. 22195584.2, mailed on Jan. 5, 2023, 13 pages.
Extended European Search Report received for European Patent Application No. 22201007.6, mailed on Jan. 12, 2023, 7 pages.
Final Office Action received for U.S. Appl. No. 17/479,897, mailed on Jan. 10, 2023, 15 pages.
Final Office Action received for U.S. Appl. No. 17/950,900, mailed on Jan. 23, 2023, 14 pages.
Intention to Grant received for Danish Patent Application No. PA202270464, mailed on Feb. 20, 2023, 2 pages.
Invitation to pay Additional Fees received for PCT Patent Application No. PCT/US2022/044592, mailed on Jan. 16, 2023, 21 pages.
Invitation to Pay Search Fees received for European Patent Application No. 20760624.5, mailed on Jan. 2, 2023, 3 pages.
Larson, Tom, "How to Turn your Webcam into a Document Camera", Retrieved from the Internet: URL: https://vwvv.youtube.com/watchvzUlaW22FxRZM, Nov. 7, 2020, 1 page.
Non-Final Office Action received for U.S. Appl. No. 17/181,089, mailed on Feb. 17, 2023, 14 pages.
Non-Final Office Action received for U.S. Appl. No. 17/479,974, mailed on Feb. 22, 2023, 30 pages.
Non-Final Office Action received for U.S. Appl. No. 17/483,542, mailed on Jan. 31, 2023, 14 pages.
Non-Final Office Action received for U.S. Appl. No. 17/747,804, mailed on Mar. 1, 2023, 14 pages.
Non-Final Office Action received for U.S. Appl. No. 17/752,582, mailed on Mar. 6, 2023, 17 pages.
Non-Final Office Action received for U.S. Appl. No. 17/867,317, mailed on Feb. 28, 2023, 18 pages.
Notice of Acceptance received for Australian Patent Application No. 2021201243, mailed on Feb. 23, 2023, 3 pages.
Notice of Acceptance received for Australian Patent Application No. 2022200901, mailed on Mar. 9, 2023. 3 pages.
Notice of Allowance received for Japanese Patent Application No. 2022-125792, mailed on Jan. 27, 2023, 4 pages (1 page of English Translation and 3 pages of Official Copy).
Notice of Allowance received for Korean Patent Application No. 10-2021-7017731, mailed on Feb. 28, 2023, 5 pages (2 pages of English Translation and 3 pages of Official Copy).
Notice of Allowance received for Korean Patent Application No. 10-2022-7006175, mailed on Jan. 12, 2023, 7 pages (2 pages of English Transiation and 5 pages of Official Copy).
Notice of Allowance received for U.S. Appl. No. 16/888,775, mailed on Feb. 21, 2023, 5 pages.
Notice of Allowance received for U.S. Appl. No, 17/482,977, mailed on Jan. 24, 2023, 10 pages.
Notice of Allowance received for U.S. Appl. No. 17/519,025, mailed on Mar. 2, 2023, 8 pages.
Notice of Allowance received for U.S. Appl. No. 17/950,900, mailed on Mar. 7, 2023. 10 pages.
Office Action received for Chinese Patent Application No. 202110328602.X, mailed on Dec. 1, 2022, 28 pages (17 pages of English Translation 11 pages of Official Copy).
Office Action received for Chinese Patent Application No. 202111652452.4, mailed on Feb. 11, 2023, 28 pages (13 pages of English Translation and 15 pages of Official Copy).
Office Action received for European Patent Application No. 20760624.5, mailed on Mar. 7, 2023, 13 pages.
Office Action received for European Patent Application No. 21166718.3, mailed on Feb. 20, 2023, 7 pages.
Office Action received for European Patent Application No. 21728781.2, mailed on Mar. 1, 2023, 13 pages.

(56)                    References Cited

OTHER PUBLICATIONS

Office Action received for Japanese Patent Application No. 2021-206121, mailed on Feb. 20, 2023, 7 pages (3 pages of English Translation and 4 pages of Official Copy).

Philips Support Website, "How to switch to preferred audio in Philips TV from a broadcast with multiple languages audio stream?", Retrieved from the Internet: URL: https://www.youtube.com/watchv=UlaW22FxRZM, Dec. 29, 2016, 5 pages.

Supplemental Notice of Allowance received for U.S. Appl. No. 16/888,775, mailed on Mar. 1, 2023, 2 pages.

Applicant-Initiated Interview Summary received for U.S. Appl. No. 17/950,868, mailed on Jul. 19, 2024, 2 pages.

Applicant-Initiated Interview Summary received for U.S. Appl. No. 18/067,350, mailed on Jul. 29, 2024, 3 pages.

Intention to Grant received for European Patent Application No. 23168537.1, mailed on Jul. 25, 2024, 8 pages.

Non-Final Office Action received for U.S. Appl. No. 18/380,116, mailed on Jul. 18, 2024, 16 pages.

Notice of Allowance received for Chinese Patent Application No. 202211110081.1, mailed on Jul. 24, 2024, 2 pages (1 page of English Translation and 1 page of Official Copy).

Notice of Allowance received for U.S. Appl. No. 18/229,989, mailed on Jul. 24, 2024, 5 pages.

Office Action received for Chinese Patent Application No. 202110894284.3, mailed on Jun. 27, 2024, 10 pages (5 pages of English Translation and 5 pages of Official Copy).

Office Action received for European Patent Application No. 22201007.6, mailed on Jul. 18, 2024, 4 pages.

Office Action received for Japanese Patent Application No. 2023-077990, mailed on Jul. 12, 2024, 8 pages (4 pages of English Translation and 4 pages of Official Copy).

Office Action received for Japanese Patent Application No. 2023-571312, mailed on Jul. 16, 2024, 4 pages (2 pages of English Translation and 2 pages of Official Copy).

Office Action received for Korean Patent Application No. 10-2024-7019962, mailed on Jul. 16, 2024, 6 pages (2 pages of English Translation and 4 pages of Official Copy).

Corrected Notice of Allowance received for U.S. Appl. No. 17/740,104, mailed on Jan. 2, 2024, 2 pages.

Final Office Action received for U.S. Appl. No. 18/088,309, mailed on Jan. 9, 2024, 13 pages.

International Preliminary Report on Patentability received for PCT Patent Application No. PCT/US2022/031252, mailed on Dec. 21, 2023, 13 pages.

Office Action received for Australian Patent Application No. 2022218517, mailed on Dec. 21, 2023, 5 pages.

13 questions and answers about using Apple Pay online, online available at: http://www.it528.com/apple/1356.html, Feb. 18, 2016, 5 pages (Official Copy Only) See Communication Under 37 CFR § 1.98(a) (3).

Advisory Action received for U.S. Appl. No. 14/863,099, mailed on Sep. 8, 2016, 3 pages.

Advisory Action received for U.S. Appl. No. 16/422,736, mailed on Mar. 12, 2021, 3 pages.

Advisory Action received for U.S. Appl. No. 16/583,989, mailed on Sep. 22, 2020, 5 pages.

Advisory Action received for U.S. Appl. No. 17/181,089, mailed on Dec. 20, 2022, 4 pages.

Advisory Action received for U.S. Appl. No. 17/483,679, mailed on Sep. 20, 2022, 8 pages.

Advisory Action received for U.S. Appl. No. 15/250,152, mailed on Mar. 25, 2019, 5 pages.

Applicant Initiated Interview Summary received for U.S. Appl. No. 14/641,304, mailed on Dec. 2, 2019, 5 pages.

Applicant Initiated Interview Summary received for U.S. Appl. No. 14/641,304, mailed on Jul. 28, 2020, 5 pages.

Applicant Initiated Interview Summary received for U.S. Appl. No. 15/433,320, mailed on Feb. 11, 2020, 5 pages.

Applicant Initiated Interview Summary received for U.S. Appl. No. 16/583,989, mailed on Aug. 3, 2020, 6 pages.

Applicant Initiated Interview Summary received for U.S. Appl. No. 16/583,989, mailed on Mar. 25, 2020, 4 pages.

Applicant Initiated Interview Summary received for U.S. Appl. No. 16/584,490, mailed on Jul. 28, 2020, 4 pages.

Applicant Initiated Interview Summary received for U.S. Appl. No. 16/702,968, mailed on Jul. 1, 2020, 5 pages.

Applicant Initiated Interview Summary received for U.S. Appl. No. 16/790,619, mailed on Jul. 28, 2020, 3 pages.

Applicant-Initiated Interview Summary received for U.S. Appl. No. 15/433,320, mailed on Nov. 25, 2020, 4 pages.

Applicant-Initiated Interview Summary received for U.S. Appl. No. 15/910,263, mailed on Nov. 18, 2020, 6 pages.

Applicant-Initiated Interview Summary received for U.S. Appl. No. 16/422,736, mailed on Feb. 24, 2021, 3 pages.

Applicant-Initiated Interview Summary received for U.S. Appl. No. 16/422,736, mailed on Sep. 28, 2020, 3 pages.

Applicant-Initiated Interview Summary received for U.S. Appl. No. 16/528,941, mailed on Jun. 19, 2020, 3 pages.

Applicant-Initiated Interview Summary received for U.S. Appl. No. 16/528,941, mailed on Nov. 10, 2020, 2 pages.

Applicant-Initiated Interview Summary received for U.S. Appl. No. 16/584,490, mailed on Jan. 31, 2020, 4 pages.

Applicant-Initiated Interview Summary received for U.S. Appl. No. 16/670,949, mailed on Apr. 6, 2021, 2 pages.

Applicant-Initiated Interview Summary received for U.S. Appl. No. 16/679,967, mailed on Feb. 10, 2022, 2 pages.

Applicant-Initiated Interview Summary received for U.S. Appl. No. 16/679,967, mailed on Jun. 1, 2022, 2 pages.

Applicant-Initiated Interview Summary received for U.S. Appl. No. 16/679,967, mailed on Oct. 25, 2021, 2 pages.

Applicant-Initiated Interview Summary received for U.S. Appl. No. 16/702,968, mailed on Sep. 28, 2020, 6 pages.

Applicant-Initiated Interview Summary received for U.S. Appl. No. 16/799,481, mailed on Jul. 24, 2020, 3 pages.

Applicant-Initiated Interview Summary received for U.S. Appl. No. 16/803,849, mailed on Aug. 21, 2020, 5 pages.

Applicant-Initiated Interview Summary received for U.S. Appl. No. 16/803,849, mailed on Dec. 21, 2020, 5 pages.

Applicant-Initiated Interview Summary received for U.S. Appl. No. 16/803,849, mailed on Feb. 28, 2022, 9 pages.

Applicant-Initiated Interview Summary received for U.S. Appl. No. 16/803,849, mailed on Oct. 12, 2021, 6 pages.

Applicant-Initiated Interview Summary received for U.S. Appl. No. 16/807,604, mailed on Dec. 21, 2020, 7 pages.

Applicant-Initiated Interview Summary received for U.S. Appl. No. 16/807,604, mailed on Jul. 24, 2020, 5 pages.

Applicant-Initiated Interview Summary received for U.S. Appl. No. 16/836,571, mailed on Jul. 7, 2021, 6 pages.

Applicant-Initiated Interview Summary received for U.S. Appl. No. 16/922,675, mailed on Dec. 16, 2020, 3 pages.

Applicant-Initiated Interview Summary received for U.S. Appl. No. 16/922,675, mailed on Nov. 2, 2020, 3 pages.

Applicant-Initiated Interview Summary received for U.S. Appl. No. 16/922,675, mailed on Nov. 15, 2020, 2 pages.

Applicant-Initiated Interview Summary received for U.S. Appl. No. 16/922,675, mailed on Sep. 3, 2021, 2 pages.

Applicant-Initiated Interview Summary received for U.S. Appl. No. 17/026,818, mailed on Dec. 15, 2020, 7 pages.

Applicant-Initiated Interview Summary received for U.S. Appl. No. 17/026,818, mailed on Mar. 8, 2021, 4 pages.

Applicant-Initiated Interview Summary received for U.S. Appl. No. 17/031,833, mailed on Dec. 21, 2020, 5 pages.

Applicant-Initiated Interview Summary received for U.S. Appl. No. 17/031,833, mailed on May 24, 2021, 6 pages.

Applicant-Initiated Interview Summary received for U.S. Appl. No. 17/121,610, mailed on Oct. 29, 2021, 2 pages.

Applicant-Initiated Interview Summary received for U.S. Appl. No. 17/168,069, mailed on Nov. 17, 2021, 2 pages.

Applicant-Initiated Interview Summary received for U.S. Appl. No. 17/181,089, mailed on Nov. 22, 2022, 3 pages.

Applicant-Initiated Interview Summary received for U.S. Appl. No. 17/181,089, mailed on Oct. 7, 2022, 4 pages.

(56)　　　　　References Cited

OTHER PUBLICATIONS

Applicant-Initiated Interview Summary received for U.S. Appl. No. 17/223,794, mailed on Sep. 7, 2021, 3 pages.
Applicant-Initiated Interview Summary received for U.S. Appl. No. 17/461,103, mailed on Jan. 26, 2022, 6 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/482,987, mailed on Apr. 11, 2022, 4 pages.
Applicant-Initiated Interview Summary received for U.S. Appl. No. 17/483,542, mailed on Nov. 23, 2022, 4 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/484,899, mailed on Apr. 27, 2022, 5 pages.
Applicant-Initiated Interview Summary received for U.S. Appl. No. 17/484,899, mailed on Sep. 1, 2022, 5 pages.
Applicant-Initiated Interview Summary received for U.S. Appl. No. 17/484,907, mailed on Jan. 10, 2022, 2 pages.
Board Decision received for Chinese Patent Application No. 201510288981.9, mailed on May 6, 2021, 31 pages (3 pages of English Translation and 28 pages of Official Copy).
Board Decision received for Chinese Patent Application No. 201580043701.6, mailed on Aug. 19, 2021, 2 pages (1 page of English Translation and 1 page of Official Copy).
Board Decision received for Chinese Patent Application No. 201810338826.7, mailed on May 30, 2022, 20 pages (2 pages of English Translation and 18 pages of Official Copy).
Board Opinion received for Chinese Patent Application No. 201510288981.9, mailed on Jan. 4, 2021, 21 pages (9 pages of English Translation and 12 pages of Official Copy).
Board Opinion received for Chinese Patent Application No. 201810338826.7, mailed on Jan. 19, 2022, 18 pages (6 pages of English Translation and 12 pages of Official Copy).
Brief Communication Regarding Oral Proceedings received for European Patent Application No. 17799904.2, mailed on Sep. 13, 2022, 1 page.
Brief Communication Regarding Oral Proceedings received for European Patent Application No. 17813737.8, mailed on Sep. 19, 2022, 1 page.
Brief Communication Regarding Oral Proceedings received for European Patent Application No. 18197583.0, mailed on Feb. 18, 2021, 2 pages.
Brief Communication Regarding Oral Proceedings received for European Patent Application No. 18728002.9, mailed on Dec. 7, 2022, 1 page.
Brief Communication Regarding Oral Proceedings received for European Patent Application No. 18728002.9, mailed on Nov. 28, 2022, 7 pages.
Brief Communication Regarding Oral Proceedings received for European Patent Application No. 19150528.8, mailed on Sep. 5, 2022, 2 pages.
Brief Communication Regarding Oral Proceedings received for European Patent Application No. 20158824.1, mailed on May 30, 2022, 1 page.

Certificate of Examination received for Australian Patent Application No. 2017100553, mailed on Jan. 17, 2018, 2 pages.
Certificate of Examination received for Australian Patent Application No. 2018101014, mailed on Mar. 20, 2019, 2 pages.
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 20200101324, mailed on Sep. 7, 2020, 2 pages.
Corrected Notice of Allowance received for U.S. Appl. No. 14/641,298, mailed on Dec. 9, 2021, 5 pages.
Corrected Notice of Allowance received for U.S. Appl. No. 14/719,217, mailed on Apr. 22, 2019, 2 pages.
Corrected Notice of Allowance received for U.S. Appl. No. 14/719,217, mailed on Mar. 20, 2019, 2 pages.
Corrected Notice of Allowance received for U.S. Appl. No. 15/269,801, mailed on Oct. 3, 2017, 4 pages.
Corrected Notice of Allowance received for U.S. Appl. No. 15/845,794, mailed on Feb. 25, 2019, 2 pages.
Corrected Notice of Allowance received for U.S. Appl. No. 15/910,263, mailed on Feb. 10, 2021, 3 pages.
Corrected Notice of Allowance received for U.S. Appl. No. 15/910,263, mailed on Mar. 17, 2021, 3 pages.
Corrected Notice of Allowance received for U.S. Appl. No. 15/910,263, mailed on Mar. 18, 2021, 3 pages.
Corrected Notice of Allowance received for U.S. Appl. No. 15/952,736, mailed on Nov. 19, 2018, 2 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of Allowance received for U.S. Appl. No. 16/147,432, mailed on Jan. 18, 2019, 3 pages.
Corrected Notice of Allowance received for U.S. Appl. No. 16/147,432, mailed on Jul. 16, 2019, 3 pages.
Corrected Notice of Allowance received for U.S. Appl. No. 16/229,959, mailed on Mar. 3, 2020, 3 pages.
Corrected Notice of Allowance received for U.S. Appl. No. 16/422,736, mailed on Jul. 9, 2021, 2 pages.
Corrected Notice of Allowance received for U.S. Appl. No. 16/434,865, mailed on Apr. 28, 2020, 2 pages.
Corrected Notice of Allowance received for U.S. Appl. No. 16/434,865, mailed on Jun. 4, 2020, 2 pages.
Corrected Notice of Allowance received for U.S. Appl. No. 16/511,578, mailed on Feb. 13, 2020, 3 pages.
Corrected Notice of Allowance received for U.S. Appl. No. 16/670,949, mailed on Sep. 8, 2021, 2 pages.
Corrected Notice of Allowance received for U.S. Appl. No. 16/702,968, mailed on Jun. 8, 2021, 3 pages.
Corrected Notice of Allowance received for U.S. Appl. No. 16/702,968, mailed on Jun. 16, 2021, 4 pages.
Corrected Notice of Allowance received for U.S. Appl. No. 16/702,968, mailed on Jun. 28, 2021, 4 pages.
Corrected Notice of Allowance received for U.S. Appl. No. 16/702,968, mailed on May 26, 2021, 4 pages.
Corrected Notice of Allowance received for U.S. Appl. No. 16/702,968, mailed on May 28, 2021, 4 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Notice of Allowance received for U.S. Appl. No. 16/803,849, mailed on Jul. 7, 2022, 3 pages.
Corrected Notice of Allowance received for U.S. Appl. No. 16/803,849, mailed on Jun. 8, 2022, 3 pages.
Corrected Notice of Allowance received for U.S. Appl. No. 16/807,604, mailed on Jul. 26, 2021, 3 pages.
Corrected Notice of Allowance received for U.S. Appl. No. 16/807,604, mailed on Jun. 28, 2021, 3 pages.
Corrected Notice of Allowance received for U.S. Appl. No. 16/807,604, mailed on May 28, 2021, 3 pages.

(56)  References Cited

OTHER PUBLICATIONS

Corrected Notice of Allowance received for U.S. Appl. No. 16/807,604, mailed on Oct. 4, 2021, 5 pages.
Corrected Notice of Allowance received for U.S. Appl. No. 16/807,604, mailed on Oct. 14, 2021, 3 pages.
Corrected Notice of Allowance received for U.S. Appl. No. 16/807,604, mailed on Oct. 22, 2021, 3 pages.
Corrected Notice of Allowance received for U.S. Appl. No. 16/836,571, mailed on Dec. 6, 2021, 5 pages.
Corrected Notice of Allowance received for U.S. Appl. No. 16/836,571, mailed on Mar. 25, 2022, 2 pages.
Corrected Notice of Allowance received for U.S. Appl. No. 16/836,571, mailed on Nov. 4, 2021, 4 pages.
Corrected Notice of Allowance received for U.S. Appl. No. 16/836,571, mailed on Nov. 18, 2021, 3 pages.
Corrected Notice of Allowance received for U.S. Appl. No. 16/836,571, mailed on Oct. 12, 2021, 4 pages.
Corrected Notice of Allowance received for U.S. Appl. No. 16/922,675, mailed on Mar. 4, 2022, 6 pages.
Corrected Notice of Allowance received for U.S. Appl. No. 16/987,003, mailed on Sep. 1, 2021, 3 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/031,833, mailed on Aug. 2, 2021, 3 pages.
Corrected Notice of Allowance received for U.S. Appl. No. 17/121,610, mailed on Jun. 7, 2022, 4 pages.
Corrected Notice of Allowance received for U.S. Appl. No. 17/121,610, mailed on Mar. 31, 2022, 3 pages.
Corrected Notice of Allowance received for U.S. Appl. No. 17/121,610, mailed on May 20, 2022, 4 pages.
Corrected Notice of Allowance received for U.S. Appl. No. 17/157,166, mailed on Apr. 13, 2022, 4 pages.
Corrected Notice of Allowance received for U.S. Appl. No. 17/157,166, mailed on Apr. 25, 2022, 4 pages.
Corrected Notice of Allowance received for U.S. Appl. No. 17/157,166, mailed on Dec. 9, 2021, 4 pages.
Corrected Notice of Allowance received for U.S. Appl. No. 17/157,166, mailed on Dec. 15, 2021, 4 pages.
Corrected Notice of Allowance received for U.S. Appl. No. 17/157,166, mailed on Jan. 5, 2022, 4 pages.
Corrected Notice of Allowance received for U.S. Appl. No. 17/157,166, mailed on Jun. 29, 2022, 4 pages.
Corrected Notice of Allowance received for U.S. Appl. No. 17/168,069, mailed on Feb. 9, 2022, 2 pages.
Corrected Notice of Allowance received for U.S. Appl. No. 17/461,103, mailed on Apr. 14, 2022, 2 pages.
Corrected Notice of Allowance received for U.S. Appl. No. 17/461,103, mailed on Aug. 3, 2022, 2 pages.
Corrected Notice of Allowance received for U.S. Appl. No. 17/461,103, mailed on May 10, 2022, 2 pages.
Corrected Notice of Allowance received for U.S. Appl. No. 17/483,549, mailed on Aug. 24, 2022, 3 pages.
Corrected Notice of Allowance received for U.S. Appl. No. 17/483,582, mailed on Feb. 15, 2022, 2 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
Corrected Search Report and Opinion received for Danish Patent Application No. PA201870364, mailed on Sep. 5, 2018, 13 pages.
Customize Notifications and Content on Your Galaxy Phone's Lock Screen, Online Available at: https://www.samsung.com/us/support/answer/ANS00062636, Oct. 4, 2017, 5 pages.
Decision on Appeal received for U.S. Appl. No. 14/641,298, mailed on Nov. 1, 2021, 9 pages.

Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision on Appeal received for U.S. Appl. No. 15/128,952, mailed on Dec. 28, 2020, 23 pages.
Decision to Grant received for Danish Patent Application No. PA201670628, mailed on Nov. 20, 2017, 2 pages.
Decision to Grant received for Danish Patent Application No. PA201770392, mailed on Oct. 24, 2018, 2 pages.
Decision to Grant received for Danish Patent Application No. PA201770401, mailed on Oct. 24, 2018, 2 pages.
Decision to Grant received for Danish Patent Application No. PA201770403, mailed on Oct. 24, 2018, 2 pages.
Decision to Grant received for Danish Patent Application No. PA201770404, mailed on Nov. 11, 2019, 3 pages.
Decision to Grant received for Danish Patent Application No. PA201770406, mailed on May 15, 2020, 2 pages.
Decision to Grant received for Danish Patent Application No. PA201770782, mailed on Oct. 25, 2019, 2 pages.
Decision to Grant received for Danish Patent Application No. PA201870362, mailed on May 15, 2020, 2 pages.
Decision to Grant received for Danish Patent Application No. PA202070560, mailed on Oct. 21, 2021, 2 pages.
Decision to Grant received for Danish Patent Application No. PA202170320, mailed on Nov. 10, 2022, 2 pages.
Decision to Grant received for European Patent Application No. 12773460.6, mailed on Jun. 27, 2019, 2 pages.
Decision to Grant received for European Patent Application No. 13171047.7, mailed on Jun. 27, 2019, 2 pages.
Decision to Grant received for European Patent Application No. 15711969.4, mailed on Sep. 26, 2019, 2 pages.
Decision to Grant received for European Patent Application No. 15713062.6, mailed on Apr. 11, 2019, 2 pages.
Decision to Grant received for European Patent Application No. 15719347.5, mailed on Jun. 24, 2021, 2 pages.
Decision to Grant received for European Patent Application No. 15724160.5, mailed on Jun. 14, 2018, 2 pages.
Decision to Grant received for European Patent Application No. 16710590.7, mailed on Oct. 28, 2021, 2 pages.
Decision to Grant received for European Patent Application No. 18197583.0, mailed on Feb. 3, 2022, 3 pages.
Decision to Grant received for European Patent Application No. 18197589.7, mailed on Jun. 10, 2021, 2 pages.
Decision to Grant received for European Patent Application No. 19207753.5, mailed on Jun. 2, 2022, 3 pages.
Decision to Grant received for European Patent Application No. 19729395.4, mailed on Dec. 9, 2021, 2 pages.
Decision to Grant received for European Patent Application No. 20158824. 1, mailed on Dec. 15, 2022, 3 pages.
Decision to Grant received for German Patent Application No. 102015208532.5, mailed on Sep. 22, 2020, 10 pages (1 page of English Translation and 9 pages of Official Copy).
Decision to Grant received for Japanese Patent Application No. 2017-075031, mailed on Jul. 1, 2019, 3 pages (1 page of English Translation and 2 pages of Official Copy).
Decision to Grant received for Japanese Patent Application No. 2019-124728, mailed on Apr. 2, 2021, 4 pages (1 page of English Translation and 3 pages of Official Copy).
Decision to Refuse received for European Patent Application No. 12770400.5, mailed on Nov. 8, 2018, 12 pages.
Decision to Refuse received for European Patent Application No. 17799904.2, mailed on Sep. 19, 2022, 4 pages.
Decision to Refuse received for European Patent Application No. 17813737.8, mailed on Sep. 30, 2022, 5 pages.
Decision to Refuse received for European Patent Application No. 18208881.5, mailed on Dec. 23, 2022, 12 pages.
Decision to Refuse received for European Patent Application No. 19150528.8, mailed on Sep. 9, 2022, 4 pages.
Evaluation Report for Utility Model Patent received for Chinese Patent Application No. 201620051290.7, completed on Sep. 19, 2016, 11 pages (6 pages of English translation and 5 pages of Official Copy).

(56)                    References Cited

OTHER PUBLICATIONS

Ex Parte Quayle Action received for U.S. Appl. No. 17/121,610, mailed on Dec. 9, 2021, 7 pages.
Examiner Initiated-Interview Summary received for U.S. Appl. No. 16/528,941, mailed on Dec. 1, 2020, 2 pages.
Examiner-Initiated Interview Summary received for U.S. Appl. No. 17/027,373, mailed on Mar. 31, 2022, 4 pages.
Examiner's Answer to Appeal Brief received for U.S. Appl. No. 14/641,298, mailed on Mar. 22, 2021, 19 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 15/128,952, mailed on Jan. 8, 2020, 9 pages.
Examiner's Initiated Interview Summary received for U.S. Appl. No. 14/641,298, mailed on Mar. 10, 2020, 4 pages.
Examiner's Pre-Review Report received for Japanese Patent Application No. 2018-080122, mailed on Feb. 25, 2020, 6 pages (3 pages of English Translation and 3 pages of Official Copy).
Extended European Search Report for European Application No. 17813737.8, mailed on Nov. 22, 2019, 9 pages.
Extended European Search Report received for European Patent Application No. 17799904.2, mailed on Jul. 30, 2018, 7 pages.
Extended European Search Report received for European Patent Application No. 18178147.7, mailed on Oct. 4, 2018, 8 pages.
Extended European Search Report received for European Patent Application No. 18197583.0, mailed on Jun. 4, 2019, 20 pages.
Extended European Search Report received for European Patent Application No. 18197589.7, mailed on Jan. 7, 2019, 9 pages.
Extended European Search Report received for European Patent Application No. 18208881.5, mailed on Jan. 8, 2019, 7 pages.
Extended European Search Report received for European Patent Application No. 19150528.8, mailed on May 15, 2019, 9 pages.
Extended European Search Report received for European Patent Application No. 19186538.5, mailed on Oct. 9, 2019, 10 pages.
Extended European Search Report received for European Patent Application No. 19203942.8, mailed on Apr. 1, 2020, 10 pages.
Extended European Search Report received for European Patent Application No. 19207753.5, mailed on Dec. 18, 2019, 9 pages.
Extended European Search Report received for European Patent Application No. 20158824.1, mailed on Aug. 10, 2020, 13 pages.
Extended European Search Report received for European Patent Application No. 20166552.8, mailed on Jun. 12, 2020, 9 pages.
Extended European Search Report received for European Patent Application No. 20205496.1, mailed on Mar. 11, 2021, 11 pages.
Extended European Search Report received for European Patent Application No. 21166718.3, mailed on Jul. 6, 2021, 11 pages.
Extended European Search Report received for European Patent Application No. 21197457.1, mailed on Nov. 15, 2021, 8 pages.
Extended European Search Report received for European Patent Application No. 21207736.6, mailed on Feb. 22, 2022, 11 pages.
Extended European Search Report received for European Patent Application No. 22188377.0, mailed on Oct. 27, 2022, 8 pages.
Extended European Search Report received for European Patent Application No. 22198071.7, mailed on Dec. 5, 2022, 8 pages.
Final Office Action received for U.S. Appl. No. 13/248,882, mailed on Dec. 4, 2013, 22 pages.
Final Office Action received for U.S. Appl. No. 14/285,378, mailed on Jul. 23, 2015, 19 pages.
Final Office Action received for U.S. Appl. No. 14/503,327, mailed on May 18, 2017, 10 pages.
Final Office Action received for U.S. Appl. No. 14/641,289, mailed on Jul. 1, 2016., 32 pages.
Final Office Action received for U.S. Appl. No. 14/641,298, mailed on Jun. 26, 2020, 50 pages.
Final Office Action received for U.S. Appl. No. 14/641,298, mailed on May 16, 2019, 50 pages.
Final Office Action received for U.S. Appl. No. 14/641,298, mailed on Oct. 4, 2017, 30 pages.

Final Office Action received for U.S. Appl. No. 14/641,304, mailed on Jul. 24, 2018, 19 pages.
Final Office Action received for U.S. Appl. No. 14/641,304, mailed on Oct. 15, 2019, 21 pages.
Final Office Action received for U.S. Appl. No. 14/719,217, mailed on Feb. 23, 2017., 37 pages.
Final Office Action received for U.S. Appl. No. 14/774,664, mailed on Aug. 25, 2017, 23 pages.
Final Office Action received for U.S. Appl. No. 14/841,455, mailed on Nov. 6, 2018, 14 Pages.
Final Office Action received for U.S. Appl. No. 14/863,099, mailed on Apr. 21, 2016, 20 pages.
Final Office Action received for U.S. Appl. No. 15/128,952, mailed on Jul. 18, 2018, 19 pages.
Final Office Action received for U.S. Appl. No. 15/433,320, mailed on Dec. 31, 2019, 30 pages.
Final Office Action received for U.S. Appl. No. 15/910,263, mailed on Aug. 28, 2019, 32 pages.
Final Office Action received for U.S. Appl. No. 16/422,736, mailed on Jan. 11, 2021, 39 pages.
Final Office Action received for U.S. Appl. No. 16/528,941, mailed on Jul. 13, 2020, 15 pages.
Final Office Action received for U.S. Appl. No. 16/583,989, mailed on Jul. 10, 2020, 23 pages.
Final Office Action received for U.S. Appl. No. 16/584,490, mailed on May 1, 2020, 48 pages.
Final Office Action received for U.S. Appl. No. 16/679,967, mailed on Nov. 10, 2021, 14 pages.
Final Office Action received for U.S. Appl. No. 16/702,968, mailed on Jul. 27, 2020, 21 pages.
Final Office Action received for U.S. Appl. No. 16/803,849, mailed on Nov. 2, 2021, 37 pages.
Final Office Action received for U.S. Appl. No. 16/803,849, mailed on Sep. 24, 2020, 29 pages.
Final Office Action received for U.S. Appl. No. 16/807,604, mailed on Aug. 19, 2020, 35 pages.
Final Office Action received for U.S. Appl. No. 16/922,675, mailed on Dec. 3, 2020, 21 pages.
Final Office Action received for U.S. Appl. No. 16/922,675, mailed on Nov. 30, 2020, 12 pages.
Final Office Action received for U.S. Appl. No. 17/026,818, mailed on Jan. 29, 2021, 21 pages.
Final Office Action received for U.S. Appl. No. 17/031,833, mailed on Jan. 26, 2021, 17 pages.
Final Office Action received for U.S. Appl. No. 17/181,089, mailed on Oct. 21, 2022, 15 pages.
Final Office Action received for U.S. Appl. No. 17/476,404, mailed on May 5, 2022, 30 pages.
Final Office Action received for U.S. Appl. No. 17/483,564, mailed on Apr. 18, 2022, 23 pages.
Final Office Action received for U.S. Appl. No. 17/483,679, mailed on May 24, 2022, 21 pages.
Final Office Action received for U.S. Appl. No. 17/484,899, mailed on May 12, 2022, 29 pages.
Final Office Action received for U.S. Appl. No. 15/250,152, mailed on Aug. 23, 2017, 24 pages.
Final Office Action received for U.S. Appl. No. 15/250,152, mailed on Nov. 16, 2018, 30 pages.
Firefox Sync—Take Your Bookmarks, Tabs and Personal Information with You, available online at https://web.archive.org/web/20120601020556/http://support.mozilla.org/en-US/kb/firefox-sync-take-your-bookmarks-and-tabs-with-you?redirectlocale=en-US &redirectslug=what-firefox-sync, Jun. 1, 2012, 3 pages.
G Pad, LG's latest Uls that shine even more on the G-Pad, Online available at : http://bungq.com/1014., Nov. 19, 2013, 49 pages (30 pages of English Translation and 19 pages of Official Copy).
HuddleCamHD SimplTrack2 Auto Tracking Camera Installation & Operation Manual, Available Online at: https://huddlecamhd.com/wp-content/uploads/2021/01/SimplTrack2-User-Manual-v1_2-6-20.pdf, Jun. 2020, 41 pages.
Intention to Grant received for Danish Patent Application No. PA201670628, mailed on Aug. 28, 2017., 2 pages.

(56) References Cited

OTHER PUBLICATIONS

Intention to Grant received for Danish Patent Application No. PA201770392, mailed on Aug. 31, 2018, 2 pages.
Intention to Grant received for Danish Patent Application No. PA201770392, mailed on Jul. 2, 2018, 2 pages.
Intention to Grant received for Danish Patent Application No. PA201770401, mailed on Jun. 14, 2018, 2 Pages.
Intention to Grant received for Danish Patent Application No. PA201770401, mailed on Sep. 17, 2018, 2 pages.
Intention to Grant received for Danish Patent Application No. PA201770403, mailed on May 7, 2018, 2 pages.
Intention to Grant received for Danish Patent Application No. PA201770403, mailed on Oct. 3, 2018, 2 pages.
Intention to Grant received for Danish Patent Application No. PA201770404, mailed on Sep. 23, 2019, 3 pages.
Intention to Grant received for Danish Patent Application No. PA201770406, mailed on Feb. 6, 2020, 3 pages.
Intention to Grant received for Danish Patent Application No. PA201770408, mailed on Nov. 30, 2018, 3 pages.
Intention to Grant received for Danish Patent Application No. PA201770782, mailed on Aug. 8, 2019, 2 pages.
Intention to Grant received for Danish Patent Application No. PA201870362, mailed on Feb. 14, 2020, 2 pages.
Intention to Grant received for Danish Patent Application No. PA202070560, mailed on Apr. 26, 2021, 2 pages.
Intention to Grant received for Danish Patent Application No. PA202070617, mailed on Nov. 15, 2021, 2 pages.
Intention to Grant received for Danish Patent Application No. PA202170320, mailed on Jul. 27, 2022, 2 pages.
Intention to Grant received for European Patent Application No. 12773460.6, mailed on Feb. 4, 2019, 8 pages.
Intention to Grant received for European Patent Application No. 12773460.6, mailed on Jun. 17, 2019, 4 pages.
Intention to Grant received for European Patent Application No. 13171047.7, mailed on Jan. 23, 2019, 8 pages.
Intention to Grant received for European Patent Application No. 15711969.4, mailed on May 29, 2019, 11 pages.
Intention to Grant received for European Patent Application No. 15713062.6, mailed on Mar. 25, 2019, 7 pages.
Intention to Grant received for European Patent Application No. 15713062.6, mailed on Oct. 8, 2018, 8 pages.
Intention to Grant received for European Patent Application No. 15719347.5, mailed on Dec. 8, 2020, 7 pages.
Intention to Grant received for European Patent Application No. 15719347.5, mailed on Jun. 8, 2021, 7 pages.
Intention to Grant received for European Patent Application No. 15719347.5, mailed on May 11, 2021, 8 pages.
Intention to Grant received for European Patent Application No. 15724160.5, mailed on Mar. 7, 2018, 8 pages.
Intention to Grant received for European Patent Application No. 16710590.7, mailed on Jun. 14, 2021, 8 pages.
Intention to Grant received for European Patent Application No. 18197583.0, mailed on Jan. 17, 2022, 9 pages.
Intention to Grant received for European Patent Application No. 18197583.0, mailed on Jul. 23, 2021, 9 pages.
Intention to Grant received for European Patent Application No. 18197589.7, mailed on Jan. 21, 2021, 8 pages.
Intention to Grant received for European Patent Application No. 19207753.5, mailed on Jan. 28, 2022, 8 pages.
Intention to Grant received for European Patent Application No. 19207753.5, mailed on Sep. 3, 2021, 8 pages.
Intention to Grant received for European Patent Application No. 19729395.4, mailed on Jul. 23, 2021, 10 pages.
Intention to Grant received for European Patent Application No. 20158824.1, mailed on Aug. 11, 2022, 10 pages.
International Preliminary Report on Patentability received for PCT Patent Application No. PCT/US2012/057319, mailed on Apr. 10, 2014, 6 pages.

International Preliminary Report on Patentability received for PCT Patent Application No. PCT/US2012/057656, mailed on Apr. 10, 2014, 6 pages.
International Preliminary Report on Patentability received for PCT Patent Application No. PCT/US2014/027882, mailed on Sep. 24, 2015, 8 pages.
International Preliminary Report on Patentability Received for PCT Patent Application No. PCT/US2015/019306, mailed on Dec. 15, 2016, 10 pages.
International Preliminary Report on Patentability Received for PCT Patent Application No. PCT/US2015/019309, mailed on Dec. 15, 2016, 10 pages.
International Preliminary Report on Patentability received for PCT Patent Application No. PCT/US2015/019317, mailed on Dec. 15, 2016, 18 pages.
International Preliminary Report on Patentability received for PCT Patent Application No. PCT/US2015/025188, mailed on Mar. 2, 2017, 8 pages.
International Preliminary Report on Patentability received for PCT Patent Application No. PCT/US2015/030199, mailed on Dec. 15, 2016, 7 pages.
International Preliminary Report on Patentability received for PCT Patent Application No. PCT/US2016/021012, mailed on Sep. 21, 2017, 11 Pages.
International Preliminary Report on Patentability received for PCT Patent Application No. PCT/US2017/031086, mailed on Dec. 27, 2018, 12 pages.
International Preliminary Report on Patentability received for PCT Patent Application No. PCT/US2017/032240, mailed on Nov. 29, 2018, 29 pages.
International Preliminary Report on Patentability received for PCT Patent Application No. PCT/US2018/032904, mailed on Nov. 28, 2019, 14 pages.
International Preliminary Report on Patentability received for PCT Patent Application No. PCT/US2018/048151, mailed on Apr. 9, 2020, 14 pages.
International Preliminary Report on Patentability received for PCT Patent Application No. PCT/US2019/031202, mailed on Nov. 19, 2020, 13 pages.
International Preliminary Report on Patentability received for PCT Patent Application No. PCT/US2020/035488, mailed on Dec. 9, 2021, 16 pages.
International Preliminary Report on Patentability received for PCT Patent Application No. PCT/US2021/031760, mailed on Nov. 24, 2022, 11 pages.
International Search Report and Written Opinion received for PCT Patent Application No. PCT/US17/31086, mailed on Sep. 8, 2017, 15 pages.
International Search Report and Written Opinion received for PCT Patent Application No. PCT/US2012/057319, mailed on Feb. 25, 2013, 7 pages.
International Search Report and Written Opinion received for PCT Patent Application No. PCT/US2012/057656, mailed on Feb. 25, 2013, 7 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2016/021012, mailed on Jun. 2, 2016, 15 pages.
International Search Report and Written Opinion received for PCT Patent Application No. PCT/US2017/032240, mailed on Sep. 21, 2017, 33 pages.
International Search Report and Written Opinion received for PCT Patent Application No. PCT/US2018/032904, mailed on Oct. 1, 2018, 21 pages.
International Search Report and Written Opinion received for PCT Patent Application No. PCT/US2018/048151, mailed on Jan. 10, 2019, 23 pages.

(56) References Cited

OTHER PUBLICATIONS

International Search Report and Written Opinion received for PCT Patent Application No. PCT/US2019/031202, mailed on Oct. 4, 2019, 19 pages.
International Search Report and Written Opinion received for PCT Patent Application No. PCT/US2020/035488, mailed on Nov. 17, 2020, 21 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2021/048358, mailed on Feb. 24, 2022, 21 pages.
International Search Report and Written Opinion received for PCT Patent Application No. PCT/US2022/014271, mailed on Jul. 4, 2022, 23 pages.
International Search Report and Written Opinion received for PCT Patent Application No. PCT/US2022/029261, mailed on Oct. 20, 2022, 18 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.
International Search Report and Written Opinion received for PCT Patent Application No. PCT/US2022/031252, mailed on Oct. 7, 2022, 18 pages.
Invitation to Pay Addition Fees and Partial International Search Report received for PCT Patent Application No. PCT/US2018/032904, mailed on Jul. 31, 2018, 18 pages.
Invitation to Pay Additional Fee received for PCT Patent Application No. PCT/US17/31086, mailed on Jul. 14, 2017., 2 pages.
Invitation to Pay Additional Fee received for PCT Patent Application No. PCT/US17/32240, mailed on Jul. 12, 2017., 2 pages.
Invitation to Pay Additional Fees and Partial International Search Report received for PCT Patent Application No. PCT/US2022/014271, mailed on May 12, 2022, 20 pages.
Invitation to Pay Additional Fees and Partial International Search Report received for PCT Patent Application No. PCT/US2022/029261, mailed on Aug. 29, 2022, 16 pages.
Invitation to Pay Additional Fees and Partial International Search Report received for PCT Patent Application No. PCT/US2022/029580, mailed on Sep. 5, 2022, 13 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
Invitation to Pay Additional Fees received for PCT Patent Application No. PCT/US2020/035488, mailed on Sep. 23, 2020, 15 pages.
Invitation to Pay Additional Fees received for PCT Patent Application No. PCT/US2021/048358, mailed on Dec. 23, 2021, 14 pages.
Invitation to Pay Additional Fees received for PCT Patent Application No. PCT/US2022/029273, mailed on Sep. 2, 2022, 13 pages.
Invitation to Pay Search Fees received for European Patent Application No. 15714698.6, mailed on Dec. 16, 2022, 4 pages.
Invitation to Pay Search Fees received for European Patent Application No. 18728002.9, mailed on Sep. 2, 2020, 8 pages.
Invitation to Pay Search Fees received for European Patent Application No. 21728781.2, mailed on Dec. 2, 2022, 3 pages.
Kinect Gesture Commands—Kinect Voice Commands, Xbox Wire, Available Online At: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.

LG G Pad 8.3 Tablet Q Remote User, Available at :—<https://mushroomprincess.tistory.com/1320>, Dec. 26, 2013, 37 pages (20 pages of English Translation and 17 pages of Official Copy).
Minutes of Oral Hearing received for German Patent Application No. 102015208532.5, mailed on Dec. 13, 2019, 21 pages (3 pages of English Translation and 18 pages of Official Copy).
Minutes of Oral Proceedings received for European Patent Application No. 18208881.5, mailed on Dec. 22, 2022, 4 pages.
Minutes of Oral Proceedings received for European Patent Application No. 18728002.9, mailed on Dec. 22, 2022, 7 pages.
Minutes of the Oral Proceedings received for European Application No. 12770400.5, mailed on Nov. 6, 2018, 7 pages.
Minutes of the Oral Proceedings received for European Application No. 15711969.4, mailed on May 16, 2019, 7 pages.
Minutes of the Oral Proceedings received for European Patent Application No. 18197583.0, mailed on Mar. 9, 2021, 6 pages.
Minutes of the Oral Proceedings received for European Patent Application No. 19729395.4, mailed on Jul. 21, 2021, 6 pages.
Non-Final Action received for U.S. Appl. No. 15/952,736, mailed on Jun. 1, 2018, 12 pages.
Non-Final Office Action received for U. S. Appl. No. 14/503,327, mailed on Sep. 12, 2016, 10 pages.
Non-Final Office Action received for U.S. Appl. No. 16/035,422, mailed on Nov. 30, 2018, 13 Pages.
Non-Final Office Action received for U.S Appl. No. 17/157,166, mailed on Jul. 9, 2021, 12 pages.
Non-Final Office Action received for U.S. Appl. No. 14/841,455, mailed on Apr. 25, 2018, 13 pages.
Non-Final Office Action received for U.S. Appl. No. 17/476,404, mailed on Feb. 8, 2022, 26 pages.
Non-Final Office Action received for U.S. Appl. No. 16/679,967, mailed on Sep. 2, 2021, 12 pages.
Non-Final Office Action received for U.S. Appl. No. 13/248,872, mailed on May 19, 2014, 6 pages.
Non-Final Office Action received for U.S. Appl. No. 13/248,882, mailed on Jul. 10, 2013, 14 pages.
Non-Final Office Action received for U.S. Appl. No. 14/285,378, mailed on Dec. 21, 2015, 18 pages.
Non-Final Office Action received for U.S. Appl. No. 14/285,378, mailed on Jan. 21, 2015, 19 pages.
Non-Final Office Action received for U.S. Appl. No. 14/641,298, mailed on Mar. 6, 2017, 26 pages.
Non-Final Office Action received for U.S. Appl. No. 14/641,298, mailed on Nov. 29, 2019, 47 pages.
Non-Final Office Action received for U.S. Appl. No. 14/641,298, mailed on Sep. 19, 2018, 41 pages.
Non-Final Office Action received for U.S. Appl. No. 14/641,304, mailed on Feb. 27, 2019, 18 pages.
Non-Final Office Action received for U.S. Appl. No. 14/641,304, mailed on Mar. 4, 2020, 21 pages.
Non-Final Office Action received for U.S. Appl. No. 14/641,304, mailed on Sep. 11, 2017, 18 pages.
Non-Final Office Action received for U.S. Appl. No. 14/642,366, mailed on Aug. 24, 2015, 7 pages.
Non-Final Office Action received for U.S. Appl. No. 14/719,217, mailed on Jul. 26, 2018, 40 pages.
Non-Final Office Action received for U.S. Appl. No. 14/719,217, mailed on Jul. 28, 2016, 28 pages.
Non-Final Office Action received for U.S. Appl. No. 14/774,664, mailed on Mar. 7, 2017, 23 pages.
Non-Final Office Action received for U.S. Appl. No. 14/863,099, mailed on Dec. 2, 2015, 12 pages.
Non-Final Office Action received for U.S. Appl. No. 15/128,952, mailed on Apr. 1, 2019, 20 pages.
Non-Final Office Action received for U.S. Appl. No. 15/128,952, mailed on Dec. 29, 2017, 13 pages.
Non-Final Office Action received for U.S. Appl. No. 15/134,638, mailed on Sep. 20, 2016, 6 pages.
Non-Final Office Action received for U.S. Appl. No. 15/269,801, mailed on Dec. 30, 2016, 17 pages.
Non-Final Office Action received for U.S. Appl. No. 15/433,320, mailed on Jul. 31, 2020, 13 pages.

(56) References Cited

OTHER PUBLICATIONS

Non-Final Office Action received for U.S. Appl. No. 15/620,666, mailed on Mar. 28, 2018, 14 pages.

Non-Final Office Action received for U.S. Appl. No. 15/845,794, mailed on Oct. 15, 2018, 8 pages.

Non-Final Office Action received for U.S. Appl. No. 15/910,263, mailed on Jun. 15, 2020, 38 pages.

Non-Final Office Action received for U.S. Appl. No. 15/910,263, mailed on Mar. 4, 2019, 26 pages.

Non-Final Office Action received for U.S. Appl. No. 16/109,552, mailed on Oct. 17, 2018, 16 pages.

Non-Final Office Action received for U.S. Appl. No. 16/144,572, mailed on Nov. 30, 2018, 8 pages.

Non-Final Office Action received for U.S. Appl. No. 16/229,959, mailed on Oct. 31, 2019, 10 pages.

Non-Final Office Action received for U.S. Appl. No. 16/383,403, mailed on Aug. 23, 2019, 10 pages.

Non-Final Office Action received for U.S. Appl. No. 16/422,736, mailed on Jun. 23, 2020, 24 pages.

Non-Final Office Action received for U.S. Appl. No. 16/434,865, mailed on Jan. 16, 2020, 9 pages.

Non-Final Office Action received for U.S. Appl. No. 16/528,941, mailed on Dec. 7, 2020, 15 pages.

Non-Final Office Action received for U.S. Appl. No. 16/528,941, mailed on Jan. 30, 2020, 14 pages.

Non-Final Office Action received for U.S. Appl. No. 16/583,989, mailed on Jan. 24, 2020, 20 pages.

Non-Final Office Action received for U.S. Appl. No. 16/584,490, mailed on Dec. 10, 2019, 27 pages.

Non-Final Office Action received for U.S. Appl. No. 16/670,949, mailed on Dec. 9, 2020, 11 pages.

Non-Final Office Action received for U.S. Appl. No. 16/679,967, mailed on Apr. 19, 2022, 13 pages.

Non-Final Office Action received for U.S. Appl. No. 16/702,968, mailed on Apr. 8, 2020, 20 pages.

Non-Final Office Action received for U.S. Appl. No. 16/790,619, mailed on May 4, 2020, 13 pages.

Non-Final Office Action received for U.S. Appl. No. 16/799,481, mailed on May 1, 2020, 13 pages.

Non-Final Office Action received for U.S. Appl. No. 16/803,849, mailed on Jul. 13, 2020, 23 pages.

Non-Final Office Action received for U.S. Appl. No. 16/803,849, mailed on May 14, 2021, 34 pages.

Non-Final Office Action received for U.S. Appl. No. 16/807,604, mailed on Jun. 2, 2020, 28 pages.

Non-Final Office Action received for U.S. Appl. No. 16/836,571, mailed on Mar. 25, 2021, 28 pages.

Non-Final Office Action received for U.S. Appl. No. 16/922,675, mailed on Aug. 13, 2020, 17 pages.

Non-Final Office Action received for U.S. Appl. No. 16/922,675, mailed on Jun. 8, 2022, 21 pages.

Non-Final Office Action received for U.S. Appl. No. 16/922,675, mailed on May 4, 2021, 23 pages.

Non-Final Office Action received for U.S. Appl. No. 16/987,003, mailed on May 10, 2021, 20 pages.

Non-Final Office Action received for U.S. Appl. No. 17/026,818, mailed on Nov. 25, 2020, 20 pages.

Non-Final Office Action received for U.S. Appl. No. 17/027,373, mailed on Feb. 2, 2022, 17 pages.

Non-Final Office Action received for U.S. Appl. No. 17/031,833, mailed on Dec. 7, 2020, 13 pages.

Non-Final Office Action received for U.S. Appl. No. 17/121,610, mailed on May 13, 2021, 17 pages.

Non-Final Office Action received for U.S. Appl. No. 17/168,069, mailed on Jul. 21, 2021, 17 pages.

Non-Final Office Action received for U.S. Appl. No. 17/181,089, mailed on May 13, 2022, 12 pages.

Non-Final Office Action received for U.S. Appl. No. 17/223,794, mailed on Jun. 16, 2021, 32 pages.

Non-Final Office Action received for U.S. Appl. No. 17/320,900, mailed on Dec. 22, 2022, 30 pages.

Non-Final Office Action received for U.S. Appl. No. 17/461,103, mailed on Nov. 22, 2021, 15 pages.

Non-Final Office Action received for U.S. Appl. No. 17/476,404, mailed on Sep. 14, 2022, 31 pages.

Non-Final Office Action received for U.S. Appl. No. 17/479,897, mailed on Aug. 30, 2022, 10 pages.

Non-Final Office Action received for U.S. Appl. No. 17/482,977, mailed on Oct. 13, 2022, 20 pages.

Non-Final Office Action received for U.S. Appl. No. 17/482,987, mailed on Jan. 18, 2022, 25 pages.

Non-Final Office Action received for U.S. Appl. No. 17/483,542, mailed on Sep. 22, 2022, 18 pages.

Non-Final Office Action received for U.S. Appl. No. 17/483,549, mailed on Jan. 11, 2022, 5 pages.

Non-Final Office Action received for U.S. Appl. No. 17/483,564, mailed on Jan. 6, 2022, 23 pages.

Non-Final Office Action received for U.S. Appl. No. 17/483,564, mailed on Nov. 28, 2022, 24 pages.

Non-Final Office Action received for U.S. Appl. No. 17/483,679, mailed on Dec. 9, 2022, 31 pages.

Non-Final Office Action received for U.S. Appl. No. 17/483,679, mailed on Feb. 1, 2022, 19 pages.

Non-Final Office Action received for U.S. Appl. No. 17/484,899, mailed on Jan. 24, 2022, 24 pages.

Non-Final Office Action received for U.S. Appl. No. 17/484,907, mailed on Nov. 19, 2021, 24 pages.

Non-Final Office Action received for U.S. Appl. No. 17/666,971, mailed on Dec. 8, 2022, 26 pages.

Non-Final Office Action received for U.S. Appl. No. 14/841,455, mailed on Apr. 11, 2019, 13 pages.

Non-Final Office Action received for U.S. Appl. No. 15/250,152, mailed on Apr. 6, 2018, 31 pages.

Non-Final Office Action received for U.S. Appl. No. 15/250,152, mailed on Mar. 2, 2017, 26 pages.

Non-Final Office Action received for U.S. Appl. No. 15/433,320, mailed on May 2, 2019, 27 pages.

Non-Final Office Action received for U.S. Appl. No. 15/945,610, mailed on Sep. 20, 2018, 9 pages.

Notice of Acceptance received for Australian Patent Application No. 2015201884, mailed on Oct. 4, 2016, 3 pages.

Notice of Acceptance received for Australian Patent Application No. 2015267671, mailed on Apr. 4, 2018, 3 pages.

Notice of Acceptance received for Australian Patent Application No. 2016230001, mailed on May 25, 2018, 3 pages.

Notice of Acceptance received for Australian Patent Application No. 2017266867, mailed on Mar. 6, 2019, 3 pages.

Notice of Acceptance received for Australian Patent Application No. 2017284013, mailed on Aug. 26, 2020, 3 pages.

Notice of Acceptance received for Australian Patent Application No. 2018202751, mailed on Sep. 4, 2019, 3 pages.

Notice of Acceptance received for Australian Patent Application No. 2018220115, mailed on Jun. 29, 2020, 3 pages.

Notice of Acceptance received for Australian Patent Application No. 2018223051, mailed on Oct. 30, 2018, 3 Pages.

Notice of Acceptance received for Australian Patent Application No. 2018229544, mailed on May 4, 2020, 3 pages.

Notice of Acceptance received for Australian Patent Application No. 2018236872, mailed on Jul. 9, 2019, 3 pages.

Notice of Acceptance received for Australian Patent Application No. 2019203473, mailed on Nov. 7, 2019, 3 pages.

Notice of Acceptance received for Australian Patent Application No. 2019266225, mailed on Dec. 23, 2020, 3 pages.

Notice of Acceptance received for Australian Patent Application No. 2019268111, mailed on Feb. 18, 2021, 3 pages.

Notice of Acceptance received for Australian Patent Application No. 2020207785, mailed on May 4, 2022, 3 pages.

Notice of Acceptance received for Australian Patent Application No. 2020239711, mailed on Dec. 16, 2021, 3 pages.

Notice of Acceptance received for Australian Patent Application No. 2020273355, mailed on Jan. 17, 2022, 3 pages.

(56) References Cited

OTHER PUBLICATIONS

Notice of Acceptance received for Australian Patent Application No. 2020282362, mailed on Jan. 4, 2022, 3 pages.

Notice of Acceptance received for Australian Patent Application No. 2021200789, mailed on Feb. 26, 2021, 3 pages.

Notice of Acceptance received for Australian Patent Application No. 2021203669, mailed on May 25, 2022, 3 pages.

Notice of Acceptance received for Australian Patent Application No. 2021203903, mailed on May 25, 2022, 3 pages.

Notice of Acceptance received for Australian Patent Application No. 2021204454, mailed on Feb. 25, 2022, 3 pages.

Notice of Acceptance received for Australian Patent Application No. 2022200515, mailed on Dec. 21, 2022, 3 pages.

Notice of Acceptance received for Australian Patent Application No. 2022202458, mailed on May 6, 2022, 3 pages.

Notice of Allowance received for Chinese Patent Application No. 201910400179.2, mailed on Oct. 9, 2022, 4 pages (1 page of English Translation and 3 pages of Official Copy).

Notice of Allowance received for Chinese Patent Application No. 201280047459.6, mailed on Jan. 31, 2018, 2 pages (1 page of English Translation and 1 page of Official Copy).

Notice of Allowance received for Chinese Patent Application No. 201580028491.3, mailed on Mar. 29, 2019, 2 pages (1 page of English Translation and 1 page of Official Copy).

Notice of Allowance received for Chinese Patent Application No. 201580028505.1, mailed on Sep. 19, 2019, 2 pages (1 page of English Translation and 1 page of Official Copy).

Notice of Allowance received for Chinese Patent Application No. 201580043701.6, mailed on Jan. 26, 2022, 2 pages (1 page of English Translation and 1 page of Official Copy).

Notice of Allowance received for Chinese Patent Application No. 201620051290.7, mailed on Jun. 22, 2016, 2 Pages (Official Copy only).

Notice of Allowance received for Chinese Patent Application No. 201680011682.3, mailed on Aug. 5, 2020, 2 pages (1 page of English Translation and 1 page of Official Copy).

Notice of Allowance received for Chinese Patent Application No. 201780002398.4, mailed on Jun. 17, 2019, 2 pages (1 page of English Translation and 1 page of Official Copy).

Notice of Allowance received for Chinese Patent Application No. 201780033899.9, mailed on Feb. 8, 2022, 2 pages (1 page of English Translation and 1 page of Official Copy).

Notice of Allowance received for Chinese Patent Application No. 201810338038.8, mailed on Jun. 30, 2020, 2 pages (1 page of English Translation and 1 page of Official Copy).

Notice of Allowance received for Chinese Patent Application No. 201810338040.5, mailed on Mar. 30, 2022, 6 pages (2 pages of English Translation and 4 pages of Official Copy).

Notice of Allowance received for Chinese Patent Application No. 201810339290.0, mailed on Mar. 9, 2022, 2 pages (1 page of English Translation and 1 page of Official Copy).

Notice of Allowance received for Chinese Patent Application No. 201811460172.1, mailed on Jan. 11, 2021, 2 pages (1 page of English Translation and 1 page of Official Copy).

Notice of Allowance received for Chinese Patent Application No. 201811539260.0, mailed on Mar. 15, 2021, 2 pages (1 page of English Translation and 1 page of Official Copy).

Notice of Allowance received for Chinese Patent Application No. 201880001436.9, mailed on May 8, 2020, 3 pages (2 pages of English Translation and 1 page of Official Copy).

Notice of Allowance received for Chinese Patent Application No. 201880056514.5, mailed on Jan. 11, 2021, 2 pages (1 page of English Translation and 1 page of Official Copy).

Notice of Allowance received for Chinese Patent Application No. 201910400180.5, mailed on Nov. 5, 2020, 2 pages (1 page of English Translation and 1 page of Official Copy).

Notice of Allowance received for Chinese Patent Application No. 201910475434.X, mailed on Mar. 10, 2021, 2 pages (1 page of English Translation and 1 page of Official Copy).

Notice of Allowance received for Chinese Patent Application No. 202010125114.4, mailed on Nov. 24, 2021, 2 pages (1 page of English Translation and 1 page of Official Copy).

Notice of Allowance received for Chinese Patent Application No. 202011243876.0, mailed on Sep. 8, 2021, 4 pages (1 page of English Translation and 3 pages of Official Copy).

Notice of Allowance received for Danish Patent Application No. PA201770408, mailed on Feb. 8, 2019, 2 pages.

Notice of Allowance received for Japanese Patent Application No. 2015-095183, mailed on Apr. 21, 2017., 3 pages. (Official Copy Only) See Communication Under 37 CFR § 1.98(a) (3).

Notice of Allowance received for Japanese Patent Application No. 2016-569669, mailed on Mar. 19, 2018, 4 pages (1 page of English translation and 3 pages of Official Copy).

Notice of Allowance received for Japanese Patent Application No. 2017-101107, mailed on Jun. 3, 2019, 5 pages (1 page of English Translation and 4 pages of Official Copy).

Notice of Allowance received for Japanese Patent Application No. 2017-507413, mailed on Jul. 22, 2019, 4 pages (1 page of English Translation and 3 pages of Official Copy).

Notice of Allowance received for Japanese Patent Application No. 2017-543762, mailed on Mar. 30, 2020, 4 pages (1 page of English Translation and 3 pages of Official Copy).

Notice of Allowance received for Japanese Patent Application No. 2018-080122, mailed on May 7, 2021, 28 pages (1 page of English Translation and 27 pages of Official Copy).

Notice of Allowance received for Japanese Patent Application No. 2018-183504, mailed on Sep. 27, 2019, 4 pages (1 page of English Translation and 3 pages of Official Copy).

Notice of Allowance received for Japanese Patent Application No. 2018-560107, mailed on Dec. 6, 2019, 4 pages (1 page of English Translation and 3 pages of Official Copy).

Notice of Allowance received for Japanese Patent Application No. 2019-116580, mailed on Oct. 2, 2020, 4 pages (1 page of English Translation and 3 pages of Official Copy).

Notice of Allowance received for Japanese Patent Application No. 2019-194597, mailed on Nov. 19, 2021, 4 pages (1 page of English Translation and 3 pages of Official Copy).

Notice of Allowance received for Japanese Patent Application No. 2019-238894, mailed on Oct. 5, 2020, 4 pages (1 page of English Translation and 3 pages of Official Copy).

Notice of Allowance received for Japanese Patent Application No. 2020-159840, mailed on Jul. 8, 2022, 4 pages (1 page of English Translation and 3 pages of Official Copy).

Notice of Allowance received for Japanese Patent Application No. 2020-183773, mailed on Dec. 23, 2021, 4 pages (1 page of English Translation and 3 pages of Official Copy).

Notice of Allowance received for Japanese Patent Application No. 2021-074395, mailed on Jun. 27, 2022, 4 pages (1 page of English Translation and 3 pages of Official Copy).

Notice of Allowance received for Japanese Patent Application No. 2021-563716, mailed on Mar. 14, 2022, 4 pages (1 page of English Translation and 3 pages of Official Copy).

Notice of Allowance received for Japanese Patent Application No. 2022-079682, mailed on Jul. 15, 2022, 4 pages (1 page of English Translation and 3 pages of Official Copy).

Notice of Allowance received for Korean Patent Application No. 10-2015-0072162, mailed on Dec. 27, 2017, 4 pages (2 pages of English Translation and 2 pages of Official copy).

Notice of Allowance received for Korean Patent Application No. 10-2016-7032902, mailed on Sep. 7, 2018, 3 pages (1 page of English Translation and 2 pages of Official Copy).

Notice of Allowance received for Korean Patent Application No. 10-2016-7035555, mailed on Sep. 23, 2019, 3 pages (1 page of English Translation and 2 pages of Official Copy).

Notice of Allowance received for Korean Patent Application No. 10-2017-7012145, mailed on Oct. 30, 2019, 3 pages (1 page of English Translation and 2 pages of Official Copy).

Notice of Allowance received for Korean Patent Application No. 10-2017-7022905, mailed on Jul. 31, 2019, 4 pages (2 pages of English Translation and 2 pages of Official Copy).

(56) References Cited

OTHER PUBLICATIONS

Notice of Allowance received for Korean Patent Application No. 10-2018-0035949, mailed on Nov. 28, 2019, 3 pages (1 page of English Translation and 2 pages of Official Copy).

Notice of Allowance received for Korean Patent Application No. 10-2018-7033301, mailed on Feb. 20, 2019, 5 pages ( 2 Pages of English Translation and 3 Pages of Official Copy).

Notice of Allowance received for Korean Patent Application No. 10-2018-7035747, mailed on Dec. 9, 2020, 5 pages (2 pages of English Translation and 3 pages of Official Copy).

Notice of Allowance received for Korean Patent Application No. 10-2019-7014494, mailed on Mar. 19, 2020, 4 pages (1 page of English Translation and 3 pages of Official Copy).

Notice of Allowance received for Korean Patent Application No. 10-2020-0024632, mailed on Jul. 26, 2021, 3 pages (1 page of English Translation and 2 pages of Official Copy).

Notice of Allowance received for Korean Patent Application No. 10-2020-0123805, mailed on Jun. 19, 2022, 5 pages (2 pages of English Translation and 3 pages of Official Copy).

Notice of Allowance received for Korean Patent Application No. 10-2020-7002929, mailed on Nov. 26, 2020, 3 pages (1 page of English Translation and 2 pages of Official Copy).

Notice of Allowance received for Korean Patent Application No. 10-2020-7017803, mailed on Nov. 5, 2020, 6 pages (2 pages of English Translation and 4 pages of Official Copy).

Notice of Allowance received for Korean Patent Application No. 10-2020-7032110, mailed on Mar. 8, 2021, 4 pages (1 page of English Translation and 3 pages of Official Copy).

Notice of Allowance received for Korean Patent Application No. 10-2021-0143923, mailed on Jan. 27, 2022, 4 pages (1 page of English Translation and 3 pages of Official Copy).

Notice of Allowance received for Korean Patent Application No. 10-2021-7005691, mailed on Mar. 29, 2021, 3 pages (1 page of English Translation and 2 pages of Official Copy).

Notice of Allowance received for Korean Patent Application No. 10-2021-7020549, mailed on Jul. 13, 2021, 3 pages (1 page of English Translation and 2 pages of Official Copy).

Notice of Allowance received for Korean Patent Application No. 10-2021-7032984, mailed on Jun. 29, 2022, 5 pages (2 pages of English Translation and 3 pages of Official Copy).

Notice of Allowance received for Korean Patent Application No. 10-2021-7035472, mailed on Nov. 23, 2021, 4 pages (2 pages of English Translation and 2 pages of Official Copy).

Notice of Allowance received for Korean Patent Application No. 10-2022-0091730, mailed on Oct. 4, 2022, 5 pages (2 pages of English Translation and 3 pages of Official Copy).

Notice of Allowance received for Korean Patent Application No. 10-2014-7008348, mailed on Feb. 21, 2019, 5 pages (2 Pages of English Translation and 3 Pages of Official Copy).

Notice of Allowance received for Taiwanese Patent Application No. 104108223, mailed on Jan. 10, 2017, 3 pages (Official Copy Only) See Communication Under 37 CFR § 1.98(a) (3).

Notice of Allowance received for Taiwanese Patent Application No. 104114953, mailed on Oct. 17, 2017, 3 pages (Official Copy only) See Communication Under 37 CFR § 1.98(a) (3).

Notice of Allowance Received for Taiwanese Patent Application No. 104117041, mailed on Feb. 24, 2017., 3 pages. (Official Copy Only) See Communication Under 37 CFR § 1.98(a) (3).

Notice of Allowance received for Taiwanese Patent Application No. 106144804, mailed on Jun. 27, 2018, 6 pages (2 pages of English Translation and 4 pages of Official copy).

Notice of Allowance received for Taiwanese Patent Application No. 104117042, mailed on Nov. 17, 2017, 5 pages (2 Pages of English Translation and 3 Pages of Official Copy).

Notice of Allowance received for U.S. Appl. No. 16/035,422, mailed on Apr. 10, 2019, 6 pages.

Notice of Allowance received for U.S. Appl. No. 16/528,941, mailed on Aug. 10, 2021, 5 pages.

Notice of Allowance received for U.S. Appl. No. 16/528,941, mailed on May 19, 2021, 5 pages.

Notice of Allowance received for U.S. Appl. No. 16/702,968, mailed on Apr. 21, 2021, 20 pages.

Notice of Allowance received for U.S. Appl. No. 17/157,166, mailed on Nov. 16, 2021, 6 pages.

Notice of Allowance received for U.S. Appl. No. 13/248,872, mailed on Dec. 4, 2014, 7 pages.

Notice of Allowance received for U.S. Appl. No. 13/248,882, mailed on Mar. 13, 2014, 16 pages.

Notice of Allowance received for U.S. Appl. No. 13/492,057, mailed on Jan. 3, 2017, 5 pages.

Notice of Allowance received for U.S. Appl. No. 13/492,057, mailed on May 18, 2017, 3 pages.

Notice of Allowance received for U.S. Appl. No. 14/285,378, mailed May 19, 2016, 10 pages.

Notice of Allowance received for U.S. Appl. No. 14/503,327, mailed on Mar. 22, 2018, 5 pages.

Notice of Allowance received for U.S. Appl. No. 14/503,327, mailed on Nov. 30, 2017, 5 pages.

Notice of Allowance received for U.S. Appl. No. 14/641,289, mailed on Aug. 24, 2017., 6 Pages.

Notice of Allowance received for U.S. Appl. No. 14/641,289, mailed on Dec. 12, 2017, 5 pages.

Notice of Allowance received for U.S. Appl. No. 14/641,298, mailed on Nov. 29, 2021, 8 pages.

Notice of Allowance received for U.S. Appl. No. 14/641,304, mailed on Sep. 9, 2020, 15 pages.

Notice of Allowance received for U.S. Appl. No. 14/642,366, mailed on Jan. 14, 2016, 8 pages.

Notice of Allowance received for U.S. Appl. No. 14/719,217, mailed on Feb. 13, 2019, 13 pages.

Notice of Allowance received for U.S. Appl. No. 15/134,638, mailed on Apr. 10, 2018, 7 pages.

Notice of Allowance received for U.S. Appl. No. 15/134,638, mailed on Jul. 27, 2018, 7 pages.

Notice of Allowance received for U.S. Appl. No. 15/250,152, mailed on May 1, 2019, 12 pages.

Notice of Allowance received for U.S. Appl. No. 15/269,801, mailed on May 3, 2017, 6 pages.

Notice of Allowance received for U.S. Appl. No. 15/269,801, mailed on Sep. 7, 2017, 5 pages.

Notice of Allowance received for U.S. Appl. No. 15/433,320, mailed on Apr. 1, 2021, 19 pages.

Notice of Allowance received for U.S. Appl. No. 15/845,794, mailed on Feb. 14, 2019, 6 pages.

Notice of Allowance received for U.S. Appl. No. 15/910,263, mailed on Feb. 18, 2021, 3 pages.

Notice of Allowance received for U.S. Appl. No. 15/910,263, mailed on Jan. 22, 2021, 33 pages.

Notice of Allowance received for U.S. Appl. No. 15/945,610, mailed on May 20, 2019, 7 pages.

Notice of Allowance received for U.S. Appl. No. 15/952,736, mailed on Sep. 11, 2018, 16 pages.

Notice of Allowance received for U.S. Appl. No. 16/109,552, mailed on Mar. 13, 2019, 25 pages.

Notice of Allowance received for U.S. Appl. No. 16/109,552, mailed on May 13, 2019, 2 pages.

Notice of Allowance received for U.S. Appl. No. 16/131,767, mailed on Sep. 6, 2019, 7 pages.

Notice of Allowance received for U.S. Appl. No. 16/144,572, mailed on Feb. 28, 2019, 7 pages.

Notice of Allowance received for U.S. Appl. No. 16/147,432, mailed on Dec. 18, 2018, 13 pages.

Notice of Allowance received for U.S. Appl. No. 16/147,432, mailed on May 20, 2019, 6 pages.

Notice of Allowance received for U.S. Appl. No. 16/229,959, mailed on Dec. 4, 2019, 6 pages.

Notice of Allowance received for U.S. Appl. No. 16/383,403, mailed on Jan. 10, 2020, 11 pages.

Notice of Allowance received for U.S. Appl. No. 16/422,736, mailed on Apr. 20, 2021, 12 pages.

Notice of Allowance received for U.S. Appl. No. 16/422,736, mailed on Jun. 15, 2021, 13 pages.

(56) References Cited

OTHER PUBLICATIONS

Notice of Allowance received for U.S. Appl. No. 16/434,865, mailed on Apr. 7, 2020, 5 pages.

Notice of Allowance received for U.S. Appl. No. 16/511,578, mailed on Nov. 18, 2019, 12 pages.

Notice of Allowance received for U.S. Appl. No. 16/583,989, mailed on Apr. 1, 2021, 5 pages.

Notice of Allowance received for U.S. Appl. No. 16/583,989, mailed on Dec. 24, 2020, 7 pages.

Notice of Allowance received for U.S. Appl. No. 16/584,490, mailed on Aug. 27, 2020, 13 pages.

Notice of Allowance received for U.S. Appl. No. 16/584,490, mailed on Mar. 26, 2021, 13 pages.

Notice of Allowance received for U.S. Appl. No. 16/670,949, mailed on May 27, 2021, 7 pages.

Notice of Allowance received for U.S. Appl. No. 16/670,949, mailed on Sep. 14, 2021, 7 pages.

Notice of Allowance received for U.S. Appl. No. 16/679,967, mailed on Jun. 15, 2022, 7 pages.

Notice of Allowance received for U.S. Appl. No. 16/679,967, mailed on Nov. 2, 2022, 7 pages.

Notice of Allowance received for U.S. Appl. No. 16/790,619, mailed on Sep. 8, 2020, 6 pages.

Notice of Allowance received for U.S. Appl. No. 16/799,481, mailed on Sep. 8, 2020, 6 pages.

Notice of Allowance received for U.S. Appl. No. 16/803,849, mailed on May 17, 2022, 12 pages.

Notice of Allowance received for U.S. Appl. No. 16/807,604, mailed on Apr. 30, 2021, 25 pages.

Notice of Allowance received for U.S. Appl. No. 16/836,571, mailed on Feb. 14, 2022, 31 pages.

Notice of Allowance received for U.S. Appl. No. 16/836,571, mailed on Sep. 8, 2021, 25 pages.

Notice of Allowance received for U.S. Appl. No. 16/888,775, mailed on Jan. 12, 2022, 5 pages.

Notice of Allowance received for U.S. Appl. No. 16/888,775, mailed on Jul. 26, 2021, 5 pages.

Notice of Allowance received for U.S. Appl. No. 16/888,775, mailed on Jun. 3, 2021, 11 pages.

Notice of Allowance received for U.S. Appl. No. 16/888,775, mailed on Oct. 19, 2022, 6 pages.

Notice of Allowance received for U.S. Appl. No. 16/922,675, mailed on Dec. 8, 2022, 9 pages.

Notice of Allowance received for U.S. Appl. No. 16/922,675, mailed on Feb. 10, 2022, 8 pages.

Notice of Allowance received for U.S. Appl. No. 16/922,675, mailed on Jan. 21, 2021, 7 pages.

Notice of Allowance received for U.S. Appl. No. 16/922,675, mailed on Sep. 27, 2021, 10 pages.

Notice of Allowance received for U.S. Appl. No. 16/987,003, mailed on Aug. 18, 2021, 9 pages.

Notice of Allowance received for U.S. Appl. No. 17/026,818, mailed on May 13, 2021, 10 pages.

Notice of Allowance received for U.S. Appl. No. 17/027,373, mailed on Aug. 2, 2022, 2 pages.

Notice of Allowance received for U.S. Appl. No. 17/027,373, mailed on Jun. 3, 2022, 8 pages.

Notice of Allowance received for U.S. Appl. No. 17/027,373, mailed on Oct. 3, 2022, 5 pages.

Notice of Allowance received for U.S. Appl. No. 17/031,833, mailed on Jun. 25, 2021, 15 pages.

Notice of Allowance received for U.S. Appl. No. 17/031,833, mailed on Sep. 20, 2021, 6 pages.

Notice of Allowance received for U.S. Appl. No. 17/121,610, mailed on Jul. 7, 2022, 5 pages.

Notice of Allowance received for U.S. Appl. No. 17/121,610, mailed on Jul. 13, 2022, 4 pages.

Notice of Allowance received for U.S. Appl. No. 17/121,610, mailed on Mar. 11, 2022, 5 pages.

Notice of Allowance received for U.S. Appl. No. 17/157,166, mailed on Mar. 30, 2022, 6 pages.

Notice of Allowance received for U.S. Appl. No. 17/168,069, mailed on Jan. 19, 2022, 12 pages.

Notice of Allowance received for U.S. Appl. No. 17/168,069, mailed on Mar. 22, 2022, 5 pages.

Notice of Allowance received for U.S. Appl. No. 17/461,103, mailed on Jun. 20, 2022, 6 pages.

Notice of Allowance received for U.S. Appl. No. 17/461,103, mailed on Mar. 17, 2022, 10 pages.

Notice of Allowance received for U.S. Appl. No. 17/482,987, mailed on Jun. 23, 2022, 9 pages.

Notice of Allowance received for U.S. Appl. No. 17/482,987, mailed on May 11, 2022, 10 pages.

Notice of Allowance received for U.S. Appl. No. 17/483,549, mailed on Apr. 15, 2022, 10 pages.

Notice of Allowance received for U.S. Appl. No. 17/483,582, mailed on Apr. 19, 2022, 5 pages.

Notice of Allowance received for U.S. Appl. No. 17/483,582, mailed on Jan. 20, 2022, 10 pages.

Notice of Allowance received for U.S. Appl. No. 17/484,907, mailed on Jul. 25, 2022, 10 pages.

Notice of Allowance received for U.S. Appl. No. 17/484,907, mailed on Mar. 2, 2022, 13 pages.

Notice of Allowance received for U.S. Appl. No. 17/484,907, mailed on May 20, 2022, 13 pages.

Notice of Allowance received for U.S. Appl. No. 14/841,455, mailed on Oct. 22, 2019, 10 pages.

Office Action received for Australian Patent Application No. 2016230001, mailed on Feb. 7, 2018, 3 pages.

Office Action received for European Patent Application No. 15711969.4, mailed on Nov. 17, 2017, 9 pages.

Office Action received for Australian Patent Application No. 2015100490, mailed on Dec. 15, 2016, 2 pages.

Office Action received for Australian Patent Application No. 2015267671, mailed on Apr. 5, 2017., 2 pages.

Office Action received for Australian Patent Application No. 2015302298, mailed on Apr. 4, 2018, 3 pages.

Office Action received for Australian Patent Application No. 2015302298, mailed on Jul. 20, 2018, 3 pages.

Office Action received for Australian Patent Application No. 2015302298, mailed on Sep. 14, 2017, 3 pages.

Office Action received for Australian Patent Application No. 2015302298, mailed on Sep. 4, 2018, 5 pages.

Office Action received for Australian Patent Application No. 2016266010, mailed on Aug. 23, 2018, 4 pages.

Office Action received for Australian Patent Application No. 2016266010, mailed on May 4, 2018, 4 pages.

Office Action received for Australian Patent Application No. 2016266010, mailed on Nov. 28, 2018, 5 pages.

Office Action received for Australian Patent Application No. 2016266010, mailed on Nov. 30, 2017., 5 pages.

Office Action received for Australian Patent Application No. 2017100553, mailed on Aug. 4, 2017, 5 pages.

Office Action received for Australian Patent Application No. 2017101563, mailed on Jan. 22, 2018, 2 pages.

Office Action received for Australian Patent Application No. 2017101563, mailed on Jun. 26, 2018, 3 pages.

Office Action received for Australian Patent Application No. 2017266867, mailed on Dec. 6, 2018, 3 pages.

Office Action received for Australian Patent Application No. 2017284013, mailed on Mar. 19, 2020, 3 pages.

Office Action received for Australian Patent Application No. 2018101014, mailed on Jan. 18, 2019, 5 pages.

Office Action received for Australian Patent Application No. 2018101014, mailed on Sep. 19, 2018, 4 pages.

Office Action received for Australian Patent Application No. 2018202751, mailed on Apr. 2, 2019, 4 pages.

Office Action received for Australian Patent Application No. 2018220115, mailed on Apr. 21, 2020, 3 pages.

Office Action received for Australian Patent Application No. 2018220115, mailed on Oct. 4, 2019, 3 pages.

(56) References Cited

OTHER PUBLICATIONS

Office Action received for Australian Patent Application No. 2018229544, mailed on Nov. 15, 2019, 4 pages.
Office Action received for Australian Patent Application No. 2018236870, mailed on Jul. 29, 2019, 7 pages.
Office Action received for Australian Patent Application No. 2018236870, mailed on Nov. 21, 2018, 10 pages.
Office Action received for Australian Patent Application No. 2018236870, mailed on Oct. 31, 2019, 8 pages.
Office Action received for Australian Patent Application No. 2018236872, mailed on Nov. 23, 2018, 4 pages.
Office Action received for Australian Patent Application No. 2018271366, mailed on Feb. 25, 2020, 5 pages.
Office Action received for Australian Patent Application No. 2018271366, mailed on Jan. 19, 2021, 5 pages.
Office Action received for Australian Patent Application No. 2018271366, mailed on May 17, 2021, 5 pages.
Office Action received for Australian Patent Application No. 2018271366, mailed on Oct. 26, 2020, 5 pages.
Office Action received for Australian Patent Application No. 2019100499, mailed on Jun. 28, 2019., 4 pages.
Office Action received for Australian Patent Application No. 2019101062, mailed on Apr. 22, 2020, 2 pages.
Office Action received for Australian Patent Application No. 2019101062, mailed on Dec. 5, 2019, 3 pages.
Office Action received for Australian Patent Application No. 2019203473, mailed on Oct. 25, 2019, 2 pages.
Office Action received for Australian Patent Application No. 2019266225, mailed on Nov. 23, 2020, 4 pages.
Office Action received for Australian Patent Application No. 2019268111, mailed on Oct. 27, 2020, 7 pages.
Office Action received for Australian Patent Application No. 2020207785, mailed on Dec. 14, 2021, 5 pages.
Office Action received for Australian Patent Application No. 2020207785, mailed on Jul. 13, 2021, 3 pages.
Office Action received for Australian Patent Application No. 2020239711, mailed on Sep. 13, 2021, 5 pages.
Office Action received for Australian Patent Application No. 2020273355, mailed on Jul. 6, 2021, 3 pages.
Office Action received for Australian Patent Application No. 2020273355, mailed on Nov. 23, 2021, 6 pages.
Office Action received for Australian Patent Application No. 2020282362, mailed on Nov. 25, 2021, 3 pages.
Office Action received for Australian Patent Application No. 2021201243, mailed on Dec. 12, 2022, 3 pages.
Office Action received for Australian Patent Application No. 2021201243, mailed on Feb. 17, 2022, 4 pages.
Office Action received for Australian Patent Application No. 2021201243, mailed on Jun. 1, 2022, 5 pages.
Office Action received for Australian Patent Application No. 2021203669, mailed on Apr. 5, 2022, 3 pages.
Office Action received for Australian Patent Application No. 2021203903, mailed on Feb. 24, 2022, 3 pages.
Office Action received for Australian Patent Application No. 2021204454, mailed on Aug. 9, 2021, 7 pages.
Office Action received for Australian Patent Application No. 2022200515, mailed on Nov. 2, 2022, 2 pages.
Office Action received for Australian Patent Application No. 2022200901, mailed on Dec. 19, 2022, 4 pages.
Office Action received for Australian Patent Application No. 2022201532, mailed on Dec. 19, 2022, 5 pages.
Office Action received for Australian Patent Application No. 2022241590, mailed on Nov. 18, 2022, 8 pages.
Office Action received for Chinese Patent Application No. 201510288981.9, mailed on Jul. 1, 2019, 16 pages (8 pages of English Translation and 8 pages of Official Copy).
Office Action received for Chinese Patent Application No. 201510288981.9, mailed on Jul. 3, 2018, 19 pages (8 pages of English Translation and 11 pages of official copy).

Office Action received for Chinese Patent Application No. 201510288981.9, mailed on Mar. 6, 2019, 20 pages (10 pages of English Translation and 10 pages of Official Copy).
Office Action received for Chinese Patent Application No. 201580028491.3, mailed on Oct. 8, 2018, 9 pages (3 pages of English Translation and 6 pages of Official Copy).
Office Action received for Chinese Patent Application No. 201580028505.1, mailed on Jan. 16, 2019, 15 pages (5 pages of English Translation and 10 pages of Official Copy).
Office Action received for Chinese Patent Application No. 201580028505.1, mailed on Jun. 20, 2019, 7 pages (3 pages of English Translation and 4 pages of Official Copy).
Office Action received for Chinese Patent Application No. 201580043701.6, mailed on Dec. 24, 2018, 20 pages (5 pages of English Translation and 15 pages of Official copy).
Office Action received for Chinese Patent Application No. 201580043701.6, mailed on May 8, 2021, 10 pages (1 page of English Translation and 9 pages of Official Copy).
Office Action received for Chinese Patent Application No. 201580043701.6, mailed on Nov. 4, 2019, 20 pages (6 pages of English Translation and 14 pages of Official Copy).
Office Action received for Chinese Patent Application No. 201580043701.6, mailed on Oct. 12, 2020, 22 pages (5 pages of English Translation and 17 pages of Official Copy).
Office Action received for Chinese Patent Application No. 201580043701.6, mailed on Sep. 10, 2021, 10 pages (5 pages of English Translation and 5 pages of Official Copy).
Office Action received for Chinese Patent Application No. 201680011682.3, mailed on Dec. 2, 2019, 14 pages (7 pages of English Translation and 7 pages of Official Copy).
Office Action received for Chinese Patent Application No. 201711292804.3, mailed on Aug. 5, 2020, 26 pages (16 pages of English Translation and 10 pages of Official Copy).
Office Action received for Chinese Patent Application No. 201711292804.3, mailed on Feb. 23, 2021, 17 pages (8 pages of English Translation and 9 pages of Official Copy).
Office Action received for Chinese Patent Application No. 201711292804.3, mailed on Sep. 10, 2021, 19 pages (8 pages of English Translation and 11 pages of Official Copy).
Office Action received for Chinese Patent Application No. 201780002398.4, mailed on Feb. 27, 2019, 6 pages (3 pages of English Translation and 3 pages of Official Copy).
Office Action received for Chinese Patent Application No. 201780002398.4, mailed on Sep. 12, 2018, 17 pages (5 pages of English Translation and 12 pages of Official Copy).
Office Action received for Chinese Patent Application No. 201780033899.9, mailed on Sep. 3, 2021, 12 pages (6 pages of English Translation and 6 pages of Official Copy).
Office Action received for Chinese Patent Application No. 201810338038.8, mailed on Jan. 21, 2020, 26 pages (13 pages of English Translation and 13 pages of Official Copy).
Office Action received for Chinese Patent Application No. 201810338038.8, mailed on May 14, 2019, 26 pages (13 pages of English Translation and 13 pages of Official Copy).
Office Action received for Chinese Patent Application No. 201810338040.5, mailed on Jun. 3, 2021, 25 pages (15 pages of English Translation and 10 pages of Official Copy).
Office Action received for Chinese Patent Application No. 201810338040.5, mailed on Oct. 25, 2021, 22 pages (13 pages of English Translation and 9 pages of Official Copy).
Office Action received for Chinese Patent Application No. 201810338826.7, mailed on Apr. 3, 2019, 21 pages (13 pages of English Translation and 8 pages of Official Copy).
Office Action received for Chinese Patent Application No. 201810338826.7, mailed on Jan. 16, 2020, 16 Pages (10 pages of English Translation and 6 pages of Official Copy).
Office Action received for Chinese Patent Application No. 201810338826.7, mailed on Oct. 21, 2019, 19 pages (12 pages of English Translation and 7 pages of Official Copy).
Office Action received for Chinese Patent Application No. 201810339290.0, mailed on Jun. 4, 2021, 20 pages (11 pages of English Translation and 9 pages of Official Copy).

(56) References Cited

OTHER PUBLICATIONS

Office Action received for Chinese Patent Application No. 201810339290.0, mailed on Oct. 18, 2021, 20 pages (11 pages of English Translation and 9 pages of Official Copy).
Office Action received for Chinese Patent Application No. 201811460172.1, mailed on Jan. 21, 2020, 17 pages (8 pages of English Translation and 9 pages of Official Copy).
Office Action received for Chinese Patent Application No. 201811460172.1, mailed on Oct. 14, 2020, 7 pages (4 pages of English Translation and 3 pages of Official Copy).
Office Action received for Chinese Patent Application No. 201811539259.8, mailed on Apr. 3, 2020, 10 pages (6 pages of English Translation and 4 pages of Official Copy).
Office Action received for Chinese Patent Application No. 201811539259.8, mailed on Sep. 3, 2020, 10 pages (6 pages of English Translation and 4 pages of Official Copy).
Office Action received for Chinese Patent Application No. 201811539259.8, mailed on Sep. 18, 2019, 12 pages (6 pages of English Translation and 6 pages of Official Copy).
Office Action received for Chinese Patent Application No. 201811539260.0, mailed on Jun. 3, 2020, 8 pages (5 pages of English Translation and 3 pages of Official Copy).
Office Action received for Chinese Patent Application No. 201811539260.0, mailed on Nov. 4, 2020, 9 pages (5 pages of English Translation and 4 pages of Official Copy).
Office Action received for Chinese Patent Application No. 201811539260.0, mailed on Oct. 8, 2019, 14 pages (7 pages of English Translation and 7 pages of Official Copy).
Office Action received for Chinese Patent Application No. 201880001436.9, mailed on Apr. 28, 2019, 19 pages (11 pages of English Translation and 8 pages of Official copy).
Office Action received for Chinese Patent Application No. 201880001436.9, mailed on Nov. 6, 2019, 24 pages (15 pages of English Translation and 9 pages of Official Copy).
Office Action received for Chinese Patent Application No. 201880056514.5, mailed on Sep. 2, 2020, 7 pages (1 page of English Translation and 6 pages of Official Copy).
Office Action received for Chinese Patent Application No. 201910400179.2, mailed on Dec. 27, 2021, 32 pages (13 pages of English Translation and 19 pages of Official Copy).
Office Action received for Chinese Patent Application No. 201910400180.5, mailed on Jun. 1, 2020, 11 pages (5 pages of English Translation and 6 pages of Official Copy).
Office Action received for Chinese Patent Application No. 201910475434.X, mailed on Dec. 4, 2019, 14 pages (8 pages of English Translation and 6 pages of Official Copy).
Office Action received for Chinese Patent Application No. 201910475434.X, mailed on Jun. 3, 2020, 9 pages (5 pages of English Translation and 4 pages of Official Copy).
Office Action received for Chinese Patent Application No. 201910475434.X, mailed on Oct. 30, 2020, 9 pages (5 pages of English Translation and 4 pages of Official Copy).
Office Action received for Chinese Patent Application No. 201910704856.X, mailed on Apr. 6, 2021, 13 pages (7 pages of English Translation and 6 pages of Official Copy).
Office Action received for Chinese Patent Application No. 201910704856.X, mailed on Dec. 9, 2020, 23 pages (13 pages of English Translation and 10 pages of Official Copy).
Office Action received for Chinese Patent Application No. 201910704856.X, mailed on May 27, 2020, 26 pages (14 pages of English Translation and 12 pages of Official Copy).
Office Action received for Chinese Patent Application No. 201911128105.4, mailed on Apr. 8, 2021, 10 pages (5 pages of English Translation and 5 pages of Official Copy).
Office Action received for Chinese Patent Application No. 201911128105.4, mailed on Jan. 4, 2021, 14 pages (7 pages of English Translation and 7 pages of Official Copy).
Office Action received for Chinese Patent Application No. 201911128105.4, mailed on Jul. 3, 2020, 18 pages (9 pages of English Translation and 9 pages of Official Copy).

Office Action received for Chinese Patent Application No. 202010125114.4, mailed on Aug. 21, 2020, 16 pages (8 pages of English Translation and 8 pages of Official Copy).
Office Action received for Chinese Patent Application No. 202010125114.4, mailed on Jun. 7, 2021, 7 pages (4 pages of English Translation and 3 pages of Official Copy).
Office Action received for Chinese Patent Application No. 202010125114.4, mailed on Mar. 1, 2021, 15 pages (9 pages of English Translation and 6 pages of Official Copy).
Office Action received for Chinese Patent Application No. 202010126661.4, mailed on Feb. 3, 2021, 16 pages (9 pages of English Translation and 7 pages of Official Copy).
Office Action received for Chinese Patent Application No. 202010126661.4, mailed on Jun. 2, 2022, 11 pages (7 pages of English Translation and 4 pages of Official Copy).
Office Action received for Chinese Patent Application No. 202010126661.4, mailed on Mar. 4, 2022, 13 pages (8 pages of English Translation and 5 pages of Official Copy).
Office Action received for Chinese Patent Application No. 202011243876.0, mailed on Apr. 6, 2021, 11 pages (5 pages of English Translation and 6 pages of Official Copy).
Office Action received for Chinese Patent Application No. 202110327012.5, mailed on Apr. 29, 2022, 17 pages (10 pages of English Translation and 7 pages of Official Copy).
Office Action received for Chinese Patent Application No. 202110327012.5, mailed on Nov. 28, 2022, 16 pages (10 pages of English Translation and 6 pages of Official Copy).
Office Action received for Chinese Patent Application No. 202110328597.2, mailed on Apr. 15, 2022, 18 pages (9 pages of English Translation and 9 pages of Official Copy).
Office Action received for Chinese Patent Application No. 202110328597.2, mailed on Oct. 10, 2022, 13 pages (7 pages of English Translation and 6 pages of Official Copy).
Office Action received for Chinese Patent Application No. 202110328601.5, mailed on Apr. 27, 2022, 25 pages (14 pages of English Translation and 11 pages of Official Copy).
Office Action received for Chinese Patent Application No. 202110328601.5, mailed on Nov. 2, 2022, 32 pages (19 pages of English Translation and 13 pages of Official Copy).
Office Action received for Chinese Patent Application No. 202110328602.X, mailed on Mar. 24, 2022, 6 pages (3 pages of English Translation and 3 pages of Official Copy).
Office Action received for Chinese Patent Application No. 202111652452.4, mailed on Aug. 29, 2022, 23 pages (12 pages of English Translation and 11 pages of Official Copy).
Office Action received for Danish Patent Application No. PA201570256, mailed on Mar. 17, 2016, 5 pages.
Office Action received for Danish Patent Application No. PA201570256, mailed on May 23, 2017, 3 pages.
Office Action received for Danish Patent Application No. PA201570256, mailed on Oct. 10, 2016, 3 pages.
Office Action Received for Danish Patent Application No. PA201670622, mailed on Aug. 17, 2018, 4 pages.
Office Action Received for Danish Patent Application No. PA201670622, mailed on May 30, 2017, 4 pages.
Office Action received for Danish Patent Application No. PA201670622, mailed on Nov. 1, 2017, 5 pages.
Office Action Received for Danish Patent Application No. PA201670622, mailed on Oct. 31, 2016, 11 pages.
Office Action received for Danish Patent Application No. PA201670628, mailed on Jun. 6, 2017, 3 pages.
Office Action received for Danish Patent Application No. PA201670628, mailed on Oct. 26, 2016, 7 pages.
Office Action received for Danish Patent Application No. PA201770392, mailed on Apr. 17, 2018, 2 pages.
Office Action received for Danish Patent Application No. PA201770392, mailed on Dec. 8, 2017, 4 pages.
Office Action received for Danish Patent Application No. PA201770392, mailed on Jun. 20, 2017, 11 pages.
Office Action received for Danish Patent Application No. PA201770401, mailed on Jan. 31, 2018, 3 pages.
Office Action received for Danish Patent Application No. PA201770401, mailed on May 17, 2018, 3 Pages.

(56)     References Cited

OTHER PUBLICATIONS

Office Action received for Danish Patent Application No. PA201770402, mailed on Apr. 16, 2018, 5 pages.
Office Action received for Danish Patent Application No. PA201770402, mailed on Dec. 18, 2017, 6 pages.
Office Action received for Danish Patent Application No. PA201770402, mailed on Jun. 19, 2017, 11 pages.
Office Action received for Danish Patent Application No. PA201770403, mailed on Dec. 12, 2017, 3 pages.
Office Action received for Danish Patent Application No. PA201770403, mailed on Jun. 16, 2017, 8 pages.
Office Action received for Danish Patent Application No. PA201770404, mailed on Aug. 8, 2018, 4 pages.
Office Action received for Danish Patent Application No. PA201770404, mailed on Dec. 1, 2017, 5 pages.
Office Action received for Danish Patent Application No. PA201770404, mailed on Feb. 21, 2019, 2 pages.
Office Action received for Danish Patent Application No. PA201770404, mailed on May 1, 2019, 2 pages.
Office Action received for Danish Patent Application No. PA201770406, mailed on Feb. 27, 2018, 7 pages.
Office Action received for Danish Patent Application No. PA201770406, mailed on Jan. 25, 2019, 8 pages.
Office Action received for Danish Patent Application No. PA201770406, mailed on Jun. 22, 2017, 11 pages.
Office Action received for Danish Patent Application No. PA201770406, mailed on Mar. 26, 2019, 3 pages.
Office Action received for Danish Patent Application No. PA201770406, mailed on Nov. 11, 2019, 4 pages.
Office Action received for Danish Patent Application No. PA201770408, mailed on Dec. 21, 2017., 6 pages.
Office Action received for Danish Patent Application No. PA201770408, mailed on Jun. 20, 2017, 9 pages.
Office Action received for Danish Patent Application No. PA201770408, mailed on May 3, 2018, 7 pages.
Office Action received for Danish Patent Application No. PA201770410, mailed on Apr. 9, 2018, 5 pages.
Office Action received for Danish Patent Application No. PA201770410, mailed on Jun. 23, 2017, 9 pages.
Office Action received for Danish Patent Application No. PA201770410, mailed on Nov. 22, 2018, 5 pages.
Office Action received for Danish Patent Application No. PA201770782, mailed on Jan. 26, 2018, 8 pages.
Office Action received for Danish Patent Application No. PA201770782, mailed on Nov. 22, 2018, 3 pages.
Office Action received for Danish Patent Application No. PA201870060, mailed on Jan. 15, 2019, 4 pages.
Office Action received for Danish Patent Application No. PA201870060, mailed on Jul. 25, 2019, 2 pages.
Office Action received for Danish Patent Application No. PA201870362, mailed on Aug. 22, 2019, 4 pages.
Office Action received for Danish Patent Application No. PA201870362, mailed on Dec. 18, 2018, 2 pages.
Office Action received for Danish Patent Application No. PA201870363, mailed on Mar. 26, 2019, 3 pages.
Office Action received for Danish Patent Application No. PA201870364, mailed on Jan. 28, 2019, 8 pages.
Office Action received for Danish Patent Application No. PA201870364, mailed on Jun. 11, 2019, 11 pages.
Office Action received for Danish Patent Application No. PA201870419, mailed on Feb. 27, 2020, 8 pages.
Office Action received for Danish Patent Application No. PA201870419, mailed on Sep. 30, 2019, 4 pages.
Office Action received for Danish Patent Application No. PA201870598, mailed on May 1, 2019, 3 pages.
Office Action received for Danish Patent Application No. PA201870598, mailed on Nov. 8, 2019, 4 pages.
Office Action received for Danish Patent Application No. PA202070560, mailed on Dec. 11, 2020, 7 pages.

Office Action received for Danish Patent Application No. PA202070560, mailed on Mar. 10, 2021, 7 pages.
Office Action received for Danish Patent Application No. PA202070617, mailed on Sep. 24, 2021, 4 pages.
Office Action received for Danish Patent Application No. PA202170320, mailed on May 3, 2022, 3 pages.
Office Action received for Danish Patent Application No. PA202270464, mailed on Dec. 20, 2022, 3 pages.
Office Action received for Danish Patent Application No. PA202270464, mailed on Oct. 25, 2022, 9 pages.
Office Action received for European Patent Application No. 12770400.5, mailed on Mar. 10, 2015, 5 pages.
Office Action received for European Patent Application No. 12773460.6, mailed on Feb. 19, 2018, 6 pages.
Office Action received for European Patent Application No. 13171047.7, mailed on May 24, 2017, 7 pages.
Office Action received for European Patent Application No. 15713062.6, mailed on Dec. 6, 2017, 7 pages.
Office Action received for European Patent Application No. 15714698.6, mailed on Oct. 13, 2021, 2 pages.
Office Action received for European Patent Application No. 15719347.5, mailed on Apr. 9, 2020, 4 pages.
Office Action received for European Patent Application No. 15719347.5, mailed on Jun. 17, 2019, 4 pages.
Office Action received for European Patent Application No. 16710590.7, mailed on Mar. 15, 2019, 10 pages.
Office Action received for European Patent Application No. 17799904.2, mailed on Oct. 21, 2020, 6 pages.
Office Action received for European Patent Application No. 17813737.8, mailed on Apr. 16, 2021, 7 pages.
Office Action received for European Patent Application No. 18178147.7, mailed on Mar. 20, 2020, 4 pages.
Office Action received for European Patent Application No. 18197583.0, mailed on Feb. 28, 2020, 8 pages.
Office Action received for European Patent Application No. 18197589.7, mailed on Oct. 1, 2019, 5 pages.
Office Action received for European Patent Application No. 18208881.5, mailed on Jun. 11, 2019, 5 pages.
Office Action received for European Patent Application No. 18208881.5, mailed on May 7, 2021, 6 pages.
Office Action received for European Patent Application No. 18728002.9, mailed on Dec. 14, 2020, 15 pages.
Office Action received for European Patent Application No. 18779093.6, mailed on Dec. 11, 2020, 4 pages.
Office Action received for European Patent Application No. 18779093.6, mailed on Mar. 17, 2022, 4 pages.
Office Action received for European Patent Application No. 19150528.8, mailed on Jul. 1, 2020, 6 pages.
Office Action received for European Patent Application No. 19186538.5, mailed on Oct. 12, 2020, 7 pages.
Office Action received for European Patent Application No. 19186538.5, mailed on Oct. 22, 2021, 7 pages.
Office Action received for European Patent Application No. 19203942.8, mailed on Oct. 29, 2021, 6 pages.
Office Action received for European Patent Application No. 19207753.5, mailed on May 10, 2021, 4 pages.
Office Action received for European Patent Application No. 19207753.5, mailed on Nov. 12, 2020, 5 pages.
Office Action received for European Patent Application No. 19729395.4, mailed on Jul. 15, 2020, 4 pages.
Office Action received for European Patent Application No. 19729395.4, mailed on Sep. 29, 2020, 10 pages.
Office Action received for European Patent Application No. 20158824.1, mailed on Jun. 13, 2022, 5 pages.
Office Action received for European Patent Application No. 20158824.1, mailed on May 18, 2021, 10 pages.
Office Action received for European Patent Application No. 20166552.8, mailed on Mar. 24, 2021, 8 pages.
Office Action received for European Patent Application No. 20205496.1, mailed on Nov. 10, 2021, 5 pages.
Office Action received for European Patent Application No. 21197457.1, mailed on Sep. 2, 2022, 8 pages.

(56) References Cited

OTHER PUBLICATIONS

Office Action received for German Patent Application No. 102015208532.5, mailed on Apr. 1, 2019, 20 pages (10 pages of English Translation and 10 pages of Official Copy).

Office Action received for German Patent Application No. 102015208532.5, mailed on Apr. 21, 2020, 3 pages (1 page of English Translation and 2 pages of Official Copy).

Office Action received for German Patent Application No. 102015208532.5, mailed on Aug. 21, 2019, 15 pages (5 pages of English Translation and 10 pages of Official Copy).

Office Action received for Indian Patent Application No. 201814036860, mailed on Jul. 29, 2021, 8 pages.

Office Action received for Indian Patent Application No. 202014041529, mailed on Dec. 6, 2021, 6 pages.

Office Action received for Japanese Patent Application No. 2015-095183, mailed on Jun. 3, 2016, 13 pages (6 pages of English Translation and 7 pages of Official copy).

Office Action received for Japanese Patent Application No. 2017-075031, mailed on Jul. 30, 2018, 16 pages (8 pages of English Translation and 8 pages of Official Copy).

Office Action received for Japanese Patent Application No. 2017-101107, mailed on Sep. 7, 2018, 14 pages (7 pages of English Translation and 7 pages of Official Copy).

Office Action received for Japanese Patent Application No. 2017-507413, mailed on Feb. 22, 2019, 11 pages (5 pages of English Translation and 6 pages of Official Copy).

Office Action received for Japanese Patent Application No. 2017-507413, mailed on May 25, 2018, 14 pages (7 pages of English Translation and 7 pages of Official Copy).

Office Action received for Japanese Patent Application No. 2017-543762, mailed on Apr. 8, 2019, 5 pages (2 pages of English Translation and 3 pages of Official copy).

Office Action received for Japanese Patent Application No. 2017-543762, mailed on Jul. 9, 2018, 8 pages (4 pages of English Translation and 4 pages of Official Copy).

Office Action received for Japanese Patent Application No. 2018-080122, mailed on Aug. 9, 2019, 5 pages (2 pages of English Translation and 3 pages of Official Copy).

Office Action received for Japanese Patent Application No. 2018-080122, mailed on Jan. 28, 2019, 11 pages (6 pages of English Translation and 5 pages of Official Copy).

Office Action received for Japanese Patent Application No. 2018-080122, mailed on Nov. 27, 2020, 16 pages (8 pages of English Translation and 8 pages of Official Copy).

Office Action received for Japanese Patent Application No. 2018-560107, mailed on Jun. 14, 2019, 26 pages (13 pages of English Translation and 13 pages of Official Copy).

Office Action received for Japanese Patent Application No. 2019-124728, mailed on Dec. 14, 2020, 4 pages (2 pages of English Translation and 2 pages of Official Copy).

Office Action received for Japanese Patent Application No. 2019-124728, mailed on Sep. 18, 2020, 6 pages (3 pages of English Translation and 3 pages of Official Copy).

Office Action received for Japanese Patent Application No. 2019-194597, mailed on Jan. 18, 2021, 10 pages (5 pages of English Translation and 5 pages of Official Copy).

Office Action received for Japanese Patent Application No. 2019-238894, mailed on Mar. 6, 2020, 7 pages (3 pages of English Translation and 4 pages of Official Copy).

Office Action received for Japanese Patent Application No. 2020-159840, mailed on Dec. 10, 2021, 13 pages (7 pages of English Translation and 6 pages of Official Copy).

Office Action received for Japanese Patent Application No. 2020-159840, mailed on Mar. 28, 2022, 6 pages (3 pages of English Translation and 3 pages of Official Copy).

Office Action received for Japanese Patent Application No. 2020-184605, mailed on Dec. 12, 2022, 9 pages (4 pages of English Translation and 5 pages of Official Copy).

Office Action received for Japanese Patent Application No. 2020-184605, mailed on Feb. 14, 2022, 24 pages (11 pages of English Translation and 13 pages of Official Copy).

Office Action received for Korean Patent Application No. 10-2014-7008348, mailed on Jan. 22, 2019, 16 pages (1 page of English Translation and 15 pages of Official Copy).

Office Action received for Korean Patent Application No. 10-2015-0072162, mailed on Feb. 27, 2017., 12 pages (6 pages of English Translation and 6 pages of Official Copy).

Office Action received for Korean Patent Application No. 10-2016-7035555, mailed on Dec. 26, 2017, 5 pages (2 pages of English Translation and 3 pages of Official Copy).

Office Action received for Korean Patent Application No. 10-2016-7035555, mailed on Jul. 18, 2019, 9 pages (4 pages of English Translation and 5 pages of Official Copy).

Office Action received for Korean Patent Application No. 10-2016-7035555, mailed on Sep. 18, 2018, 9 pages (4 pages of English Translation and 5 pages of Official Copy).

Office Action received for Korean Patent Application No. 10-2017-7012145, mailed on Jul. 18, 2019, 5 pages (2 Pages of English Translation and 3 Pages of Official Copy).

Office Action received for Korean Patent Application No. 10-2017-7012145, mailed on Sep. 13, 2018, 6 pages (3 pages of English Translation and 3 pages of Official Copy).

Office Action received for Korean Patent Application No. 10-2017-7022905, mailed on Oct. 22, 2018, 9 pages (4 pages of English Translation and 5 pages of official copy).

Office Action received for Korean Patent Application No. 10-2018-0035949, mailed on Apr. 24, 2019, 9 pages (4 pages of English Translation and 5 pages of Official Copy).

Office Action received for Korean Patent Application No. 10-2018-0035949, mailed on Dec. 24, 2018, 7 pages (3 pages of English Translation and 4 pages of Official Copy).

Office Action received for Korean Patent Application No. 10-2018-0035949, mailed on Jun. 20, 2018, 9 pages (4 pages of English Translation and 5 pages of Official Copy).

Office Action received for Korean Patent Application No. 10-2018-7033301, mailed on Dec. 14, 2018, 6 pages (2 pages of English Translation and 4 pages of Official Copy).

Office Action received for Korean Patent Application No. 10-2018-7035747, mailed on Apr. 9, 2020, 11 pages (5 pages of English Translation and 6 pages of Official Copy).

Office Action received for Korean Patent Application No. 10-2018-7035747, mailed on Oct. 14, 2020, 6 pages (3 pages of English Translation and 3 pages of Official Copy).

Office Action received for Korean Patent Application No. 10-2019-7014494, mailed on Jun. 14, 2019, 11 pages (5 pages of English Translation and 6 pages of Official Copy).

Office Action received for Korean Patent Application No. 10-2020-0024632, mailed on Dec. 29, 2020, 11 pages (5 pages of English Translation and 6 pages of Official Copy).

Office Action received for Korean Patent Application No. 10-2020-0024632, mailed on May 18, 2020, 11 pages (5 pages of English Translation and 6 pages of Official Copy).

Office Action received for Korean Patent Application No. 10-2020-7002929, mailed on Mar. 22, 2020, 5 pages (2 pages of English Translation and 3 pages of Official Copy).

Office Action received for Korean Patent Application No. 10-2020-7032110, mailed on Dec. 15, 2020, 6 pages (2 pages of English Translation and 4 pages of official Copy).

Office Action received for Korean Patent Application No. 10-2021-7017731, mailed on May 30, 2022, 5 pages (2 pages of English Translation and 3 pages of Official Copy).

Office Action received for Korean Patent Application No. 10-2021-7032984, mailed on Feb. 22, 2022, 8 pages (4 pages of English Translation and 4 pages of Official Copy).

Office Action received for Korean Patent Application No. 10-2022-0053111, mailed on Dec. 12, 2022, 9 pages (4 pages of English Translation and 5 pages of Official Copy).

Office Action received for Korean Patent Application No. 10-2022-7006175, mailed on May 27, 2022, 7 pages (3 pages of English Translation and 4 pages of Official Copy).

(56) References Cited

OTHER PUBLICATIONS

Office Action received for Taiwanese Patent Application No. 104108223, mailed on Apr. 25, 2016, 10 pages (5 pages of English Translation and 5 pages of Official copy).

Office Action received for Taiwanese Patent Application No. 104114953, issued on Feb. 18, 2017, 9 pages (4 pages of English Translation and 5 pages of Official copy).

Office Action received for Taiwanese Patent Application No. 104114953, mailed on Jun. 8, 2016, 11 pages (5 pages of English Translation and 6 pages of Official copy).

Office Action Received for Taiwanese Patent Application No. 104117041, mailed on Aug. 22, 2016, 6 pages (3 pages of English Translation and 3 pages of Official Copy).

Office Action received for Taiwanese Patent Application No. 104117042, mailed on Apr. 20, 2017, 18 pages (7 pages of English Translation and 11 pages of Official Copy).

Partial European Search Report received for European Patent Application No. 20158824.1, mailed on May 8, 2020, 14 pages.

Partial European Search Report received for European Patent Application No. 18197583.0, mailed on Jan. 14, 2019, 18 pages.

Q Pair, When I connected to LG G Pad 8.3 Q pair G Flex . . . —G Pad 8.3 review, Posting of a blog, Online Available at: <http://www.leaderyou.co.kr/2595>, Dec. 7, 2013, 28 pages (15 page of English Translation and 13 pages of Official Copy).

QPair, online available at : http://mongri.net/entry/G-Pad-83-Qpair, Retrieved on Mar. 6, 2017, Dec. 20, 2013, 22 pages (10 pages of English translation and 12 pages of Official Copy).

Record of Oral Hearing received for U.S. Appl. No. 14/641,298, mailed on Oct. 8, 2021, 17 pages.

Result of Consultation received for European Patent Application No. 16710590.7, mailed on Dec. 7, 2020, 4 pages.

Result of Consultation received for European Patent Application No. 18197583.0, mailed on Feb. 24, 2021, 3 pages.

Result of Consultation received for European Patent Application No. 18197589.7, mailed on Dec. 1, 2020, 9 pages.

Result of Consultation received for European Patent Application No. 18197589.7, mailed on Dec. 17, 2020, 6 pages.

Result of Consultation received for European Patent Application No. 18208881.5, mailed on Dec. 6, 2022, 10 pages.

Result of Consultation received for European Patent Application No. 19729395.4, mailed on Jun. 22, 2021, 3 pages.

Result of Consultation received for European Patent Application No. 19729395.4, mailed on Jun. 23, 2021, 3 pages.

Result of Consultation received for European Patent Application No. 20158824.1, mailed on May 17, 2022, 7 pages.

Search Report and Opinion received for Danish Patent Application No. PA201770401, mailed on Jun. 19, 2017, 6 pages.

Search Report and Opinion received for Danish Patent Application No. PA201870060 mailed on Apr. 30, 2018, 7 pages.

Search Report and Opinion received for Danish Patent Application No. PA201870362, mailed on Sep. 7, 2018, 9 pages.

Search Report and Opinion received for Danish Patent Application No. PA201870363, mailed on Sep. 11, 2018, 12 pages.

Search Report and Opinion received for Danish Patent Application No. PA201870364, mailed on Sep. 4, 2018, 12 pages.

Search Report and Opinion received for Danish Patent Application No. PA201870419, mailed on Aug. 27, 2018, 7 pages.

Search Report and Opinion received for Danish Patent Application No. PA201870419, mailed on Sep. 10, 2018, 9 pages.

Search Report and Opinion received for Danish Patent Application No. PA201870598, mailed on Dec. 5, 2018, 8 pages.

Search Report and Opinion received for Danish Patent Application No. PA202070617, mailed on Dec. 23, 2020, 8 pages.

Search Report and Opinion received for Danish Patent Application No. PA202170320, mailed on Oct. 6, 2021, 9 pages.

Search Report received for Danish Patent Application No. PA201770404, mailed on Jun. 20, 2017., 8 Pages.

Search Report received for Danish Patent Application No. PA201770409, mailed on Jun. 20, 2017., 9 Pages.

Smart Home App—What is the Widget, Online Available at: https://support.vivint.com/s/article/Vivint-Smart-Home-App-What-is-the-Widget, Jan. 26, 2019, 4 pages.

Summons to Attend Oral Proceedings received for European Patent Application 20158824.1, mailed on Dec. 7, 2021, 6 pages.

Summons to Attend Oral Proceedings received for European Patent Application No. 12770400.5 , mailed on Mar. 19, 2018, 10 pages.

Summons to Attend Oral Proceedings received for European Patent Application No. 13171047.7, mailed on Jul. 9, 2018, 12 pages.

Summons to Attend Oral Proceedings received for European Patent Application No. 15711969.4, mailed on Oct. 22, 2018, 12 pages.

Summons to Attend Oral Proceedings received for European Patent Application No. 17799904.2, mailed on Dec. 20, 2021, 8 pages.

Summons to Attend Oral Proceedings received for European Patent Application No. 17813737.8, mailed on Jan. 4, 2022, 12 pages.

Summons to Attend Oral Proceedings received for European Patent Application No. 18178147.7, mailed on Jun. 28, 2021, 8 pages.

Summons to Attend Oral Proceedings received for European Patent Application No. 18197583.0, mailed on Aug. 14, 2020, 12 pages.

Summons to attend Oral proceedings received for European Patent Application No. 18197589.7, mailed on Apr. 9, 2020, 7 pages.

Summons to Attend Oral Proceedings received for European Patent Application No. 18208881.5, mailed on Jun. 29, 2022, 9 pages.

Summons to Attend Oral Proceedings received for European Patent Application No. 18728002.9, mailed on Jun. 3, 2022, 15 pages.

Summons to Attend Oral Proceedings received for European Patent Application No. 19150528.8, mailed on Mar. 15, 2022, 7 pages.

Summons to Attend Oral Proceedings received for European Patent Application No. 19729395.4, mailed on Mar. 11, 2021, 7 pages.

Summons to Attend Oral Proceedings received for European Patent Application No. 19729395.4, mailed on Mar. 19, 2021, 9 pages.

Summons to Attend Oral Proceedings received for European Patent Application No. 20205496.1, mailed on Sep. 8, 2022, 9 pages.

Supplemental Notice of Allowance received for U.S. Appl. No. 16/584,490, mailed on Apr. 13, 2021, 2 pages.

Supplemental Notice of Allowance received for U.S. Appl. No. 17/168,069, mailed on Apr. 20, 2022, 2 pages.

Supplemental Notice of Allowance received for U.S. Appl. No. 17/168,069, mailed on Feb. 2, 2022, 2 pages.

Androidcentral, "How do i respond to group messages from notification bar?", Available online at: https://forums.androidcentral.com/ask-question/952030-how-do-i-respond-group-messages-notification-bar.html, Mar. 25, 2019, 3 pages.

Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.

Office Action received for Korean Patent Application No. 10-2015-0072162, mailed on Apr. 20, 2016, 11 pages (6 pages of English Translation and 5 pages of Official Copy).

Notice of Allowance received for Taiwanese Patent Application No. 102120412, mailed on Oct. 28, 2015, 5 pages (2 pages of English Translation and 3 pages of Official copy).

Office Action received for Taiwanese Patent Application No. 102120412, mailed on Feb. 25, 2015, 15 pages (6 pages of English Translation and 9 pages of Official Copy).

Final Office Action received for U.S. Appl. No. 13/492,057, mailed on Apr. 8, 2016, 29 pages.

Final Office Action received for U.S. Appl. No. 13/492,057, mailed on Mar. 30, 2015, 18 pages.

Non-Final Office Action received for U.S. Appl. No. 13/492,057, mailed on Dec. 17, 2015, 25 pages.

Non-Final Office Action received for U.S. Appl. No. 13/492,057, mailed on Jul. 8, 2014, 14 pages.

Extended European Search Report received for European Patent Application No. 13171047.7, mailed on Oct. 29, 2014, 8 pages.

Non-Final Office Action received for U.S. Appl. No. 14/641,289, mailed on Jul. 16, 2015, 31 pages.

Non-Final Office Action received for U.S. Appl. No. 14/641,289, mailed on Mar. 11, 2016, 26 pages.

Office Action received for Hong Kong Patent Application No. 151051633, mailed on Jun. 5, 2015, 11 pages (Official Copy Only) See Communication Under 37 CFR § 1.98(a) (3).

(56)                 References Cited

OTHER PUBLICATIONS

Search Report received for Netherlands Patent Application No. 2014737, mailed on Oct. 29, 2015, 9 pages.

Office Action received for Australian Patent Application No. 2015100490, issued on Jun. 9, 2015, 6 pages.

Office Action received for Australian Patent Application No. 2015201884, mailed on Oct. 12, 2015, 4 pages.

Notice of Allowance received for Chinese Patent Application No. 201520364847.8, mailed on Nov. 5, 2015, 9 pages (7 page of English Translation and 2 pages of Official Copy).

Office Action received for Danish Patent Application No. PA201570256, mailed on Jul. 7, 2015, 2 pages.

Abdulezer et al., "Skype for Dummies", Available Online at: https://ixn.es/Skype%20For%20Dummies.pdf, 2007, 361 pages.

Akhgari Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.

Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.

Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.

Beard Chris, "Mozilla Labs Introducing Weave", available online at <https://blog.mozilla.org/labs/2007/12/introducing-weave/>, Dec. 21, 2007, 57 pages.

Bell Killian, "Twitter Notifications, iCloud Tabs & Location-Based Reminders Appear in Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.

Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.

Brumberg et al., "The Unlock Project: A Python-based framework for practical brain-computer interface communication "app" development", Conf Proc IEEE Eng Med Biol Soc. 2012, doi:10.1109/EMBC.2012.6346473, Institute of Electrical and Electronics Engineers, 2012, 11 pages.

Call Me, "Samsung R3 speaker gives you a delicious 360-degree sound experience—with WiFi and Bluetooth | Call me", 0:24 / 3:22, Available Online at: <https://www.youtube.com/watch?v=4Uv_sOhrlro>, Sep. 22, 2016, 3 pages.

Chan Christine, "Handoff Your Browser to Your iPhone or iPad! Plus a Chance to Win a Copy!", Apr. 12, 2011, 2 pages.

Cohn Emily, "Sonos Just Fixed the Most Annoying Thing About Its iPhone App", online available at https://www.businessinsider.com/sonos-mobile-app-works-on-lock-screen-2016-6, Jun. 27, 2016, 2 pages.

Computeradv, "Sonos App Navigation & Menu on iPhone", Available online at: https://www.youtube.com/watch?v=Jhz9XvWQ204, Aug. 4, 2015, 1 page.

Crutnacker, "Amazon Echo Tips and Tricks: Playing Music Demonstration", Available Online at: https://www.youtube.com/watch?v=W_bqq2ynUll, Nov. 4, 2015, 1 page.

Dharmasena Anusha, "iMessage-send as text message Option", YouTube, Available online at: <https://www.youtube.com/watch?v=hXG-MdlW6FA>, Feb. 18, 2013, 1 page.

Dybwad Barb, "Google Chrome Gets Bookmark Syncing", available online at "http://mashable.com/2009/11/02/chrome-bookmark-sync/",, Nov. 3, 2009, 6 pages.

Fingas Jon, "Sonos Puts Speaker Controls on Your iPhone's Lock Screen", online available at https://www.engadget.com/2016-06-21-sonos-ios-lock-screen-controls.html, Jun. 21, 2016, 3 pages.

Review: Samsung Radiant R3 Wireless Speakers, Available Online at: <https://www.youtube.com/watch?v=ZBICVE1WdKE>, Jan. 19, 2016, 3 pages.

Frakes Dan, "How to Get Started with Airplay", availble at: https://www.macworld.com/article/2039770/how-to-get-started-with-airplay.html, Macworld, May 27, 2013, 8 pages.

Google, "Google Home Help, Listen to music", Datasheet [online], Available Online at <https://web.archive.org/web/20170326051235/https:/support.google.com/googlehome/answer/7030379?hl=en&ref_topic=7030084>, Mar. 26, 2017, 3 pages.

Google Labs, "Google Browser Sync", available online at "https://web.archive.org/web/20120518050142/http://www.google.com/tools/firefox/browsersync/faq.html", May 18, 2012, 5 pages.

Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.

Han Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only) See Communication Under 37 CFR § 1.98(a) (3).

Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.

Jarvie, "Alexa plays me music", Available online at: https://www.youtube.com/watch?v=bR2ZC8Sy8YQ, Feb. 23, 2015, 1 page.

Kazmucha Allyson, "Sonos Controller App for iPhone and iPad Review", online available at https://www.imore.com/sonos-controller-app-iphone-and-ipad-review, Mar. 1, 2018, 4 pages.

Kimura Ryoji, "Keynote presentation practice guide for iPad & iPhone", K.K. Rutles, first edition, Feb. 29, 2012, 4 pages (Official Copy Only) See Communication Under 37 CFR § 1.98(a) (3).

Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.

Low Cherlynn, "So you bought a smartwatch. Now what?", Online available at: https://www.engadget.com/2018-02-06-how-to-set-up-your-smartwatch.html, Feb. 6, 2018, 19 pages.

Mackie Simon, "Emulate Safari's Reader Mode in Other Browsers With Readability", available online at "https://gigaom.com/2010/06/21/emulate-safaris-reader-mode-in-other-browsers-with-readability/", Jun. 21, 2010, 5 pages.

Mozilla Services, "Firefox Sync Terms of Service (for versions prior to Firefox 29)", available online at <https://services.mozilla.com/tos/>, Aug. 19, 2010, 4 pages.

NBC News, "NBC News—YouTube Democratic Debate (full)", Online available at :—https://www.youtube.com/watch?v=ti2Nokoq1J4, Jan. 17, 2016, 1 page.

International Preliminary Report on Patentability received for PCT Patent Application No. PCT/US2013/044710, mailed on Dec. 18, 2014, 11 pages.

International Search Report and Written Opinion received for PCT Patent Application No. PCT/US2013/044710, mailed on Aug. 15, 2013, 11 pages.

International Search Report and Written Opinion received for PCT Patent Application No. PCT/US2015/019306, mailed on Jun. 17, 2015, 15 pages.

International Search Report and Written Opinion received for PCT Application No. PCT/US2015/019309, mailed on Jun. 25, 2015, 15 pages.

International Search Report and Written Opinion received for PCT Patent Application No. PCT/US2015/019317, mailed on Aug. 25, 2015, 24 pages.

Invitation to Pay Additional Fees received for PCT Patent Application No. PCT/US2015/019317, mailed on May 22, 2015, 7 pages.

International Search Report and Written Opinion received for PCT Patent Application No. PCT/US2015/025188, mailed on Jun. 23, 2015, 11 pages.

(56) References Cited

OTHER PUBLICATIONS

International Search Report and Written Opinion received for PCT Patent Application No. PCT/US2015/030199, mailed on Aug. 14, 2015, 11 pages.

Pu Fang, "Research on Location-aware Service in Pervasive Computing", Issue No. 7, Information Technology Series, China Doctoral Dissertations, Jul. 15, 2008, 140 pages (Official Copy only) See Communication Under 37 CFR § 1.98(a) (3).

Punchkick Interactive, "Punchkick hands-on review: Fitbit Surge", URL: https://www.youtube.com/watch?v=K2G7aebUYcA, Mar. 25, 2015, 3 pages.

Qiye Wang, "Design and Implementation of SAN Device Access Control in Unified Storage Platform", Master's Theses, Huazhong University of Science & Technology, Wuhan, Jun. 2008, 63 pages (Official Copy only) See Communication Under 37 CFR § 1.98(a) (3).

QQ, "Method of QQ voice chat", Online Available at: https://www.taodocs.com/p-47909082.html, May 25, 2016, 3 pages (Official Copy only) See Communication Under 37 CFR § 1.98(a) (3).

Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.

Samsung, "Control an individual smart device on your watch", Online Available at: https://www.samsung.com/us/support/troubleshooting/TSG01003208/, Nov. 9, 2018, 1 page.

Samsung, "Problems with Smart Things on your Samsung Smartwatch", Online Available at: https://www.samsung.com/us/support/troubleshooting/TSG01003169/#smartthings-error-on-samsung-smartwatch, Nov. 9, 2018, 10 pages.

Samsung, "Samsung—User manual—Galaxy Watch", Online available at: https://content.abt.com/documents/90234/SM-R810NZDAXAR-use.pdf, Aug. 24, 2018, 102 pages.

Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.

PartyShare—turn your Xperia into a jukebox, Available at: https://forum.xda-developers.com/crossdevice-dev/sony/app-partyshare-xperia-jukebox-t2877807, Sep. 15, 2014, 5 pages.

Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.

Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.

Shankland Stephen, "Chrome OS Gets 'Ok Google' Voice Search Control", available online at <http://www.cnet.com/news/chrome-os-gets-ok-google-voice-search-control/>, May 21, 2014, 4 pages.

Smarttricks, "Top 3 Music Player for Android", Available online at: <https://www.youtube.com/watch?v=He7RTn4CL34>, Feb. 22, 2017, 4 pages.

Smith Eddie, "The expert's guide to Instapaper", available online at "http://www.macworld.com/article/1166898/the_experts_guide_to_instapaper.html", May 23, 2012, 8 pages.

Sonos, "Sonos Controller App for iPad Product Guide", Available online at :—https://www.sonos.com/documents/productguides/en/iPadGuide_EN.pdf, Nov. 2014, 47 pages.

Stroud Forrest, "Screen Lock Meaning & Definition", Online Available at: https://www.webopedia.com/definitions/screen-lock, Jan. 30, 2014, 3 pages.

Vanhemert Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.

Wikipedia, "QR code", Available online at: https://en.wikipedia.org/w/index.php?title=OR_code&oldid=452939488, Sep. 28, 2011, pp. 1-9.

Woolsey Amanda, "Apple Watch Tips—How to Add and Play Music", Available online at: <https://www.youtube.com/watch?v=EOQEuqMaoi8>, Apr. 26, 2015, 3 pages.

Extended European Search Report received for European Patent Application No. 24164409.5, mailed on Jun. 14, 2024, 5 pages.

Final Office Action received for U.S. Appl. No. 18/200,480, mailed on Jun. 17, 2024, 19 pages.

Notice of Allowance received for Korean Patent Application No. 10-2023-0001668, mailed on May 22, 2024, 6 pages (2 pages of English Translation and 4 pages of Official Copy).

Office Action received for Chinese Patent Application No. 201910704856.X, mailed on Jun. 11, 2024, 33 pages (1 page of English Translation and 32 pages of Official Copy).

Office Action received for Chinese Patent Application No. 202011083486.1, mailed on May 22, 2024, 15 pages (5 pages of English Translation and 10 pages of Official Copy).

6. Voice chat with friends through QQ, Online available at: https://v.qq.com/x/page/a0166p7xrt0.html, Sep. 22, 2015, 1 page (Official Copy Only). (See Communication under 37 CFR § 1.98(a) (3)}.

Applicant-Initiated Interview Summary received for U.S. Appl. No. 17/181,089, mailed on Apr. 7, 2023, 5 pages.

Applicant-Initiated Interview Summary received for U.S. Appl. No. 17/320,900, mailed on Apr. 17, 2023, 4 pages.

Applicant-Initiated Interview Summary received for U.S. Appl. No. 17/479,974, mailed on Apr. 4, 2023, 2 pages.

Applicant-Initiated Interview Summary received for U.S. Appl. No. 17/483,564, mailed on Apr. 21, 2023, 5 pages.

Applicant-Initiated Interview Summary received for U.S. Appl. No. 17/752,582, mailed on Apr. 17, 2023, 3 pages.

Brief Communication Regarding Oral Proceedings received for European Patent Application No. 20205496.1, mailed on Apr. 19, 2023, 1 page.

Corrected Notice of Allowance received for U.S. Appl. No. 16/922,675, mailed on Apr. 14, 2023, 6 pages.

Corrected Notice of Allowance received for U.S. Appl. No. 17/482,977, mailed on Apr. 24, 2023, 3 pages.

Corrected Notice of Allowance received for U.S. Appl. No. 17/950,900, mailed on Apr. 14, 2023, 2 pages.

Corrected Notice of Allowance received for U.S. Appl. No. 17/950,922, mailed on Apr. 14, 2023, 2 pages.

Corrected Notice of Allowance received for U.S. Appl. No. 18/077,905, mailed on Apr. 10, 2023, 2 pages.

Corrected Notice of Allowance received for U.S. Appl. No. 18/077,905, mailed on Apr. 19, 2023, 2 pages.

Corrected Notice of Allowance received for U.S. Appl. No. 18/077,905, mailed on Apr. 14, 2023, 3 pages.

Extended European Search Report received for European Patent Application No. 23157906.1, mailed on Apr. 6, 2023, 10 pages.

Final Office Action received for U.S. Appl. No. 17/181,089, mailed on Apr. 19, 2023, 13 pages.

Final Office Action received for U.S. Appl. No. 17/747,804, mailed on Apr. 28, 2023, 17 pages.

Intention to Grant received for European Patent Application No. 18728002.9, mailed on Apr. 12, 2023, 9 pages.

International Preliminary Report on Patentability received for PCT Patent Application No. PCT/US2021/048358, mailed on Apr. 6, 2023, 15 pages.

International Search Report and Written Opinion received for PCT Patent Application No. PCT/US2022/044592, mailed on Mar. 14, 2023, 22 pages.

Jiutian Technology, "Windows 8 Chinese version from entry to proficiency", Jan. 1, 2014, 5 pages (Official Copy Only). (See Communication under 37 CFR S 1.98(a) (3)}.

Non-Final Office Action received for U.S. Appl. No. 17/476,404 mailed on Mar. 30, 2023, 29 pages.

Non-Final Office Action received for U.S. Appl. No. 17/479,897, mailed on Apr. 25, 2023, 14 pages.

Non-Final Office Action received for U.S. Appl. No. 17/835,110, mailed on Apr. 3, 2023, 28 pages.

Non-Final Office Action received for U.S. Appl. No. 17/903,946, mailed on Apr. 14, 2023, 17 pages.

Non-Final Office Action received for U.S. Appl. No. 18/077,971, mailed on Apr. 3, 2023, 24 pages.

(56)                    References Cited

OTHER PUBLICATIONS

Notice of Acceptance received for Australian Patent Application No. 2018271366, mailed on Mar. 31, 2023, 3 pages.
Notice of Allowance received for Japanese Patent Application No. 2022-007217, mailed on Apr. 10, 2023, 4 pages (1 page of English Translation and 3 pages of Official Copy).
Notice of Allowance received for U.S. Appl. No. 16/922,675, mailed on Mar. 22, 2023, 8 pages.
Notice of Allowance received for U.S. Appl. No. 17/950,922, mailed on Apr. 5, 2023, 10 pages.
Notice of Allowance received for U.S. Appl. No. 18/077,905, mailed on Mar. 24, 2023, 18 pages.
Office Action received for Australian Patent Application No. 2022241590, mailed on Mar. 17, 2023, 5 pages.
Office Action received for Chinese Patent Application No. 201811539259.8, mailed on Mar. 13, 2023, 16 pages (8 pages of English Transeation and 8 pages of Official Copy).
Office Action received for Chinese Patent Application No. 202110327012.5, mailed on Mar. 16, 2023, 12 pages (7 pages of English Translation and 5 pages of Official Copy).
Office Action received for Chinese Patent Application No. 202110328601.5, mailed on Mar. 24, 2023, 25 pages (15 pages of English Translation and 10 pages of Official Copy).
Office Action received for European Patent Application No. 15714698.6, mailed on Apr. 18, 2023, 14 pages.
Office Action received for Indian Patent Application No. 202015013360, mailed on Mar. 17, 2023, 7 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Result of Consultation received for European Patent Application No. 20205496.1, mailed on April 18, 2023, 3 pages.
Song, Jianhua, "Guidelines for Network", Feb. 29, 2008, 11 pages (Official Copy Only). {See Communication under 37 CFR § 1.98(a)(3)}.
Applicant-Initiated Interview Summary received for U.S. Appl. No. 17/479,974, mailed on Jul. 21, 2023, 2 pages.
Applicant-Initiated Interview Summary received for U.S. Appl. No. 17/483,679, mailed on Aug. 18, 2023, 2 pages.
Applicant-Initiated Interview Summary received for U.S. Appl. No. 17/872,736, mailed on Jul. 25, 2023, 2 pages.
Corrected Notice of Allowance received for U.S. Appl. No. 17/479,897, mailed on Aug. 17, 2023, 2 pages.
Corrected Notice of Allowance received for U.S. Appl. No. 17/483,542, mailed on Aug. 25, 2023, 3 pages.
Corrected Notice of Allowance received for U.S. Appl. No. 17/752,582, mailed on Jul. 17, 2023, 3 pages.
Corrected Notice of Allowance received for U.S. Appl. No. 17/950,900, mailed on Jun. 30, 2023, 2 pages.
Ex-Parte Quayle Action received for U.S. Appl. No. 17/903,946, mailed on Aug. 4, 2023, 4 pages.
Extended European Search Report received for European Patent Application No. 23168537.1, mailed on Jul. 25, 2023, 13 pages.
Garrison, D R., "An Analysis and Evaluation of Audio Teleconferencing to Facilitate Education at a Distance", Online Available at: https://doi.org/10.1080/08923649009526713, American Journal of Distance Education, Jol. 4, No. 3, Sep. 24, 2009, 14 pages.
Intention to Grant received for European Patent Application No. 19203942.8, mailed on Aug. 1 , 2023, 8 pages.
Intention to Grant received for European Patent Application No. 20166552.8, mailed on Jun. 29, 2023, 8 pages.
Intention to Grant received for European Patent Application No. 21728781.2, mailed on Jul. 28, 2023, 9 pages.

International Preliminary Report on Patentability received for PCT Patent Application No. PCT/US2022/014271, mailed on Aug. 10, 2023, 17 pages.
Non-Final Office Action received for U.S. Appl. No. 17/181,089, mailed on Aug. 4, 2023, 15 pages.
Non-Final Office Action received for U.S. Appl. No. 17/684,843, mailed on Aug. 11, 2023, 23 pages.
Non-Final Office Action received for U.S. Appl. No. 17/732,204, mailed on Aug. 4, 2023, 18 pages.
Non-Final Office Action received for U.S. Appl. No. 17/740,104, mailed on Aug. 2, 2023, 15 pages.
Non-Final Office Action received for U.S. Appl. No. 17/950,900, mailed on Dec. 1, 2022, 14 pages.
Notice of Allowance received for Australian Patent Application No. 2022228207, mailed on Jul. 3, 2023, 3 pages.
Notice of Allowance received for Chinese Patent Application No. 201911099970.0, mailed on Jun. 25, 2023, 4 pages (1 page of English Translation and 3 pages of Official Copy).
Notice of Allowance received for Chinese Patent Application No. 202110328601.5, mailed on Jul. 5, 2023, 5 pages (1 page of English Translation and 4 pages of Official Copy).
Notice of Allowance received for U.S. Appl. No. 16/922,675, mailed on Jul. 19, 2023, 13 pages.
Notice of Allowance received for U.S. Appl. No. 17/306,354, mailed on Jul. 24, 2023, 7 pages.
Notice of Allowance received for U.S. Appl. No. 17/320,900, mailed on Aug. 29, 2023, 14 pages.
Notice of Allowance received for U.S. Appl. No. 17/479,897, mailed on Jul. 26, 2023, 7 pages.
Notice of Allowance received for U.S. Appl. No. 17/483,542, mailed on Aug. 11, 2023, 9 pages.
Notice of Allowance received for U.S. Appl. No. 17/483,564, mailed on Jul. 17, 2023, 46 pages.
Notice of Allowance received for U.S. Appl. No. 17/666,971, mailed on Aug. 16, 2023, 8 pages.
Notice of Allowance received for U.S. Appl. No. 17/824,510, mailed on Jul. 19, 2023, 9 pages.
Notice of Allowance received for U.S. Appl. No. 17/867,317, mailed on Aug. 30, 2023, 6 pages.
Notice of Allowance received for U.S. Appl. No. 17/867,317, mailed on Jul. 6, 2023, 11 pages.
Notice of Allowance received for U.S. Appl. No. 17/872,736, mailed on Aug. 21, 2023, 6 pages.
Notice of Allowance received for U.S. Appl. No. 17/872,736, mailed on Aug. 30, 2023, 4 pages.
Office Action received for Australian Patent Application No. 2022218517, mailed on Jul. 24, 2023, 6 pages.
Office Action received for Australian Patent Application No. 2022218540, mailed on Aug. 3, 2023, 5 pages.
Office Action received for Australian Patent Application No. 2022241590, mailed on Aug. 15, 2023, 6 pages.
Office Action received for Chinese Patent Application No. 202110328597.2, mailed on Jul. 18, 2023, 21 pages (6 pages of English Translation and 15 pages of Official Copy).
Office Action received for Chinese Patent Application No. 202110328602.X, mailed on Jun. 29, 2023, 27 pages (18 pages of English Translation and 9 pages of Official Copy).
Office Action received for Japanese Patent Application No. 2020-184605, mailed on Jul. 3, 2023, 6 pages (3 pages of English Translation and 3 pages of Official Copy).
Office Action received for Korean Patent Application No. 10-2022-0053111, mailed on Jun. 29, 2023, 7 pages (3 pages of English Translation and 4 pages of Official Copy).
Office Action received for Korean Patent Application No. 10-2022-7033655, mailed on Jul. 27, 2023, 5 pages (2 pages of English Translation and 3 pages of Official Copy).
Shangmeng, Li, "The Design and Implementation of Mobile Terminal System of Multimedia Conference Based on Symbian Operating System", China Academic Journal Electronic Publishing House, Online available at: http://www.cnki.net, 2011, 66 pages (Official Copy only). {See Communication under 37 CFR § 1.98(a) (3)}.
Applicant-Initiated Interview Summary received for U.S. Appl. No. 17/483,679, mailed on Dec. 18, 2023, 2 pages.

(56) References Cited

OTHER PUBLICATIONS

Final Office Action received for U.S. Appl. No. 18/067,350, mailed on Dec. 13, 2023, 44 pages.

Intention to Grant received for European Patent Application No. 15714698.6, mailed on Dec. 8, 2023.

Intention to Grant received for European Patent Application No. 21728781.2, mailed on Dec. 12, 2023.

Notice of Allowance received for U.S. Appl. No. 17/483,542, mailed on Dec. 20, 2023, 6 pages.

Notice of Allowance received for U.S. Appl. No. 17/666,971, mailed on Dec. 15, 2023, 8 pages.

Decision to Grant received for European Patent Application No. 21166718.3, mailed on Aug. 8, 2024, 2 pages.

Examiner-Initiated Interview Summary received for U.S. Appl. No. 18/234,613, mailed on Aug. 9, 2024, 2 pages.

Final Office Action received for U.S. Appl. No. 18/088,309, mailed on Aug. 1, 2024, 16 pages.

Notice of Allowance received for Japanese Patent Application No. 2023-097196, mailed on Jul. 29, 2024, 4 pages (1 page of English Translation and 3 pages of Official Copy).

Notice of Allowance received for Japanese Patent Application No. 2023-571161, mailed on Jul. 30, 2024, 3 pages (1 page of English Translation and 2 pages of Official Copy).

Supplemental Notice of Allowance received for U.S. Appl. No. 18/229,989, mailed on Aug. 7, 2024, 2 pages.

Applicant-Initiated Interview Summary received for U.S. Appl. No. 17/484,899, mailed on Jun. 24, 2024, 4 pages.

Applicant-Initiated Interview Summary received for U.S. Appl. No. 17/970,417, mailed on Jun. 26, 2024, 2 pages.

Applicant-Initiated Interview Summary received for U.S. Appl. No. 18/229,989, mailed on Jun. 28, 2024, 2 pages.

Brief Communication Regarding Oral Proceedings received for European Patent Application No. 21197457.1, mailed on Jun. 19, 2024, 1 page.

Create Confirmation Dialog Box—Matlab Ulconfirm, Online available at: https://www.mathworks.com/help/matlab/ref/uiconfirm.html, 2017, 19 pages.

Non-Final Office Action received for U.S. Appl. No. 18/234,613, mailed on Jul. 1, 2024, 19 pages.

Notice of Allowance received for Japanese Patent Application No. 2022-116534, mailed on Jun. 24, 2024, 4 pages (1 page of English Translation and 3 pages of Official Copy).

Office Action received for Australian Patent Application No. 2023201057, mailed on Jun. 19, 2024, 5 pages.

Office Action received for Chinese Patent Application No. 202210384721.1, mailed on May 23, 2024, 26 pages (14 pages of English Translation and 12 pages of Official Copy).

Office Action received for European Patent Application No. 22792995.7, mailed on Jun. 24, 2024, 6 pages.

Office Action received for European Patent Application No. 23190753.6, mailed on Jun. 25, 2024, 10 pages.

Office Action received for Japanese Patent Application No. 2023-097196, mailed on Jun. 7, 2024, 7 pages (3 pages of English Translation and 4 pages of Official Copy).

Window confirm (), Online available at: https://www.w3schools.com/jsref/met_win_confirm.asp, 2014, 5 pages.

Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.

Cosmic Mook, "Line laboratory, New function Exhaustive Coverage! Line 120% Application Guide, Inc.", Jan. 24, 2018, 7 pages. (Official Copy Only). {See Communication Under Rule 37 CFR § 1.98(a) (3)}.

Myoko Mori, "Line Perfect Guide Book [Revised Version]", Sotec Co. Ltd., Dec. 31, 2013, 5 pages. (Official Copy Only). {See Communication Under Rule 37 CFR § 1.98(a) (3)}.

Octoba, "Enjoy free calls with Line! Part 2", retrieved from: https://web.archive.org/web/20170923013859/https://octoba.net/ archives/line-call2.html, Sep. 23, 2017, 13 pages. (Official Copy Only). {See Communication Under Rule 37 CFR § 1.98(a) (3)}.

Weifeng.com, "Install and use Apple Pay on your Apple Watch", Available online at: https://www.mpaypass.com.cn/news/201504/28093555.html, Apr. 28, 2015, 3 pages (Official Copy Only). {See Communication Under Rule 37 CFR § 1.98(a) (3)}.

Xiaokai, "Apple senior executive", Apple Watch mobile payment is convenient and fast, Available online at: https://it.hebei.com.cn/system/2015/03/09/015101153.shtml, Mar. 9, 2015, 2 pages (Official Copy). {See Communication Under Rule 37 CFR § 1.98(a) (3)}.

Cosmic Mook, "Line laboratory, New function Exhaustive Coverage! Line 120% Application Guide, Inc.", Jan. 24, 2018, 7 pages.

Myoko Mori, "Line Perfect Guide Book [Revised Version]", Sotec Co. Ltd., Dec. 31, 2013, 5 pages.

Octoba, "Enjoy free calls with Line! Part 2", retrieved from: https://web.archive.org/web/20170923013859/https://octoba.net/archives/line-call2.html, Sep. 23, 2017, 13 pages.

weifeng.com, "Install and use Apple Pay on your Apple Watch", Available online at: https://www.mpaypass.com.cn/news/201504/28093555.html, Apr. 28, 2015, 3 pages.

Xiaokai, "Apple senior executive", Apple Watch mobile payment is convenient and fast, Available online at: https://it.hebei.com.cn/system/2015/03/09/015101153.shtml, Mar. 9, 2015, 2 pages.

Advisory Action received for U.S. Appl. No. 17/479,974, mailed on May 6, 2024, 4 pages.

Notice of Allowance received for Japanese Patent Application No. 2022-129377, mailed on Apr. 26, 2024, 4 pages (1 page of English Translation and 3 pages of Official Copy).

Intention to Grant received for European Patent Application No. 21166718.3, mailed on Mar. 25, 2024, 8 pages.

International Search Report and Written Opinion received for PCT Patent Application No. PCT/US2023/032792, mailed on Jan. 19, 2024, 15 pages.

International Search Report and Written Opinion received for PCT Patent Application No. PCT/US2023/032911, mailed on Jan. 4, 2024, 18 pages.

Invitation to Pay Search Fees received for European Patent Application No. 21789897.2, mailed on Mar. 14, 2024, 3 pages.

Non-Final Office Action received for U.S. Appl. No. 17/484,899, mailed on Mar. 21, 2024, 42 pages.

Non-Final Office Action received for U.S. Appl. No. 18/200,480, mailed on Mar. 6, 2024, 17 pages.

Office Action received for Chinese Patent Application No. 201911128105.4, mailed on Mar. 19, 2024, 9 pages (1 page of English Translation and 8 pages of Official Copy).

Office Action received for Japanese Patent Application No. 2023-028786, mailed on Mar. 22, 2024, 10 pages (5 pages of English Translation and 5 pages of Official Copy).

Office Action received for Korean Patent Application No. 10-2023-7040599, mailed on Mar. 12, 2024, 6 pages (2 pages of English Translation and 4 pages of Official Copy).

Applicant-Initiated Interview Summary received for U.S. Appl. No. 18/088,309, mailed on Jun. 7, 2024, 2 pages.

Avery et al., "Kinect", Wikipedia, Feb. 26, 2015, 14 pages.

Brief Communication Regarding Oral Proceedings received for European Patent Application No. 21197457.1, mailed on May 23, 2024, 5 pages.

Extended European Search Report received for European Patent Application No. 24160234.1, mailed on May 28, 2024, 6 pages.

Non-Final Office Action received for U.S. Appl. No. 17/747,804, mailed on Jun. 4, 2024, 20 pages.

Non-Final Office Action received for U.S. Appl. No. 18/229,989, mailed on May 31, 2024, 18 pages.

Notice of Acceptance received for Australian Patent Application No. 2024202768, mailed on Jun. 4, 2024, 3 pages.

Notice of Allowance received for Chinese Patent Application No. 201911128105.4, mailed on May 24, 2024, 2 pages (1 page of English Translation and 1 page of Official Copy).

Notice of Allowance received for U.S. Appl. No. 17/684,843, mailed on Jun. 5, 2024, 5 pages.

Office Action received for European Patent Application No. 21207736.6, mailed on May 31, 2024, 4 pages.

(56)                    References Cited

OTHER PUBLICATIONS

Office Action received for European Patent Application No. 22705232. 1. mailed on May 27, 2024, 7 pages.

Office Action received for Japanese Patent Application No. 2023-571161, mailed on May 28, 2024, 4 pages (2 pages of English Translation and 2 pages of Official Copy).

Advisory Action received for U.S. Appl. No. 17/747,804, mailed on Jun. 23, 2023, 6 pages.

Applicant Initiated Interview Summary received for U.S. Appl. No. 17/666,971, mailed on Jun. 9, 2023, 2 pages.

Applicant Initiated Interview Summary received for U.S. Appl. No. 17/824,510, mailed on Jun. 16, 2023, 4 pages.

Applicant-Initiated Interview Summary received for U.S. Appl. No. 17/181,089, mailed on May 16, 2023, 4 pages.

Applicant-Initiated Interview Summary received for U.S. Appl. No. 17/306,354, mailed on Jun. 28, 2023, 3 pages.

Applicant-Initiated Interview Summary received for U.S. Appl. No. 17/476,404, mailed on Jun. 2, 2023, 2 pages.

Applicant-Initiated Interview Summary received for U.S. Appl. No. 17/479,897, mailed on Jun. 12, 2023, 2 pages.

Applicant-Initiated Interview Summary received for U.S. Appl. No. 17/483,542, mailed on May 22, 2023, 3 pages.

Applicant-Initiated Interview Summary received for U.S. Appl. No. 17/483,564, mailed on Jun. 21, 2023, 4 pages.

Applicant-Initiated Interview Summary received for U.S. Appl. No. 17/483,679, mailed on May 19, 2023, 3 pages.

Applicant-Initiated Interview Summary received for U.S. Appl. No. 17/747,804, mailed on May 31, 2023, 4 pages.

Applicant-Initiated Interview Summary received for U.S. Appl. No. 17/867,317, mailed on May 30, 2023, 4 pages.

Corrected Notice of Allowance received for U.S. Appl. No. 18/077,905, mailed on May 4, 2023, 2 pages.

Decision to Grant received for Danish Patent Applcation No. PA202270464, mailed on May 9, 2023, 1 page.

Decision to Refuse received for European Patent Application No. 20205496.1, mailed on May 12, 2023, 16 pages.

Examiner Interview Summary received for U.S. Appl. No. 17/903,946, mailed on Jun. 28, 2023, 2 pages.

Final Office Acton received for U.S. Appl. No. 17/479,974, mailed on Jun. 28, 2023, 32 pages.

Final Office Acton received for U.S. Appl. No. 17/483,564, mailed on May 25, 2023, 26 pages.

Final Office Action received for U.S. Appl. No. 17/483,679, mailed on Jun. 13, 2023, 33 pages.

Final Office Action received for U.S. Appl. No. 17/666,971, mailed on May 12, 2023, 29 pages.

International Search Report and Written Opinion received for PCT Patent Application No. PCT/US2023/017280, mailed on Jun. 26, 2023, 20 pages.

Minutes of the Oral Proceedings received for European Patent Application No. 20205496.1, mailed on May 9, 2023, 7 pages.

Non-Final Office Action received for U.S. Appl. No. 17/306,354, mailed on Jun. 2, 2023, 21 pages.

Non-Final Office Action received for U.S. Appl. No. 17/484,899, mailed on Jun. 14, 2023, 41 pages.

Non-Final Office Action received for U.S. Appl. No. 17/824,510, mailed on May 22, 2023, 15 pages.

Non-Final Office Action received for U.S. Appl. No. 17/872,736, mailed on May 11, 2023, 17 pages.

Notice of Acceptance received for Australian Patent Application No. 2022201532, mailed on May 22, 2023, 3 pages.

Notice of Allowance received for Japanese Patent Application No. 2021-206121 , mailed on May 15, 2023, 4 pages (1 page of English Translation and 3 pages of Official Copy).

Notice of Allowance received for U.S. Appl. No. 17/519,025, mailed on Jun. 22, 2023, 7 pages.

Notice of Allowance received for U.S. Appl. No. 17/752,582, mailed on Jun. 13, 2023, 18 pages.

Notice of Allowance received for U.S. Appl. No. 17/950,900, mailed on Jun. 16, 2023, 6 pages.

Office Action received for Australian Patent Application No. 2022218517, mailed on Apr. 27, 2023, 7 pages.

Office Action received for Australian Patent Application No. 2022228207, mailed on Apr. 28, 2023, 3 pages.

Office Action received for Australian Patent Application No. 2022241590, mailed on Jun. 7, 2023, 7 pages.

Office Action received for Chinese Patent Application No. 201811539259.8, mailed on May 24, 2023, 22 pages (2 pages of English Translation and 20 pages of Official Copy).

Office Action recelved for Chinese Patent Application No. 201911099970.0, mailed on Feb. 23, 2023, 15 pages (5 pages of English Transation and 10 pages of Official Copy).

Office Action received for Chinese Patent Application No. 202110328597.2, mailed on May 15, 2023, 13 pages (6 pages of English Translation and 7 pages of Official Copy).

Office Action received for Chinese Patent Application No. 202111652452.4, mailed on May 19, 2023, 15 pages (8 pages of English Translation and 7 pages of Official Copy).

Office Action received for European Patent Application No. 18779093. 6, mailed on Jun. 28, 2023, 4 pages.

Office Action received for European Patent Application No. 21197457. 1, mailed on May 30, 2023, 8 pages.

Corrected Notice of Allowance received for U.S. Appl. No. 17/970,417, mailed on Feb. 20, 2025, 2 pages.

Corrected Notice of Allowance received for U.S. Appl. No. 18/389,655, mailed on Feb. 24, 2025, 2 pages.

Decision to Grant received for Japanese Patent Application No. 2024-173274, mailed on Feb. 10, 2025, 3 pages (1 page of English Translation and 2 pages of Official Copy).

Examiner-Initiated Interview Summary received for U.S. Appl. No. 18/499,848, mailed on Feb. 14, 2025, 3 pages.

Intention to Grant received for European Patent Application No. 21789897.2, mailed on Feb. 13, 2025, 9 pages.

Intention to Grant received for European Patent Application No. 22792995.7, mailed on Feb. 17, 2025, 9 pages.

Non-Final Office Action received for U.S. Appl. No. 17/745,680, mailed on Feb. 20, 2025, 28 pages.

Office Action received for Chinese Patent Application No. 202410030102.1, mailed on Jan. 22, 2025, 14 pages (8 pages of English Translation and 6 pages of Official Copy).

Office Action received for European Patent Application No. 22705232. 1, mailed on Feb. 4, 2025, 10 pages.

Office Action received for European Patent Application No. 24160234. 1, mailed on Feb. 20, 2025, 3 pages.

Applicant-Initiated Interview Summary received for U.S. Appl. No. 18/088,309, mailed on Aug. 27, 2024, 2 pages.

Non-Final Office Action received for U.S. Appl. No. 18/389,655, mailed on Aug. 23, 2024, 23 pages.

Notice of Allowance received for Chinese Patent Application No. 202211081603.X, mailed on Jul. 29, 2024, 2 pages (1 page of English Translation and 1 page of Official Copy).

Notice of Allowance received for U.S. Appl. No. 17/484,899, mailed on Aug. 26, 2024, 21 pages.

Notice of Allowance received for U.S. Appl. No. 17/903,946, mailed on Aug. 27, 2024, 5 pages.

Notice of Allowance received for U.S. Appl. No. 17/978,930, mailed on Aug. 19, 2024, 9 pages.

Office Action received for Chinese Patent Application No. 202311321231.8, mailed on Jul. 28, 2024, 9 pages (5 pages of English Translation and 4 pages of Official Copy).

Result of Consultation received for European Patent Application No. 22201007.6, mailed on Aug. 20, 2024, 3 pages.

That Guy who Loves METV and SSBB Mods, "Kinect Party Gameplay", Available online at: https://youtu.be/bkbOlzfyLzc?si=QAAKh_V4aqY0iegL, Oct. 20, 2021, 2 pages.

Xbox, "Kinect Tips, Part 3: Gesture Controls", Available online at: https://youtu.be/VXhhE-l96qQ?si=gLmHbp9jOm-w0fNW, May 7, 2014, 3 pages.

Examiner's Answer to Appeal Brief received for U.S. Appl. No. 17/747,804, mailed on Mar. 5, 2025, 23 pages.

Final Office Action received for U.S. Appl. No. 18/535,820, mailed on Feb. 27, 2025, 35 pages.

(56) References Cited

OTHER PUBLICATIONS

Notice of Allowance received for Japanese Patent Application No. 2023-147860, mailed on Feb. 25, 2025, 4 pages (1 page of English Translation and 3 pages of Official Copy).
Office Action received for Chinese Patent Application No. 202110327012.5, mailed on Feb. 10, 2025, 22 pages (13 pages of English Translation and 9 pages of Official Copy).
Office Action received for European Patent Application No. 22733778.9, mailed on Feb. 20, 2025, 4 pages.
Examiner-Initiated Interview Summary received for U.S. Appl. No. 17/950,868, mailed on Jul. 5, 2024, 2 pages.
Intention to Grant received for European Patent Application No. 21197457.1, mailed on Jul. 9, 2024, 12 pages.
Minutes of the Oral Proceedings received for European Patent Application No. 21197457.1, mailed on Jul. 3, 2024, 9 pages.
Notice of Allowance received for Chinese Patent Application No. 202010728711.6, mailed on Jul. 1, 2024, 2 pages (1 page of English Translation and 1 page of Official Copy).
Notice of Allowance received for Korean Patent Application No. 10-2022-0053111, mailed on Jun. 25, 2024, 7 pages (2 pages of English Translation and 5 pages of Official Copy).
Notice of Allowance received for Korean Patent Application No. 10-2023-7040599, mailed on Jun. 26, 2024, 7 pages (2 pages of English Translation and 5 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202311185909.4, mailed on Jun. 12, 2024, 18 pages (10 pages of English Translation and 8 pages of Official Copy).
Office Action received for Chinese Patent Application No. 202311305998.1, mailed on May 29, 2024, 13 pages (7 pages of English Translation and 6 pages of Official Copy).
Office Action received for Japanese Patent Application No. 2024-003876, mailed on Jul. 2, 2024, 3 pages (1 page of English Translation and 2 pages of Official Copy).
Corrected Notice of Allowance received for U.S. Appl. No. 17/483,542, mailed on Feb. 5, 2024, 3 pages.
Decision to Refuse received for Japanese Patent Application No. 2022-116534, mailed on Jan. 29, 2024, 5 pages (2 pages of English Translation and 3 pages of Official Copy).
Extended European Search Report received for European Patent Application No. 23203414.0, mailed on Jan. 26, 2024, 10 pages.
Final Office Action received for U.S. Appl. No. 17/483,679, mailed on Feb. 6, 2024, 45 pages.
Notice of Acceptance received for Australian Patent Application No. 2023248185, mailed on Jan. 23, 2024, 3 pages.
Office Action received for Australian Patent Application No. 2023201057, mailed on Jan. 25, 2024, 6 pages.
Office Action received for Indian Patent Application No. 202117048581, mailed on Feb. 1, 2024, 6 pages.
13 questions and answers about using Apple Pay online, online available at: http://www.it528.com/apple/1356.html, Feb. 18, 2016, 5 pages.
Issued by the Japanese Patent Office in related Patent Application No. 2015-095183, on Apr. 21, 2017.
Issued by the Taiwanese Patent Office in related Patent Application No. 104108223, on Jan. 10, 2017.
Issued by the Taiwanese Patent Office in related Patent Application No. 104114953, on Oct. 17, 2017.
Issued by the Taiwanese Patent Office in related Patent Application No. 104117041, on Feb. 24, 2017.
Issued by the Hong Kong Patent Office in related Patent Application No. 151051633, on Jun. 5, 2015,.
Han Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages.

Kimura Ryoji, "Keynote presentation practice guide for iPad & iPhone", K.K. Rutles, first edition, Feb. 29, 2012, 4 pages.
Pu Fang, "Research on Location-aware Service in Pervasive Computing", Issue No. 7, Information Technology Series, China Doctoral Dissertations, Jul. 15, 2008, 140 pages.
Qiye Wang, "Design and Implementation of SAN Device Access Control in Unified Storage Platform", Master's Theses, Huazhong University of Science & Technology, Wuhan, Jun. 2008, 63 pages.
QQ, "Method of QQ voice chat", Online Available at: https://www.taodocs.com/p-47909082.html, May 25, 2016, 3 pages.
Applicant-Initiated Interview Summary received for U.S. Appl. No. 17/484,899, mailed on Feb. 14, 2024, 8 pages.
Decision to Grant received for European Patent Application No. 21728781.2, mailed on Feb. 8, 2024, 3 pages.
Non-Final Office Action received for U.S. Appl. No. 17/978,930, mailed on Feb. 12, 2024, 25 pages.
Notice of Allowance received for U.S. Appl. No. 17/684,843, mailed on Feb. 14, 2024, 8 pages.
Office Action received for European Patent Application No. 22198071.7, mailed on Feb. 13, 2024, 4 pages.
Advisory Action received for U.S. Appl. No. 14/263,889, mailed on May 26, 2016, 4 pages.
Advisory Action received for U.S. Appl. No. 15/725,868, mailed on Dec. 10, 2018, 5 pages.
Advisory Action received for U.S. Appl. No. 16/666,073, mailed on Jul. 7, 2020, 5 pages.
Advisory Action received for U.S. Appl. No. 17/950,868, mailed on Sep. 24, 2024, 3 pages.
Advisory Action received for U.S. Appl. No. 17/970,417, mailed on Dec. 12, 2024, 7 pages.
Applicant-Initiated Interview Summary received for U.S. Appl. No. 14/263,889, mailed on Apr. 15, 2016, 3 pages.
Applicant-Initiated Interview Summary received for U.S. Appl. No. 15/725,868, mailed on Jul. 25, 2018, 3 pages.
Applicant-Initiated Interview Summary received for U.S. Appl. No. 15/725,868, mailed on May 13, 2019, 3 pages.
Applicant-Initiated Interview Summary received for U.S. Appl. No. 15/725,868, mailed on Nov. 20, 2018, 3 pages.
Applicant-Initiated Interview Summary received for U.S. Appl. No. 17/970,417, mailed on Nov. 4, 2024, 2 pages.
Applicant-Initiated Interview Summary received for U.S. Appl. No. 17/991,708, mailed on Dec. 16, 2024, 5 pages.
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Aug. 27, 2024, 2 pages.
Applicant-Initiated Interview Summary received for U.S. Appl. No. 18/140,449, mailed on Nov. 26, 2024, 2 pages.
Applicant-Initiated Interview Summary received for U.S. Appl. No. 18/389,655, mailed on Sep. 20, 2024, 6 pages.
Baudisch et al., "Back-of-device interaction allows creating very small touch devices", Chi 2009—Digital Life, New World:Conference Proceedings and Extended Abstracts; The 27th Annual Chi Conference on Human Factors in Computing Systems. Available online at <http://dx.doi.org/10.1145/1518701.1518995>, Apr. 9, 2009, pp. 1923-1932.
Corrected Notice of Allowance received for U.S. Appl. No. 15/725,868, mailed on Aug. 23, 2019, 2 pages.
Corrected Notice of Allowance received for U.S. Appl. No. 15/725,868, mailed on Sep. 30, 2019, 3 pages.
Corrected Notice of Allowance received for U.S. Appl. No. 16/666,073, mailed on Apr. 6, 2021, 3 pages.
Corrected Notice of Allowance received for U.S. Appl. No. 16/666,073, mailed on Apr. 26, 2021, 4 pages.
Corrected Notice of Allowance received for U.S. Appl. No. 16/666,073, mailed on Feb. 22, 2021, 3 pages.
Corrected Notice of Allowance received for U.S. Appl. No. 16/666,073, mailed on Mar. 11, 2021, 3 pages.
Corrected Notice of Allowance received for U.S. Appl. No. 17/684,843, mailed on Oct. 7, 2024, 2 pages.
Corrected Notice of Allowance received for U.S. Appl. No. 17/745,680, mailed on Nov. 20, 2024, 2 pages.

(56)                References Cited

OTHER PUBLICATIONS

Corrected Notice of Allowance received for U.S. Appl. No. 17/950,868, mailed on Nov. 27, 2024, 3 pages.
Corrected Notice of Allowance received for U.S. Appl. No. 18/138,348, mailed on Nov. 27, 2024, 2 pages.
Corrected Notice of Allowance received for U.S. Appl. No. 18/234,613, mailed on Nov. 20, 2024, 2 pages.
Corrected Notice of Allowance received for U.S. Appl. No. 18/234,613, mailed on Oct. 28, 2024, 2 pages.
Decision on Appeal received for Korean Patent Application No. 10-2020-7034959, mailed on Jul. 25, 2022, 28 pages (5 pages of English Translation and 23 pages of Official Copy).
Decision to Grant received for European Patent Application No. 10763539.3, mailed on Jul. 19, 2018, 3 pages.
Decision to Grant received for European Patent Application No. 18188433.9, mailed on Aug. 13, 2020, 3 pages.
Decision to Refuse received for Japanese Patent Application No. 2013-503731, mailed on Jun. 23, 2014, 4 pages (2 pages of English Translation and 2 pages of Official Copy).
Examiner's Answer to Appeal Brief received for U.S. Appl. No. 17/479,974, mailed on Oct. 24, 2024, 18 pages.
Examiner's Answer to Appeal Brief received for U.S. Appl. No. 18/200,480, mailed on Dec. 13, 2024, 9 pages.
Examiner's Pre-Review Report received for Japanese Patent Application No. 2014-212867, mailed on Nov. 4, 2016, 5 pages (2 pages of English Translation and 3 pages of Official Copy).
Extended European Search Report received for European Patent Application No. 18188433.9, mailed on Oct. 29, 2018, 8 pages.
Extended European Search Report received for European Patent Application No. 24197852.7, mailed on Dec. 5, 2024, 11 pages.
Final Office Action received for U.S. Appl. No. 12/794,766, mailed on Nov. 26, 2012, 23 pages.
Final Office Action received for U.S. Appl. No. 14/263,889, mailed on Jan. 4, 2016, 9 pages.
Final Office Action received for U.S. Appl. No. 15/725,868, mailed on Sep. 27, 2018, 25 pages.
Final Office Action received for U.S. Appl. No. 16/666,073, mailed on Apr. 17, 2020, 18 pages.
Final Office Action received for U.S. Appl. No. 17/332,829, mailed on Feb. 6, 2023, 19 pages.
Final Office Action received for U.S. Appl. No. 18/067,350, mailed on Oct. 31, 2024, 44 pages.
Final Office Action received for U.S. Appl. No. 18/138,348, mailed on Oct. 18, 2024, 10 pages.
Final Office Action received for U.S. Appl. No. 18/140,449, mailed on Oct. 18, 2024, 11 pages.
Intention to Grant received for European Patent Application No. 10763539.3, mailed on Mar. 15, 2018, 6 pages.
Intention to Grant received for European Patent Application No. 18188433.9, mailed on Apr. 6, 2020, 9 pages.
Intention to Grant received for European Patent Application No. 21197457.1, mailed on Nov. 21, 2024, 12 pages.
Intention to Grant received for European Patent Application No. 21197457.1, mailed on Oct. 24, 2024, 12 pages.
Intention to Grant received for European Patent Application No. 21789897.2, mailed on Nov. 12, 2024, 9 pages.
Intention to Grant received for European Patent Application No. 22734711.9, mailed on Sep. 13, 2024, 7 pages.
Intention to Grant received for European Patent Application No. 23158566.2, mailed on Sep. 30, 2024, 8 pages.
Intention to Grant received for European Patent Application No. 23168537.1, mailed on Dec. 2, 2024, 8 pages.
Intention to Grant received for European Patent Application No. 24160234.1, mailed on Nov. 4, 2024, 9 pages.
International Preliminary Report on Patentability received for PCT Patent Application No. PCT/US2010/050311, mailed on Oct. 18, 2012, 11 pages.
International Preliminary Report on Patentability received for PCT Patent Application No. PCT/US2023/017280, mailed on Oct. 17, 2024, 15 pages.

International Preliminary Report on Patentability received for PCT Patent Application No. PCT/US2023/020569, mailed on Nov. 21, 2024, 16 pages.
International Search Report and Written Opinion received for PCT Patent Application No. PCT/US2010/050311, mailed on Aug. 24, 2011, 15 pages.
International Search Report and Written Opinion received for PCT Patent Application No. PCT/US2024/023231, mailed on Oct. 23, 2024, 24 pages.
Invitation to Pay Additional Fees and Partial International Search Report received for PCT Patent Application No. PCT/US2010/ 050311, mailed on Dec. 21, 2010, 6 pages.
Invitation to Pay Additional Fees and Partial International Search Report received for PCT Patent Application No. PCT/US2024/ 023231, mailed on Aug. 29, 2024, 17 pages.
Koyama, Kaori, "Mac Fan Macintosh Master Book Mac OS X v10.4 "Tiger" & iLife", '06 version, Mainichi Communications Inc. Nobuyuki Nakagawa, Jul. 9, 2007, 4 pages (Official Copy Only) {See Communication Under Rule 37 CFR § 1.98(a) (3)}.
Lin, Wei, "Can Apple Watch Lead the Wearable Market", Financial Economics, Issue 23, Dec. 31, 2014, 1 page (Official Copy Only) {See Communication Under Rule 37 CFR § 1.98(a) (3)}.
Loomba et al., "Energy-aware collaborative sensing for multiple applications in mobile cloud computing", Sustainable Computing: Informatics and Systems, Issue 8, Online Available at: https://www. sciencedirect.com/science/article/abs/pii/S2210537915000384?via% 3Dihub, Dec. 31, 2015, pp. 47-59.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.
Non-Final Office Action received for U.S. Appl. No. 12/794,768, mailed on Oct. 10, 2012, 14 pages.
Non-Final Office Action received for U.S. Appl. No. 14/263,889, mailed on Jul. 2, 2015, 9 pages.
Non-Final Office Action received for U.S. Appl. No. 14/263,889, mailed on Jul. 26, 2016, 11 pages.
Non-Final Office Action received for U.S. Appl. No. 15/725,868, mailed on Apr. 27, 2018, 17 pages.
Non-Final Office Action received for U.S. Appl. No. 15/725,868, mailed on Feb. 12, 2019, 26 pages.
Non-Final Office Action received for U.S. Appl. No. 16/666,073, mailed on Dec. 10, 2019, 16 pages.
Non-Final Office Action received for U.S. Appl. No. 17/332,829, mailed on Aug. 1, 2022, 17 pages.
Non-Final Office Action received for U.S. Appl. No. 17/991,708, mailed on Oct. 22, 2024, 20 pages.
Non-Final Office Action received for U.S. Appl. No. 18/140,449, mailed on May 24, 2024, 19 pages.
Non-Final Office Action received for U.S. Appl. No. 18/535,820, mailed on Sep. 25, 2024, 27 pages.
Notice of Acceptance received for Australian Patent Application No. 2010350749, mailed on Jan. 13, 2015, 3 pages.
Notice of Acceptance received for Australian Patent Application No. 2015201127, mailed on Feb. 14, 2017, 3 pages.
Notice of Acceptance received for Australian Patent Application No. 2023266353, mailed on Oct. 1, 2024, 3 pages.
Notice of Acceptance received for Australian Patent Application No. 2024200283, mailed on Nov. 13, 2024, 3 pages.
Notice of Allowance received for Brazilian Patent Application No. BR112012025746-3, mailed on Jul. 6, 2021, 3 pages (1 page of English Translation and 2 pages of Official Copy).
Notice of Allowance received for Chinese Patent Application No. 201010602653.9, mailed on Nov. 15, 2014, 2 pages (1 page of English Translation and 1 page of Official Copy).
Notice of Allowance received for Chinese Patent Application No. 2010106600623.4, mailed on Aug. 11, 2014, 4 pages (1 page of English Translation and 3 pages of Official Copy).
Notice of Allowance received for Chinese Patent Application No. 201410575145.4, mailed on May 10, 2018, 3 pages (1 page of English Translation and 2 pages of Official Copy).

(56) References Cited

OTHER PUBLICATIONS

Notice of Allowance received for Chinese Patent Application No. 201910704856.X, mailed on Sep. 30, 2024, 4 pages (1 page of English Translation and 3 pages of Official Copy).

Notice of Allowance received for Chinese Patent Application No. 202010728844.3, mailed on Sep. 29, 2024, 2 pages (1 page of English Translation and 1 page of Official Copy).

Notice of Allowance received for Chinese Patent Application No. 202210384721.1, mailed on Nov. 8, 2024, 4 pages (1 page of English Translation and 3 pages of Official Copy).

Notice of Allowance received for Japanese Patent Application No. 2014-212867, mailed on Mar. 30, 2018, 3 pages (1 page of English Translation and 2 pages of Official Copy).

Notice of Allowance received for Japanese Patent Application No. 2016-151497, mailed on Jun. 4, 2018, 4 pages (1 page of English Translation and 3 pages of Official Copy).

Notice of Allowance received for Japanese Patent Application No. 2019-182484, mailed on Aug. 30, 2021, 4 pages (1 page of English Translation and 3 pages of Official Copy).

Notice of Allowance received for Japanese Patent Application No. 2021-154573, mailed on Nov. 11, 2022, 4 pages (1 page of English Translation and 3 pages of Official Copy).

Notice of Allowance received for Japanese Patent Application No. 2022-197327, mailed on May 31, 2024, 4 pages (1 page of English Translation and 3 pages of Official Copy).

Notice of Allowance received for Japanese Patent Application No. 2023-028786, mailed on Dec. 2, 2024, 4 pages (1 page of English Translation and 3 pages of Official Copy).

Notice of Allowance received for Korean Patent Application No. 10-2012-7028535, mailed on Jul. 16, 2014, 5 pages (1 page of English Translation and 4 pages of Official Copy).

Notice of Allowance received for Korean Patent Application No. 10-2014-7005164, mailed on Dec. 21, 2014, 4 pages (1 page of English Translation and 3 pages of Official Copy).

Notice of Allowance received for Korean Patent Application No. 10-2014-7029838, mailed on Jul. 28, 2015, 4 pages (1 page of English Translation and 3 pages of Official Copy).

Notice of Allowance received for Korean Patent Application No. 10-2015-7007050, mailed on Feb. 26, 2016, 4 pages (1 page of English Translation and 3 pages of Official Copy).

Notice of Allowance received for Korean Patent Application No. 10-2016-7014580, mailed on Dec. 17, 2019, 6 pages (2 pages of English Translation and 4 pages of Official Copy).

Notice of Allowance received for Korean Patent Application No. 10-2018-7036975, mailed on Sep. 18, 2019, 6 pages (2 pages of English Translation and 4 pages of Official Copy).

Notice of Allowance received for Korean Patent Application No. 10-2020-7002845, mailed on Sep. 24, 2020, 5 pages (1 page of English Translation and 4 pages of Official Copy).

Notice of Allowance received for Korean Patent Application No. 10-2023-7005442, mailed on Jan. 22, 2024, 8 pages (2 pages of English Translation and 6 pages of Official Copy).

Notice of Allowance received for Korean Patent Application No. 10-2023-7018775, mailed on Sep. 30, 2024, 7 pages (2 pages of English Translation and 5 pages of Official Copy).

Notice of Allowance received for Korean Patent Application No. 10-2023-7040599, mailed on Oct. 18, 2024, 7 pages (2 pages of English Translation and 5 pages of Official Copy).

Notice of Allowance received for Korean Patent Application No. 10-2024-0112016, mailed on Dec. 2, 2024, 6 pages (2 pages of English Translation and 4 pages of Official Copy).

Notice of Allowance received for Mexican Patent Application No. MX/a/2012/011623, mailed on Jan. 16, 2014, 2 pages (1 page of English Translation and 1 page of Official Copy).

Notice of Allowance received for Mexican Patent Application No. MX/a/2014/004295, mailed on May 21, 2015, 2 pages (1 page of English Translation and 1 page of Official Copy).

Notice of Allowance received for Mexican Patent Application No. MX/a/2015/010523, mailed on May 25, 2016, 2 pages (1 page of English Translation and 1 page of Official Copy).

Notice of Allowance received for Mexican Patent Application No. MX/a/2016/012174, mailed on Jan. 17, 2020, 3 pages (1 page of English Translation and 2 pages of Official Copy).

Notice of Allowance received for Mexican Patent Application No. MX/a/2020/003290, mailed on Feb. 9, 2023, 4 pages (1 page of English Translation and 3 pages of Official Copy).

Notice of Allowance received for Taiwanese Patent Application No. 099132253, mailed on Apr. 27, 2016, 3 pages (1 page of English Translation and 2 pages of Official Copy).

Notice of Allowance received for Taiwanese Patent Application No. 099132254, mailed on Feb. 18, 2014, 3 pages (1 page of English Translation and 2 pages of Official Copy).

Notice of Allowance received for U.S. Appl. No. 12/794,766, mailed on Jan. 17, 2014, 6 pages.

Notice of Allowance received for U.S. Appl. No. 12/794,768, mailed on Mar. 22, 2013, 6 pages.

Notice of Allowance received for U.S. Appl. No. 14/263,889, mailed on Feb. 1, 2017, 10 pages.

Notice of Allowance received for U.S. Appl. No. 14/263,889, mailed on Jun. 16, 2017, 6 pages.

Notice of Allowance received for U.S. Appl. No. 15/725,868, mailed on Jun. 12, 2019, 9 pages.

Notice of Allowance received for U.S. Appl. No. 16/666,073, mailed on Jan. 21, 2021, 11 pages.

Notice of Allowance received for U.S. Appl. No. 17/483,679, mailed on Nov. 21, 2024, 8 pages.

Notice of Allowance received for U.S. Appl. No. 17/745,680, mailed on Dec. 12, 2024, 2 pages.

Notice of Allowance received for U.S. Appl. No. 17/745,680, mailed on Nov. 12, 2024, 8 pages.

Notice of Allowance received for U.S. Appl. No. 17/950,868, mailed on Oct. 23, 2024, 10 pages.

Notice of Allowance received for U.S. Appl. No. 18/077,891, mailed on Dec. 10, 2024, 9 pages.

Notice of Allowance received for U.S. Appl. No. 18/138,348, mailed on Nov. 13, 2024, 10 pages.

Notice of Allowance received for U.S. Appl. No. 18/234,613, mailed on Dec. 12, 2024, 7 pages.

Notice of Allowance received for U.S. Appl. No. 18/234,613, mailed on Oct. 11, 2024, 10 pages.

Notice of Allowance received for U.S. Appl. No. 18/389,655, mailed on Nov. 27, 2024, 8 pages.

Office Action received for Australian Patent Application No. 2010350749, mailed on Oct. 16, 2013, 3 pages.

Office Action received for Australian Patent Application No. 2015201127, mailed on Mar. 21, 2016, 3 pages.

Office Action received for Australian Patent Application No. 2023201057, mailed on Oct. 24, 2024, 3 pages.

Office Action received for Australian Patent Application No. 2023266353, mailed on Sep. 19, 2024, 2 pages.

Office Action received for Australian Patent Application No. 2024200283, mailed on Oct. 8, 2024, 2 pages.

Office Action received for Brazilian Patent Application No. BR112012025746-3, mailed on Jun. 2, 2020, 7 pages (4 pages of English Translation and 3 pages of Official Copy).

Office Action received for Chinese Patent Application No. 201010602653.9, mailed on Apr. 1, 2013, 21 pages (13 pages of English Translation and 8 pages of Official Copy).

Office Action received for Chinese Patent Application No. 201010602653.9, mailed on Dec. 9, 2013, 10 pages (6 pages of English Translation and 4 pages of Official Copy).

Office Action received for Chinese Patent Application No. 201010602653.9, mailed on May 15, 2014, 6 pages (3 pages of English Translation and 3 pages of Official Copy).

Office Action received for Chinese Patent Application No. 2010106600623.4, mailed on Apr. 28, 2014, 7 pages (4 pages of English Translation and 3 pages of Official Copy).

Office Action received for Chinese Patent Application No. 2010106600623.4, mailed on Jan. 24, 2014, 7 pages (4 pages of English Translation and 3 pages of Official Copy).

Office Action received for Chinese Patent Application No. 2010106600623.4, mailed on May 2, 2013, 27 pages (15 pages of English Translation and 12 pages of Official Copy).

(56)　　　　References Cited

OTHER PUBLICATIONS

Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for Chinese Patent Application No. 202011083486.1, mailed on Aug. 19, 2024, 12 pages (4 pages of English Translation and 8 pages of Official Copy).
Office Action received for Chinese Patent Application No. 202311305998.1, mailed on Oct. 19, 2024, 6 pages (3 pages of English Translation and 3 pages of Official Copy).
Office Action received for Chinese Patent Application No. 202311753064.4, mailed on Aug. 23, 2024, 18 pages (11 pages of English Translation and 7 pages of Official Copy).
Office Action received for Chinese Patent Application No. 202311831154.0, mailed on Aug. 30, 2024, 13 pages (7 pages of English Translation and 6 pages of Official Copy).
Office Action received for Chinese Patent Application No. 202311835200.4, mailed on Aug. 29, 2024, 16 pages (7 pages of English Translation and 9 pages of Official Copy).
Office Action received for European Patent Application No. 10763539.3, mailed on Jun. 13, 2016, 5 pages.
Office Action received for European Patent Application No. 22705232.1, mailed on Sep. 26, 2024, 8 pages.
Office Action received for European Patent Application No. 22733778.9, mailed on Oct. 22, 2024, 6 pages.
Office Action received for European Patent Application No. 22737681.1, mailed on Oct. 18, 2024, 10 pages.
Office Action received for European Patent Application No. 22792995.7, mailed on Oct. 15, 2024, 8 pages.
Office Action received for Japanese Patent Application No. 2013-503731, mailed on Mar. 3, 2014, 8 pages (2 pages of English Translation and 6 pages of Official Copy).
Office Action received for Japanese Patent Application No. 2013-503731, mailed on Sep. 24, 2013, 3 pages (1 page of English Translation and 2 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).
Office Action received for Japanese Patent Application No. 2016-151497, mailed on Sep. 25, 2017, 7 pages (2 pages of English Translation and 5 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-182484, mailed on Dec. 4, 2020, 6 pages (1 page of English Translation and 5 pages of Official Copy).
Office Action received for Japanese Patent Application No. 2022-197327, mailed on Mar. 1, 2024, 14 pages (7 pages of English Translation and 7 pages of Official Copy).
Office Action received for Japanese Patent Application No. 2023-147860, mailed on Nov. 18, 2024, 15 pages (7 pages of English Translation and 8 pages of Official Copy).
Office Action received for Japanese Patent Application No. 2023-572748, mailed on Jul. 29, 2024, 4 pages (2 pages of English Translation and 2 pages of Official Copy).
Office Action received for Japanese Patent Application No. 2024-146741, mailed on Nov. 25, 2024, 12 pages (6 pages of English Translation and 6 pages of Official Copy).

Office Action received for Korean Patent Application No. 10-2012-7028535, mailed on Nov. 26, 2013, 10 pages (4 pages of English Translation and 6 pages of Official Copy).
Office Action received for Korean Patent Application No. 10-2014-7005164, mailed on May 23, 2014, 15 pages (6 pages of English Translation and 9 pages of Official Copy).
Office Action received for Korean Patent Application No. 10-2014-7029838, mailed on Dec. 20, 2014, 13 pages (5 pages of English Translation and 8 pages of Official Copy).
Office Action received for Korean Patent Application No. 10-2015-7007050, mailed on Apr. 16, 2015, 14 pages (6 pages of English Translation and 8 pages of Official Copy).
Office Action received for Korean Patent Application No. 10-2015-7007050, mailed on Oct. 23, 2015, 7 pages (3 pages of English Translation and 4 pages of Official Copy).
Office Action received for Korean Patent Application No. 10-2016-7014580, mailed on Jan. 30, 2018, 10 pages (4 pages of English Translation and 6 pages of Official Copy).
Office Action received for Korean Patent Application No. 10-2016-7014580, mailed on Jul. 30, 2018, 7 pages (3 pages of English Translation and 4 pages of Official Copy).
Office Action received for Korean Patent Application No. 10-2016-7014580, mailed on Jun. 29, 2017, 7 pages (1 page of English Translation and 6 pages of Official Copy).
Office Action received for Korean Patent Application No. 10-2016-7014580, mailed on Sep. 19, 2018, 7 pages (3 pages of English Translation and 4 pages of Official Copy).
Office Action received for Korean Patent Application No. 10-2016-7014580, mailed on Sep. 27, 2016, 9 pages (4 pages of English Translation and 5 pages of Official Copy).
Office Action received for Korean Patent Application No. 10-2017-7002774, mailed on Apr. 18, 2017, 10 pages (4 pages of English Translation and 6 pages of Official Copy).
Office Action received for Korean Patent Application No. 10-2017-7002774, mailed on Jul. 30, 2018, 6 pages (3 pages of English Translation and 3 pages of Official Copy).
Office Action received for Korean Patent Application No. 10-2017-7002774, mailed on Sep. 20, 2018, 12 pages (6 pages of English Translation and 6 pages of Official Copy).
Office Action received for Korean Patent Application No. 10-2018-7036975, mailed on Mar. 22, 2019, 11 pages (5 pages of English Translation and 6 pages of Official Copy).
Office Action received for Korean Patent Application No. 10-2020-7002845, mailed on Feb. 17, 2020, 14 pages (6 pages of English Translation and 8 pages of Official Copy).
Office Action received for Korean Patent Application No. 10-2020-7034959, mailed on Jan. 27, 2022, 7 pages (3 pages of English Translation and 4 pages of Official Copy).
Office Action received for Korean Patent Application No. 10-2020-7034959, mailed on Mar. 2, 2021, 12 pages (5 pages of English Translation and 7 pages of Official Copy).
Office Action received for Korean Patent Application No. 10-2020-7034959, mailed on Oct. 27, 2021, 8 pages (4 pages of English Translation and 4 pages of Official Copy).
Office Action received for Korean Patent Application No. 10-2022-7006973, mailed on May 19, 2022, 10 pages (4 pages of English Translation and 6 pages of Official Copy).
Office Action received for Korean Patent Application No. 10-2022-7006973, mailed on Nov. 24, 2022, 6 pages (3 pages of English Translation and 3 pages of Official Copy).
Office Action received for Korean Patent Application No. 10-2023-7005442, mailed on Jul. 25, 2023, 10 pages (4 pages of English Translation and 6 pages of Official Copy).
Office Action received for Korean Patent Application No. 10-2024-7019962, mailed on Sep. 25, 2024, 7 pages (2 pages of English Translation and 5 pages of Official Copy).
Office Action received for Mexican Patent Application No. MX/a/2014/004295, mailed on Aug. 21, 2014, 4 pages (2 pages of English Translation and 2 pages of Official Copy).
Office Action received for Mexican Patent Application No. MX/a/2014/004295, mailed on Jan. 20, 2015, 4 pages (1 page of English Translation and 3 pages of Official Copy).

(56)        References Cited

OTHER PUBLICATIONS

Office Action received for Mexican Patent Application No. MX/a/ 2015/010523, mailed on Jan. 26, 2016, 4 pages (2 pages of English Translation and 2 pages of Official Copy).
Office Action received for Mexican Patent Application No. MX/a/ 2016/012174, mailed on Apr. 10, 2019, 7 pages (4 pages of English Translation and 3 pages of Official Copy).
Office Action received for Mexican Patent Application No. MX/a/ 2016/012174, mailed on Aug. 8, 2019, 7 pages (2 pages of English Translation and 5 pages of Official Copy).
Office Action received for Mexican Patent Application No. MX/a/ 2020/003290, mailed on Nov. 11, 2022, 7 pages (2 pages of English Translation and 5 pages of Official Copy).
Office Action received for Mexican Patent Application No. MX/a/ 2020/003290, mailed on Oct. 26, 2022, 8 pages (3 pages of English Translation and 5 pages of Official Copy).
Office Action received for Mexican Patent Application No. MX/a/ 2023/005388, mailed on Dec. 15, 2023, 18 pages (9 pages of English Translation and 9 pages of Official Copy).
Office Action received for Mexican Patent Application No. MX/a/ 2023/005388, mailed on Jun. 2, 2023, 24 pages (12 pages of English Translation and 12 pages of Official Copy).
Office Action received for Taiwanese Patent Application No. 099132253, mailed on Jun. 24, 2013, 16 pages (8 pages of English Translation and 8 pages of Official Copy).
Office Action received for Taiwanese Patent Application No. 099132253, mailed on Mar. 27, 2014, 10 pages (4 pages of English Translation and 6 pages of Official Copy).
Office Action received for Taiwanese Patent Application No. 099132254, mailed on May 27, 2013, 24 pages (12 pages of English Translation and 12 pages of Official Copy).
Prabeesh Rk., "Android Studio Tutorial—17—Highlight selected item in a ListView", Available Online at: https://www.youtube.com/ watch?v=W6bBYmXP0HY, Feb. 24, 2015, 5 pages.
Sharf et al., "SnapPaste:an interactive technique for easy mesh composition", The Visual Computer; International Journal of Computer Graphics, Springer, Berlin, De, vol. 22, No. 9-11. Available Online at <http://dx.doi.org/10.1007/s00371-006-0068-5>, Aug. 25, 2006, pp. 835-844.
Supplemental Notice of Allowance received for U.S. Appl. No. 17/484,899, mailed on Oct. 29, 2024, 5 pages.
Supplemental Notice of Allowance received for U.S. Appl. No. 17/484,899, mailed on Sep. 30, 2024, 5 pages.
Szogyenyi, Zina, "Improving the usability of multi-selecting from a long list", Available online at: https://medium.com/tripaneer-techblog/ improving-the-usability-of-multi-selecting-from-a-long-list-63e1a67aab35, Jun. 13, 2018, 12 pages.
Applicant-Initiated Interview Summary received for U.S. Appl. No. 17/745,680, mailed on Apr. 24, 2025, 2 pages.
Corrected Notice of Allowance received for U.S. Appl. No. 18/138,348, mailed on Apr. 16, 2025, 2 pages.
Decision on Appeal received for U.S. Appl. No. 17/181,089, mailed on Apr. 17, 2025, 19 pages.
Extended European Search Report received for European Patent Application No. 25154475.5, mailed on Apr. 28, 2025, 11 pages.
Extended European Search Report received for European Patent Application No. 25166659.0, mailed on Apr. 15, 2025, 9 pages.
Intention to Grant received for European Patent Application No. 22201007.6, mailed on Apr. 4, 2025, 8 pages.
International Preliminary Report on Patentability received for PCT Patent Application No. PCT/US2023/032792, mailed on Apr. 3, 2025, 10 pages.
International Preliminary Report on Patentability received for PCT Patent Application No. PCT/US2023/032911, mailed on Apr. 3, 2025, 13 pages.
International Search Report and Written Opinion received for PCT Patent Application No. PCT/US2024/053247, mailed on Jan. 28, 2025, 13 pages.
Non-Final Office Action received for U.S. Appl. No. 18/067,350, mailed on Apr. 17, 2025, 49 pages.

Notice of Allowance received for U.S. Appl. No. 18/499,848, mailed on Apr. 2, 2025, 11 pages.
Office Action received for Japanese Patent Application No. 2024-146741, mailed on Mar. 28, 2025, 10 pages (5 pages of English Translation and 5 pages of Official Copy).
Pre-Appeal Review Report received for Japanese Patent Application No. 2023-572748, mailed on Apr. 1, 2025, 4 pages (2 pages of English Translation and 2 pages of Official Copy).
Record of Oral Hearing received for U.S. Appl. No. 17/181,089, mailed on Mar. 27, 2025, 15 pages.
Applicant-Initiated Interview Summary received for U.S. Appl. No. 17/745,680, mailed on Jun. 30, 2025, 2 pages.
Applicant-Initiated Interview Summary received for U.S. Appl. No. 18/367,977, mailed on Jul. 3, 2025, 5 pages.
Applicant-Initiated Interview Summary received for U.S. Appl. No. 18/383,371, mailed on Jul. 10, 2025, 2 pages.
Examiner-Initiated Interview Summary received for U.S. Appl. No. 18/067,350, mailed on Jun. 26, 2025, 4 pages.
Notice of Allowance received for U.S. Appl. No. 17/181,089, mailed on Jul. 3, 2025, 12 pages.
Office Action received for European Patent Application No. 22733778.9, mailed on Jun. 20, 2025, 4 pages.
Office Action received for Indian Patent Application No. 202315041189, mailed on Jun. 26, 2025, 7 pages.
Office Action received for Japanese Patent Application No. 2024-146741, mailed on Jun. 20, 2025, 6 pages (3 pages of English Translation and 3 pages of Official Copy).
Result of Consultation received for European Patent Application No. 22729921.1, mailed on Jun. 27, 2025, 3 pages.
Koyama, Kaori, "Mac Fan Macintosh Master Book Mac OS X v10.4 "Tiger" & iLife", '06 version, Mainichi Communications Inc. Nobuyuki Nakagawa, Jul. 9, 2007, 4 pages.
Lin, Wei, "Can Apple Watch Lead the Wearable Market", Financial Economics, Issue 23, Dec. 31, 2014, 1 page.
Applicant-Initiated Interview Summary received for U.S. Appl. No. 18/499,848, mailed on Feb. 12, 2025, 2 pages.
Corrected Notice of Allowance received for U.S. Appl. No. 18/234,613, mailed on Jan. 10, 2025, 5 pages.
Decision to Grant received for European Patent Application No. 21197457.1, mailed on Jan. 7, 2025, 4 pages.
Decision to Grant received for European Patent Application No. 22734711.9, mailed on Jan. 7, 2025, 2 pages.
Decision to Refuse received for Japanese Patent Application No. 2023-077990, mailed on Dec. 13, 2024, 6 pages (3 pages of English Translation and 3 pages of Official Copy).
Extended European Search Report received for European Patent Application No. 24215184.3, mailed on Jan. 24, 2025, 11 pages.
Final Office Action received for U.S. Appl. No. 17/991,708, mailed on Dec. 30, 2024, 22 pages.
Final Office Action received for U.S. Appl. No. 18/380,116, mailed on Jan. 30, 2025, 17 pages.
Intention to Grant received for European Patent Application No. 22201007.6, mailed on Jan. 29, 2025, 9 pages.
Intention to Grant received for European Patent Application No. 24164409.5, mailed on Jan. 14, 2025, 8 pages.
Megasafetyfirst, "How to pair Bluetooth Headphones to your TV / SmartTV / Television (How to)", XP093245538, Available online at: https://www.youtube.com/watch?v=19VNMySYouY, Feb. 15, 2020, 2 pages.
Non-Final Office Action received for U.S. Appl. No. 18/499,848, mailed on Jan. 27, 2025, 18 pages.
Notice of Allowance received for Chinese Patent Application No. 202311305998.1, mailed on Jan. 2, 2025, 2 pages (1 page of English Translation and 1 page of Official Copy).
Notice of Allowance received for Chinese Patent Application No. 202311312328.2, mailed on Jan. 3, 2025, 2 pages (1 page of English Translation and 1 page of Official Copy).
Notice of Allowance received for Chinese Patent Application No. 202311831154.0, mailed on Jan. 17, 2025, 4 pages (1 page of English Translation and 3 pages of Official Copy).
Notice of Allowance received for U.S. Appl. No. 17/483,679, mailed on Jan. 29, 2025, 5 pages.

(56) References Cited

OTHER PUBLICATIONS

Notice of Allowance received for U.S. Appl. No. 17/484,899, mailed on Jan. 16, 2025, 16 pages.

Notice of Allowance received for U.S. Appl. No. 17/950,868, mailed on Feb. 12, 2025, 6 pages.

Notice of Allowance received for U.S. Appl. No. 17/970,417, mailed on Feb. 5, 2025, 6 pages.

Notice of Allowance received for U.S. Appl. No. 18/140,449, mailed on Jan. 21, 2025, 10 pages.

Notice of Hearing received for Indian Patent Application No. 202015013360, mailed on Dec. 26, 2024, 2 pages.

Office Action received for Australian Patent Application No. 2023201057, mailed on Dec. 19, 2024, 4 pages.

Office Action received for Australian Patent Application No. 2023201057, mailed on Jan. 28, 2025, 3 pages.

Office Action received for Australian Patent Application No. 2024278098, mailed on Jan. 22, 2025, 3 pages.

Office Action received for Chinese Patent Application No. 202110894284.3, mailed on Jan. 10, 2025, 9 pages (4 pages of English Translation and 5 pages of Official Copy).

Office Action received for Chinese Patent Application No. 202311835200.4, mailed on Dec. 26, 2024, 11 pages (6 pages of English Translation and 5 pages of Official Copy).

Office Action received for European Patent Application No. 22737681.1, mailed on Feb. 6, 2025, 9 pages.

Office Action received for European Patent Application No. 23190753.6, mailed on Jan. 30, 2025, 9 pages.

Office Action received for Japanese Patent Application No. 2023-572748, mailed on Nov. 21, 2024, 31 pages (28 pages of English Translation and 3 pages of Official Copy).

Office Action received for Japanese Patent Application No. 2024-173274, mailed on Jan. 6, 2025, 3 pages (2 pages of English Translation and 1 page of Official Copy).

Supplemental Notice of Allowance received for U.S. Appl. No. 17/484,899, mailed on Feb. 3, 2025, 5 pages.

Board Decision received for Chinese Patent Application No. 201810375380.5, mailed on Jul. 6, 2022, 2 pages (1 page of English Translation and 1 page of Official Copy).

Cnet, "Android Lollipop Lock-Screen Notification Tips", Available online at: https://www.youtube.com/watch?v=LZTxHBOwzIU, Nov. 13, 2014, 3 pages.

Decision on Appeal received for U.S. Appl. No. 16/136,178, mailed on Jun. 2, 2022, 10 pages.

Decision to Grant received for Danish Patent Application No. 201570874, mailed on Jan. 26, 2018, 2 pages.

Decision to Grant received for Danish Patent Application No. PA201570865, mailed on Mar. 19, 2018, 2 pages.

Decision to Grant received for Danish Patent Application No. PA201570867, mailed on Mar. 13, 2018, 2 pages.

Decision to Grant received for Danish Patent Application No. PA201570871, mailed on Mar. 19, 2018, 2 pages.

Decision to Grant received for European Patent Application No. 16728165.8, mailed on Sep. 12, 2019, 2 pages.

Decision to Grant received for European Patent Application No. 18196448.7, mailed on Aug. 6, 2020, 2 pages.

Decision to Grant received for European Patent Application No. 20193661.4, mailed on Sep. 7, 2023, 2 pages.

Extended European Search Report received for European Patent Application No. 18196448.7, mailed on Oct. 16, 2018, 9 pages.

Extended European Search Report received for European Patent Application No. 20193661.4, mailed on Feb. 2, 2021, 10 pages.

Final Office Action received for U.S. Appl. No. 15/835,366, mailed on Apr. 5, 2019, 17 pages.

Final Office Action received for U.S. Appl. No. 15/835,366, mailed on Oct. 21, 2019, 18 pages.

Final Office Action received for U.S. Appl. No. 15/835,382, mailed on Apr. 8, 2019, 20 pages.

Final Office Action received for U.S. Appl. No. 16/136,178, mailed on Jul. 10, 2020, 17 pages.

Final Office Action received for U.S. Appl. No. 18/127,535, mailed on Jul. 19, 2024, 26 pages.

Intention to Grant received for Danish Patent Application No. PA201570865, mailed on Jan. 3, 2018, 2 pages.

Intention to Grant received for Danish Patent Application No. PA201570867, mailed on Sep. 22, 2017, 2 pages.

Intention to Grant received for Danish Patent Application No. PA201570871, mailed on Jan. 15, 2018, 2 pages.

Intention to Grant received for Danish Patent Application No. PA201570874, mailed on Nov. 16, 2017, 2 pages.

Intention to Grant received for Danish Patent Application No. PA201570880, mailed on May 9, 2018, 2 pages.

Intention to Grant received for European Patent Application No. 16728165.8, mailed on Apr. 30, 2019, 7 pages.

Intention to Grant received for European Patent Application No. 18196448.7, mailed on Jun. 19, 2020, 7 pages.

International Preliminary Report on Patentability received for PCT Patent Application No. PCT/US2016/033528, mailed on Dec. 12, 2017, 30 pages.

International Search Report and Written Opinion received for PCT Patent Application No. PCT/US2016/033528, mailed on Feb. 6, 2017, 43 pages.

Non-Final Office Action received for U.S. Appl. No. 15/835,366, mailed on Feb. 6, 2020, 15 pages.

Non-Final Office Action received for U.S. Appl. No. 15/835,366, mailed on Jun. 26, 2019, 19 pages.

Non-Final Office Action received for U.S. Appl. No. 15/835,366, mailed on Nov. 16, 2018, 14 pages.

Non-Final Office Action received for U.S. Appl. No. 15/835,382, mailed on Nov. 29, 2018, 14 pages.

Non-Final Office Action received for U.S. Appl. No. 16/136,178, mailed on Jan. 6, 2020, 15 pages.

Non-Final Office Action received for U.S. Appl. No. 18/127,535, mailed on Dec. 20, 2023, 20 pages.

Notice of Acceptance received for Australian Patent Application No. 2016276028, mailed on Aug. 6, 2019, 3 pages.

Notice of Allowance received for Chinese Patent Application No. 201680026995.6, mailed on Mar. 18, 2020, 2 pages (1 page of English Translation and 1 page of Official Copy).

Notice of Allowance received for Chinese Patent Application No. 201810368058.X, mailed on Jul. 30, 2021, 2 pages (1 page of English Translation and 1 page of Official Copy).

Notice of Allowance received for Chinese Patent Application No. 201810375380.5, mailed on Jul. 25, 2022, 1 pages (1 page of English Translation and 1 page of Official Copy).

Notice of Allowance received for Chinese Patent Application No. 201810760112.5, mailed on Sep. 21, 2020, 4 pages (1 page of English Translation and 3 pages of Official Copy).

Notice of Allowance received for U.S. Appl. No. 15/835,366, mailed on Jul. 23, 2020, 10 pages.

Notice of Allowance received for U.S. Appl. No. 16/136,178, mailed on Dec. 5, 2022, 9 pages.

Notice of Allowance received for U.S. Appl. No. 16/136,178, mailed on Sep. 9, 2022, 8 pages.

Office Action received for Australian Patent Application No. 2016276028, mailed on Aug. 9, 2018, 4 pages.

Office Action received for Australian Patent Application No. 2016276028, mailed on May 13, 2019, 4 pages.

Office Action received for Australian Patent Application No. 2019257353, mailed on Sep. 7, 2020, 4 pages.

Office Action received for Chinese Patent Application No. 201680026995.6, mailed on Oct. 22, 2019, 15 pages (6 pages of English Translation and 9 pages of Official Copy).

Office Action received for Chinese Patent Application No. 201810368058.X, mailed on Mar. 20, 2020, 15 pages (7 pages of English Translation and 8 pages of Official Copy).

Office Action received for Chinese Patent Application No. 201810368058.X, mailed on May 8, 2021, 6 pages (3 pages of English Translation and 3 pages of Official Copy).

Office Action received for Chinese Patent Application No. 201810368058.X, mailed on Nov. 3, 2020, 16 pages (7 pages of English Translation and 9 pages of Official Copy).

(56)                    References Cited

OTHER PUBLICATIONS

Office Action received for Chinese Patent Application No. 201810375380.5, mailed on Apr. 2, 2022, 11 pages (6 pages of English Translation and 5 pages of Official Copy).
Office Action received for Chinese Patent Application No. 201810375380.5, mailed on Jan. 14, 2022, 16 pages (8 pages of English Translation and 8 pages of Official Copy).
Office Action received for Chinese Patent Application No. 201810375380.5, mailed on Mar. 3, 2020, 13 pages (6 pages of English Translation and 7 pages of Official Copy).
Office Action received for Chinese Patent Application No. 201810375380.5, mailed on Nov. 12, 2020, 16 pages (8 pages of English Translation and 8 pages of Official Copy).
Office Action received for Chinese Patent Application No. 201810375380.5, mailed on Sep. 15, 2021, 10 pages (5 pages of English Translation and 5 pages of Official Copy).
Office Action received for Chinese Patent Application No. 201810760112.5, mailed on Feb. 26, 2020, 11 pages (5 pages of English Translation and 6 pages of Official Copy).
Office Action received for Chinese Patent Application No. 201810760112.5, mailed on Jul. 21, 2020, 6 pages (3 pages of English Translation and 3 pages of Official Copy).
Office Action received for Danish Patent Application No. PA201570865, mailed on Mar. 8, 2017, 5 pages.
Office Action received for Danish Patent Application No. PA201570865, mailed on Oct. 10, 2017, 2 pages.
Office Action received for Danish Patent Application No. PA201570865, mailed on Sep. 2, 2016, 4 pages.
Office Action received for Danish Patent Application No. PA201570867, mailed on Feb. 21, 2017, 2 pages.
Office Action received for Danish Patent Application No. PA201570867, mailed on Sep. 7, 2016, 3 pages.
Office Action received for Danish Patent Application No. PA201570871, mailed on Jun. 12, 2017, 3 pages.
Office Action received for Danish Patent Application No. PA201570871, mailed on Oct. 18, 2016, 4 pages.
Office Action received for Danish Patent Application No. PA201570874, mailed on Aug. 31, 2016, 4 pages.
Office Action received for Danish Patent Application No. PA201570874, mailed on May 15, 2017, 4 pages.
Office Action received for Danish Patent Application No. PA201570880, mailed on Feb. 1, 2018, 2 pages.
Office Action received for Danish Patent Application No. PA201570880, mailed on Mar. 31, 2017, 5 pages.
Office Action received for Danish Patent Application No. PA201570880, mailed on Oct. 24, 2017, 4 pages.
Office Action received for Danish Patent Application No. PA201570880, mailed on Sep. 7, 2016, 3 pages.
Office Action received for European Patent Application No. 16728165.8, mailed on Aug. 29, 2018, 4 pages.
Office Action received for European Patent Application No. 18196448.7, mailed on Sep. 16, 2019, 4 pages.
Office Action received for European Patent Application No. 20193661.4, mailed on Sep. 13, 2021, 6 pages.
Search Report and Opinion received for Danish Patent Application No. PA201570865, mailed on Mar. 30, 2016, 6 pages.
Search Report and Opinion received for Danish Patent Application No. PA201570867, mailed on Apr. 1, 2016, 6 pages.
Search Report and Opinion received for Danish Patent Application No. PA201570871, mailed on Apr. 12, 2016, 7 pages.
Search Report and Opinion received for Danish Patent Application No. PA201570874, mailed on Mar. 30, 2016, 7 pages.
Search Report and Opinion received for Danish Patent Application No. PA201570880, mailed on Apr. 4, 2016, 6 pages.
Schulzrinne H, "Indication of Message Composition for Instant Messaging", Network Working Group, Columbia University, Jan. 2005, 14 pages.
Corrected Notice of Allowance received for U.S. Appl. No. 18/138,348, mailed on Mar. 26, 2025, 2 pages.

Decision to Grant received for European Patent Application No. 23168537.1, mailed on Mar. 20, 2025, 4 pages.
Intention to Grant received for European Patent Application No. 23158566.2, mailed on Mar. 19, 2025, 9 pages.
International Preliminary Report on Patentability received for PCT Patent Application No. PCT/US2023/032084, mailed on Mar. 20, 2025, 7 pages.
Notice of Allowance received for U.S. Appl. No. 18/140,449, mailed on Mar. 26, 2025, 10 pages.
Notice of Allowance received for U.S. Appl. No. 18/138,348, mailed on Mar. 12, 2025, 10 pages.
Office Action received for Australian Patent Application No. 2024278098, mailed on Mar. 6, 2025, 3 pages.
Office Action received for Chinese Patent Application No. 202311185909.4, mailed on Feb. 13, 2025, 16 pages (10 pages of English Translation and 6 pages of Official Copy).
Office Action received for Chinese Patent Application No. 202410924550.6, mailed on Mar. 1, 2025, 12 pages (5 pages of English Translation and 7 pages of Official Copy).
Office Action received for Chinese Patent Application No. 202410924556.3, mailed on Feb. 28, 2025, 11 pages (5 pages of English Translation and 6 pages of Official Copy).
Office Action received for European Patent Application No. 22188377.0, mailed on Mar. 17, 2025, 6 pages.
Office Action received for European Patent Application No. 22729921.1, mailed on Mar. 13, 2025, 8 pages.
Office Action received for European Patent Application No. 23191379.9, mailed on Mar. 24, 2025, 6 pages.
Office Action received for Korean Patent Application No. 10-2024-7043493, mailed on Mar. 19, 2025, 11 pages (4 pages of English Translation and 7 pages of Official Copy).
Result of Consultation received for European Patent Application No. 22705232.1, mailed on Mar. 26, 2025, 3 pages.
Advisory Action received for U.S. Appl. No. 18/380,116, mailed on May 21, 2025, 4 pages.
Applicant-Initiated Interview Summary received for U.S. Appl. No. 18/242,363, mailed on Jun. 4, 2025, 3 pages.
Corrected Notice of Allowance received for U.S. Appl. No. 18/499,848, mailed on May 19, 2025, 3 pages.
Decision to Grant received for European Patent Application No. 21789897.2, mailed on Jun. 5, 2025, 3 pages
Decision to Grant received for European Patent Application No. 24164409.5, mailed on May 22, 2025, 3 pages.
Intention to Grant received for European Patent Application No. 18779093.6, mailed on May 9, 2025, 9 pages.
Intention to Grant received for European Patent Application No. 20166552.8, mailed on Apr. 30, 2025, 9 pages.
Intention to Grant received for European Patent Application No. 21207736.6, mailed on May 30, 2025, 8 pages.
Intention to Grant received for European Patent Application No. 22737681.1, mailed on May 14, 2025, 8 pages.
Intention to Grant received for European Patent Application No. 22792995.7, mailed on Jun. 10, 2025, 9 pages.
Intention to Grant received for European Patent Application No. 23190753.6, mailed on Jun. 18, 2025, 9 pages.
Intention to Grant received for European Patent Application No. 24160234.1, mailed on Jun. 20, 2025, 9 pages.
Non-Final Office Action received for U.S. Appl. No. 17/745,680, mailed on May 2, 2025, 27 pages.
Non-Final Office Action received for U.S. Appl. No. 18/242,363, mailed on May 13, 2025, 29 pages.
Non-Final Office Action received for U.S. Appl. No. 18/367,977, mailed on May 29, 2025, 20 pages.
Non-Final Office Action received for U.S. Appl. No. 18/383,371, mailed on Jun. 12, 2025, 9 pages.
Notice of Allowance received for Chinese Patent Application No. 202110894284.3, mailed on May 13, 2025, 4 pages (1 page of English Translation and 3 pages of Official Copy).
Notice of Allowance received for Chinese Patent Application No. 202311185909.4, mailed on Apr. 30, 2025, 3 pages (2 pages of English Translation and 1 page of Official Copy).

(56)                References Cited

OTHER PUBLICATIONS

Notice of Allowance received for Chinese Patent Application No. 202311185909.4, mailed on May 12, 2025, 6 pages (2 pages of English Translation and 4 pages of Official Copy).

Notice of Allowance received for Korean Patent Application No. 10-2024-7006601, mailed on Apr. 29, 2025, 6 pages (2 pages of English Translation and 4 pages of Official Copy).

Notice of Allowance received for U.S. Appl. No. 18/499,848, mailed on Jun. 16, 2025, 7 pages.

Office Action received for Chinese Patent Application No. 202110327012.5, mailed on Mar. 31, 2025, 19 pages (1 page of English Translation and 18 pages of Official Copy).

Office Action received for Chinese Patent Application No. 202311835200.4, mailed on Apr. 29, 2025, 9 pages (5 pages of English Translation and 4 pages of Official Copy).

Office Action received for Chinese Patent Application No. 202410030102.1, mailed on Apr. 24, 2025, 11 pages (6 pages of English Translation and 5 pages of Official Copy).

Office Action received for Chinese Patent Application No. 202411713875.6, mailed on May 10, 2025, 17 pages (9 pages of English Translation and 8 pages of Official Copy).

Office Action received for Chinese Patent Application No. 202411715424.6, mailed on May 17, 2025, 16 pages (8 pages of English Translation and 8 pages of Official Copy).

Office Action received for European Patent Application No. 23172038.4, mailed on May 22, 2025, 6 pages.

Office Action received for Japanese Patent Application No. 2024-081986, mailed on May 9, 2025, 6 pages (3 pages of English Translation and 3 pages of Official Copy).

Office Action received for Korean Patent Application No. 10-2023-7039401, mailed on May 19, 2025, 7 pages (3 pages of English Translation and 4 pages of Official Copy).

Result of Consultation received for European Patent Application No. 22729921.1, mailed on Jun. 12, 2025, 3 pages.

Applicant-Initiated Interview Summary received for U.S. Appl. No. 18/242,363, mailed on Aug. 18, 2025, 3 pages.

Applicant-Initiated Interview Summary received for U.S. Appl. No. 18/416,784, mailed on Sep. 25, 2025, 2 pages.

Board Opinion received for Chinese Patent Application No. 202010126661.4, mailed on Jul. 31, 2025, 16 pages (9 pages of English Translation and 7 pages of Official Copy).

Corrected Notice of Allowance received for U.S. Appl. No. 17/181,089, mailed on Jul. 15, 2025, 3 pages.

Corrected Notice of Allowance received for U.S. Appl. No. 17/745,680, mailed on Jul. 28, 2025, 3 pages.

Corrected Notice of Allowance received for U.S. Appl. No. 18/498,779, mailed on Aug. 6, 2025, 2 pages.

Corrected Notice of Allowance received for U.S. Appl. No. 18/498,779, mailed on Sep. 17, 2025, 4 pages.

Corrected Notice of Allowance received for U.S. Appl. No. 18/535,820, mailed on Sep. 3, 2025, 2 pages.

Decision on Appeal received for U.S. Appl. No. 17/479,974, mailed on Jul. 8, 2025, 14 pages.

Decision on Appeal received for U.S. Appl. No. 17/747,804, mailed on Sep. 26, 2025, 11 pages.

Decision on Appeal received for U.S. Appl. No. 18/200,480, mailed on Sep. 26, 2025, 14 pages.

Decision to Grant received for European Patent Application No. 20166552.8, mailed on Aug. 28, 2025, 4 pages.

Decision to Grant received for European Patent Application No. 22201007.6, mailed on Jul. 17, 2025, 4 pages.

Extended European Search Report received for European Patent Application No. 25170895.4, mailed on Jul. 3, 2025, 11 pages.

Extended European Search Report received for European Patent Application No. 25174339.9, mailed on Jun. 26, 2025, 9 pages.

Final Office Action received for U.S. Appl. No. 18/242,363, mailed on Jul. 30, 2025, 51 pages.

Gamexplain, "Making a Call in the Nintendo Switch Online App (Splatoon 2 Voice Chat Test!)", Online available at: https://www.youtube.com/watch?v=HYtBLcw08_s, Jul. 19, 2017, 1 page.

Intention to Grant received for European Patent Application No. 22737681.1, mailed on Jul. 9, 2025, 8 pages.

Intention to Grant received for European Patent Application No. 23158566.2, mailed on Jul. 30, 2025, 9 pages.

International Preliminary Report on Patentability received for PCT Patent Application No. PCT/US2024/017017, mailed on Sep. 4, 2025, 23 pages.

Non-Final Office Action received for U.S. Appl. No. 18/237,310, mailed on Aug. 27, 2025, 10 pages.

Non-Final Office Action received for U.S. Appl. No. 18/242,363, mailed on Sep. 24, 2025, 59 pages.

Non-Final Office Action received for U.S. Appl. No. 18/416,784, mailed on Aug. 22, 2025, 23 pages.

Non-Final Office Action received for U.S. Appl. No. 18/428,549, mailed on Sep. 24, 2025, 13 pages.

Notice of Allowance received for Chinese Patent Application No. 202410924550.6, mailed on Jun. 30, 2025, 4 pages (1 page of English Translation and 3 pages of Official Copy).

Notice of Allowance received for Chinese Patent Application No. 202410924556.3, mailed on Jun. 30, 2025, 4 pages (1 page of English Translation and 3 pages of Official Copy).

Notice of Allowance received for Japanese Patent Application No. 2023-077990, mailed on Jul. 7, 2025, 4 pages (1 page of English Translation and 3 pages of Official Copy).

Notice of Allowance received for Korean Patent Application No. 10-2024-7043493, mailed on Aug. 26, 2025, 7 pages (2 pages of English Translation and 5 pages of Official Copy).

Notice of Allowance received for Korean Patent Application No. 10-2025-0026405, mailed on Jul. 22, 2025, 7 pages (2 pages of English Translation and 5 pages of Official Copy).

Notice of Allowance received for U.S. Appl. No. 17/745,680, mailed on Jul. 18, 2025, 8 pages.

Notice of Allowance received for U.S. Appl. No. 18/383,371, mailed on Jul. 30, 2025, 8 pages.

Notice of Allowance received for U.S. Appl. No. 18/498,779, mailed on Jul. 14, 2025, 9 pages.

Notice of Allowance received for U.S. Appl. No. 18/535,820, mailed on Aug. 20, 2025, 9 pages.

Office Action received for Australian Patent Application No. 2024202748, mailed on Jul. 4, 2025, 4 pages.

Office Action received for Chinese Patent Application No. 202310585927.5, mailed on Jun. 27, 2025, 17 pages (9 pages of English Translation and 8 pages of Official Copy).

Office Action received for Chinese Patent Application No. 202411704616.7, mailed on Jul. 30, 2025, 14 pages (7 pages of English Translation and 7 pages of Official Copy).

Office Action received for Chinese Patent Application No. 202411716388.5, mailed on Jun. 8, 2025, 14 pages (7 pages of English Translation and 7 pages of Official Copy).

Office Action received for European Patent Application No. 23157906.1, mailed on Sep. 10, 2025, 4 pages.

Office Action received for European Patent Application No. 23203414.0, mailed on Jul. 29, 2025, 6 pages.

Office Action received for European Patent Application No. 24215184.3, mailed on Sep. 5, 2025, 6 pages.

Office Action received for Japanese Patent Application No. 2024-106235, mailed on Jul. 22, 2025, 14 pages (7 pages of English Translation and 7 pages of Official Copy).

Office Action received for Japanese Patent Application No. 2024-146741, mailed on Aug. 25, 2025, 4 pages (2 pages of English Translation and 2 pages of Official Copy).

Office Action received for Korean Patent Application No. 10-2024-7011347, mailed on Jul. 31, 2025, 7 pages (3 pages of English Translation and 4 pages of Official Copy).

Record of Oral Hearing received for U.S. Appl. No. 17/479,974, mailed on Jul. 3, 2025, 17 pages.

Result of Consultation received for European Patent Application No. 22733778.9, mailed on Jul. 21, 2025, 3 pages.

Summons to Attend Oral Proceedings received for European Patent Application No. 22705232.1, mailed on Jul. 23, 2025, 12 pages.

Applicant-Initiated Interview Summary received for U.S. Appl. No. 18/237,310, mailed on Oct. 2, 2025, 2 pages.

(56) References Cited

OTHER PUBLICATIONS

Applicant-Initiated Interview Summary received for U.S. Appl. No. 18/242,363, mailed on Oct. 7, 2025, 5 pages.
Board Decision received for Chinese Patent Application No. 202010126661.4, mailed on Sep. 26, 2025, 27 pages (11 pages of English Translation and 16 pages of Official Copy).
Corrected Notice of Allowance received for U.S. Appl. No. 18/498,779, mailed on Sep. 30, 2025, 3 pages.
Decision to Grant received for European Patent Application No. 21207736.6, mailed on Oct. 9, 2025, 2 pages.
Decision to Grant received for European Patent Application No. 22792995.7, mailed on Oct. 9, 2025, 4 pages.
Decision to Grant received for European Patent Application No. 24160234.1, mailed on Oct. 2, 2025, 4 pages.
Extended European Search Report received for European Patent Application No. 25201688.6, mailed on Sep. 29, 2025, 9 pages.
Notice of Allowance received for Japanese Patent Application No. 2024-081986, mailed on Oct. 6, 2025, 4 pages (1 page of English Translation and 3 pages of Official Copy).
Notice of Allowance received for U.S. Appl. No. 18/380,116, mailed on Oct. 6, 2025, 25 pages.
Office Action received for Australian Patent Application No. 2024202748, mailed on Oct. 1, 2025, 3 pages.
Final Office Action received for U.S. Appl. No. 18/416,784, mailed on Nov. 13, 2025, 28 pages.
Notice of Allowance received for U.S. Appl. No. 17/747,804, mailed on Nov. 12, 2025, 9 pages.

Office Action received for Chinese Patent Application No. 202411716388.5, mailed on Oct. 15, 2025, 12 pages (7 pages of English Translation and 5 pages of Official Copy).
Office Action received for Chinese Patent Application No. 202411726509.4, mailed on Sep. 27, 2025, 17 pages (8 pages of English Translation and 10 pages of Official Copy).
Notice of Allowance received for U.S. Appl. No. 18/237,310, mailed on Nov. 10, 2025, 10 pages.
Office Action received for Chinese Patent Application No. 202211162924.2, mailed on Sep. 22, 2025, 22 pages (9 pages of English Translation and 13 pages of Official Copy).
Decision to Grant received for European Patent Application No. 22737681.1, mailed on Oct. 23, 2025, 2 pages.
Notice of Allowance received for Chinese Patent Application No. 202411713875.6, mailed on Oct. 13, 2025, 4 pages (1 page of English Translation and 3 pages of Official Copy).
Office Action received for European Patent Application No. 22198071.7, mailed on Oct. 17, 2025, 4 pages.
Corrected Notice of Allowance received for U.S. Appl. No. 18/380,116, mailed on Oct. 14, 2025, 20 pages.
Final Office Action received for U.S. Appl. No. 18/067,350, mailed on Oct. 16, 2025, 55 pages.
Notice of Allowance received for U.S. Appl. No. 18/367,977, mailed on Oct. 20, 2025, 9 pages.
Record of Oral Hearing received for U.S. Appl. No. 17/747,804, mailed on Oct. 14, 2025, 10 pages.
Record of Oral Hearing received for U.S. Appl. No. 18/200,480, mailed on Oct. 14, 2025, 15 pages.

* cited by examiner

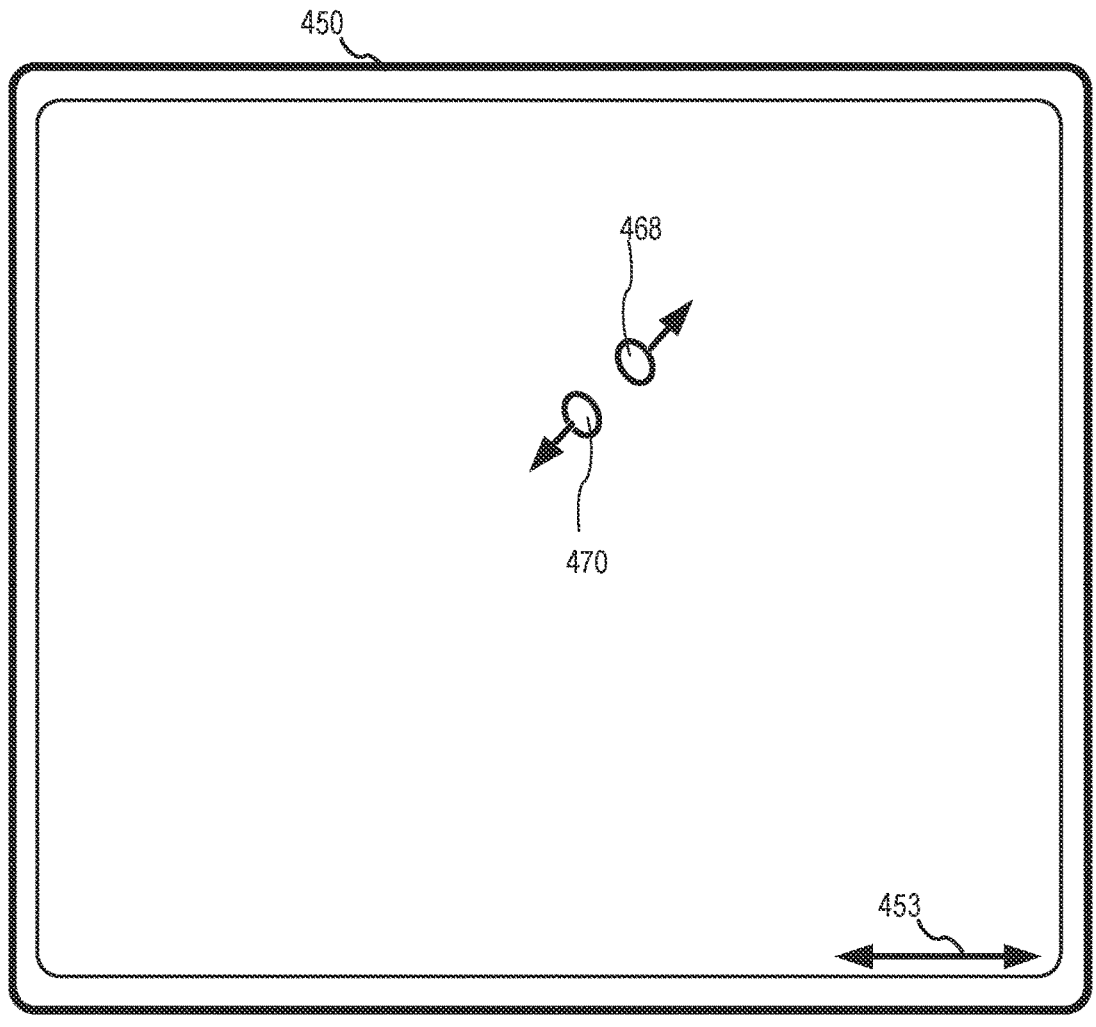
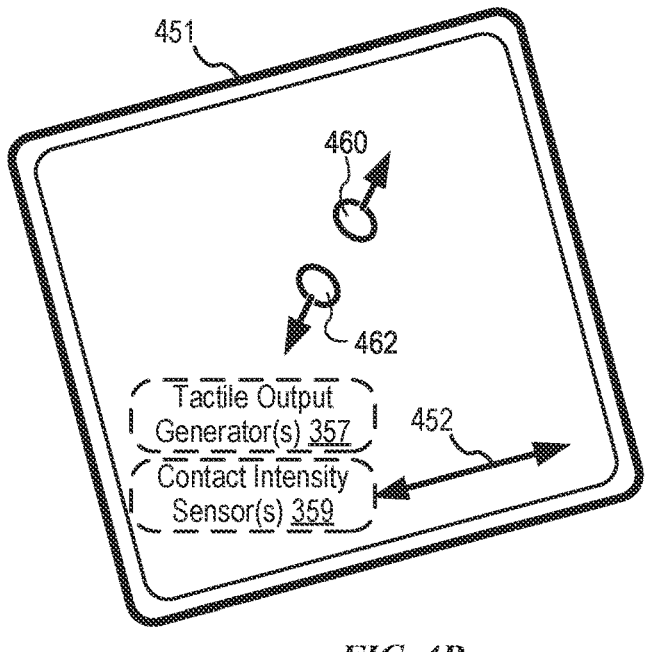
*FIG. 4B*

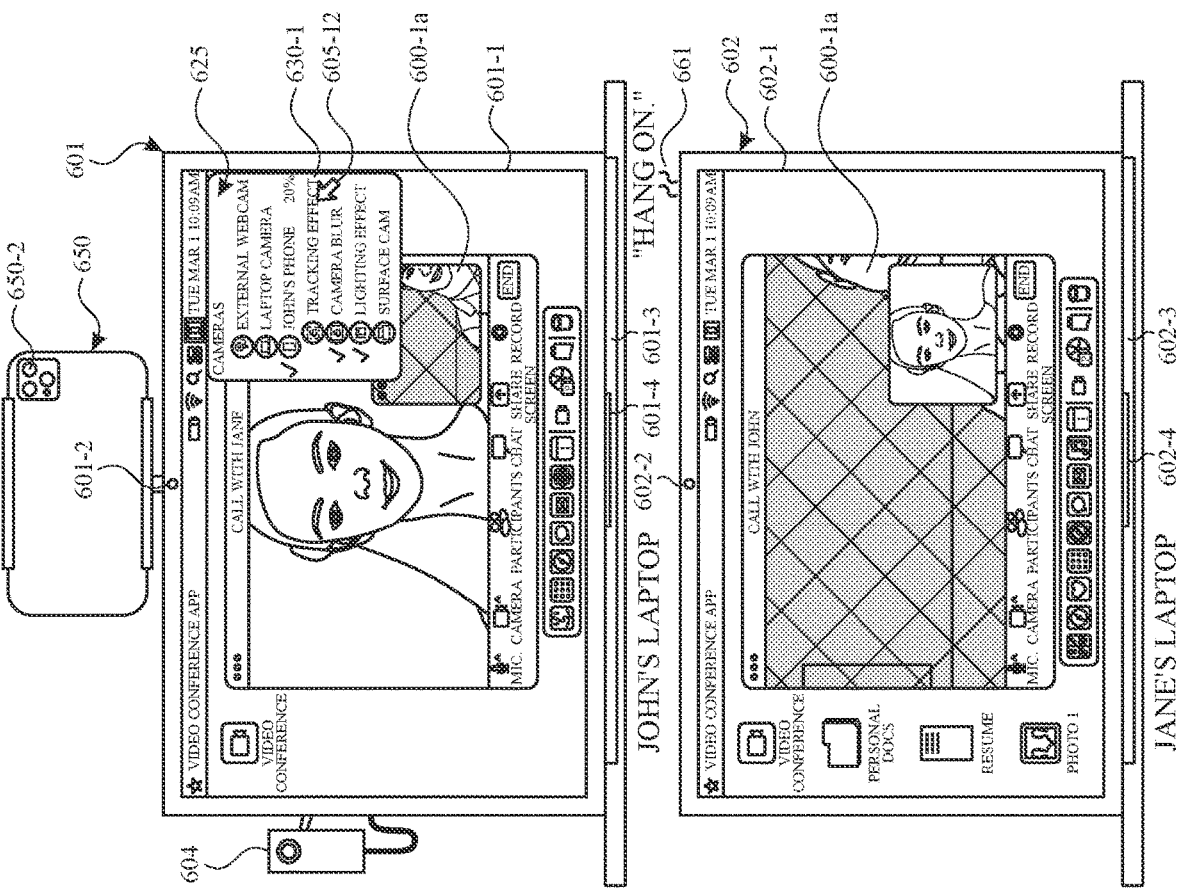
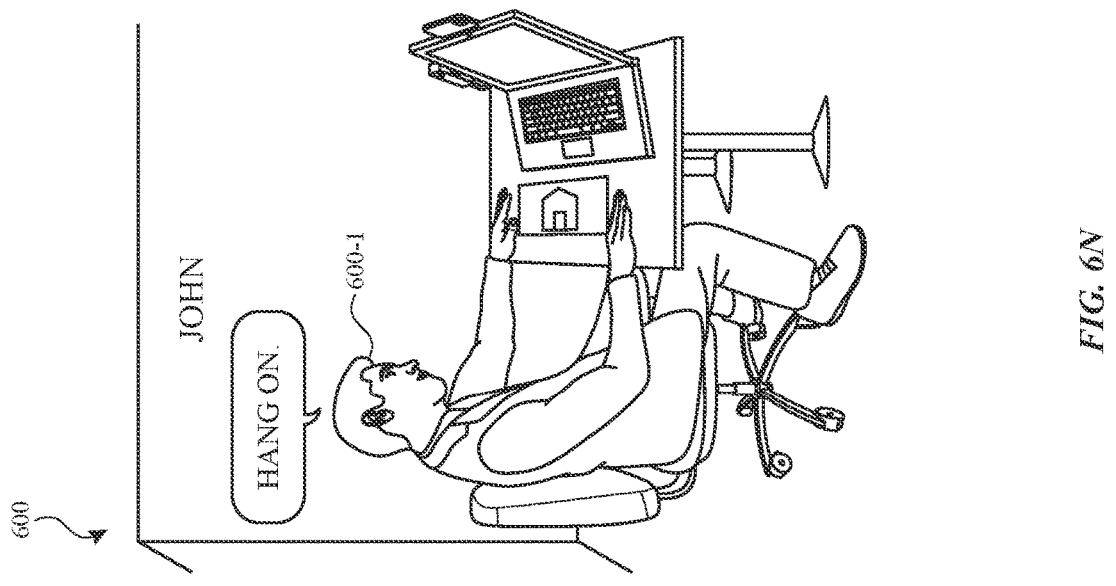
FIG. 6N

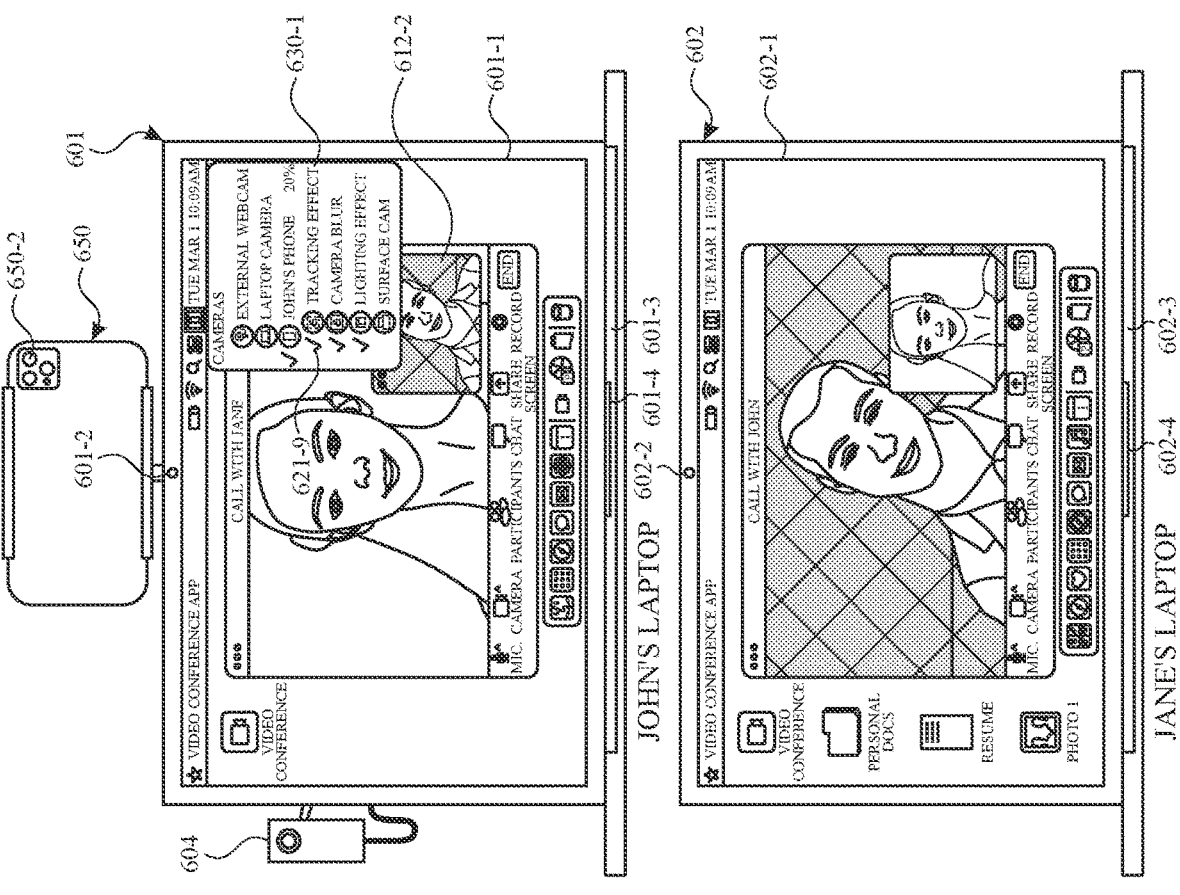
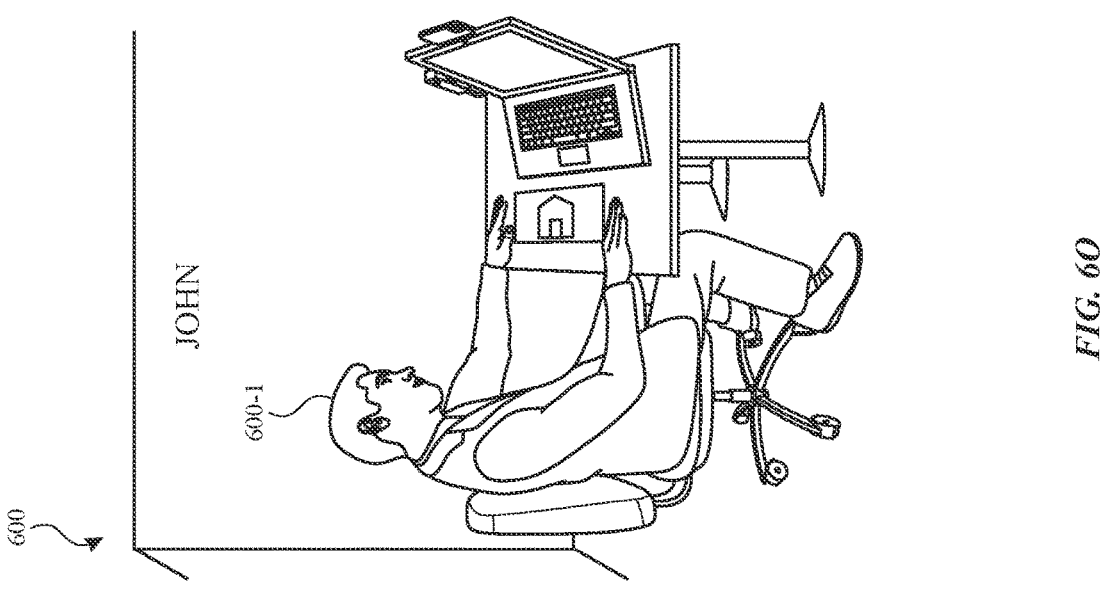
*FIG. 60*

700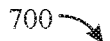

702
Display, via the one or more display generation components, a system user interface for the first computer system, wherein the system user interface is associated with an option for selecting one or more cameras for use with the first computer system, and wherein displaying the system user interface includes:

704
Display a camera selection option for selecting video information captured by one or more cameras of a second computer system, that is separate from the first computer system, to generate a video feed for the first computer system.

706
Display a set of one or more options associated with camera settings for the video information captured by the one or more cameras of the second computer system.

708
While displaying the system user interface including concurrently displaying the camera selection option and the set of one or more options associated with camera settings for the video information captured by the one or more cameras of the second computer system, receive, via the one or more input devices, one or more inputs directed to the system user interface.

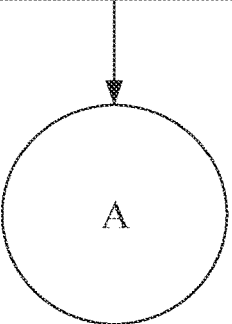

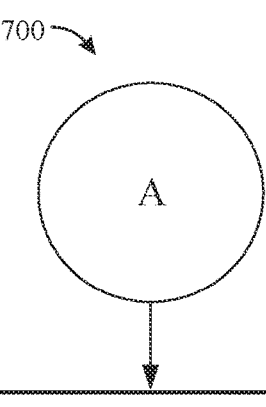

A

710

In response to receiving the one or more inputs directed to the system user interface, and in accordance with a determination that the one or more inputs corresponds to a selection of a respective option in the set of one or more options associated with camera settings for the video information captured by the one or more cameras of the second computer system, change a setting corresponding to the respective option for the one or more cameras of the second computer system when the video information of the one or more cameras of the second computer system is used to generate a video feed for the first computer system.

712

In response to receiving the one or more inputs directed to the system user interface, and in in accordance with a determination that the one or more inputs corresponds to a selection of the camera selection option, selecting the video information captured by the one or more cameras of the second computer system for use to generate a video feed for the first computer system.

*FIG. 7B*

800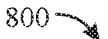

---

802
Receive, via the one or more input devices, a request to display a video feed interface for the first computer system.

↓

804
In response to receiving the request to display the video feed interface, display the video feed interface, including:

---

806
In accordance with a determination that a second computer system meets a first set of one or more criteria, wherein the first set of one or more criteria includes a requirement that the second computer system is within a first threshold distance of the first computer system in order for the first set of one or more criteria to be met, display the video feed interface with content corresponding to the second computer system

---

808
In accordance with a determination that a second computer system does not meet the first set of one or more criteria, display the video feed interface without content corresponding to the second computer system.

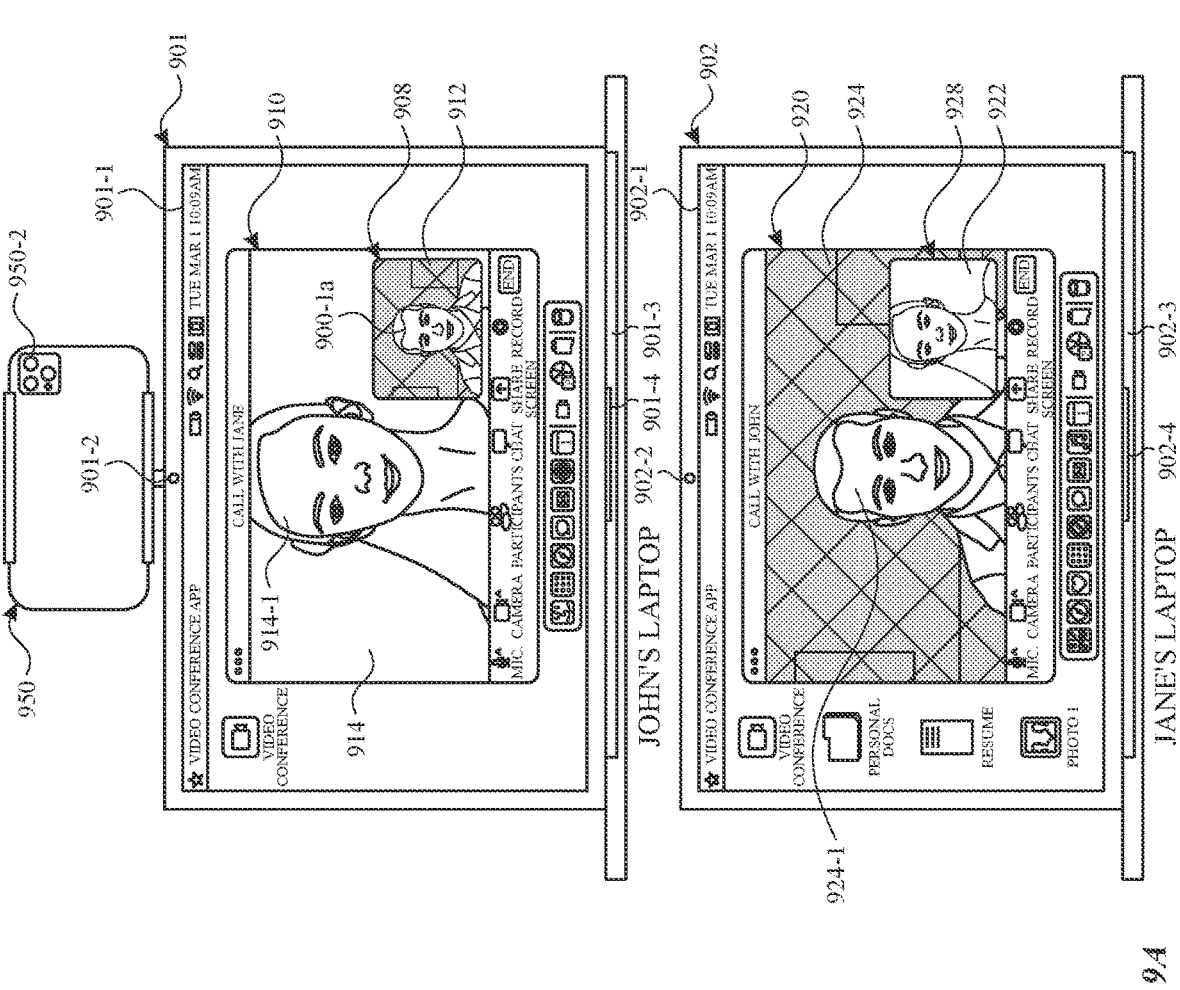
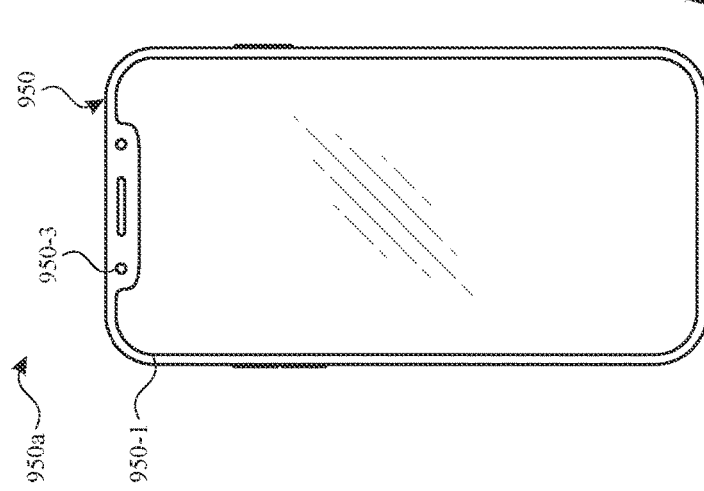
*FIG. 9A*

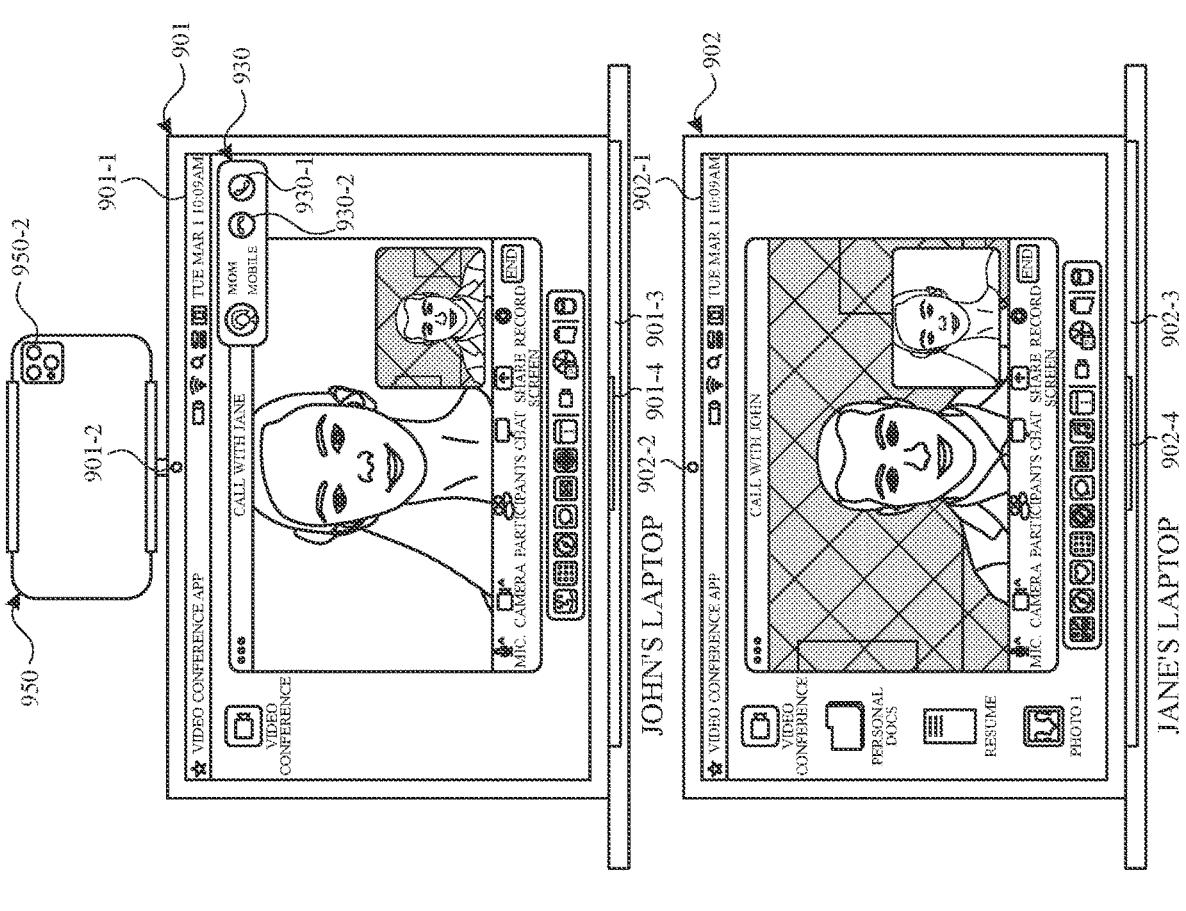
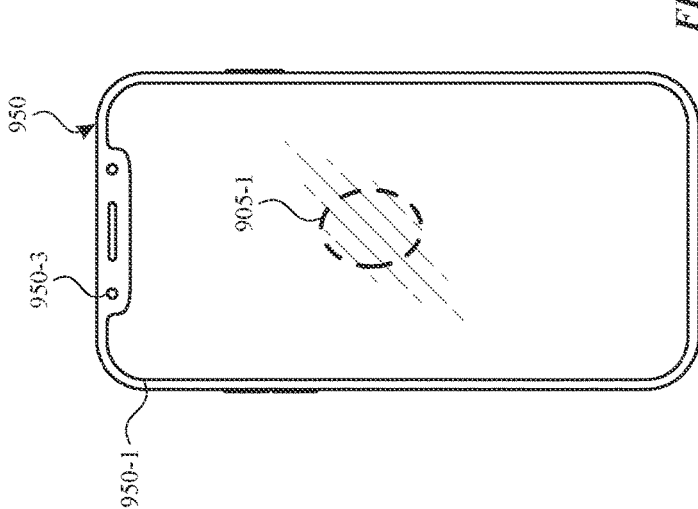
*FIG. 9B*

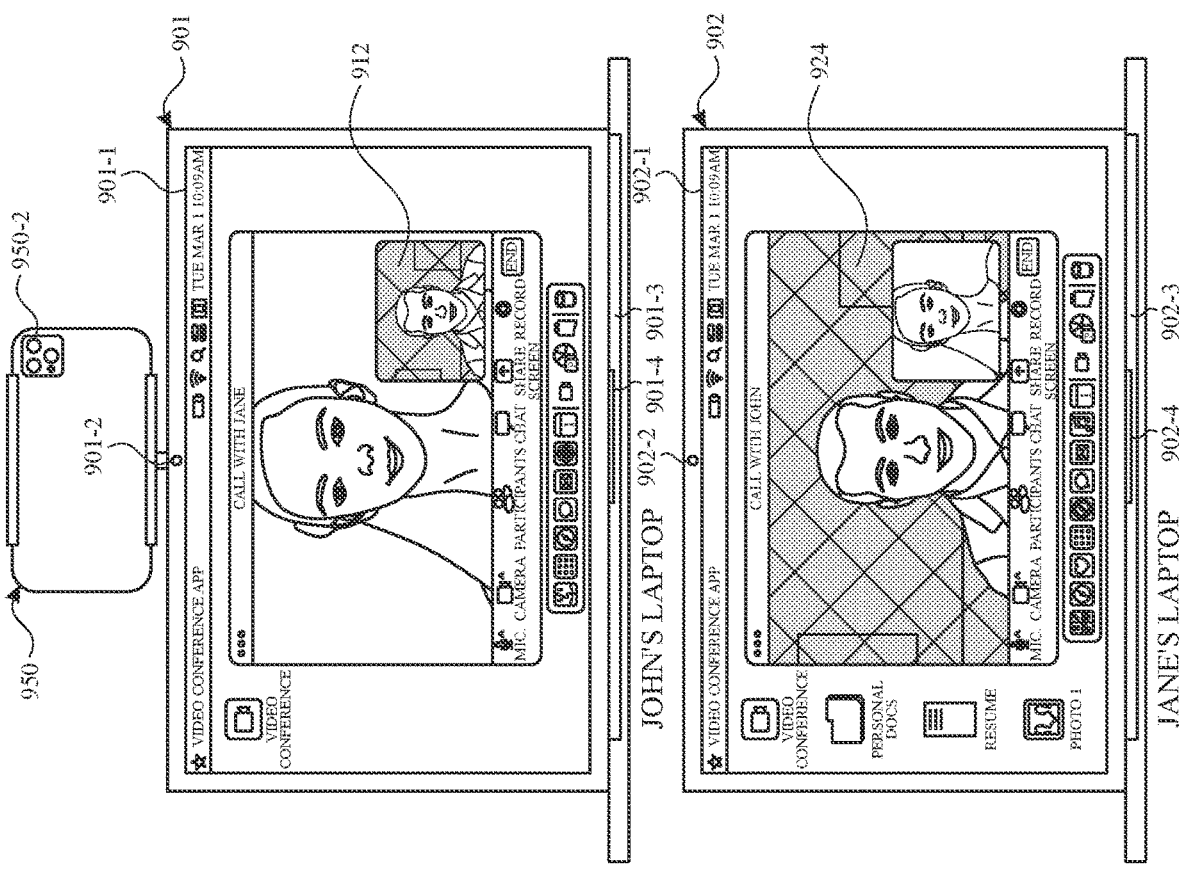
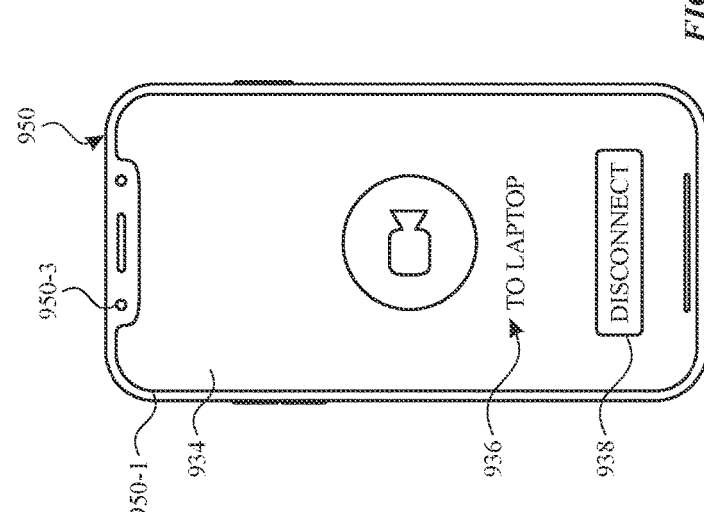
FIG. 9C

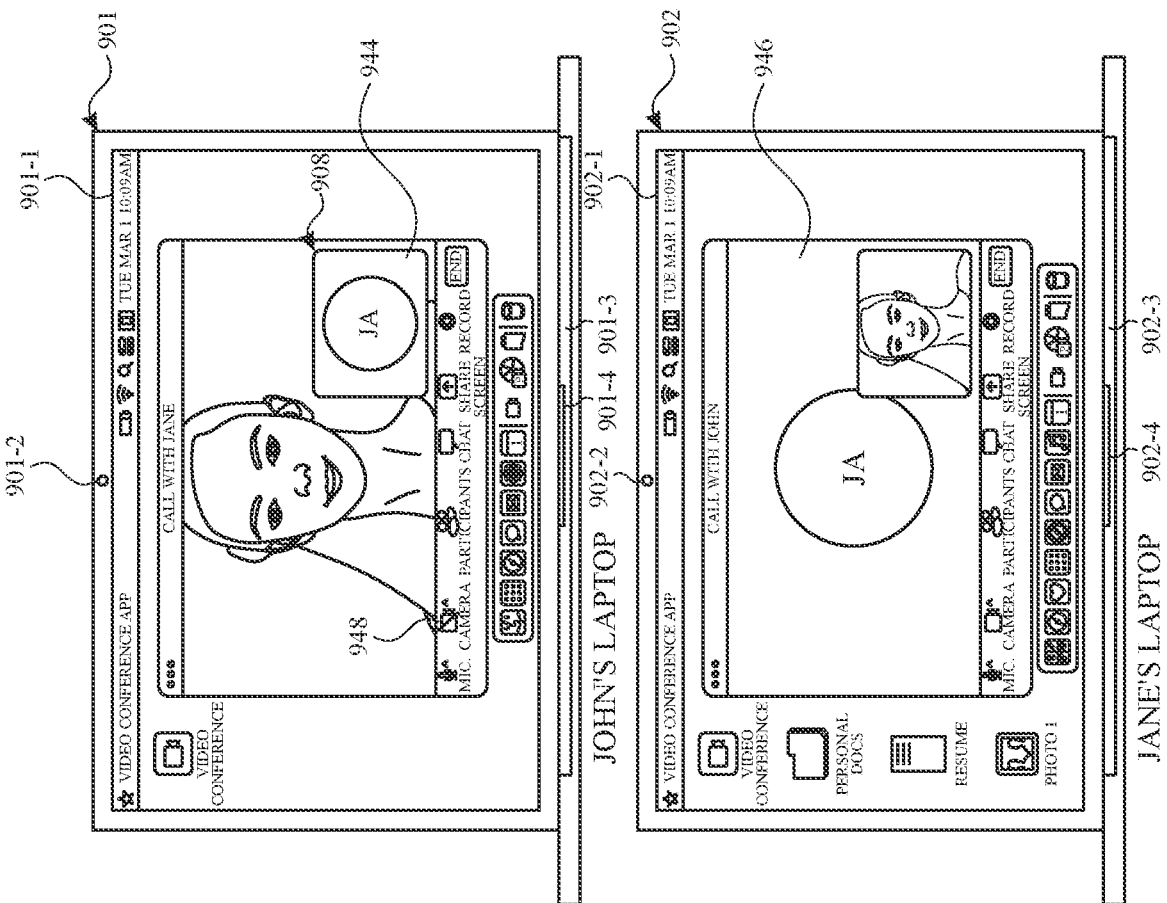
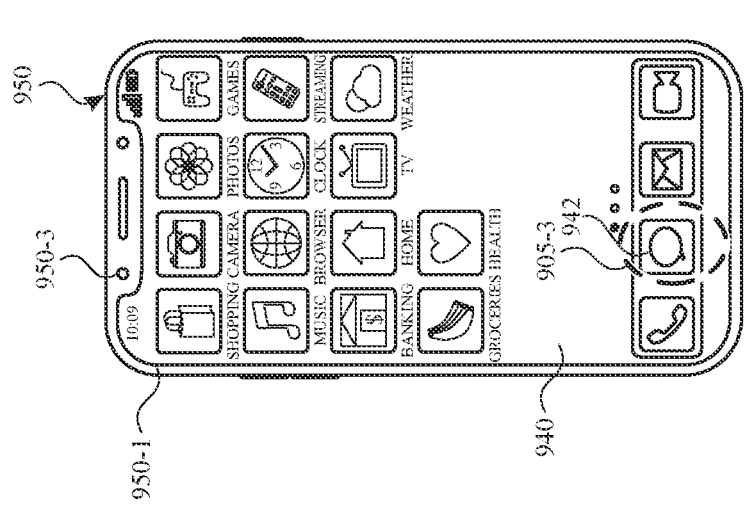
*FIG. 9E*

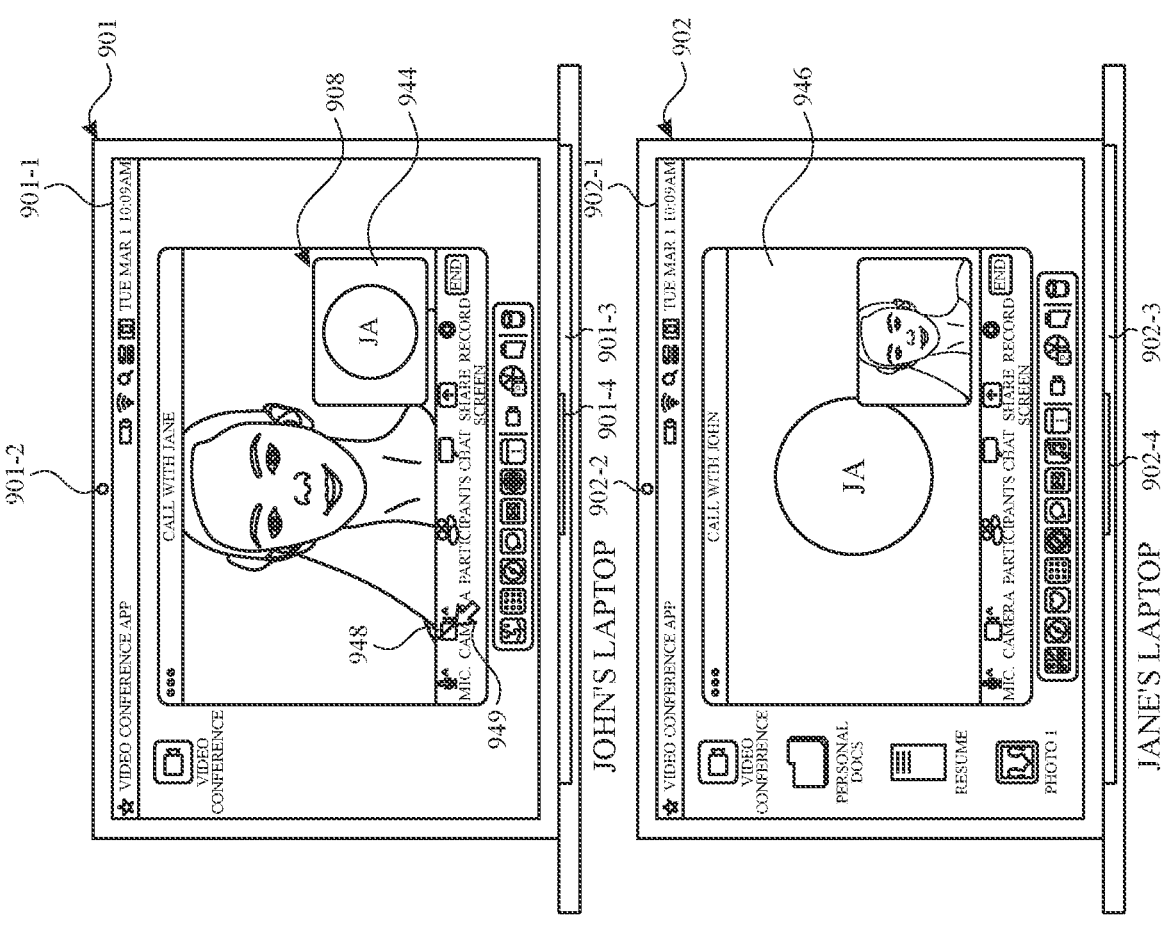
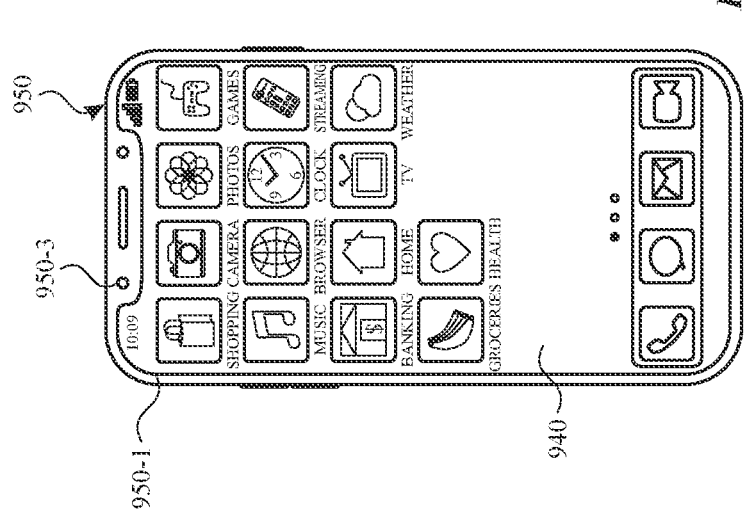
*FIG. 9H*

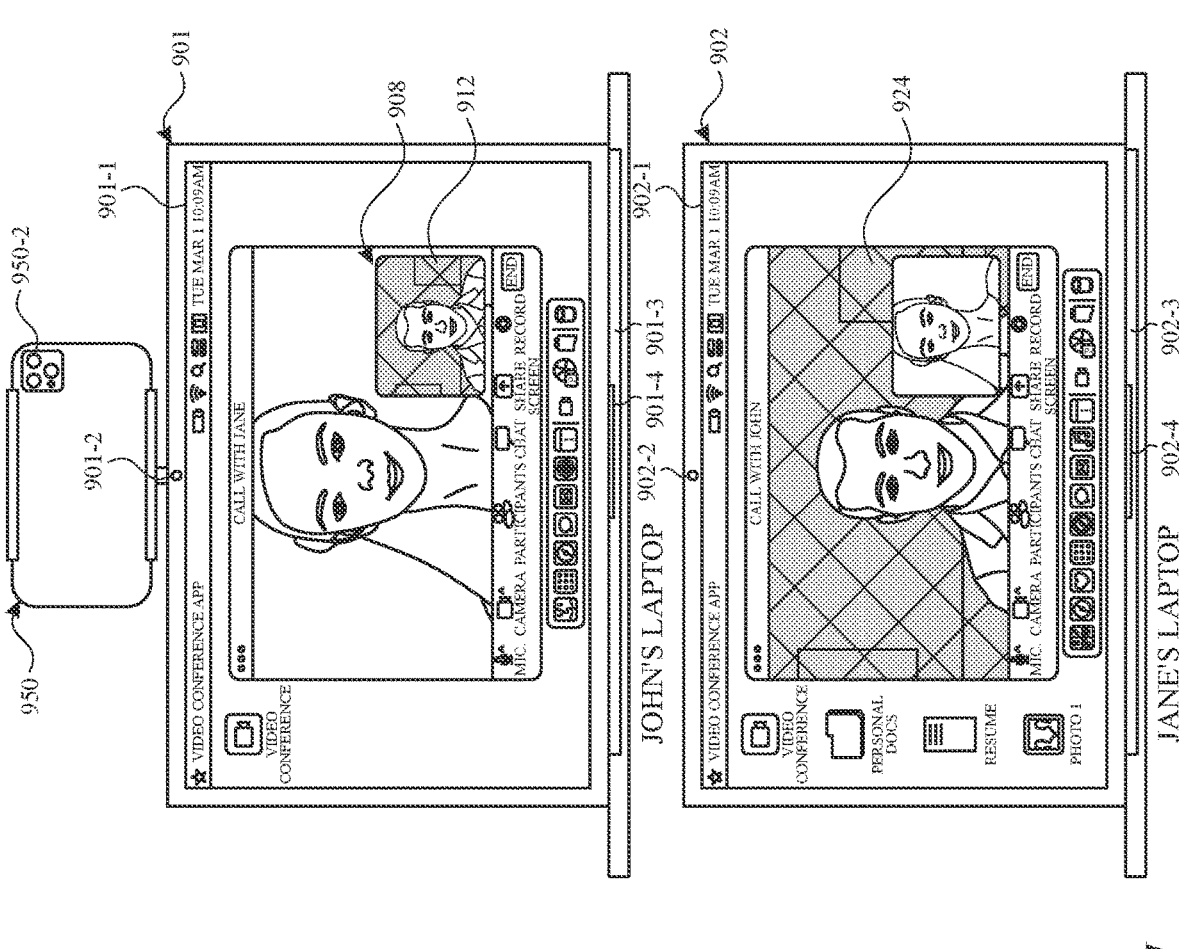
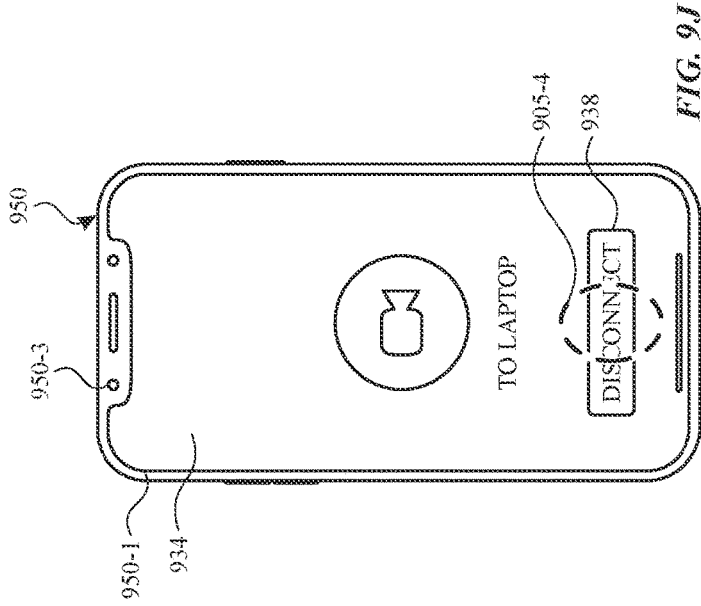
*FIG. 9J*

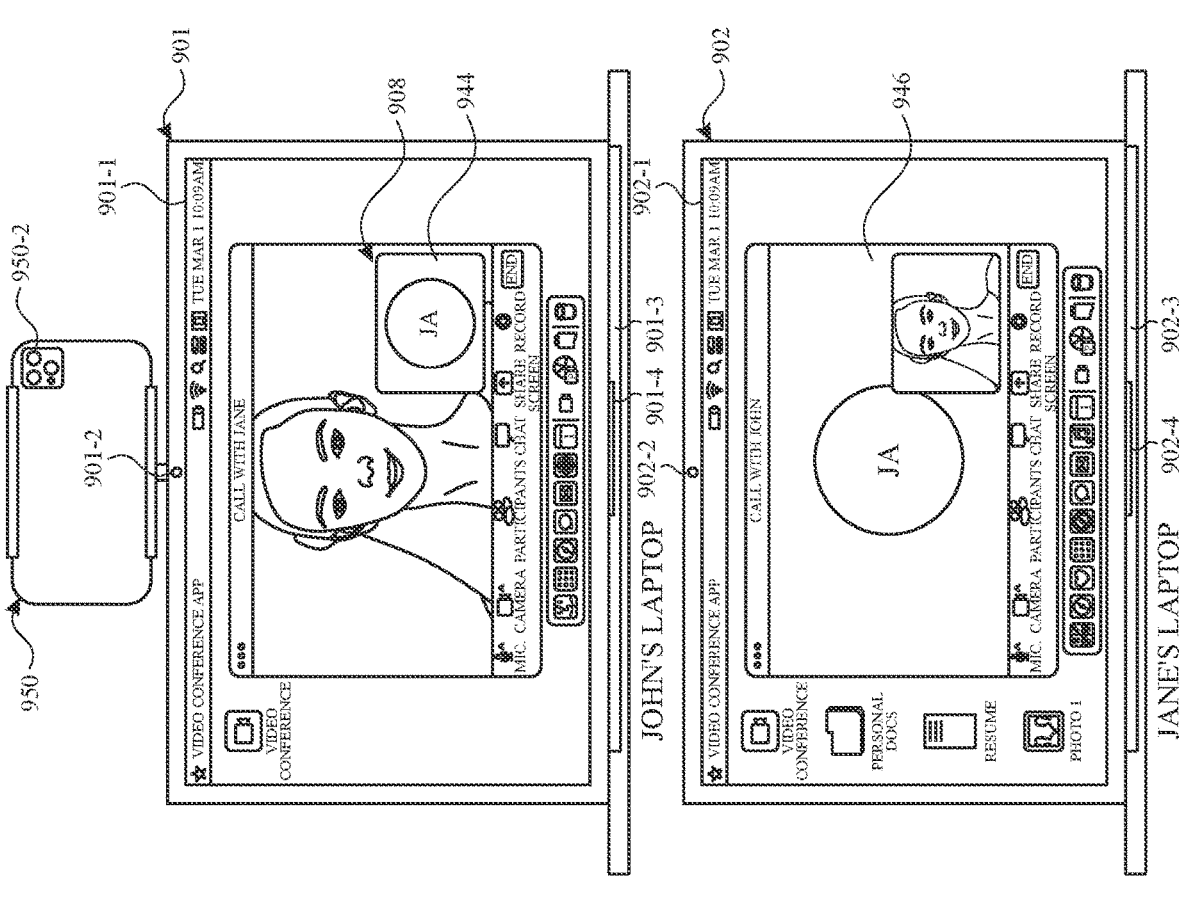
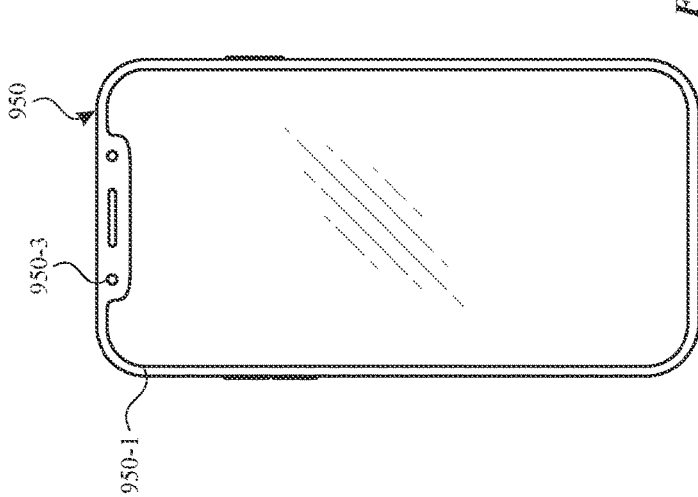
FIG. 9K

Figure 10:
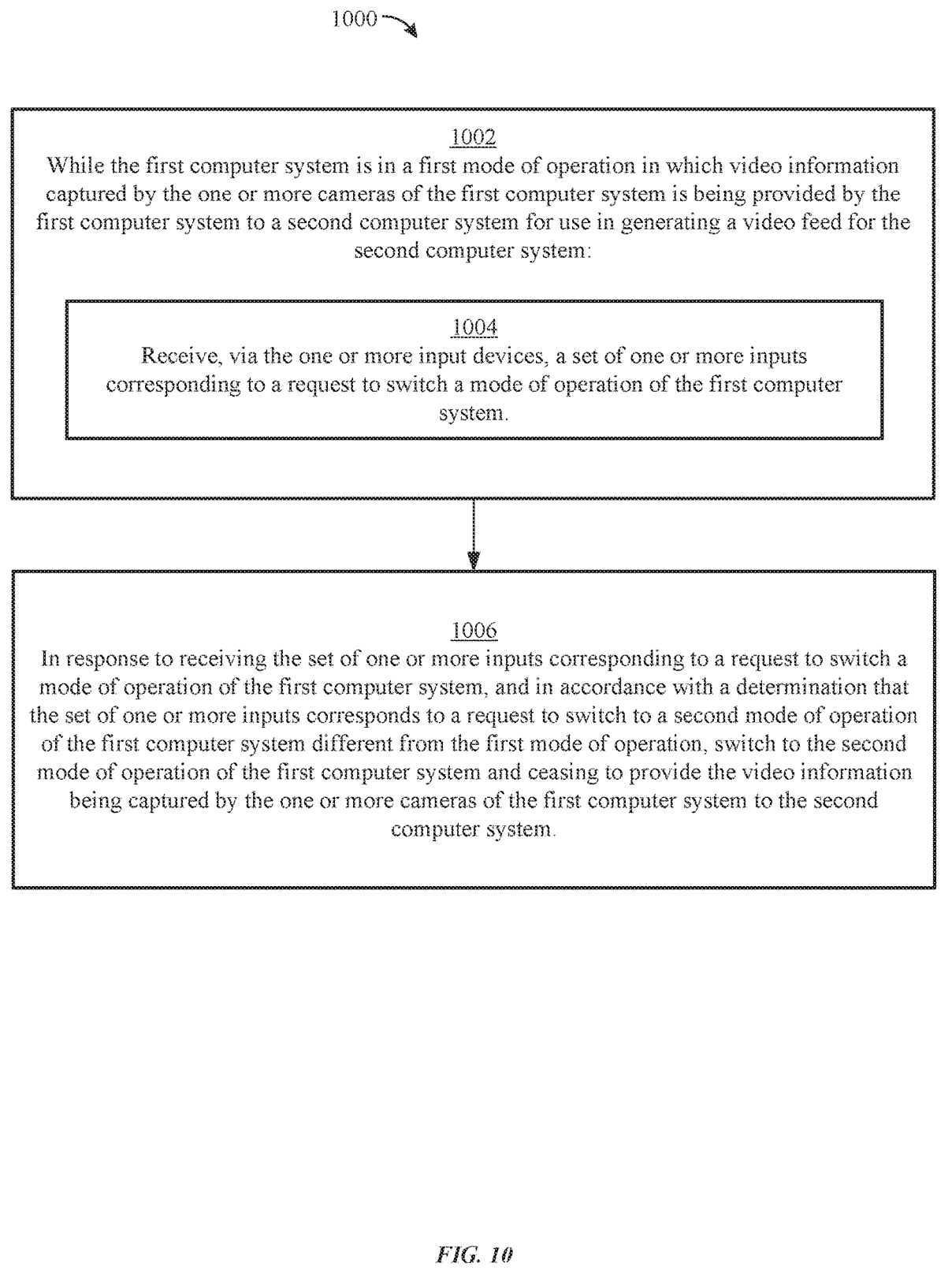

1000

---

1002

While the first computer system is in a first mode of operation in which video information captured by the one or more cameras of the first computer system is being provided by the first computer system to a second computer system for use in generating a video feed for the second computer system:

---

1004

Receive, via the one or more input devices, a set of one or more inputs corresponding to a request to switch a mode of operation of the first computer system.

---

1006

In response to receiving the set of one or more inputs corresponding to a request to switch a mode of operation of the first computer system, and in accordance with a determination that the set of one or more inputs corresponds to a request to switch to a second mode of operation of the first computer system different from the first mode of operation, switch to the second mode of operation of the first computer system and ceasing to provide the video information being captured by the one or more cameras of the first computer system to the second computer system.

USER INTERFACES FOR CAMERA SHARING

CROSS-REFERENCE TO RELATED APPLICATIONS

This application claims priority to U.S. Provisional Patent Application No. 63/327,279, entitled "USER INTERFACES FOR CAMERA SHARING," filed Apr. 4, 2022, the content of which is hereby incorporated by reference in its entirety.

FIELD

The present disclosure relates generally to computer user interfaces, and more specifically to techniques for managing camera sharing between devices.

BACKGROUND

Computer systems can include hardware and/or software for displaying interfaces for various types of communication and information sharing.

BRIEF SUMMARY

Some techniques for managing camera sharing using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing camera sharing between devices. Such methods and interfaces optionally complement or replace other methods for managing camera sharing between devices. Such methods and interfaces reduce the cognitive burden on a user, improve user privacy, and produce a more efficient human-machine interface. For battery-operated computing devices, such methods and interfaces conserve power and increase the time between battery charges.

In accordance with some embodiments, a method is performed at a first computer system that is in communication with one or more display generation components and one or more input devices. The method comprises: displaying, via the one or more display generation components, a system user interface for the first computer system, wherein the system user interface is associated with an option for selecting one or more cameras for use with the first computer system, and wherein displaying the system user interface includes concurrently displaying: a camera selection option for selecting video information captured by one or more cameras of a second computer system, that is separate from the first computer system, to generate a video feed for the first computer system; and a set of one or more options associated with camera settings for the video information captured by the one or more cameras of the second computer system; and while displaying the system user interface including concurrently displaying the camera selection option and the set of one or more options associated with camera settings for the video information captured by the one or more cameras of the second computer system, receiving, via the one or more input devices, one or more inputs directed to the system user interface; and in response to receiving the one or more inputs directed to the system user interface: in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system; and in accordance with a determination that the one or more inputs corresponds to a selection of the camera selection option, selecting the video information captured by the one or more cameras of the second computer system for use to generate a video feed for the first computer system.

In accordance with some embodiments, a non-transitory computer-readable storage medium is described. The non-transitory computer-readable storage medium stores one or more programs configured to be executed by one or more processors of a first computer system that is in communication with one or more display generation components and one or more input devices, the one or more programs including instructions for: displaying, via the one or more display generation components, a system user interface for the first computer system, wherein the system user interface is associated with an option for selecting one or more cameras for use with the first computer system, and wherein displaying the system user interface includes concurrently displaying: a camera selection option for selecting video information captured by one or more cameras of a second computer system, that is separate from the first computer system, to generate a video feed for the first computer system; and a set of one or more options associated with camera settings for the video information captured by the one or more cameras of the second computer system; and while displaying the system user interface including concurrently displaying the camera selection option and the set of one or more options associated with camera settings for the video information captured by the one or more cameras of the second computer system, receiving, via the one or more input devices, one or more inputs directed to the system user interface; and in response to receiving the one or more inputs directed to the system user interface: in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system; and in accordance with a determination that the one or more inputs corresponds to a selection of the camera selection option, selecting the video information captured by the one or more cameras of the second computer system for use to generate a video feed for the first computer system.

In accordance with some embodiments, a transitory computer-readable storage medium is described. The transitory computer-readable storage medium stores one or more programs configured to be executed by one or more processors of a first computer system that is in communication with one or more display generation components and one or more input devices, the one or more programs including instructions for: displaying, via the one or more display generation components, a system user interface for the first computer system, wherein the system user interface is associated with an option for selecting one or more cameras for use with the first computer system, and wherein displaying the system user interface includes concurrently displaying: a camera selection option for selecting video information captured by one or more cameras of a second computer system, that is separate from the first computer system, to generate a video feed for the first computer system; and a set of one or more options associated with camera settings for the video information captured by the one or more cameras of the second computer system; and while displaying the system user interface including concurrently displaying the camera selection option and the set of one or more options associated with camera settings for the video information captured by the one or more cameras of the second computer system, receiving, via the one or more input devices, one or more inputs directed to the system user interface; and in response to receiving the one or more inputs directed to the system user interface: in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system; and in accordance with a determination that the one or more inputs corresponds to a selection of the camera selection option, selecting the video information captured by the one or more cameras of the second computer system for use to generate a video feed for the first computer system.

In accordance with some embodiments a first computer system is described. The computer system is configured to communicate with one or more display generation components and one or more input devices. The first computer system comprises: one or more processors; and memory storing one or more programs configured to be executed by the one or more processors, the one or more programs including instructions for: displaying, via the one or more display generation components, a system user interface for the first computer system, wherein the system user interface is associated with an option for selecting one or more cameras for use with the first computer system, and wherein displaying the system user interface includes concurrently displaying: a camera selection option for selecting video information captured by one or more cameras of a second computer system, that is separate from the first computer system, to generate a video feed for the first computer system; and a set of one or more options associated with camera settings for the video information captured by the one or more cameras of the second computer system; and while displaying the system user interface including concurrently displaying the camera selection option and the set of one or more options associated with camera settings for the video information captured by the one or more cameras of the second computer system, receiving, via the one or more input devices, one or more inputs directed to the system user interface; and in response to receiving the one or more inputs directed to the system user interface: in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system; and in accordance with a determination that the one or more inputs corresponds to a selection of the camera selection option, selecting the video information captured by the one or more cameras of the second computer system for use to generate a video feed for the first computer system.

In accordance with some embodiments, a first computer system is described. The first computer system is configured to communicate with one or more display generation components and one or more input devices. The first computer system comprises: means for displaying, via the one or more display generation components, a system user interface for the first computer system, wherein the system user interface is associated with an option for selecting one or more cameras for use with the first computer system, and wherein displaying the system user interface includes concurrently displaying: a camera selection option for selecting video information captured by one or more cameras of a second computer system, that is separate from the first computer system, to generate a video feed for the first computer system; and a set of one or more options associated with camera settings for the video information captured by the one or more cameras of the second computer system; and means for, while displaying the system user interface including concurrently displaying the camera selection option and the set of one or more options associated with camera settings for the video information captured by the one or more cameras of the second computer system, receiving, via the one or more input devices, one or more inputs directed to the system user interface; and means for, in response to receiving the one or more inputs directed to the system user interface: in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system; and in accordance with a determination that the one or more inputs corresponds to a selection of the camera selection option, selecting the video information captured by the one or more cameras of the second computer system for use to generate a video feed for the first computer system.

In some embodiments, a computer program product is described. The computer program product comprises: one or more programs configured to be executed by one or more processors of a first computer system that is in communication with one or more display generation components and one or more input devices, the one or more programs including instructions for: displaying, via the one or more display generation components, a system user interface for the first computer system, wherein the system user interface is associated with an option for selecting one or more cameras for use with the first computer system, and wherein displaying the system user interface includes concurrently displaying: a camera selection option for selecting video information captured by one or more cameras of a second computer system, that is separate from the first computer system, to generate a video feed for the first computer system; and a set of one or more options associated with camera settings for the video information captured by the one or more cameras of the second computer system; and while displaying the system user interface including concurrently displaying the camera selection option and the set of one or more options associated with camera settings for the video information captured by the one or more cameras of the second computer system, receiving, via the one or more input devices, one or more inputs directed to the system user interface; and in response to receiving the one or more inputs directed to the system user interface: in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system; and in accordance with a determination that the one or more inputs corresponds to a selection of the camera selection option, selecting the video information captured by the one or more cameras of the second computer system for use to generate a video feed for the first computer system.

In accordance with some embodiments, a method is performed at a first computer system that is in communication with one or more cameras and one or more input devices. The method comprises: while the first computer system is in a first mode of operation in which video information captured by the one or more cameras of the first computer system is being provided by the first computer system to a second computer system for use in generating a video feed for the second computer system: receiving, via the one or more input devices, a set of one or more inputs corresponding to a request to switch a mode of operation of the first computer system; and in response to receiving the set of one or more inputs corresponding to a request to switch a mode of operation of the first computer system: in accordance with a determination that the set of one or more inputs corresponds to a request to switch to a second mode of operation of the first computer system different from the first mode of operation, switching to the second mode of operation of the first computer system and ceasing to provide the video information being captured by the one or more cameras of the first computer system to the second computer system.

In accordance with some embodiments, a non-transitory computer-readable storage medium is described. The non-transitory computer-readable storage medium stores one or more programs configured to be executed by one or more processors of a first computer system that is in communication with one or more cameras and one or more input devices, the one or more programs including instructions for: while the first computer system is in a first mode of operation in which video information captured by the one or more cameras of the first computer system is being provided by the first computer system to a second computer system for use in generating a video feed for the second computer system: receiving, via the one or more input devices, a set of one or more inputs corresponding to a request to switch a mode of operation of the first computer system; and in response to receiving the set of one or more inputs corresponding to a request to switch a mode of operation of the first computer system: in accordance with a determination that the set of one or more inputs corresponds to a request to switch to a second mode of operation of the first computer system different from the first mode of operation, switching to the second mode of operation of the first computer system and ceasing to provide the video information being captured by the one or more cameras of the first computer system to the second computer system.

In accordance with some embodiments, a transitory computer-readable storage medium is described. The transitory computer-readable storage medium stores one or more programs configured to be executed by one or more processors of a first computer system that is in communication with one or more cameras and one or more input devices, the one or more programs including instructions for: while the first computer system is in a first mode of operation in which video information captured by the one or more cameras of the first computer system is being provided by the first computer system to a second computer system for use in generating a video feed for the second computer system: receiving, via the one or more input devices, a set of one or more inputs corresponding to a request to switch a mode of operation of the first computer system; and in response to receiving the set of one or more inputs corresponding to a request to switch a mode of operation of the first computer system: in accordance with a determination that the set of one or more inputs corresponds to a request to switch to a second mode of operation of the first computer system different from the first mode of operation, switching to the second mode of operation of the first computer system and ceasing to provide the video information being captured by the one or more cameras of the first computer system to the second computer system.

In accordance with some embodiments a first computer system is described. The computer system is configured to communicate with one or more cameras and one or more input devices. The first computer system comprises: one or more processors; and memory storing one or more programs configured to be executed by the one or more processors, the one or more programs including instructions for: while the first computer system is in a first mode of operation in which video information captured by the one or more cameras of the first computer system is being provided by the first computer system to a second computer system for use in generating a video feed for the second computer system: receiving, via the one or more input devices, a set of one or more inputs corresponding to a request to switch a mode of operation of the first computer system; and in response to receiving the set of one or more inputs corresponding to a request to switch a mode of operation of the first computer system: in accordance with a determination that the set of one or more inputs corresponds to a request to switch to a second mode of operation of the first computer system different from the first mode of operation, switching to the second mode of operation of the first computer system and ceasing to provide the video information being captured by the one or more cameras of the first computer system to the second computer system.

In accordance with some embodiments, a first computer system is described. The first computer system is configured to communicate with one or more cameras and one or more input devices. The first computer system comprises: means for, while the first computer system is in a first mode of operation in which video information captured by the one or more cameras of the first computer system is being provided by the first computer system to a second computer system for use in generating a video feed for the second computer system: receiving, via the one or more input devices, a set of one or more inputs corresponding to a request to switch a mode of operation of the first computer system; and means for, in response to receiving the set of one or more inputs corresponding to a request to switch a mode of operation of the first computer system: in accordance with a determination that the set of one or more inputs corresponds to a request to switch to a second mode of operation of the first computer system different from the first mode of operation, switching to the second mode of operation of the first computer system and ceasing to provide the video information being captured by the one or more cameras of the first computer system to the second computer system.

In some embodiments, a computer program product is described. The computer program product comprises: one or more programs configured to be executed by one or more processors of a first computer system that is in communication with one or more cameras and one or more input devices, the one or more programs including instructions for: while the first computer system is in a first mode of operation in which video information captured by the one or more cameras of the first computer system is being provided by the first computer system to a second computer system for use in generating a video feed for the second computer system: receiving, via the one or more input devices, a set of one or more inputs corresponding to a request to switch a mode of operation of the first computer system; and in response to receiving the set of one or more inputs corresponding to a request to switch a mode of operation of the first computer system: in accordance with a determination that the set of one or more inputs corresponds to a request to switch to a second mode of operation of the first computer system different from the first mode of operation, switching to the second mode of operation of the first computer system and ceasing to provide the video information being captured by the one or more cameras of the first computer system to the second computer system.

In accordance with some embodiments, a method is performed at a first computer system that is in communication with one or more display generation components and one or more input devices. The method comprises: receiving, via the one or more input devices, a request to display a video feed interface for the first computer system; and in response to receiving the request to display the video feed interface, displaying the video feed interface, including: in accordance with a determination that a second computer system meets a first set of one or more criteria, wherein the first set of one or more criteria includes a requirement that the second computer system is within a first threshold distance of the first computer system in order for the first set of one or more criteria to be met, displaying the video feed interface with content corresponding to the second computer system; and in accordance with a determination that a second computer system does not meet the first set of one or more criteria, displaying the video feed interface without content corresponding to the second computer system.

In accordance with some embodiments, a non-transitory computer-readable storage medium is described. The non-transitory computer-readable storage medium stores one or more programs configured to be executed by one or more processors of a first computer system that is in communication with one or more display generation components and one or more input devices, the one or more programs including instructions for: receiving, via the one or more input devices, a request to display a video feed interface for the first computer system; and in response to receiving the request to display the video feed interface, displaying the video feed interface, including: in accordance with a determination that a second computer system meets a first set of one or more criteria, wherein the first set of one or more criteria includes a requirement that the second computer system is within a first threshold distance of the first computer system in order for the first computer system in order for the first set of one or more criteria to be met, displaying the video feed interface with content corresponding to the second computer system; and in accordance with a determination that a second computer system does not meet the first set of one or more criteria, displaying the video feed interface without content corresponding to the second computer system.

In accordance with some embodiments, a transitory computer-readable storage medium is described. The transitory computer-readable storage medium stores one or more programs configured to be executed by one or more processors of a first computer system that is in communication with one or more display generation components and one or more input devices, the one or more programs including instructions for: receiving, via the one or more input devices, a request to display a video feed interface for the first computer system; and in response to receiving the request to display the video feed interface, displaying the video feed interface, including: in accordance with a determination that a second computer system meets a first set of one or more criteria, wherein the first set of one or more criteria includes a requirement that the second computer system is within a first threshold distance of the first computer system in order for the first set of one or more criteria to be met, displaying the video feed interface with content corresponding to the second computer system; and in accordance with a determination that a second computer system does not meet the first set of one or more criteria, displaying the video feed interface without content corresponding to the second computer system.

In accordance with some embodiments a first computer system is described. The computer system is configured to communicate with one or more display generation components and one or more input devices. The first computer system comprises: one or more processors; and memory storing one or more programs configured to be executed by the one or more processors, the one or more programs including instructions for: receiving, via the one or more input devices, a request to display a video feed interface for the first computer system; and in response to receiving the request to display the video feed interface, displaying the video feed interface, including: in accordance with a determination that a second computer system meets a first set of one or more criteria, wherein the first set of one or more criteria includes a requirement that the second computer system is within a first threshold distance of the first computer system in order for the first set of one or more criteria to be met, displaying the video feed interface with content corresponding to the second computer system; and in accordance with a determination that a second computer system does not meet the first set of one or more criteria, displaying the video feed interface without content corresponding to the second computer system.

In accordance with some embodiments, a first computer system is described. The first computer system is configured to communicate with one or more display generation components and one or more input devices. The first computer system comprises: means for receiving, via the one or more input devices, a request to display a video feed interface for the first computer system; and means for, in response to receiving the request to display the video feed interface, displaying the video feed interface, including: in accordance with a determination that a second computer system meets a first set of one or more criteria, wherein the first set of one or more criteria includes a requirement that the second computer system is within a first threshold distance of the first computer system in order for the first set of one or more criteria to be met, displaying the video feed interface with content corresponding to the second computer system; and in accordance with a determination that a second computer system does not meet the first set of one or more criteria, displaying the video feed interface without content corresponding to the second computer system.

In some embodiments, a computer program product is described. The computer program product comprises: one or more programs configured to be executed by one or more processors of a first computer system that is in communication with one or more display generation components and one or more input devices, the one or more programs including instructions for: receiving, via the one or more input devices, a request to display a video feed interface for the first computer system; and in response to receiving the request to display the video feed interface, displaying the video feed interface, including: in accordance with a determination that a second computer system meets a first set of one or more criteria, wherein the first set of one or more criteria includes a requirement that the second computer system is within a first threshold distance of the first computer system in order for the first set of one or more criteria to be met, displaying the video feed interface with content corresponding to the second computer system; and in accordance with a determination that a second computer system does not meet the first set of one or more criteria, displaying the video feed interface without content corresponding to the second computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing camera sharing between devices, thereby increasing the effectiveness, efficiency, and user satisfaction with such devices. Such methods and interfaces may complement or replace other methods and interfaces for managing camera sharing between devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A and 7B depict a flow diagram illustrating a method for managing camera sharing between devices, in accordance with some embodiments.

FIG. 8 depicts a flow diagram illustrating a method for managing camera sharing between devices, in accordance with some embodiments.

FIGS. 9A-9K illustrate exemplary user interfaces for managing camera sharing between devices, in accordance with some embodiments.

FIG. 10 depicts a flow diagram illustrating a method for managing camera sharing between devices, in accordance with some embodiments.

DESCRIPTION OF EMBODIMENTS

Figure 1A:
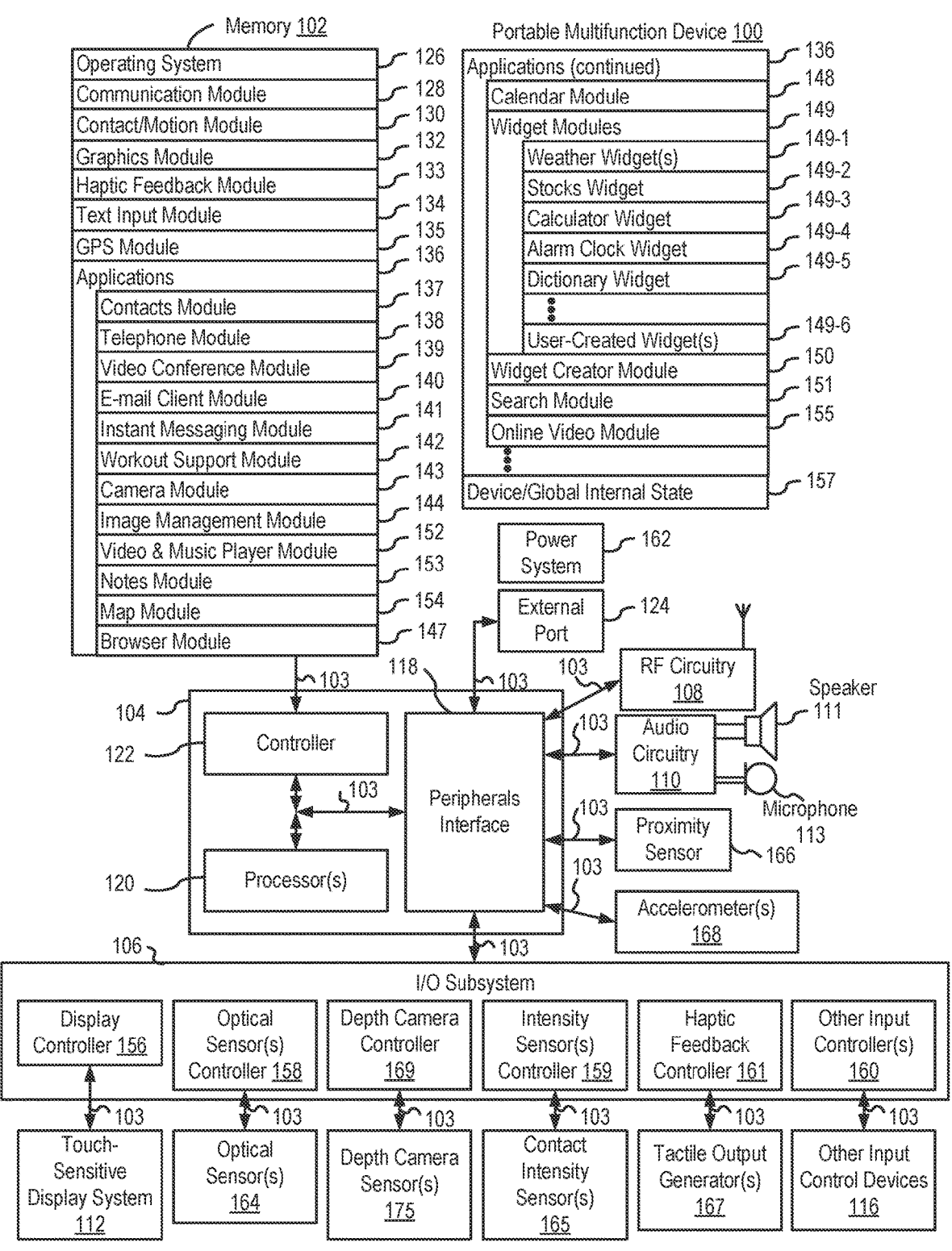
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing camera sharing between devices. Such techniques can reduce the cognitive burden on a user who shares camera information between devices, thereby enhancing productivity. Further, such techniques can reduce processor and battery power otherwise wasted on redundant user inputs.

Below, FIGS. 1A-1B, 2, 3, 4A-4B, and 5A-5C provide a description of exemplary devices for performing the techniques for managing camera sharing between devices. FIGS. 6A-6R illustrate exemplary user interfaces for managing camera sharing between devices. FIGS. 7A and 7B are a flow diagram illustrating methods of managing camera sharing between devices in accordance with some embodiments. FIG. 8 is a flow diagram illustrating methods of managing camera sharing between devices in accordance with some embodiments. The user interfaces in FIGS. 6A-6R are used to illustrate the processes described below, including the processes in FIGS. 7A, 7B, and 8. FIGS. 9A-9K illustrate exemplary user interfaces for managing camera sharing between devices. FIG. 10 is a flow diagram illustrating methods of managing camera sharing between devices in accordance with some embodiments. The user interfaces in FIGS. 9A-9K are used to illustrate the processes described below, including the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, providing improved security and/or privacy, improving ease of use of the electronic devices, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
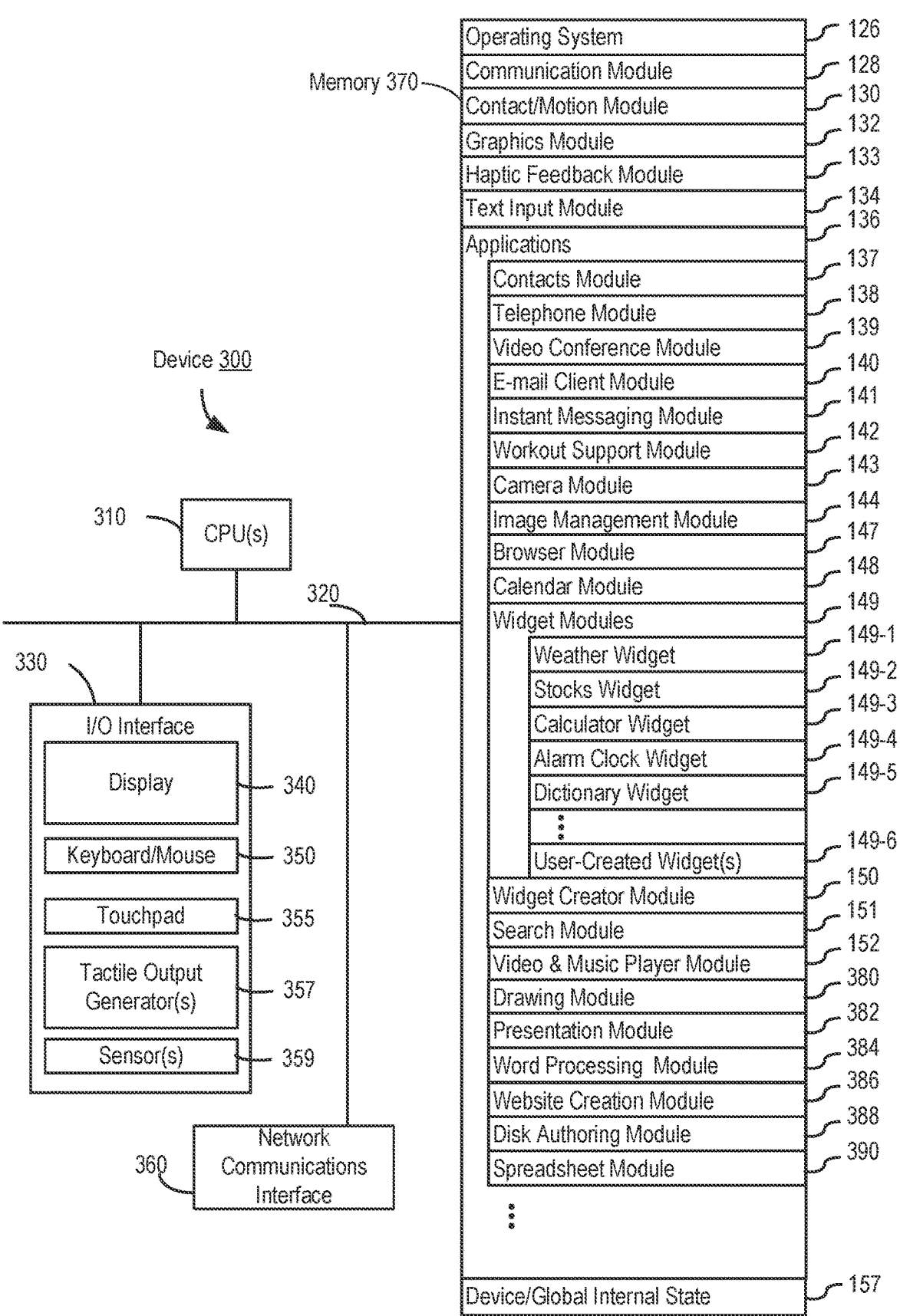
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM module 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
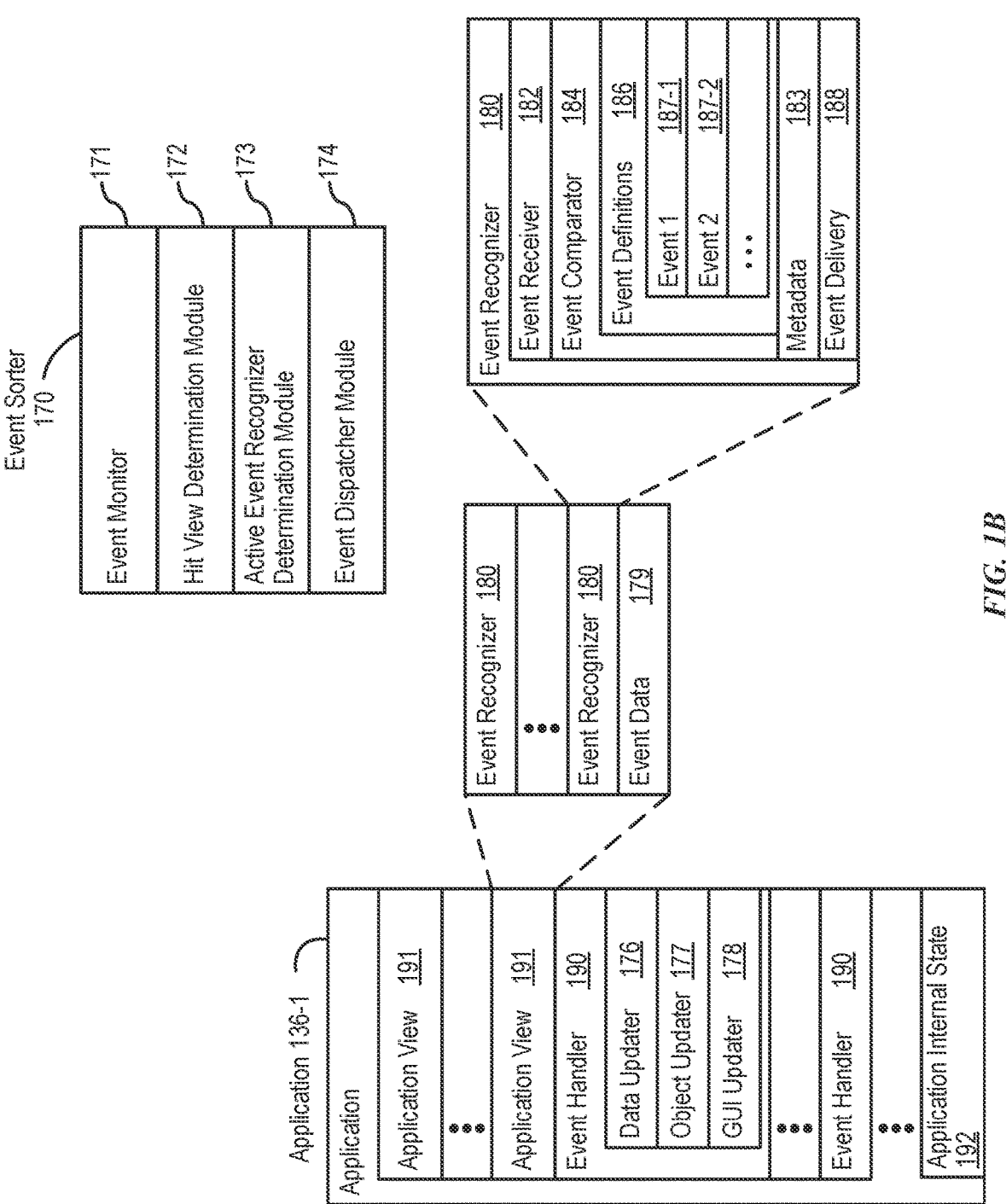
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
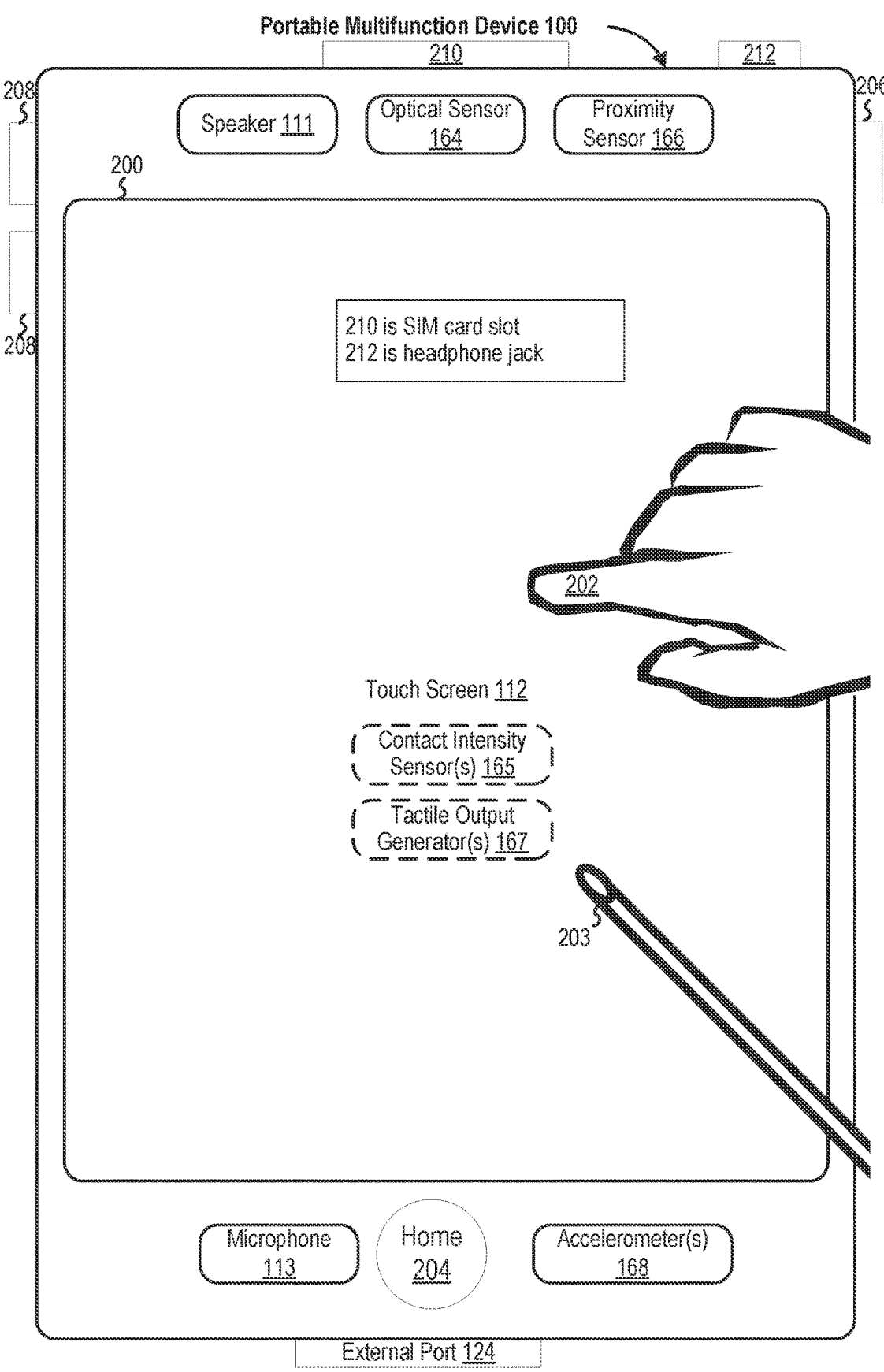
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
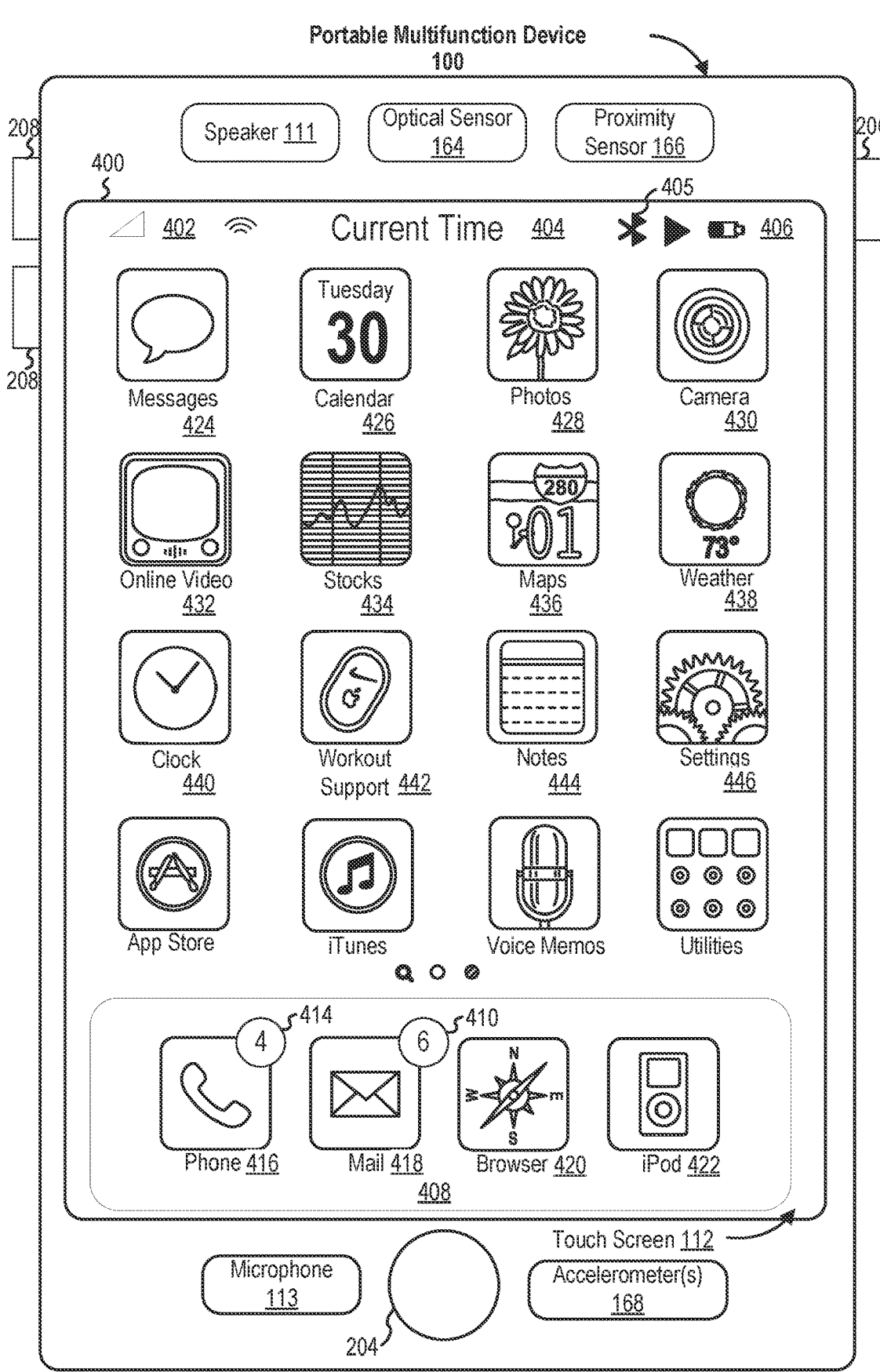
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communica-tion(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
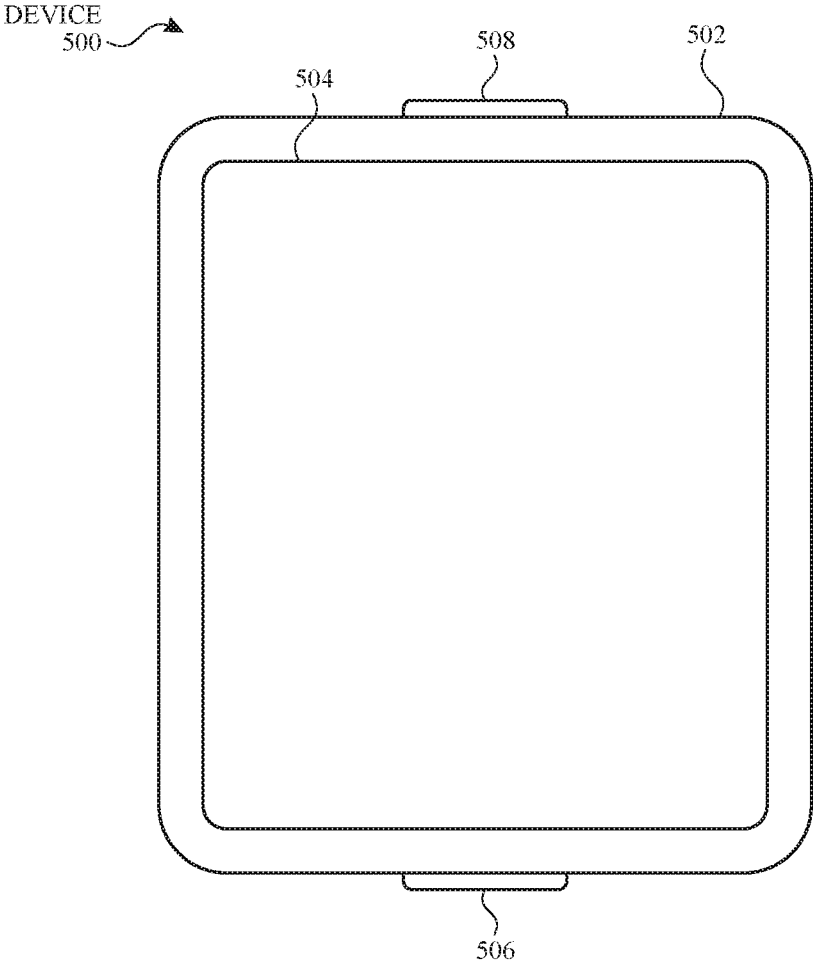
FIG. 5A illustrates a personal electronic device in accordance with some embodiments.
Figure 6A:
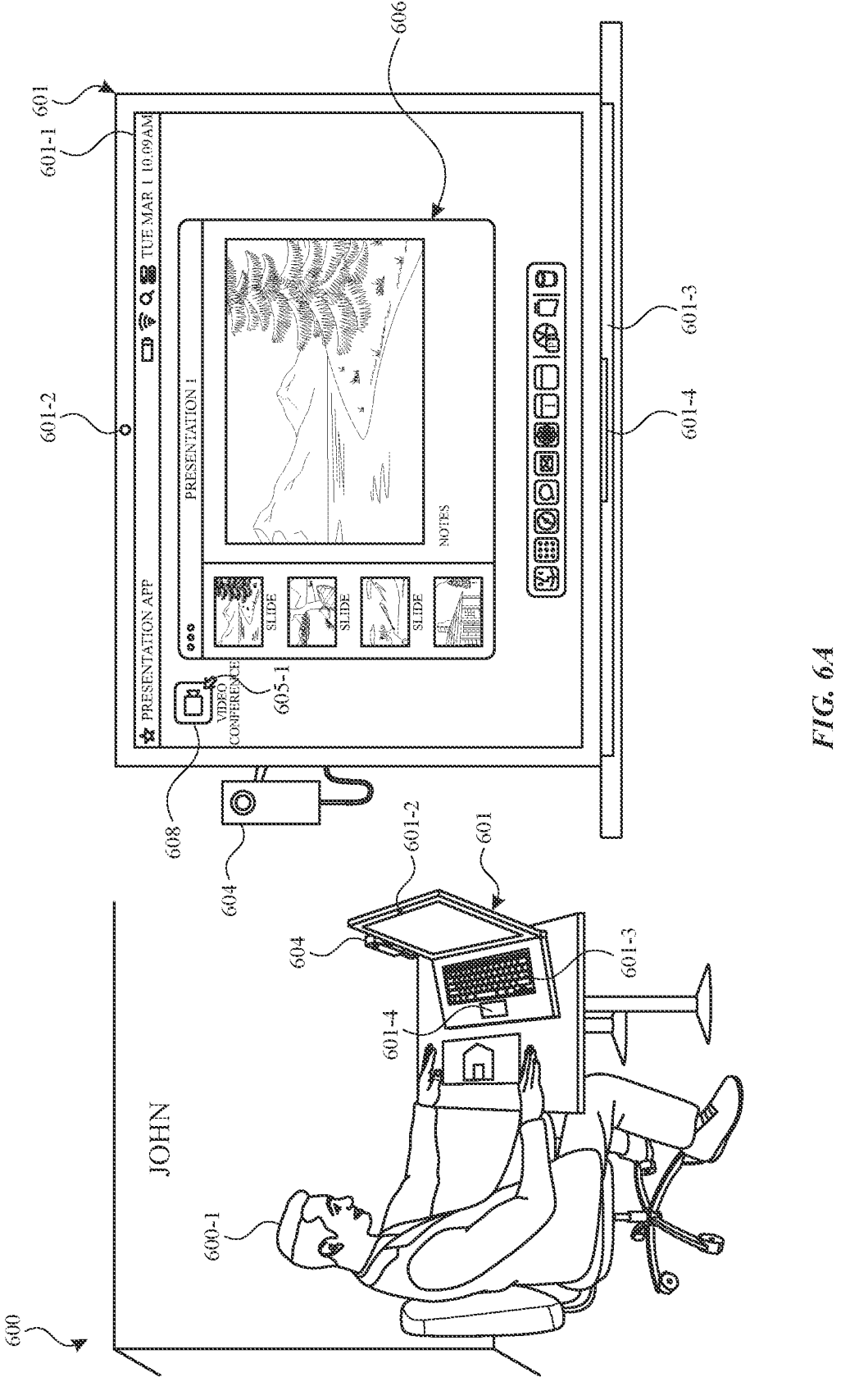
FIGS. 6A-6R illustrate exemplary user interfaces for managing camera sharing between devices, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
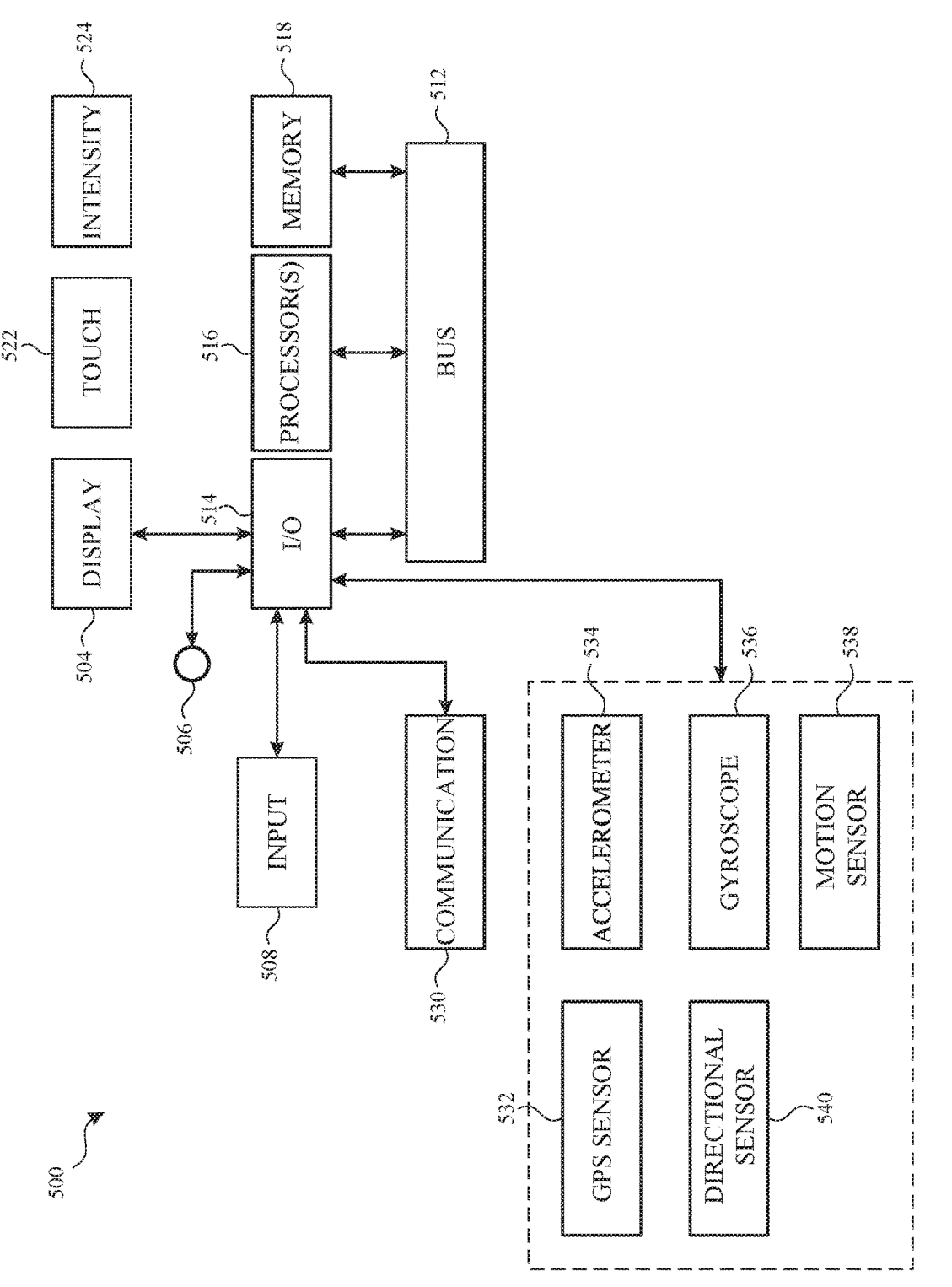
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, and 1000 (FIGS. 7A, 7B, 8, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
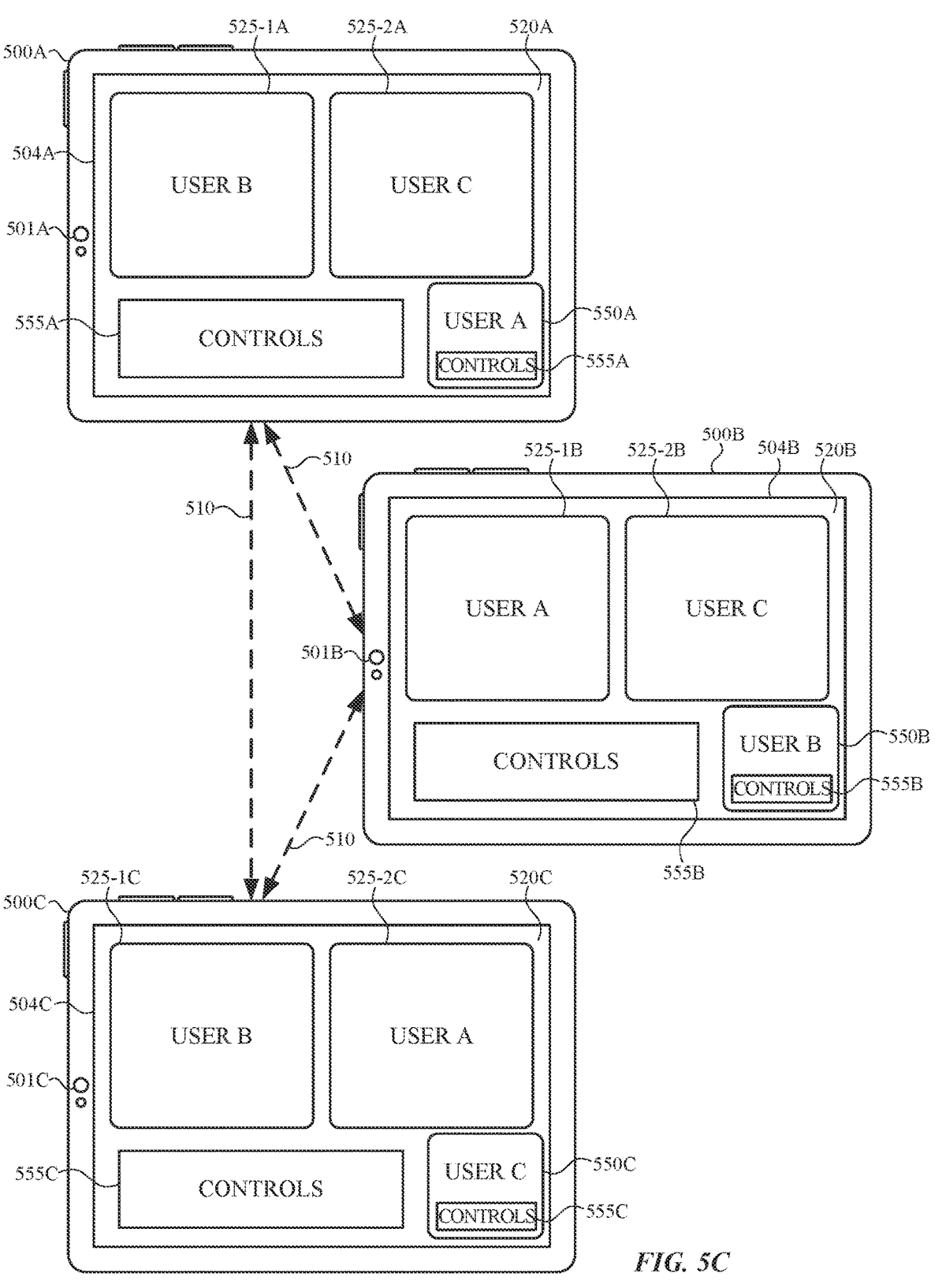
FIG. 5C illustrates an exemplary diagram of a communication session between electronic devices in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6M-6R and 9A-9K. In some embodiments, the communication sessions depicted in FIGS. 6M-6R and 9A-9K include two or more electronic devices, even if other electronic devices participating in the communication session are not depicted in the figures.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6R illustrate exemplary user interfaces for managing camera sharing between devices, in accordance with some embodiments. The user interfaces in these figures are used to illustrate the processes described below, including the processes in FIGS. 7A-7B and 8.

FIG. 6A depicts environment 600, including user 600-1 (also referred to herein as "John") and computer system 601 (also referred to herein as "John's laptop"). FIG. 6A depicts computer system 601 in environment 600, and also depicts an additional, more detailed view of computer system 601. In general, environment 600 is a schematic depiction of an environment that includes computer system 601 and/or user 600-1, and is shown in the figures when useful for understanding and/or illustrating various aspects of the techniques described herein. In the embodiments provided herein, the techniques are depicted using one or more laptops and phones; however, other devices can be used, such as a tablet, desktop computer, and/or other computer systems. For example, computer system 601 can be a desktop computer instead of a laptop. As another example, device 650 described below can be a tablet instead of a phone.

In the embodiments illustrated in FIGS. 6A-6R, computer system 601 is a computer system that includes display 601-1, camera 601-2, keyboard 601-3, and trackpad 601-4.

Computer system 601 includes one or more elements of devices 100, 300, and/or 500, such as speakers, a microphone, memory, and a processor, for example. In some embodiments, computer system 601 is shown with webcam 604 mounted to its side and connected via a wired or wireless connection. Webcam 604 is an external camera device that is separate from computer system 601 (and camera 601-2) and is used to provide a video feed captured by webcam 604. In some embodiments, computer system 601 uses a video feed captured by webcam 604, for example, when conducting a video conference or using various applications operating at computer system 601. In some embodiments, computer system 601 can select webcam 604, camera 601-2, and/or other cameras for providing respective video feeds at computer system 601.

In FIG. 6A, computer system 601 displays presentation interface 606 of a presentation application operating at computer system 601. Computer system 601 detects input 605-1 (e.g., a click or selection using trackpad 601-4, a mouse, and/or other input device) selecting video conference application icon 608 and, in response, launches the video conference application and displays video conference interface 610, as shown in FIG. 6B.

Figure 6B:
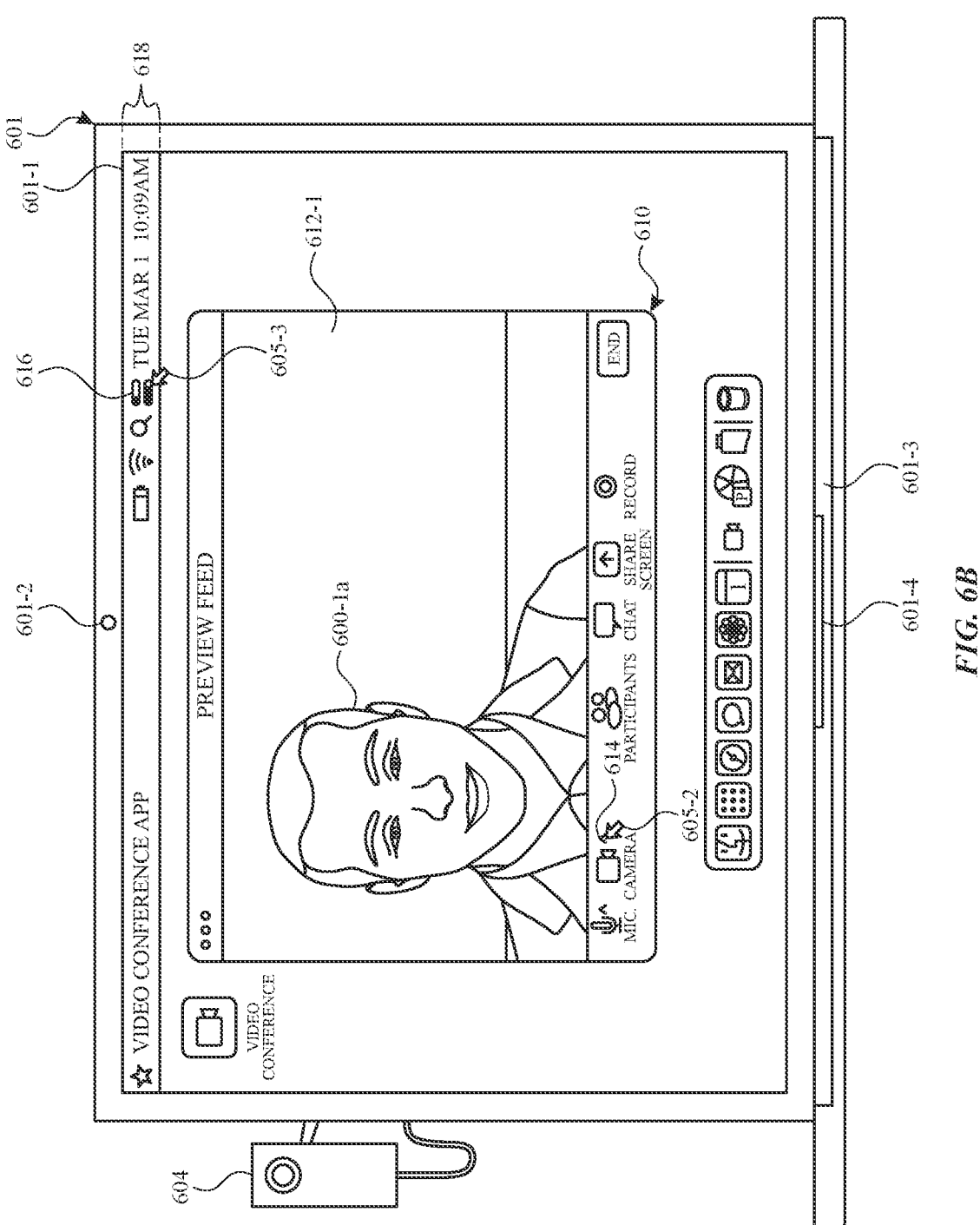

In FIG. 6B, video conference interface 610 displays video feed 612-1, which is the video feed provided to computer system 601 from webcam 604. Video feed 612-1 includes representation 600-1a of user 600-1. Because a video conference is not currently active at computer system 601, video feed 612-1 represents a preview video feed—that is, a view of the video feed before computer system 601 is connected to a video conference. Video conference interface 610 includes various controls and menu options for controlling settings of the video conference application including, for example, camera menu option 614, which is selectable to display various camera settings for the video conference application. Computer system 601 detects input 605-2 selecting camera menu option 614 and input 605-3 selecting control settings icon 616, which is displayed in status region 618.

Figure 6C:
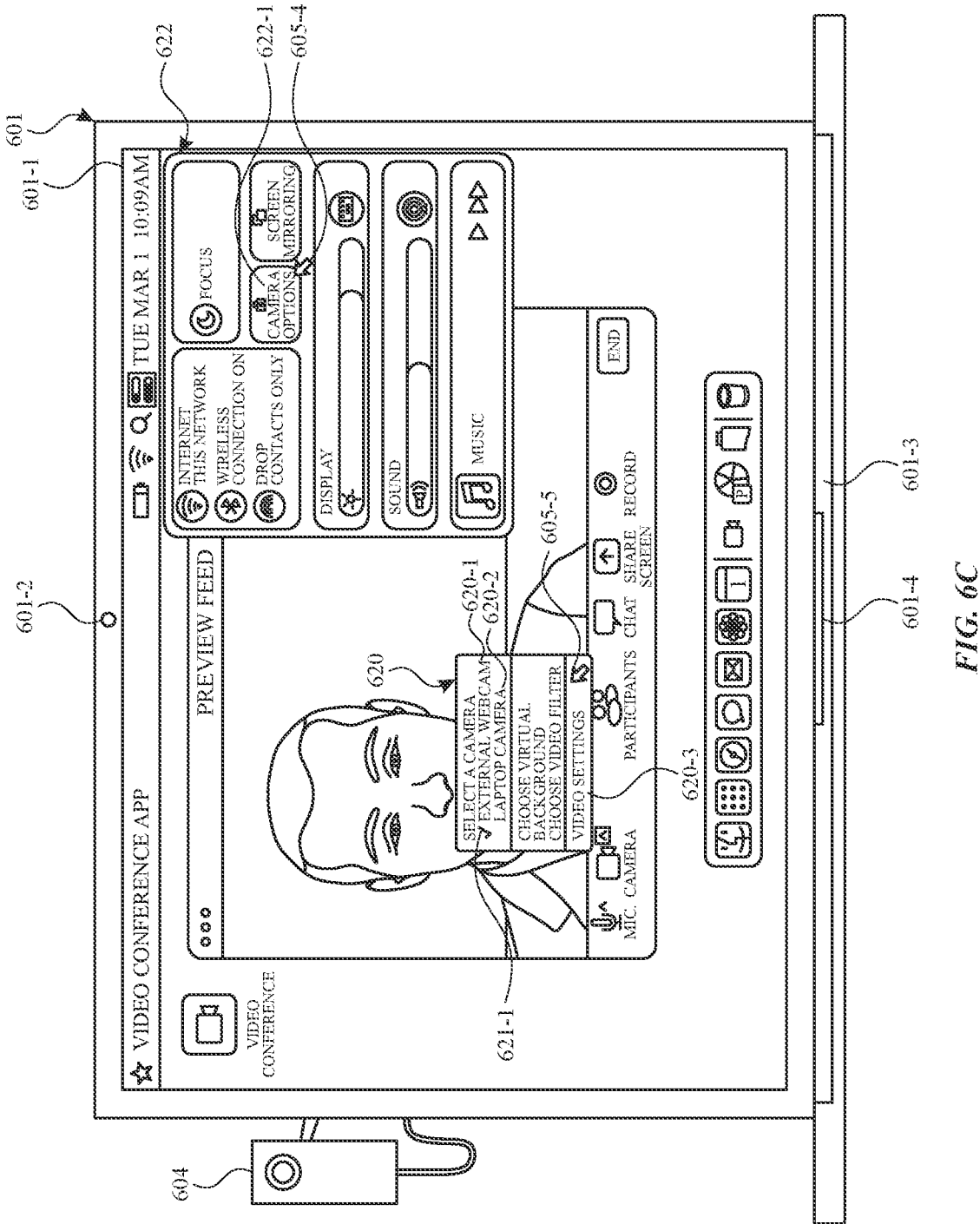

In FIG. 6C, computer system 601 displays video conference camera menu 620 in response to detecting input 605-2, and displays controls menu 622 in response to detecting input 605-3. Video conference camera menu 620 displays various camera options that are available for the video conference application. For example, webcam option 620-1 indicates that webcam 604 can be selected as a video source (also referred to herein as a video feed source, a camera source, or a camera) for the video conference application, and computer system camera option 620-2 indicates that camera 601-2 can be selected as a video source for the video conference application. Checkmark 621-1 indicates that webcam option 620-1 is currently selected as the video source for the video conference application. Accordingly, the video feed from webcam 604 (video feed 612-1) is selected for use for the video conference application. Video conference camera menu 620 includes additional camera options, including options for changing a virtual background or applying a filter, and video settings option 620-3, which is selectable to display additional camera settings for the video conference application.

Controls menu 622 includes various system control options for computer system 601. For example, controls menu 622 includes display controls, sound controls, and a control option for various wireless protocols. Controls menu 622 also includes camera control option 622-1, which is selectable to display camera controls for computer system 601. In FIG. 6C, computer system 601 detects input 605-4 selecting camera control option 622-1 and input 605-5 selecting video settings option 620-3.

Figure 6D:
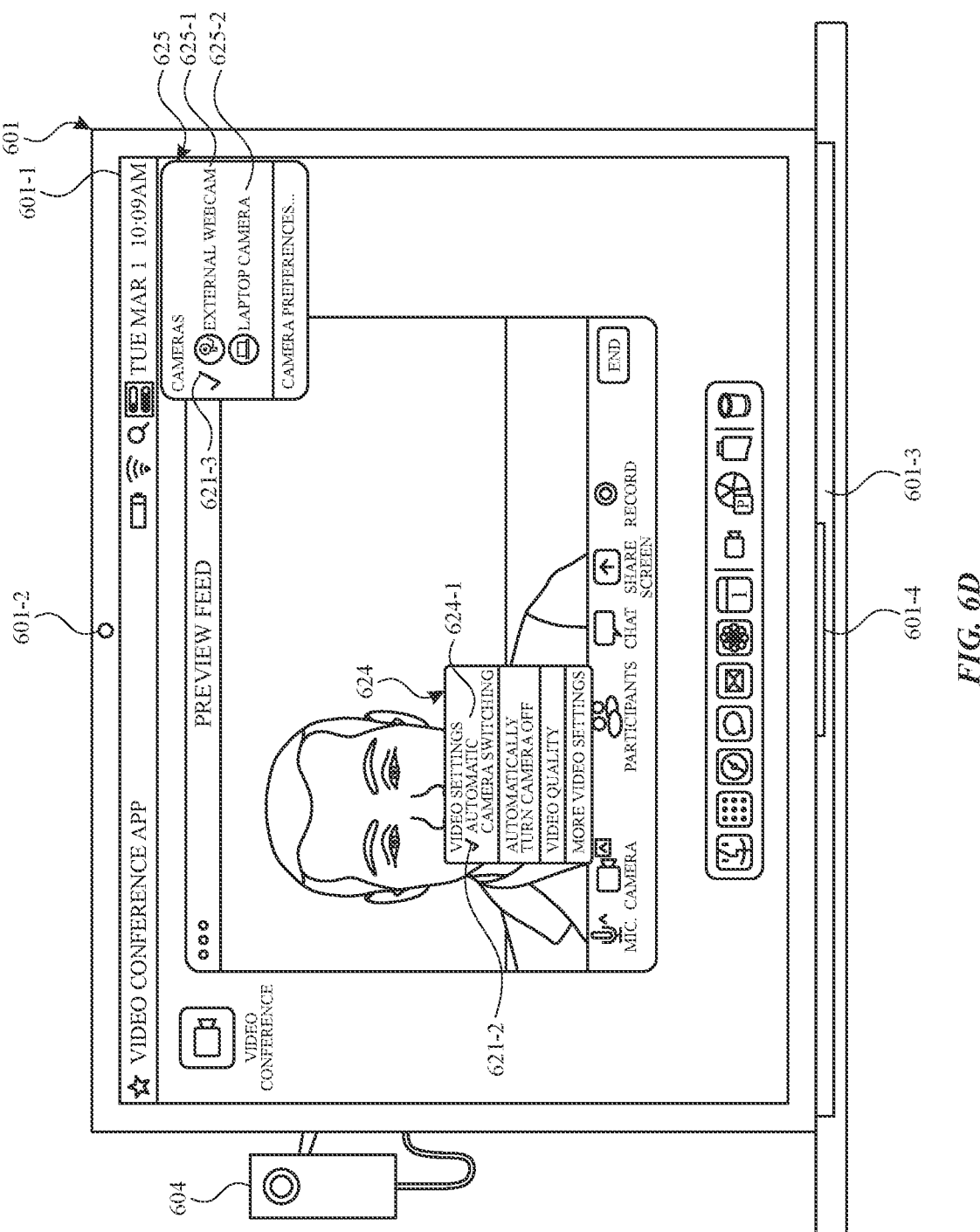

In FIG. 6D, computer system 601 displays video settings menu 624 in response to input 605-5 and displays system camera menu 625 in response to input 605-4. Video settings menu 624 includes various video settings for the video conference application, including automatic-camera-switching option 624-1, which is currently enabled, as indicated by checkmark 621-2. When automatic-camera-switching option 624-1 is enabled, computer system 601 automatically switches or selects a video feed for the video conference application based on criteria being met. For example, if a currently selected video feed is lost or turned off, and the automatic-camera-switching option is enabled, the device automatically switches to a different camera (if available) to provide the video feed for the video conference application. When automatic-camera-switching is disabled, the device does not automatically select a new camera or switch to a different video feed for the video conference application. In some embodiments, an automatic-camera-switching setting is available for different applications, and the setting can be individually enabled or disabled for the respective applications.

System camera menu 625 is a system interface for computer system 601 that provides information and controls for cameras connected to computer system 601. In some embodiments, system camera menu 625 is displayed concurrently with controls menu 622 and/or one or more of the control options provided in controls menu 622. In FIG. 6D, system camera menu 625 includes webcam option 625-1 and computer system camera option 625-2. Webcam option 625-1 indicates that webcam 604 can be selected as a video source for computer system 601, and computer system camera option 625-2 indicates that camera 601-2 can be selected as a video source for computer system 601. Checkmark 621-3 indicates that webcam option 625-1 is currently selected as the video source for computer system 601. In some embodiments, when a respective camera option is selected in system camera menu 625, the selected camera is used as a default or preferred camera for applications operating at computer system 601.

The embodiments provided herein describe various techniques for enabling computer system 601 to select a video feed provided by an external device for use at computer system 601. These techniques enable computer system 601 to select the external device as a video source when various criteria are met. In the embodiments illustrated in the figures, the external device is represented by device 650 (also referred to herein as "John's phone"). Device 650 is an external computer system that is separate from computer system 601 (and camera 601-2) and is used, in some embodiments, to provide a video feed captured by one or more cameras of device 650. Device 650 includes one or more elements of devices 100, 300, and/or 500, such as speakers, a microphone, memory, and a processor, for example. In some embodiments, computer system 601 uses a video feed captured by device 650, for example, when conducting a video conference or using various applications operating at computer system 601. Device 650 includes one or more cameras including camera 650-2 (referenced in FIG. 6G) and, in some embodiments, one or more additional cameras at device 650. In some embodiments, camera 650-2 is a wide angle camera. In some embodiments, camera 650-2 is a camera that is located on a back side of device 650, and device 650 optionally includes one or more cameras that are located on a front side of the device (for example, on a same side of device 650 as a display of device 650). When criteria are met, computer system 601 can select device 650 (e.g., manually or, in some embodiments, automatically without user input) as a video source, and video information captured by a camera of device 650 (e.g., camera 650-2 or another camera at device 650) is used as a video feed for computer system 601. In some embodiments, device 650 can be used as a video source for one or more different devices that are signed into a same user account. For example, device 650 can be used as a video source for computer system 601 and for a different device such as a second laptop, a desktop computer, and/or a tablet, when the phone, laptop, and different device are signed into the same user account. In the embodiments illustrated in the figures, video captured by camera 601-2 is used for generating a video feed. However, other cameras of device 650 can be used such as, for example, a front-facing camera located on the same side of device 650 as a display. Additionally, device 650 is shown providing a video feed while in landscape orientation; however, device 650 can provide a video feed while in a different orientation such as, for example, portrait orientation.

In some embodiments, computer system 601 can select device 650 as a video source using criteria that is based on a position, location, movement, and/or orientation of device 650, a connection state and/or type of connection between computer system 601 and device 650, a proximity of device 650 relative to computer system 601, a state of device 650 and/or computer system 601, a history of using device 650 with computer system 601, user preference settings at computer system 601 and/or device 650, user account settings, and/or other criteria as described herein. The examples provided herein for enabling computer system 601 to select device 650 as a video source are non-limiting examples and other criteria and/or combinations of criteria described herein may be used without departing from the scope of the present disclosure.

Figure 6E:
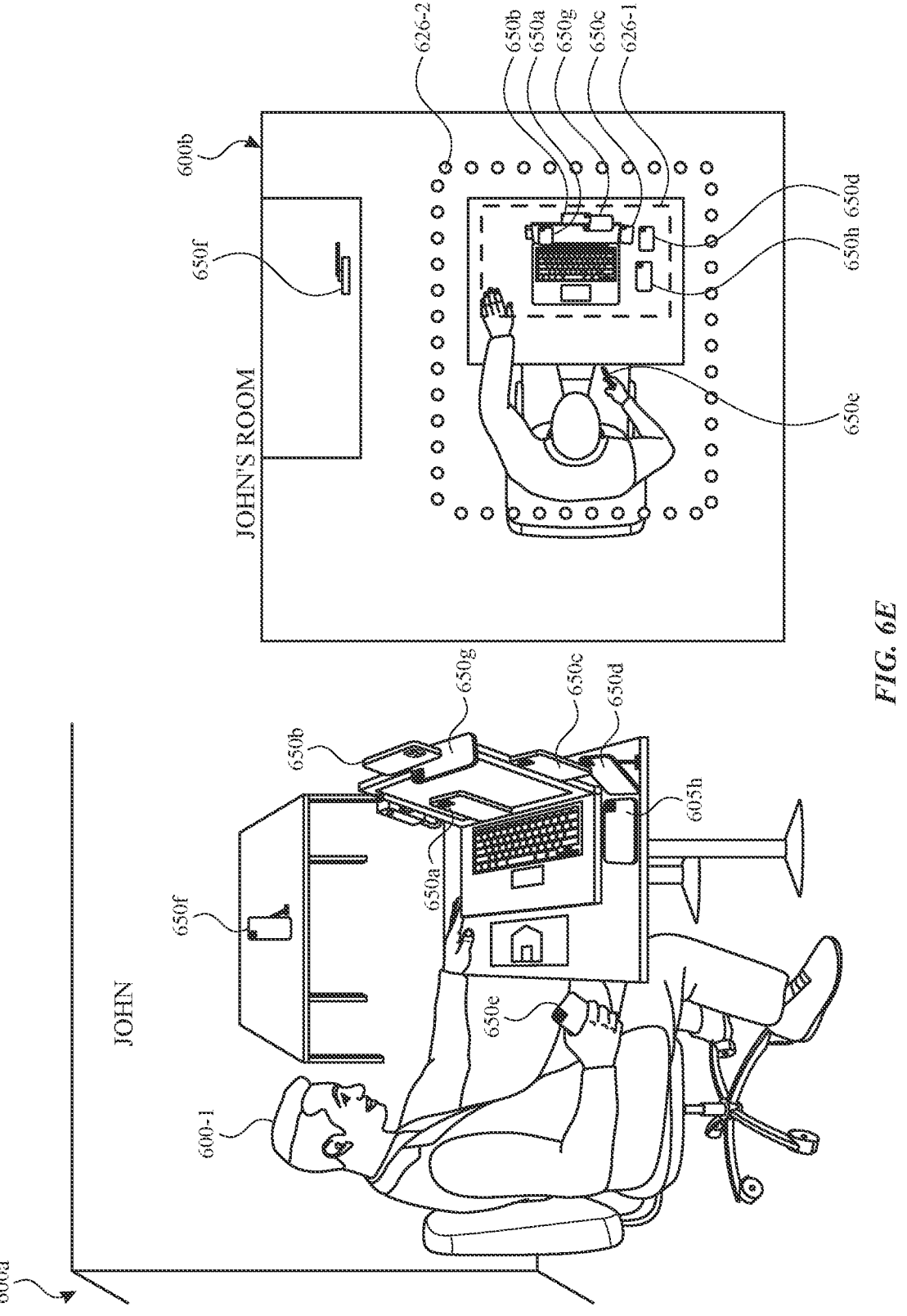

FIG. 6E illustrates two schematic views of environment 600. View 600*a* is a profile view of environment 600, similar to that shown in FIG. 6A, and view 600*b* is an overhead view of environment 600. Environment 600 is depicted in FIG. 6E with multiple representations of device 650, each representing an example location, position, and/or orientation of device 650 in environment 600, with the representations shown in the two different views (600*a* and 600*b*). View 600*b* also shows boundary lines representing different distance thresholds from computer system 601 within which device 650 can be selected for a video feed at computer system 601. Outer boundary 626-2 represents a proximity boundary within which device 650 can be selected (e.g., manually or automatically) as a video source at computer system 601 when other criteria are met. Inner boundary 626-1 represents a proximity boundary within which computer system 601 can automatically select (or, in some instances, allow manual selection of) device 650 as a video source when other criteria are met. In some embodiments, when device 650 is inside outer boundary 626-2, but outside of inner boundary 626-1, device 650 can be selected manually, but is not selected automatically, as a video feed source for computer system 601 when other criteria are met. In some embodiments, device 650 can be located inside inner boundary 626-1, but is not automatically selected by computer system 601 if other criteria are not met such as, for example, if device 650 has not previously been connected to computer system 601, device 650 is not currently connected to computer system 601, device 650 is not stationary for at least a threshold amount of time, device 650 has not previously been selected as a camera for computer system 601, device 650 has not been selected as a preferred or default camera for computer system 601, device 650 and computer system 601 are not signed in to the same user account, computer system 601 and/or device 650 are not turned on, and/or other criteria are not met. In some embodiments, device 650 can be located inside inner boundary 626-1 and can be selected manually, but not automatically, based on other criteria being met or not met. For example, if device 650 is within inner boundary 626-1, but has not been previously selected as a video feed source for computer system 601, is not stationary for a threshold amount of time, does not have a particular orientation, and/or is not selected as a default or preferred camera, device 650 can be selected as a video feed source manually, but is not automatically selected by computer system 601. Similarly, device 650 can be located inside outer boundary 626-2 and not be selectable by computer system 601 as a camera source if the other criteria are not met. In some embodiments, some criteria prevents device 650 from being selectable as a video source for computer system 601, regardless of other criteria being met. For example, if other criteria are met, but device 650 is located outside of outer boundary 626-2, device 650 may not be selectable (e.g., manually or automatically) as a video feed source for computer system 601. As another example, if computer system 601 or 650 is turned off, or if either of the devices has been configured not to communicate with one another, device 650 may not be selectable as a video feed source for computer system 601, even if other criteria are met. The criteria described herein is not an exhaustive list of criteria, nor are all listed criteria required to be met for device 650 to be selected (e.g., manually and/or automatically) as a video feed source for computer system 601, unless specifically noted otherwise. Furthermore, combinations of the criteria described herein can be used including, in some embodiments, using the described criteria in combination with other criteria.

The representations of device 650 are provided to demonstrate example scenarios for which some criteria are met and some criteria are not met for selecting device 650 as a video source for computer system 601. The different scenarios represent some of the criteria discussed above, but are not an exhaustive set of representations of the different combinations of criteria used to enable use of device 650 as a video feed source for computer system 601.

Representation 650*a* represents a scenario in which device 650 is propped in front of computer system 601 and is available to be automatically selected as a video feed source for computer system 601 because device 650 is located within inner boundary 626-1 and device 650 meets other criteria for being automatically selected such as, for example, being stationary and in portrait orientation with camera 650-2 facing user 600-1. Representation 650*b* represents a scenario in which device 650 is mounted to the top of computer system 601 and is available to be automatically selected as a video feed source for computer system 601 because device 650 is located within inner boundary 626-1 and device 650 meets other criteria for being automatically selected such as, for example, being stationary and in landscape orientation with camera 650-2 facing user 600-1. Representation 650*c* represents a scenario in which device 650 is mounted to the side of computer system 601 and is available to be automatically selected as a video feed source for computer system 601 because device 650 is located within inner boundary 626-1 and device 650 meets other criteria for being automatically selected, similar to representation 650*a*. Representation 650*d* represents a scenario in which device 650 is propped next to computer system 601 and is available to be automatically selected as a video feed source for computer system 601 because device 650 is located within inner boundary 626-1 and device 650 meets other criteria for being automatically selected, similar to representation 650a.

Representation 650e represents a scenario in which device 650 is in the user's hand and is located outside of inner boundary 626-1 and inside outer boundary 626-2. Representation 650e is not capable of being automatically selected by computer system 601 at least because representation 650e is outside of inner boundary 626-1. However, because representation 650e is inside outer boundary 626-2, device 650 is capable of being manually selected as the video feed source at computer system 601, if other criteria are met (e.g., both devices are on, both devices are connected to each other, and/or both devices are signed in to a same user account). Some criteria could also prevent device 650 from being automatically selected as a video feed source for computer system 601, even if representation 650e was within inner boundary 626-1 such as, for example, movement of device 650, the angular orientation of device 650 as depicted by representation 650e (not portrait or landscape orientation), and camera 650-2 being positioned away from user 600-1.

Representation 650f represents a scenario in which device 650 is propped up on a table outside of outer boundary 626-2, in portrait orientation with camera 650-2 facing towards user 600-1. In this embodiment, because device 650 is located outside of outer boundary 626-2, device 650 is not available to be selected as a video feed source for computer system 601, even though other criteria are met (e.g., device 650 is stationary, in portrait orientation, and with the camera facing the user).

Representation 650g represents a scenario in which device 650 is positioned on top of computer system 601, with camera 650-2 facing away from user 600-1 (e.g., facing up and/or towards the ceiling). Although representation 650g is located within inner boundary 626-1 and device 650 is stationary, computer system 601 does not automatically select device 650 as a video feed source because other criteria are not met such as, for example, the camera is facing away from user 600-1. In some embodiments, although computer system 601 does not automatically select device 650 in the scenario with representation 650g, device 650 can be manually selected as a video feed source for computer system 601.

Representation 650h represents a scenario in which device 650 is positioned next to computer system 601, inside inner boundary 626-1 with camera 650-2 facing away from user 600-1 (e.g., facing up and/or towards the ceiling). Although representation 650h is located within inner boundary 626-1 and device 650 is stationary, computer system 601 does not automatically select device 650 as a video feed source because other criteria are not met such as, for example, the camera is facing away from user 600-1. In some embodiments, although computer system 601 does not automatically select device 650 in the scenario with representation 650h, the device can be manually selected as a video feed source for computer system 601, as described in greater detail below.

Figure 6F:
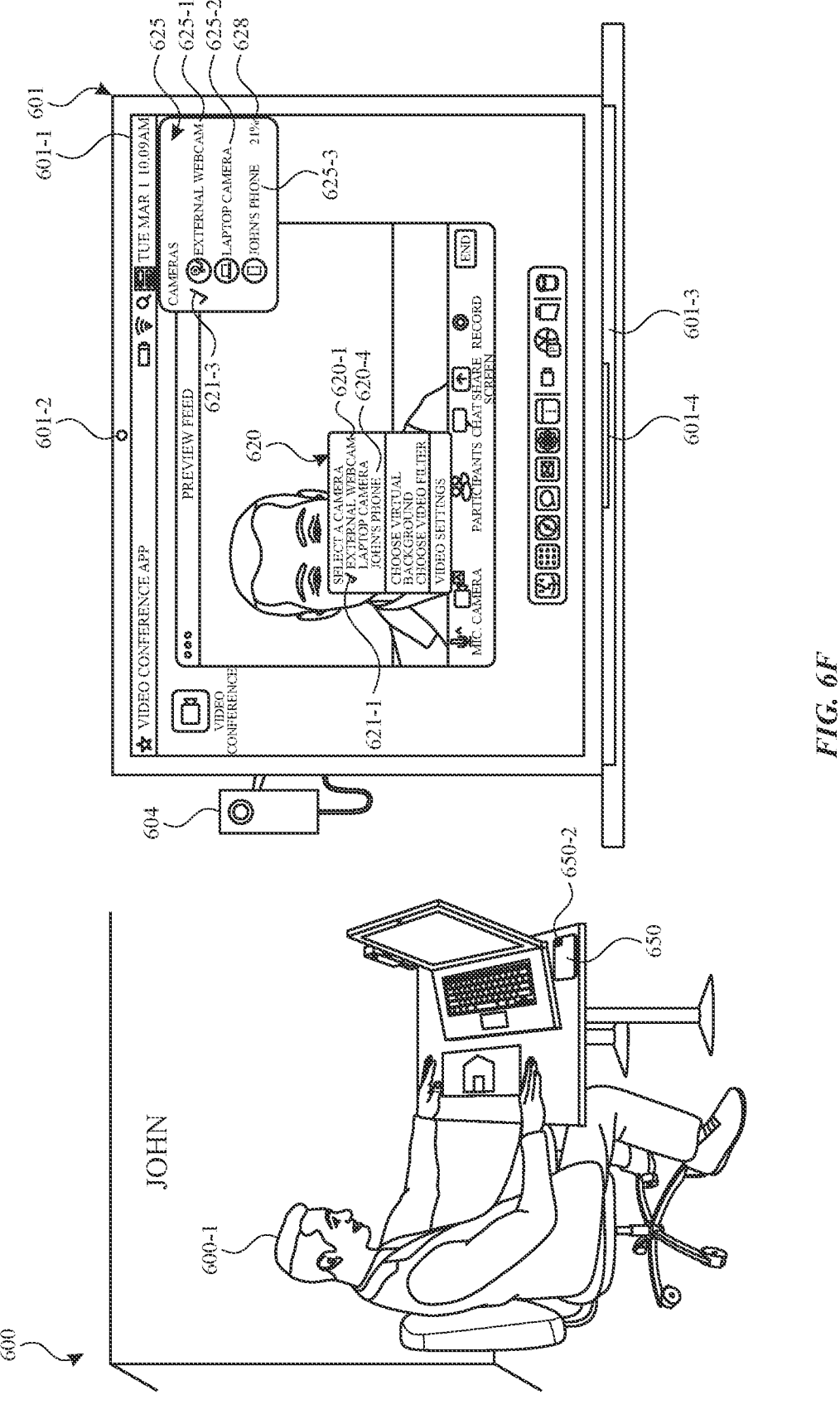

FIG. 6F depicts an embodiment in which device 650 is positioned next to computer system 601, similar to the scenario described with respect to representation 650h. Because criteria are not met for automatically selecting device 650 as a video feed source for computer system 601, and because other criteria are met for manually selecting device 650 (e.g., device 650 is within outer boundary 626-2 and/or computer system 601 and device 650 are signed in to a same user account), computer system 601 displays or modifies video conference camera menu 620 and system camera menu 625 to include respective camera options for selecting device 650 as a video feed source for computer system 601. For example, camera menu 620 includes (or is updated to include) phone option 620-4, which indicates that device 650 can be selected as a video feed source for the video conference application. Similarly, system camera menu 625 includes (or is updated to include) phone option 625-3, which indicates device 650 can be selected as a video feed source for computer system 601. System menu 625 also includes status indicator 628, showing the battery status of device 650. In FIG. 6F, device 650 is not automatically selected by computer system 601 as a video feed source, but is available to be manually selected (e.g., by selecting phone option 620-4 and/or phone option 625-3). Because phone option 620-4 is not selected, and webcam option 620-1 remains selected, computer system 601 continues to use the video feed from webcam 604, as indicated by checkmark 621-1 and video feed 612-1 in video conference interface 610. In some embodiments, phone option 620-4 and/or phone option 625-3 are not displayed when criteria are not met for selecting device 650 as a video source for computer system 601. In some embodiments, device 650 is not automatically selected as a video source for computer system 601 unless device 650 has been previously selected manually as a video source for computer system 601.

Figure 6G:
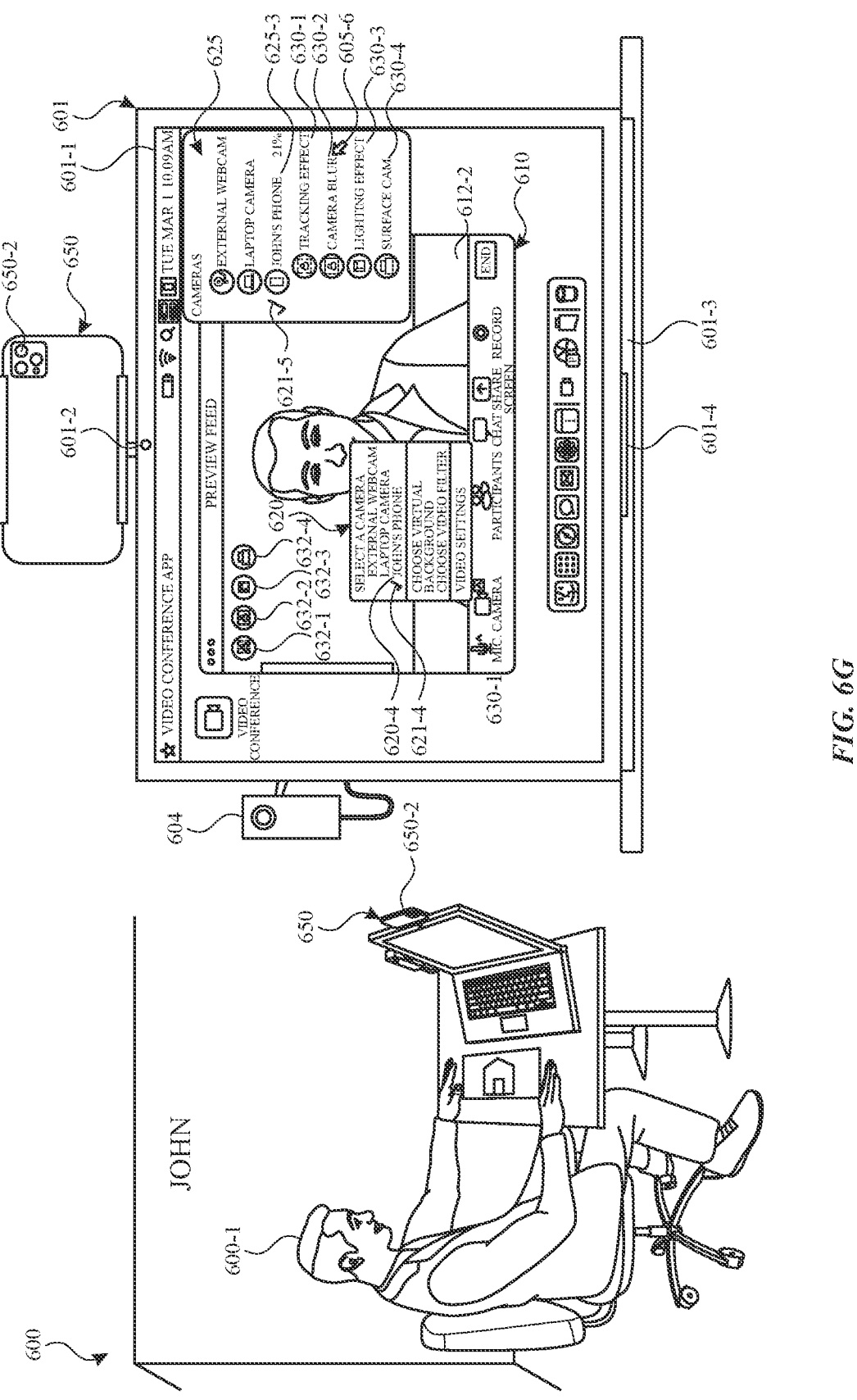

FIG. 6G depicts an embodiment in which device 650 is mounted to computer system 601, similar to the scenario described above with respect to representation 650b. Computer system 601 automatically (e.g., without user input at computer system 601) selects device 650 as the video feed source for computer system 601 because device 650 is within inner boundary 626-1 and other criteria are met for automatically selecting the device as a video feed source for computer system 601. Accordingly, computer system 601 shows phone option 620-4 selected as the video feed source for the video conference application as indicated by checkmark 621-4. Additionally, computer system 601 automatically switches from outputting video feed 612-1 from webcam 604 to outputting video feed 612-2 from camera 650-2 of device 650. Computer system 601 also updates system camera menu 625 to show selection of phone option 625-3, as indicated by checkmark 621-5.

When device 650 is connected to computer system 601, computer system 601 is capable of selecting device 650 as a video feed source, and enabling one or more camera effects provided by device 650. For example, in FIG. 6G, device 650 is connected to computer system 601 and selected as a camera source for computer system 601, and computer system 601 displays camera effect options 630-1 to 630-4, which are selectable to cause device 650 to apply camera effects using device 650 and camera 650-2 when the effects have been selected at computer system 601. Tracking effect option 630-1 can be enabled to cause a subject detected in the field-of-view of camera 650-2 to be tracked, and to update the video feed (e.g., panning and/or zooming the video feed) so that the subject remains displayed in the video feed at computer system 601 while moving around in their environment. Camera blur option 630-2 can be enabled to cause portions of the video feed that do not include a detected subject to be blurred. Lighting effect option 630-3 can be enabled to cause a simulated lighting effect to be applied on a subject detected in the field-of-view of camera 650-2. Surface cam option 630-4 can be enabled to cause modification of the video feed to include a representation of a surface detected in the environment that is obtained by digitally zooming, rotating, and/or panning the field-of-view captured by camera 650-2. In some embodiments, when surface cam option 630-4 is enabled, the video feed from device 650 is split into two video feeds that are displayed, in some embodiments concurrently, at computer system 601 with one feed showing the representation of the subject and the other feed showing the representation of the surface.

The camera effect options can be enabled by selecting the respective options 630-1 to 630-4 in system camera menu 625, or by selecting corresponding icons 632-1 to 632-4 shown in video conference user interface 610. Specifically, icon 632-1 or tracking effect option 630-1 can be selected to enable the tracking effect, icon 632-2 or camera blur option 630-2 can be selected to enable the camera blur effect, icon 632-3 or lighting effect option 630-3 can be selected to enable the lighting effect, and icon 632-4 or surface cam option 630-4 can be selected to enable the surface cam effect. In FIG. 6G, computer system 601 detects input 605-6 selecting camera blur option 630-2 and, in response, enables the camera blur effect as shown in FIG. 6H.

Figure 6H:
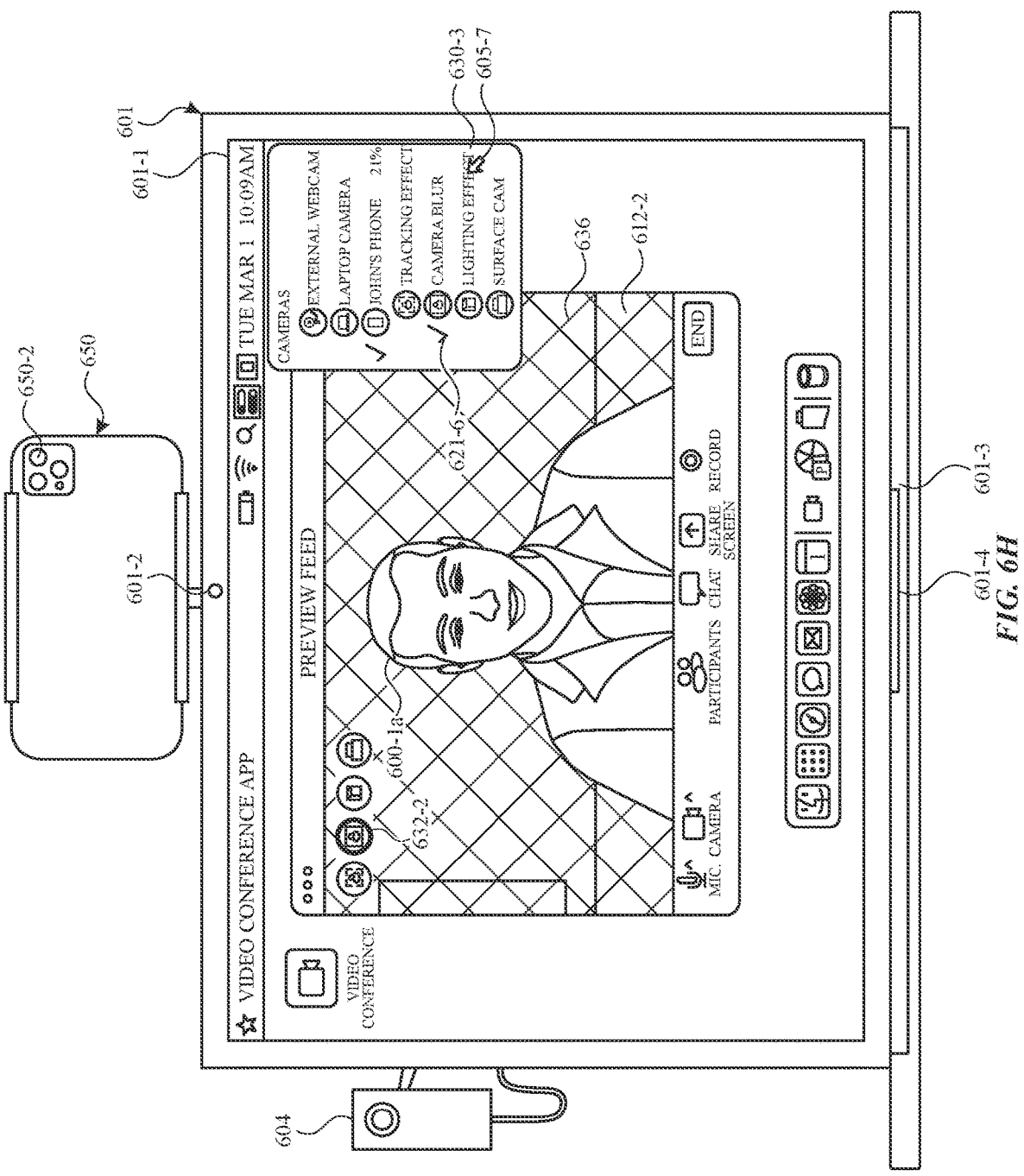

In FIG. 6H, computer system 601 displays video feed 612-2 having blurring effect 636 (shown by hatching), which is a blurring of the background behind representation 600-1a of user 600-1. Icon 632-2 is bolded and checkmark 621-6 is displayed next to camera blur option 630-2 to indicate the camera blur effect is enabled. Computer system 601 detects input 605-7 selecting lighting effect option 630-3 and, in response, enables the lighting effect as shown in FIG. 6I.

Figure 6I:
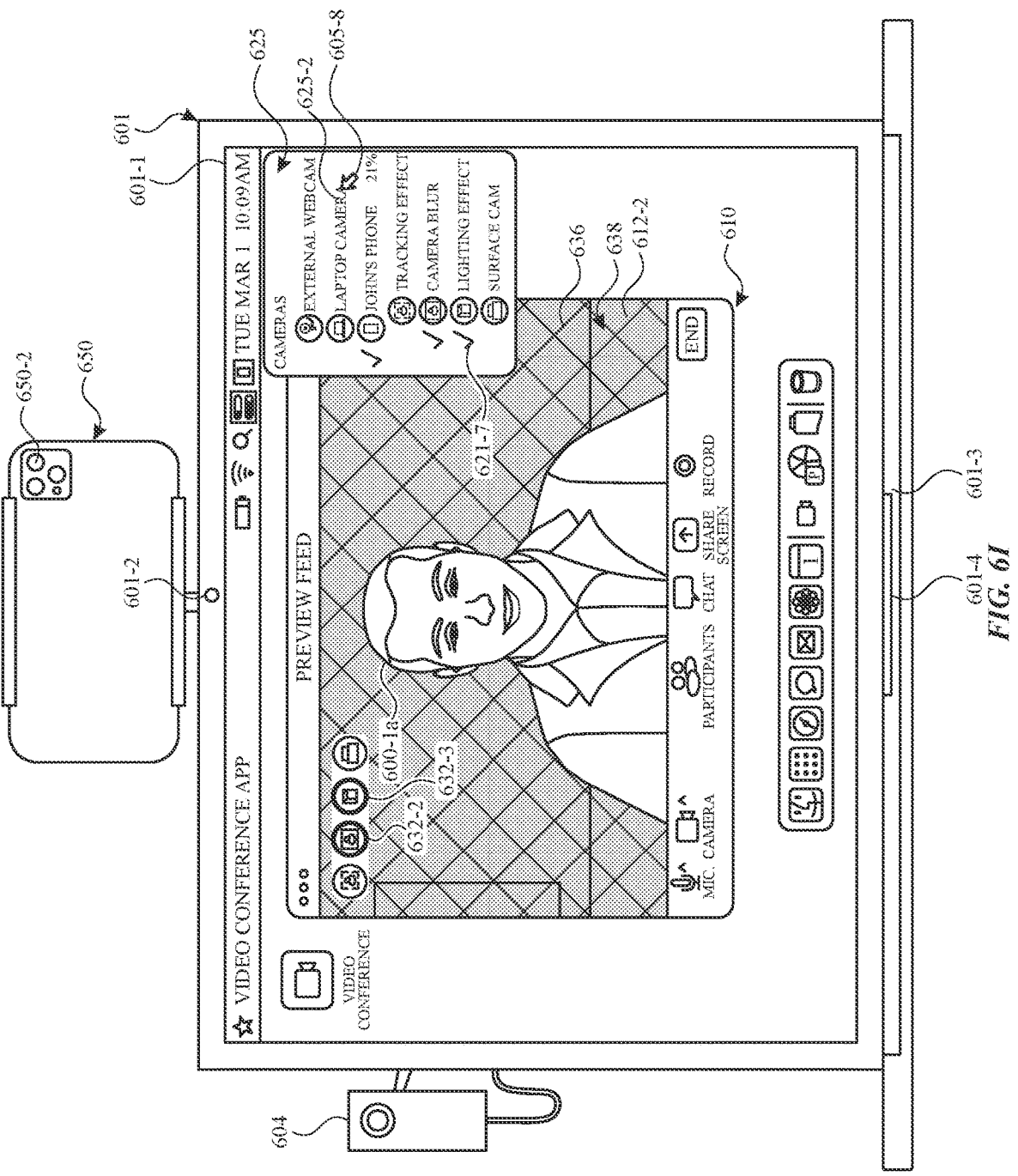

In FIG. 6I, computer system 601 updates video feed 612-2 to include lighting effect 638, which provides a brightened appearance of representation 600-1a of user 600-1 and a darkened appearance of the background behind representation 600-1a of user 600-1. Icon 632-3 is bolded and checkmark 621-7 is displayed next to lighting effect option 630-3 to indicate the lighting effect is enabled. Computer system 601 detects input 605-8 selecting computer system camera option 625-2 and, in response, switches from the video feed of device 650, to the video feed from computer system camera 601-2, as shown in FIG. 6J.

Figure 6J:
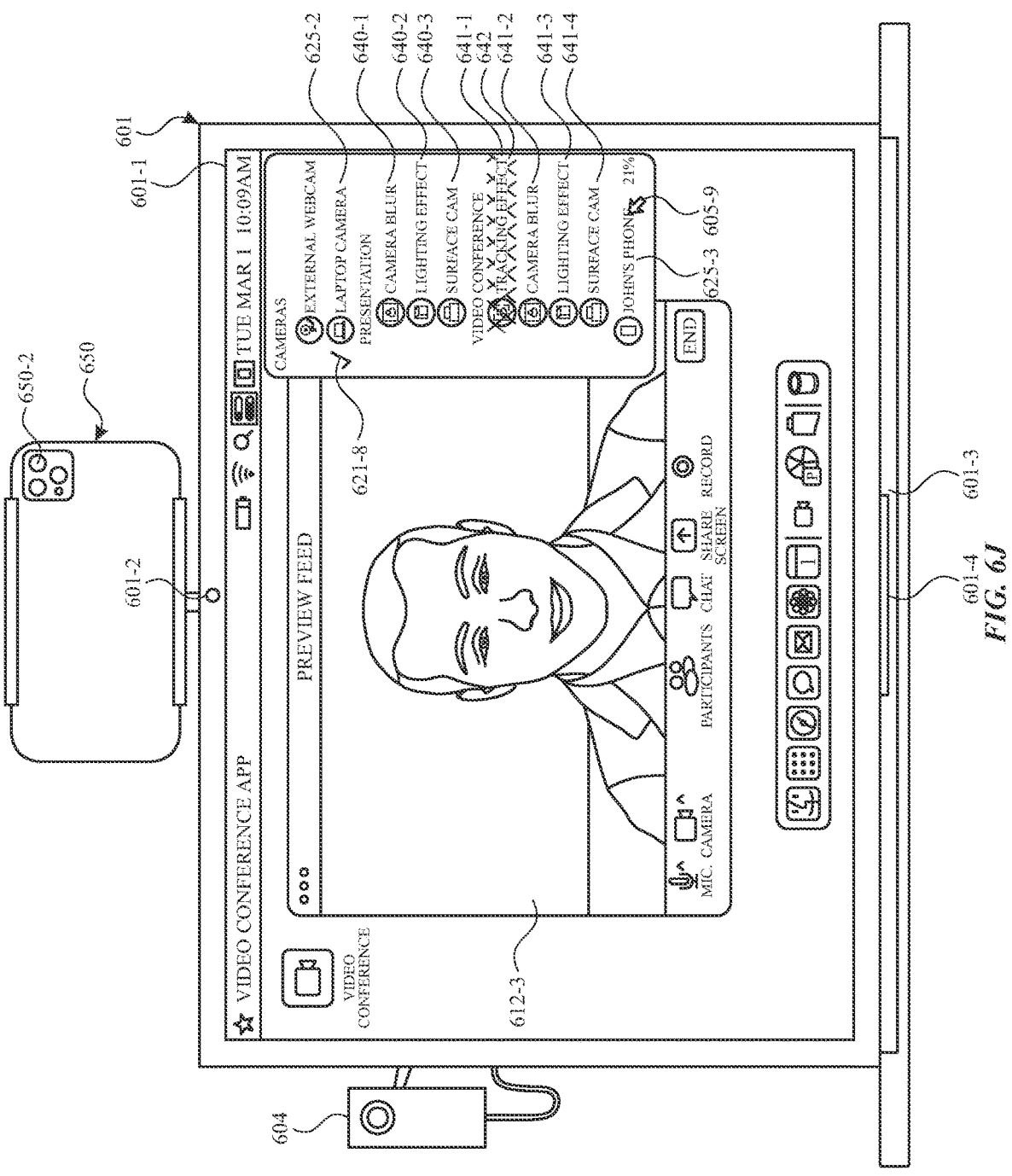

In FIG. 6J, computer system 601 displays video feed 612-3, which is the video feed from computer system camera 601-2. Video feed 612-3 has a different field-of-view than device video feed 612-2, for example, because device camera 650-2 has a wider field of view than computer system camera 601-2. Because computer system 601 switched to a camera feed from a different camera, the camera effects from device 650 are removed from the new video feed. In some embodiments, the camera effect settings are preserved, and then the selected effects are restored when switching back to the device camera feed. In the embodiment depicted in FIG. 6J, computer system 601 displays different camera effects that are available using computer system camera 601-2. These camera effects are listed based on which effects are available for a particular application operating at computer system 601. For example, the presentation application is capable of supporting a camera blur effect, a lighting effect, and a surface cam effect, as indicated by camera effect options 640-1 to 640-3. However, the presentation application is not capable of supporting a tracking effect, therefore no tracking effect option is listed with the presentation application camera effect options. Similarly, the video conference application is capable of supporting these effects, as well as a tracking effect, as indicated by camera effect options 641-1 to 641-4. In some embodiments, some camera effects can be listed because they are supported by a respective application; however, if the camera selected for use for the respective application is not capable of providing the respective camera effect, then the camera effect option can be shown as unavailable. For example, in FIG. 6J, the video conference application is capable of supporting a tracking effect, but because computer system camera 601-2 is not capable of providing the tracking effect (for example, the computer system camera does not have a large enough field of view), tracking effect option 641-1 is shown unavailable as indicated by hatching 642. Computer system 601 detects input 605-9 selecting phone camera option 625-3 and, in response, switches back to the video feed provided by device 650, as shown in FIG. 6K.

Figure 6K:
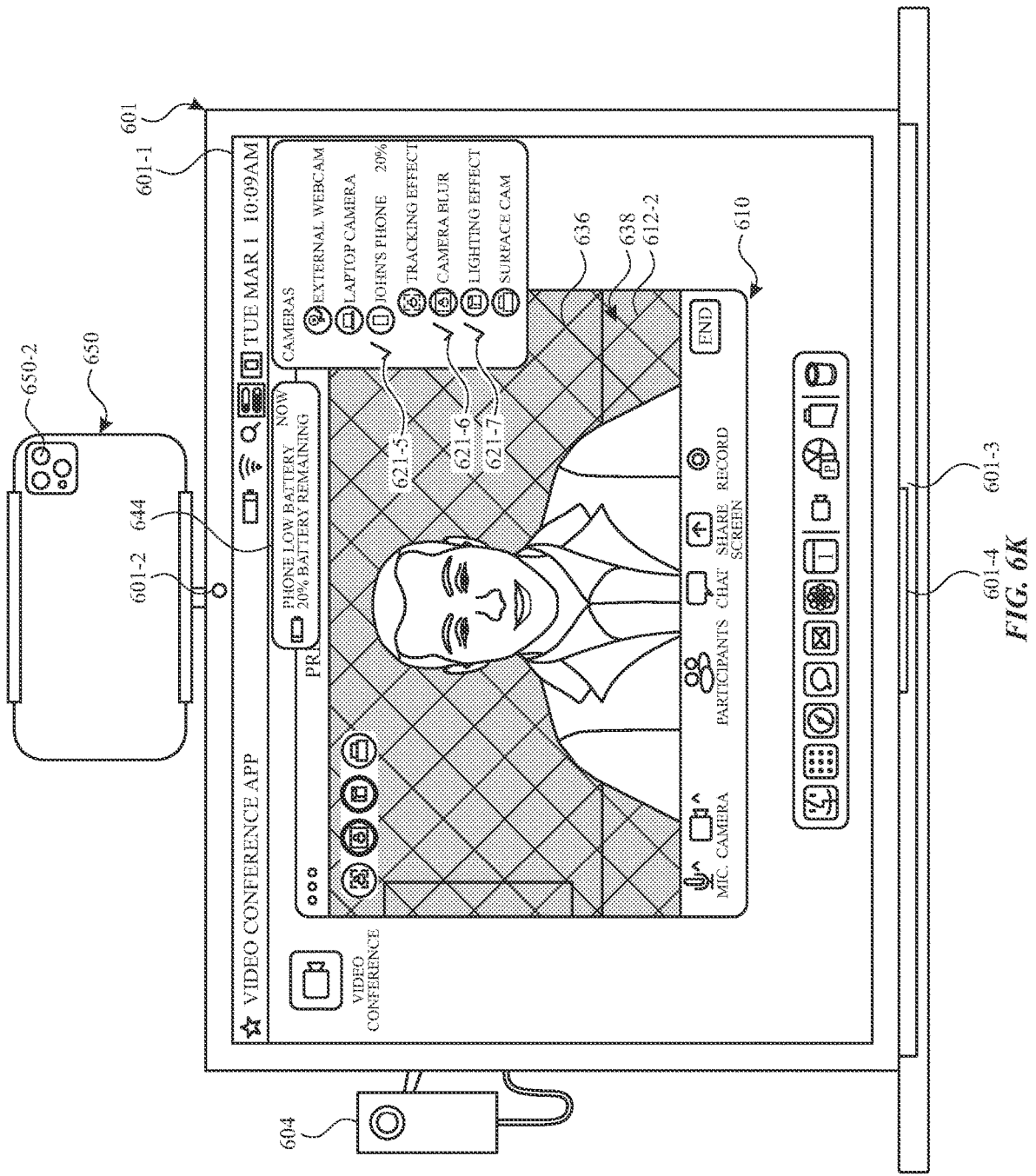

In FIG. 6K, computer system 601 again displays camera video feed 612-2 in video conference application interface 610, with the video feed having the previously selected camera effects restored. In some embodiments, when device 650 is connected to computer system 601, notifications are suppressed or modified at device 650, and notifications that are normally displayed on device 650 are instead displayed at computer system 601. For example, in FIG. 6K, device 650 has a low battery state. If device 650 was not connected to computer system 601, device 650 would display a notification warning the user of the low battery. However, because device 650 is connected to computer system 601, computer system 601 displays notification 644 notifying the user of the low battery, and the notification is not displayed at device 650. In some embodiments, instead of suppressing the notification at device 650, the notification is modified. For example, an audible component of an alert is generated at the device, but the visual and/or haptic components of the alert are not generated. In some embodiments, notifications are generated at device 650, instead of computer system 601, when device 650 is within range of computer system 601 (e.g., within outer boundary 626-2 or inner boundary 626-1) but not selected as a camera source for computer system 601 or when criteria is not met for automatically selecting device 650 as a camera source for computer system 601.

Figure 6L:
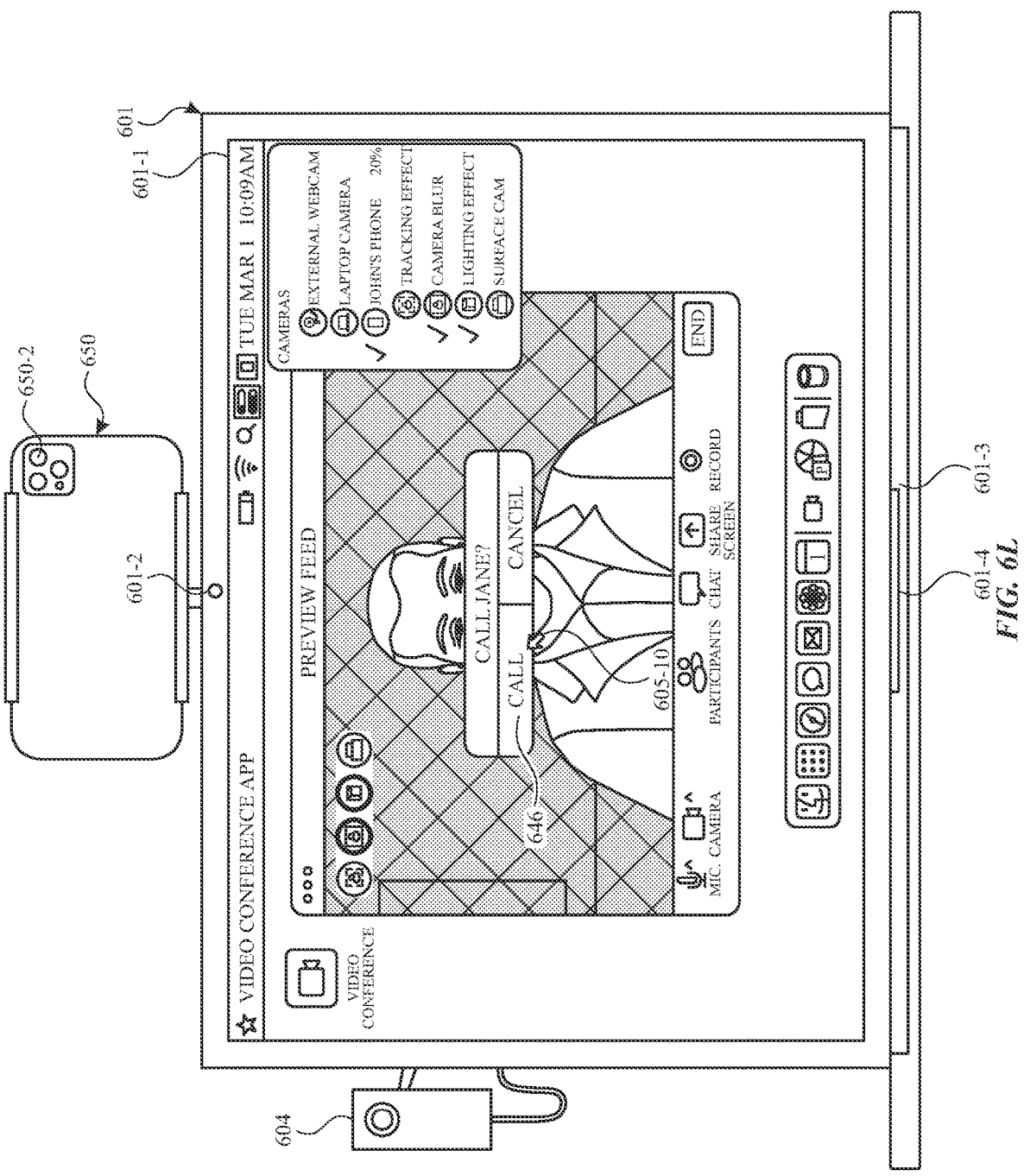
Figure 6M:
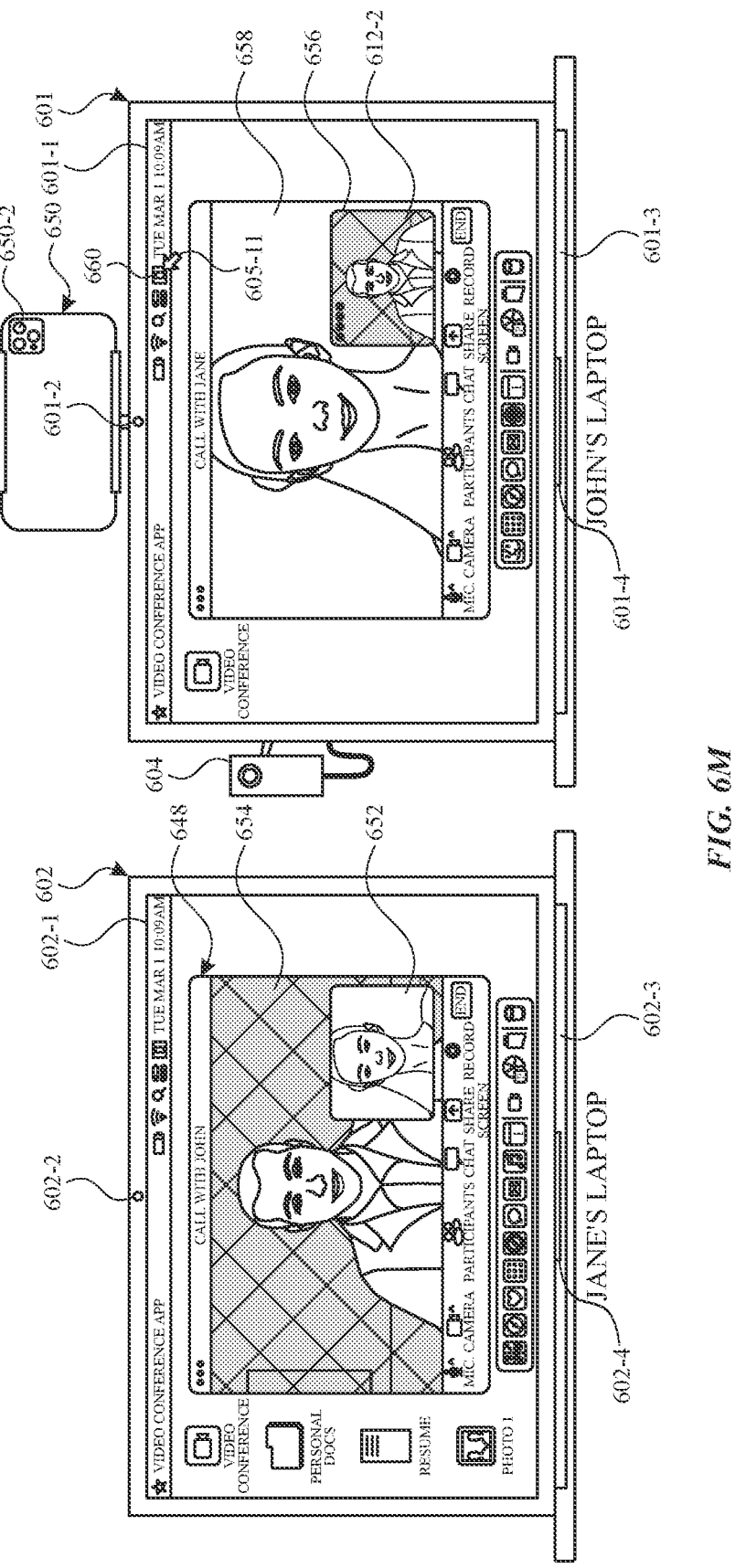

In FIG. 6L, computer system 601 initiates a video conference with Jane's computer system 602 by selecting conference option 646, via input 605-10. Computer system 601 initiates the video conference with the camera blur effect and lighting effect enabled. FIG. 6M depicts John's computer system 601 and Jane's computer system 602 while the video conference is active. Jane's computer system 602 is similar to computer system 601 and is shown displaying video conference application interface 648, which is similar to video conference application interface 610. Jane's computer system 602 displays, in video conference application interface 648, John's video feed 654 and Jane's self view 652. Jane's self view 652 is the video feed from Jane's computer system (e.g., using camera 602-2), and John's video feed 654 is the video feed from John's computer system 601. John's video feed 654 is the video feed from camera 650-2 of device 650, and is displayed with the video effects that were enabled at computer system 601, as described above. John's computer system 601 displays John's self view 656, which includes video feed 612-2 provided by device camera 650-2. John's computer system 601 also displays Jane's video feed 658, which is the video feed provided from Jane's computer system 602.

In some embodiments, when device 650 is connected to computer system 601, computer system 601 displays camera icon 660, which provides a shortcut for displaying camera menu 625, without interstitial display of controls menu 622. For example, in FIG. 6M, computer system 601 detects input

605-11 selecting camera icon 660 and, in response, displays camera menu 625, as shown in FIG. 6N.

In FIG. 6N, the tracking effect is disabled, so when John 600-1 leans to the side, representation 600-1*a* of John 600-1 moves outside of the displayed field-of-view of video feed 612-2. In some embodiments, device 650 and/or computer system 601 can be used to provide audio for the video conference. For example, in FIG. 6N, device 650 detects John saying "Hang on." and the audio is provided to participants of the video conference, as indicated by output audio 661 at Jane's computer system 602. Computer system 601 detects input 605-12 selecting tracking effect 630-1 and, in response, enables the tracking effect, as shown in FIG. 6O. In FIG. 6O, computer system 601 shows video feed 612-2 has been adjusted (e.g., panned) to position representation 600-1*a* of John 600-1 within the field-of-view of video feed 612-2. Computer system 601 also displays checkmark 621-9 indicating that tracking effect 630-1 is enabled.

Figure 6P:
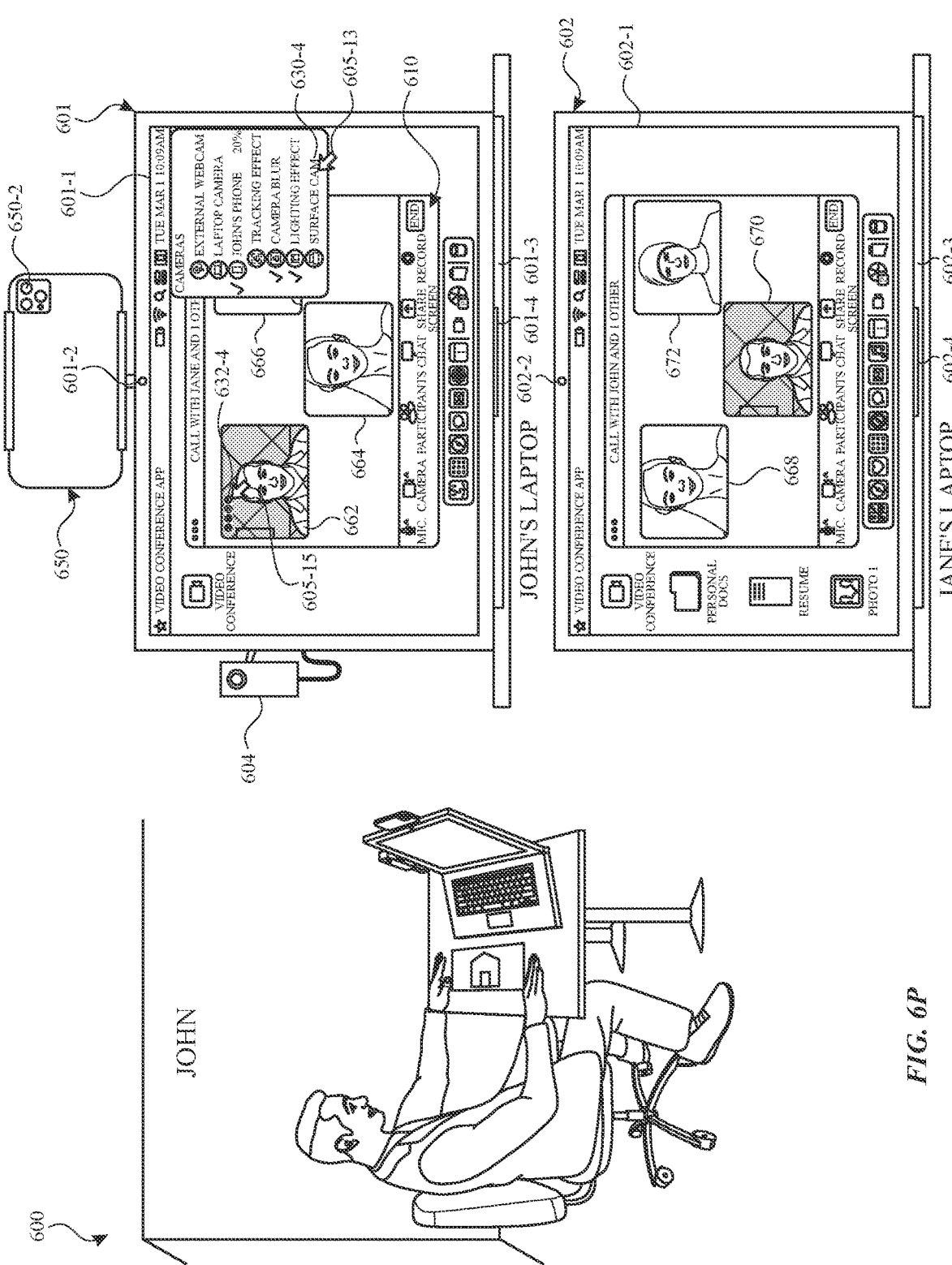
Figure 6Q:
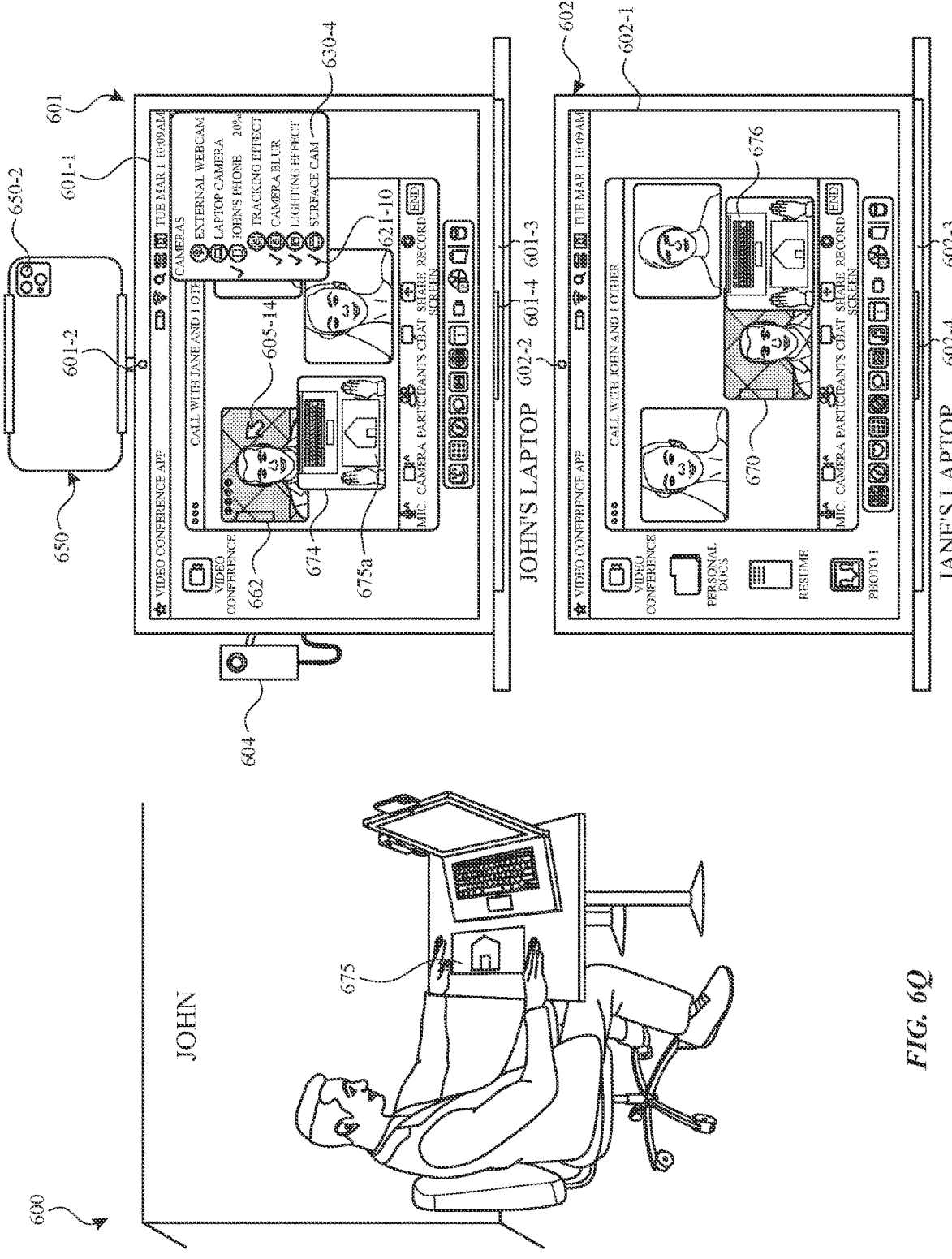
Figure 6R:
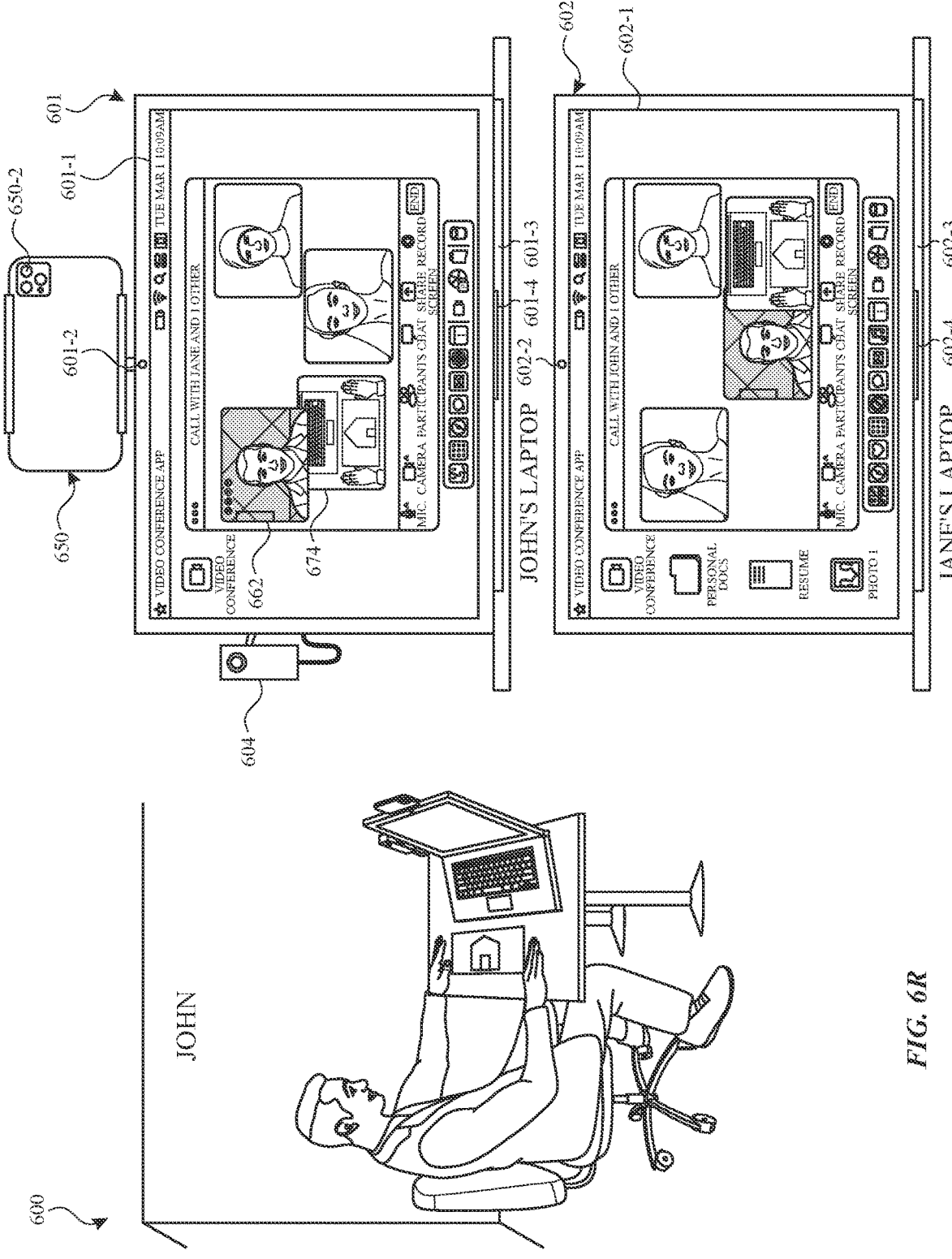

In FIG. 6P, computer system 601 is in a video conference with two other users, Jane and Jack. John's computer system 601 displays video tiles for each of the respective participants of the video conference. Video tile 662 is John's self view (similar to self view 656), video tile 664 is Jane's video feed, and video tile 666 is Jack's video feed. Computer system 601 detects input 605-13 on surface cam option 630-4 and, in response, enables the surface cam effect, as shown in FIGS. 6Q and 6R. Alternatively, computer system 601 detects input 605-15 on icon 632-4 and, in response, enables the surface cam effect, as shown in FIGS. 6Q and 6R.

In FIG. 6Q, computer system 601 displays checkmark 621-10 indicating that surface cam option 630-4 is enabled and displays video tile 674, which is a surface view provided by camera 650-2 of device 650. The surface view is a representation 675*a* of picture 675, which is on a surface in front of computer system 601 in environment 600. Both video tile 662 and video tile 674 are respective video feeds from the selected device camera (e.g., camera 650-2 of device 650), but represent different portions of the field-of-view of camera 650-2. In some embodiments, the surface view is manipulated to depict the surface view in an upright position for participants of the video conference. Jane's device 602 also displays video tile 676 showing the surface view provided by computer system 601 (in combination with camera 650-2 of device 650).

In FIG. 6Q, computer system 601 initially displays video tile 674 overlapping video tile 662, which indicates to John that the surface view is associated with his camera feed and is being presented, by John's device, to the other participants of the video conference. Similarly, Jane's computer system 602 displays video tile 676 partially overlapping John's video tile 670, indicating that the surface view is being presented by John. In some embodiments, the tiles can be manipulated or moved around by the user. For example, in response to detecting input 605-14 on video tile 662, John's computer system 601 moves John's video tile 662 in front of the surface view video tile 674, as shown in FIG. 6R. In some embodiments, a selection of video tile 674 in FIG. 6Q causes computer system 601 to swap the layering of the respective video tiles. In some embodiments, either tile 674 or tile 662 can be selected to swap the layering of the respective video tiles. For example, either tile 674 or tile 662 can be selected in FIG. 6R to return to the layered orientation depicted in FIG. 6Q.

FIGS. 7A and 7B are a flow diagram illustrating a method for managing camera sharing between devices using a computer system in accordance with some embodiments.

Method 700 is performed at a first computer system (e.g., 100, 300, 500, 601, and/or 602) (e.g., a first device, a desktop computer, a laptop computer, a smartphone, and/or a tablet) that is in communication with (e.g., includes and/or is connected to) one or more display generation components (e.g., 601-1) (e.g., a display controller, a touch-sensitive display system, a projector, a display screen, a display monitor, and/or a holographic display) and one or more input devices (e.g., 601-3 and/or 601-4) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, the first computer system is in communication with a first camera (e.g., 601-2 and/or 604) (e.g., an infrared camera, a depth camera, and/or a visible light camera). Some operations in method 700 are, optionally, combined, the orders of some operations are, optionally, changed, and some operations are, optionally, omitted.

As described below, method 700 provides an intuitive way for managing camera sharing between devices. The method reduces the cognitive burden on a user for managing camera sharing between devices, thereby creating a more efficient human-machine interface. For battery-operated computing devices, enabling a user to manage camera sharing between devices faster and more efficiently conserves power and increases the time between battery charges.

In method 700, the computer system (e.g., 601) displays (702), via the one or more display generation components (e.g., 601-1), a system user interface (e.g., 625) for the first computer system, wherein the system user interface is associated with (e.g., includes) an option (e.g., 625-1, 625-2, and/or 625-3) (e.g., a selectable option, button, icon, affordance, and/or graphical element) for selecting one or more cameras (e.g., an infrared camera, a depth camera, and/or a visible light camera) for use with the first computer system (e.g., for selecting a camera to use (e.g., as a video camera, to capture image data, and/or to capture video data) with an application (e.g., a live video communication application, a camera application, and/or a presentation application) operating at the first computer system).

As a part of displaying the system user interface (e.g., 625), the computer system (e.g., 601) concurrently displays (704) a camera selection option (e.g., 625-3) for selecting video information (e.g., video data and/or image data) captured by one or more cameras (e.g., 650-2) of a second computer system (e.g., 650) (e.g., an external computer system and/or a second device different from the first device), that is separate from the first computer system, to generate a video feed (e.g., 612-2) for the first computer system; and displays (706) a set of one or more options (e.g., 630-1, 630-2, 630-3, and/or 630-4) (e.g., selectable options, buttons, icons, affordances, and/or graphical elements) associated with camera settings (e.g., image blur settings (e.g., background blur and/or foreground blur), image lighting settings, and/or object tracking settings (e.g., adjusting a displayed camera field-of-view to maintain display of a person, object, and/or surface)) for the video information captured by the one or more cameras of the second computer system. Displaying the system user interface that includes concurrently displaying a camera selection option for selecting video information captured by one or more cameras of a second computer system, that is separate from the first computer system, to generate a video feed for the first computer system, and a set of one or more options associated with camera settings for the video information captured by the one or more cameras of the second computer system enables display of controls for selecting and/or modifying settings for a video feed provided by a camera of a different computer system without displaying additional controls and reduces the number of inputs to modify camera settings for the camera of the second computer system.

While the computer system (e.g., 601) displays the system user interface (e.g., 625) including concurrently displaying the camera selection option (e.g., 625-3) and the set of one or more options (e.g., 630-1, 630-2, 630-3, and/or 630-4) associated with camera settings for the video information captured by the one or more cameras (e.g., 650-2) of the second computer system (e.g., 650), the computer system receives (708), via the one or more input devices (e.g., 601-3 and/or 601-4), one or more inputs (e.g., 605-6, 605-7, 605-8, 605-9, 605-12, and/or 605-13) directed to the system user interface.

In response to receiving the one or more inputs (e.g., 605-6, 605-7, 605-8, 605-9, 605-12, and/or 605-13) directed to the system user interface (e.g., 625), and in accordance with a determination that the one or more inputs corresponds to (e.g., includes and/or is directed to) a selection (e.g., 605-6, 605-7, 605-12, and/or 605-13) of a respective option in the set of one or more options (e.g., 630-1, 630-2, 630-3, and/or 630-4) associated with camera settings for the video information captured by the one or more cameras (e.g., 650-2) of the second computer system (e.g., 650), the computer system (e.g., 601) changes (710) (e.g., enabling, disabling, and/or modifying) a setting corresponding to the respective option for the one or more cameras of the second computer system when the video information of the one or more cameras of the second computer system is used to generate a video feed (e.g., 612-2) for the first computer system (e.g., enabling, disabling, and/or modifying an image blur setting (e.g., background blur and/or foreground blur), enabling, disabling, and/or modifying one or more image lighting settings, and/or enabling, disabling, and/or modifying an object tracking setting).

In response to receiving the one or more inputs (e.g., 605-6, 605-7, 605-8, 605-9, 605-12, and/or 605-13) directed to the system user interface (e.g., 625), and in accordance with a determination that the one or more inputs corresponds to a selection (e.g., 605-9) of the camera selection option (e.g., 625-3), the computer system (e.g., 601) selects (712) (e.g., enabling and/or modifying) the video information captured by the one or more cameras (e.g., 650-2) of the second computer system (e.g., 650) for use to generate a video feed (e.g., 612-2) for the first computer system (e.g., selecting the camera of the second computer system for use in an application (e.g., a live video communication application, a presentation application, and/or a camera application) operating at the first computer system, and/or enabling the camera of the second computer system for use in an application operating at the first computer system).

In some embodiments, the first computer system (e.g., 601) is in communication with the second computer system (e.g., 650) via a wireless connection (e.g., WiFi, Bluetooth, Near-field Communication (NFC), and/or cellular).

In some embodiments, as a part of displaying the system user interface (e.g., 625) for the first computer system (e.g., 601), the computer system concurrently displays the camera selection option (e.g., 625-3), the set of one or more options (e.g., 630-1, 630-2, 630-3, and/or 630-4) associated with camera settings for the video information captured by the one or more cameras (e.g., 650-2) of the second computer system (e.g., 650), and a set of one or more options (e.g., 622-1 and/or other control options in controls menu 622) for controlling system functions of the first computer system (e.g., display brightness, media controls, system volume, do not disturb, flashlight, and/or wireless communication modes). Displaying the system user interface for the first computer system with the camera selection option, the set of one or more options associated with camera settings for the video information captured by the one or more cameras of the second computer system, and a set of one or more options for controlling system functions of the first computer system enables display of controls for the first computer system with controls for selecting and/or modifying settings for a video feed provided by a camera of a different computer system without displaying additional controls and reduces the number of inputs to modify functions of the first computer system and camera settings for the camera of the second computer system. In some embodiments, selecting a respective option for controlling a system function of the first computer system changes or sets a parameter for the respective system function. For example, selecting a display brightness option changes a brightness setting for the display (e.g., 601-1).

In some embodiments, prior to displaying the system user interface (e.g., 625), the first computer system (e.g., 601) displays, via the one or more display generation components (e.g., 601-1), a camera options element (e.g., 622-1 and/or 660) (e.g., a selectable element, an affordance, and/or a system shortcut for displaying and/or accessing camera information including a currently selected camera and/or the camera options for the selected camera). The first computer system detects a selection (e.g., 605-4 and/or 605-11) of the camera options element. In response to detecting the selection of the camera options element, the first computer system displays the system user interface (e.g., 625) including the set of one or more options (e.g., 630-1, 630-2, 630-3, and/or 630-4) associated with camera settings for the video information captured by the one or more cameras (e.g., 650-2) of the second computer system (e.g., 650). Displaying the system user interface including the set of one or more options associated with camera settings for the video information captured by the one or more cameras of the second computer system in response to detecting the selection of the camera options element enables display of controls for selecting and/or modifying settings for a video feed provided by a camera of a different computer system without displaying additional controls and reduces the number of inputs to modify camera settings for the camera of the second computer system.

In some embodiments, the set of one or more options (e.g., 630-1, 630-2, 630-3, and/or 630-4) associated with the camera settings for the video information captured by the one or more cameras (e.g., 650-2) of the second computer system (e.g., 650) includes a first set of one or more visual effects options (e.g., 630-1, 630-2, 630-3, and/or 630-4) that are selectable to modify (e.g., enable, disable, and/or change) a visual effect (e.g., an image blur effect, an image lighting effect, and/or an object tracking effect) for the video information captured by the one or more cameras of the second computer system (and, in some embodiments, used to generate a video feed for the first computer system). Displaying the set of one or more options associated with camera settings for the video information captured by the one or more cameras of the second computer system including a first set of one or more visual effects options that are selectable to modify a visual effect for the video information captured by the one or more cameras of the second computer system enables display of controls for modifying visual effects for a video feed provided by a camera of a different computer system without displaying additional controls and reduces the number of inputs to modify visual effects for the camera of the second computer system.

In some embodiments, the visual effect is applied (e.g., enabled, disabled, and/or modified) by the second computer system (e.g., 650) (e.g., applied to the video information obtained using the one or more cameras (e.g., 650-2) of the second computer system). Displaying the set of one or more visual effects options including visual effects applied by the second computer system enables display of controls for modifying visual effects applied by a camera of a different computer system without displaying additional controls and reduces the number of inputs to modify visual effects for the camera of the second computer system.

In some embodiments, the visual effect (e.g., 630-2) includes (e.g., is) a blurring effect (e.g., 636) (e.g., blurring or otherwise visually obscuring a foreground and/or background portion of the video feed) applied to the video information of the one or more cameras (e.g., 650-2) of the second computer system (e.g., 650) being used to generate the video feed (e.g., 612-2) for the first computer system (e.g., 601). Applying a blurring effect to the video information of the one or more cameras of the second computer system being used to generate the video feed for the first computer system causes the first computer system to instruct the second computer system to automatically apply the blurring effect without displaying additional controls and reduces the number of inputs to apply the blurring effect to video information used to generate the video feed for the first computer system.

In some embodiments, changing a setting corresponding to the respective option (e.g., 630-2) for the one or more cameras (e.g., 650-2) of the second computer system (e.g., 650) when the video information of the one or more cameras of the second computer system is used to generate a video feed (e.g., 612-2) for the first computer system (e.g., 601) includes initiating a process for causing the second computer system (e.g., 650) to apply the blurring effect (e.g., 636). In some embodiments, the blurring effect changes as a detected subject (e.g., 600-1) (e.g., a person or animal) moves in the field-of-view of the one or more cameras (e.g., 650-2), to blur a background portion of the field-of-view of the one or more cameras without blurring the subject (e.g., 600-1a).

In some embodiments, the visual effect (e.g., 630-1) includes changing a zoom level (e.g., a digital zoom level and/or an optical zoom level) of the video feed (e.g., 612-2) based on subject tracking information (e.g., increasing a zoom level of the video feed when there are fewer detected subjects (e.g., 600-1) and/or the subjects are closer together and/or decreasing a zoom level of the video feed when there are more detected subjects and/or the detected subjects are further apart). Changing a zoom level of the video feed based on subject tracking information causes the first computer system to instruct the second computer system (e.g., 650) to automatically update a zoom level of a video feed provided by the second computer system to maintain display of a subject without displaying additional controls.

In some embodiments, the visual effect (e.g., 630-1) includes changing a framing of the video feed (e.g., 612-2) based on subject tracking information (e.g., shifting which portion of the field-of-view of the one or more cameras (e.g., 650-2) is included in the video feed based on movement of one or more detected subjects (e.g., 600-1) so that a right portion of the field-of-view of the one or more cameras is included in the video feed when one or more subjects are on a right side of the field-of-view of the one or more cameras and a left portion of the field-of-view of the one or more cameras is included in the video feed when one or more subjects are on a left side of the field-of-view of the one or more cameras). Changing a framing of the video feed based on subject tracking information causes the first computer system to instruct the second computer system (e.g., 650) to automatically update a framing of a video feed provided by the second computer system to maintain display of a subject without displaying additional controls.

In some embodiments, changing a setting (e.g., 630-1) corresponding to the respective option (e.g., 630-1, 630-2, 630-3, and/or 630-4) for the one or more cameras (e.g., 650-2) of the second computer system (e.g., 650) when the video information of the one or more cameras of the second computer system is used to generate a video feed (e.g., 612-2) for the first computer system (e.g., 601) includes initiating a process for applying the visual effect. In some embodiments, initiating the process for applying the visual effect includes causing the second computer system to select (e.g., enable, disable, and/or modify) a subject tracking setting (e.g., updating the displayed portion of the camera field-of-view by changing a zoom level and/or changing a framing of the video feed to maintain display of a subject (e.g., 600-1) being tracked/located within the camera's field-of-view (which, optionally, may be greater than the displayed field-of-view of the camera feed (e.g., 612-2) due to the use of a wide angle camera)) for the video information of the one or more cameras of the second computer system being used to generate the video feed for the first computer system (e.g., 601). In some embodiments, the subject tracking setting is displayed for particular applications operating at the first computer system and is optionally not displayed (or not available or selectable) for other applications. For example, in some embodiments, the subject tracking setting is available (e.g., to be enabled, disabled, and/or modified) for video conferencing applications or camera applications, but is not available for other applications such as a presentation application or a gaming application.

In some embodiments, subject tracking is performed by physically (e.g., mechanically) zooming and/or moving (e.g., panning) one or more cameras (e.g., 650-2). In some embodiments, tracking is performed by computationally (e.g., digitally) zooming and/or moving (e.g., panning) an image or video captured by one or more cameras (e.g., 650-2). In some embodiments, subject tracking is performed by a combination of physically zooming and/or moving one or more cameras and computationally zooming and/or moving an image or video captured by one or more cameras.

In some embodiments, the subject tracking setting (e.g., 630-1) enables/disables a mode for: 1) tracking, during a live video communication session (e.g., a video conference), a position and/or location of one or more subjects (e.g., 600-1) detected within a field-of-view of the one or more cameras (e.g., 650-2), and 2) automatically adjusting a displayed view (e.g., 600-1a) of the subject(s) (e.g., in video feed 612-2), during the live video communication session, based on the tracking of the subject. In some embodiments, adjusting the displayed view of the subject(s) during the live video communication session includes: 1) in accordance with a determination that a first set of criteria is met, including that a subject (e.g., 600-1) (e.g., one or more users of the computer system) is detected at a first position in a scene (e.g., 600) (within the field-of-view of the one or more cameras), displaying a representation of a first field-of-view (e.g., the video feed (e.g., 612-2) is displayed with a first digital zoom level and a first displayed portion of the field-of-view of the one or more cameras) (in some embodiments, the representation of the first field-of-view includes a representation of the subject while the subject is located at the first position); and 2) in accordance with a determination that a second set of criteria is met, including that the subject is detected at a second position different from the first position, displaying a representation of a second field-of-view different from the representation of the first field-of-view (e.g., the video feed is displayed with a second digital zoom level and/or a second displayed portion of the field-of-view of the one or more cameras) (e.g., a representation of a field-of-view that is zoomed in, zoomed out, and/or panned in a direction relative to the representation of the first field-of-view) (in some embodiments, the representation of the second field-of-view includes a representation of the subject while the subject is located at the second position). In some embodiments, when the subject tracking setting (e.g., 630-1) is enabled, the representation of the field-of-view changes automatically (e.g., without changing the actual field-of-view of the one or more cameras) in response to a detected change in position of the subject (e.g., 600-1) and/or in response to detecting a second subject entering or leaving the field-of-view of the one or more cameras. For example, the representation of the field-of-view changes to track the position of the subject and adjusts a displayed position and/or zoom level (e.g., digital zoom level and/or optical zoom level) to more prominently display the subject (e.g., changing the digital zoom level to appear to be zooming in on the subject as they move away from the camera; changing the digital zoom level to appear to be zooming out from the subject as they move toward the camera; changing the displayed portion of the field-of-view of the one or more cameras to appear to be panning in a particular direction as the subject moves in that direction).

In some embodiments, when the subject tracking setting (e.g., 630-1) is enabled, the first computer system (e.g., 601) or the second computer system (e.g., 650) adjusts (e.g., reframes) the displayed portion (e.g., 612-2) of the field-of-view of the one or more cameras (e.g., 650-2) based on the number of subjects detected within the field-of-view of the one or more cameras of the second computer system. For example, when the number of subjects detected in the scene increases, the representation of the field-of-view of the one or more cameras changes (e.g., zooms out) to include the additional subjects (e.g., along with the subjects that were previously detected). Similarly, when the number of subjects detected in the scene decreases, the representation of the field-of-view of the one or more cameras changes (e.g., zooms in) to capture the subject(s) remaining in the scene.

In some embodiments, the one or more cameras (e.g., 650-2) of the second computer system (e.g., 650) has a larger (e.g., wider) field-of-view than a field-of-view of the one or more cameras (e.g., 601-2) of the first computer system (e.g., 601). In some embodiments, the camera of the second computer system is a wide-angle camera (e.g., a camera that includes a wide-angle lens), and the camera of the first computer system is not a wide-angle camera.

In some embodiments, the visual effect (e.g., 630-3) includes a simulated lighting effect (e.g., 638) (e.g., modelling one or more discrete points of light sources positioned around a subject based on measurements of a depth sensor or based on disparity mapping between two images taken at the same time from different locations, increasing the brightness, contrast, or visual appearance of a subject (e.g., 600-1a) in the video feed (e.g., 612-2) (e.g., in the foreground) and/or, optionally, dimming, blurring, or otherwise visually obscuring a background portion of the video feed) applied to the video information of the one or more cameras (e.g., 650-2) of the second computer system (e.g., 650) being used to generate the video feed (e.g., 612-2) for the first computer system (e.g., 601). Applying a simulated lighting effect to the video information of the one or more cameras of the second computer system being used to generate the video feed for the first computer system causes the first computer system to instruct the second computer system to automatically apply the simulated lighting effect without displaying additional controls and reduces the number of inputs to apply the simulated lighting effect to video information used to generate the video feed for the first computer system.

In some embodiments, changing a setting (e.g., 630-3) corresponding to the respective option for the one or more cameras (e.g., 650-2) of the second computer system (e.g., 650) when the video information of the one or more cameras of the second computer system is used to generate a video feed (e.g., 612-2) for the first computer system includes initiating a process for causing the second computer system to apply the simulated lighting effect (e.g., 638).

In some embodiments, the simulated lighting effect (e.g., 638) models (e.g., simulates) the result of one or more points of light sources in space based on an image data's depth map. For example, the simulated lighting effect includes modelling of multiple discrete points of light sources positioned around the subject (e.g., 600-1 and/or 600-1a) (e.g., creating a bright fill of light effect). In some embodiments, the simulated lighting effect is snapped in when lighting-effect-application criteria are met. In some embodiments, if the computer system (e.g., 650) detects a face, the facial features are taken into consideration when applying the simulated lighting effect. As a result, the simulated lighting effect changes the appearance of the representation of the image data based on a subject's specific facial features and facial shape.

In some embodiments, the visual effect (e.g., 630-4) includes modifying (e.g., at the second computer system (e.g., 650) and/or at the first computer system (e.g., 601)) (e.g., to correct distortion of an image (e.g., 674) of the surface (e.g., 675)) (e.g., adjusted, manipulated, and/or corrected) a portion of the video information of the one or more cameras (e.g., 650-2) of the second computer system (e.g., 650) that corresponds to a surface (e.g., 675) in the field-of-view of the one or more cameras based on a position (e.g., location and/or orientation) of the surface in the portion of the video information relative to the one or more cameras of the second computer system. Modifying a portion of the video information of the one or more cameras of the second computer system that corresponds to a surface in the field-of-view of the one or more cameras based on a position of the surface in the portion of the video information relative to the one or more cameras of the second computer system causes the second computer system to automatically modify the portion of the video information without displaying additional controls and reduces the number of inputs to modify the portion of the video information based on the position of the surface relative to the one or more cameras of the second computer system. In some embodiments, the image (e.g., 674) of the surface (e.g., 675) is based on image data that is modified using image processing software (e.g., skewing, rotating, flipping, and/or otherwise manipulating image data captured by the one or more cameras (e.g., 650-2) of the second computer system). In some embodiments, the image of the surface is modified without physically adjusting the camera (e.g., without rotating the camera, without lifting the camera, without lowering the camera, without adjusting an angle of the camera, and/or without adjusting a physical component (e.g., lens and/or sensor) of the camera). In some embodiments, the image of the surface is modified such that the one or more cameras of the second computer system appears to be pointed at the surface (e.g., facing the surface, aimed at the surface, pointed along an axis that is normal to the surface). In some embodiments, the image of the surface is corrected such that the line of sight of the camera appears to be perpendicular to the surface.

In some embodiments, the video feed (e.g., 612-2) includes a representation (e.g., 674) of the surface (e.g., 675) (e.g., an image of the surface) that is obtained by digitally zooming, rotating, and/or panning the field-of-view captured by the one or more cameras (e.g., 650-2) of the second computer system (e.g., 650). In some embodiments, the representation of the surface is obtained by moving (e.g., translating and/or rotating) the one or more cameras of the second computer system. In some embodiments, the representation of the surface is obtained without moving the one or more cameras of the second computer system. In some embodiments, the representation of the surface includes a cropped portion of the field-of-view of the one or more cameras of the second computer system. In some embodiments, the image of the surface is automatically modified in real time (e.g., during the live video communication session). In some embodiments, the image of the surface is automatically modified (e.g., without user input) based on the position of the surface relative to the one or more cameras of the second computer system.

In some embodiments, changing a setting (e.g., 630-4) corresponding to the respective option for the one or more cameras (e.g., 650-2) of the second computer system (e.g., 650) when the video information of the one or more cameras of the second computer system is used to generate a video feed (e.g., 612-2) for the first computer system (e.g., 601) includes initiating a process for causing the second computer system to modify the portion of the video information of the one or more cameras of the second computer system based on a position of a surface in the portion of the video information relative to the one or more cameras of the second computer system.

In some embodiments, after selecting video information captured by a respective camera (e.g., 604 and/or 601-2) (e.g., a camera of the first computer system and/or an external camera (e.g., a webcam)) (e.g., a camera different from the one or more cameras of the second computer system) to generate a video feed (e.g., 612-3) for the first computer system (e.g., 601) (e.g., after switching from using a first camera to provide the video feed to using a second camera to provide the video feed), the first computer system displays, in the system user interface (e.g., 625), a second set of one or more visual effects options (e.g., 640-1, 640-2, 640-3, 641-1, 641-2, 641-3, and/or 641-4) different from the first set of one or more visual effects options (e.g., 630-1, 630-2, 630-3, and/or 630-4) (e.g., the second set includes at least one visual effects option not included in the first set, the second set does not include a visual effects option that is included in the first set, the first set has more visual effects options than the second set, and/or the second set has more visual effects options than the first set) (In some embodiments, and based on the capabilities of the respective camera). In some embodiments, the second set of one or more visual effects options are selectable to change (e.g., enable, disable, and/or modify) a visual effect for the video information captured by the respective camera (and, in some embodiments, used to generate the video feed for the first computer system). Displaying a second set of one or more visual effects options different from the first set of visual effects options, wherein the second set of one or more visual effects options are selectable to change a visual effect for the video information captured by the respective camera, enables the first computer system to automatically display controls for modifying visual effects of the video information based on the capabilities of the respective camera without displaying additional controls and reduces the number of inputs to display and/or select controls for modifying visual effects of the video information used to generate the video feed for the first computer system.

In some embodiments, the first computer system (e.g., 601) selects the video information captured by the respective camera (e.g., 601-2 and/or 604) after (in some embodiments, in response to) receiving a set of one or more inputs (e.g., 605-8) corresponding to a request to select the video information captured by the respective camera to generate the video feed (e.g., 612-3) for the first computer system. In some embodiments, the first computer system receives the set of one or more inputs corresponding to the request to select video information captured by the respective camera while displaying the system user interface (e.g., 625). In some embodiments, the set of one or more inputs includes a request to switch from a first camera (e.g., 650-2) (e.g., the one or more cameras (e.g., 650-2) of the second computer system (e.g., 650)) to a second camera (e.g., 601-2 and/or 604) (e.g., a camera of the first computer system), for providing the video feed for the first computer system.

In some embodiments, displaying the system user interface (e.g., 625) includes displaying (e.g., concurrently with the camera selection option (e.g., 625-3) and/or the set of one or more options (e.g., 630-1, 630-2, 630-3, and/or 630-4) associated with camera settings for the video information captured by the one or more cameras (e.g., 650-2) of the second computer system (e.g., 650)) status information (e.g., 628) (e.g., battery status, connection status, and/or availability status) for a property of the second computer system, wherein the status information changes as the property of the second computer system changes. Displaying status information for a property of the second computer system, wherein the status information changes as the property of the second computer system changes, provides feedback about a state of the second computer system.

In some embodiments, prior to displaying the system user interface (e.g., 625) for the first computer system (e.g., 601), the computer system receives a request (e.g., 605-4 or 605-11) to display the system user interface for the first computer system. After receiving the request (in some embodiments, in response to receiving the request) to display the system user interface for the first computer system, and in accordance with a determination that a first set of criteria is met (e.g., a distance between the first computer system and the second computer system (e.g., 650) satisfies a distance threshold, a position of the second computer system is within a threshold distance of the first computer system, the second computer system has previously provided a video feed for the first computer system, the second computer system has a particular orientation (e.g., on edge), the second computer system has a particular state of operation, the second computer system meets stability criteria (no motion for 1-5 seconds, no motion for more than 1 second, and/or no motion for 2-7 seconds), the second computer system is logged into the same user account as the first computer system, the second computer system is connected to the first computer system in a particular manner, a frequency of use of the second computer system for providing the video feed for the first computer system meets frequency criteria, and/or the second computer system is within a predetermined threshold distance from the first computer system), the first computer system displays (e.g., automatically and/or without detecting further user input) the system user interface including the camera selection option (e.g., 625-3) for selecting video information captured by one or more cameras (e.g., 650-2) of the second computer system. In accordance with a determination that the first set of criteria is not met, the first computer system displays the system user interface (e.g., 625) without the camera selection option for selecting video information captured by one or more cameras of the second computer system (e.g., as shown in FIG. 6D). Displaying the system user interface including the camera selection option in accordance with a determination that the first set of criteria is met causes the first computer system to automatically display the camera selection option without requiring additional user input.

In some embodiments, the first set of criteria for displaying the system user interface (e.g., 625) including the camera selection option (e.g., 625-3) for selecting video information captured by one or more cameras (e.g., 650-2) of the second computer system (e.g., 650) is different from a set of criteria for automatically selecting the video information captured by the one or more cameras of the second computer system for use to generate the video feed (e.g., 612) for the first computer system (e.g., 601). For example, in some embodiments, the system user interface includes the camera selection option in accordance with a determination that the second computer system is within a first threshold distance from the first computer system, and automatically selects the video information from the second computer system in accordance with a determination that the second computer system is within a second threshold distance different from (e.g., less than) the first threshold distance.

In some embodiments, while the video information captured by the one or more cameras (e.g., 650-2) of the second computer system (e.g., 650) is not selected for use to generate the video feed (e.g., 612) for the first computer system (e.g., the camera option for the second computer system is not selected and/or a camera option for a different computer system (e.g., the first computer system and/or a third computer system) is selected), the first computer system (e.g., 601) receives data (e.g., data indicating a change in one or more properties of the second computer system such as a location, orientation, and/or steadiness of the second computer system). In response to receiving the data, and in accordance with a determination that the data indicates that a set of camera selection criteria is met (e.g., the second computer system (e.g., 650) has previously provided a video feed for the first computer system, the second computer system has a particular orientation (e.g., on edge), the second computer system has a particular state of operation, the second computer system meets stability criteria (no motion for 1-5 seconds, no motion for more than 1 second, and/or no motion for 2-7 seconds), the second computer system is logged into the same user account as the first computer system, the second computer system is connected to the first computer system in a particular manner, a frequency of use of the second computer system for providing the video feed for the first computer system meets frequency criteria, and/or the second computer system is within a predetermined threshold distance from the first computer system), the first computer system selects (e.g., automatically and/or without detecting further user input) the video information captured by the one or more cameras (e.g., 650-2) of the second computer system for use (e.g., immediately or at a later time) to generate the video feed (e.g., 612-2) for the first computer system (e.g., as shown in FIG. 6G). Selecting the video information captured by the one or more cameras of the second computer system for use to generate the video feed for the first computer system in accordance with a determination that the data indicates that a set of camera selection criteria is met causes the first computer system to automatically select the video information captured by the one or more cameras of the second computer system for use to generate the video feed for the first computer system without requiring additional user input. In some embodiments, in response to receiving the data, and in accordance with a determination that the data indicates that the set of camera selection criteria is not met, the first computer system forgoes selecting the video information captured by the one or more cameras (e.g., 650-2) of the second computer system (e.g., 650) for use to generate the video feed (e.g., 612-2) for the first computer system. In some embodiments, forgoing selecting the video information captured by the one or more cameras of the second computer system for use to generate the video feed for the first computer system includes selecting (or maintaining the selection of) video information captured by a camera of a different computer system (e.g., the first computer system and/or a third computer system) for use (e.g., immediately or at a later time) to generate the video feed for the first computer system (e.g., as shown in FIG. 6F).

In some embodiments, the camera selection criteria is different from a set of criteria for displaying a camera selection option (e.g., 625-3) for selecting video information captured by one or more cameras (e.g., 650-2) of the second computer system (e.g., 650) for use in generating a video feed (e.g., 612-2) for the first computer system (e.g., 601). For example, in some embodiments, the camera selection option is displayed when the second computer system is within a first threshold distance from the first computer system, and the video information captured by the one or more cameras of the second computer system are automatically selected for use to generate the video feed for the first computer system when the second computer system is within a second threshold distance different from (e.g., less than) the first threshold distance.

In some embodiments, the set of camera selection criteria includes a requirement that an automatic-camera-switching setting (e.g., 624-1) (e.g., a setting that, when enabled, causes an application providing a video feed to automatically switch from using a video feed from one camera to using a video feed from another camera when criteria is met) is enabled for a respective application (e.g., 610) (e.g., a live video communication application, a presentation application, and/or a camera application) used to display the video feed (e.g., 612) for the first computer system (e.g., 601) in order for the set of camera selection criteria to be met. Including a requirement that the automatic-camera-switching setting is enabled for a respective application used to display the video feed for the first computer system in order for the set of camera selection criteria to be met provides improved security and/or privacy by allowing a user of the computer system to enable or disable a setting for automatically switching a camera used to generate a video feed at the first computer system.

In some embodiments, the one or more cameras (e.g., 650-2) of the second computer system (e.g., 650) has a field-of-view that is different from (e.g., larger or smaller than) a field-of-view of a camera (e.g., 601-2) of the first computer system (e.g., 601). Using a field-of-view for the one or more cameras of the second computer system that is different from a field-of-view of a camera of the first computer system enables the first computer system to easily use a camera with a different field-of-view for use in generating a video feed. In some embodiments, the one or more cameras (e.g., 650-2) of the second computer system (e.g., 650) has a field-of-view that captures a first amount of a scene, and one or more cameras of the first computer system has a field-of-view that captures a second amount of the scene that is different from the first amount of the scene. In some embodiments, the camera of the second computer system is a wide-angle camera (e.g., a camera that includes a wide-angle lens), and the camera of the first computer system is not a wide-angle camera.

In some embodiments, after the video information captured by the one or more cameras (e.g., 650-2) of the second computer system (e.g., 650) has been selected for use to generate the video feed (e.g., 612-2) for the first computer system (e.g., 601) with a setting (e.g., a changed, updated, and/or modified setting) corresponding to a first set (e.g., one or more) of the one or more options (e.g., 630-2 and 630-3 in FIG. 6I) associated with camera settings for the video information captured by the one or more cameras of the second computer system (e.g., after one or more settings of the video information of the second computer system has been changed (e.g., enabling, disabling, and/or modifying an image blur setting (e.g., background blur and/or foreground blur), enabling, disabling, and/or modifying one or more image lighting settings, and/or enabling, disabling, and/or modifying an object tracking setting) and the video information is selected for use to generate the video feed for the first computer system), the first computer system performs the following. While a camera (e.g., 601-2 and/or 604) different from the one or more cameras (e.g., 650-2) of the second computer system (e.g., 650) (e.g., a camera of the first computer system and/or a camera of a third computer system) is selected to provide a video feed (e.g., 612-1 or 612-3) for the first computer system (e.g., 601) (e.g., after selecting video information captured by the camera different from the one or more cameras of the second computer system for use to generate the video feed for the first computer system, after deselecting the video information captured by the one or more cameras of the second computer system for use to generate the video feed for the first computer system, and/or after ceasing output of the video information captured by the one or more cameras of the second computer system as the video feed for the first computer system), the first computer system receives an input (e.g., 605-9) corresponding to a selection of the camera selection option (e.g., 625-3). In some embodiments, the video information captured by the camera different from the one or more cameras of the second computer system has one or more settings (e.g., image blur, image lighting, and/or object tracking) different from the settings of the video feed that was generated at the first computer system using the video information from the second computer system. In response to receiving the input (e.g., 605-9) corresponding to the selection of the camera selection option (e.g., 625-3), the first computer system selects (reselects) the video information captured by the one or more cameras (e.g., 650-2) of the second computer system (e.g., 650) for use to generate the video feed (e.g., 612-2) for the first computer system with the setting corresponding to the first set of the one or more options (e.g., 630-2 and 630-3 in FIG. 6K) associated with camera settings for the video information captured by the one or more cameras of the second computer system (e.g., switching back to using the video information from the second computer system as the video feed for the first computer system, while preserving the previous options (e.g., the image blur settings, image lighting settings, and/or object tracking settings applied to the video information from the second computer system) for the video feed). Selecting the video information captured by the one or more cameras of the second computer system for use to generate the video feed for the first computer system with the setting corresponding to the first set of the one or more options associated with camera settings for the video information captured by the one or more cameras of the second computer system reduces the number of inputs needed to reselect specific camera settings by preserving previous camera settings for the respective camera. In some embodiments, only changed settings of the video feed from the one or more cameras (e.g., 650-2) of the second computer system (e.g., 650) are preserved when switching back to using the one or more cameras of the second computer system.

In some embodiments, the first computer system (e.g., 601) receives (e.g., while the second computer system (e.g., 650) is in communication with the first computer system and/or while the video information captured by the one or more cameras (e.g., 650-2) of the second computer system is selected for use to generate the video feed (e.g., 612-2) for the first computer system) data indicating an event at the second computer system (e.g., an incoming call, a low battery of the second computer system, an expiration of a timer, receipt of a message, and/or receipt of a notification). In response to receiving the data indicating an event at the second computer system (e.g., 650), the first computer system displays, via the one or more display generation components (e.g., 601-1), a notification (e.g., 644) of the event (e.g., a graphical element such as a banner or notification is displayed at the first computer system depicting the event that occurred at the second computer system), without providing a notification of the event at the second computer system (e.g., the second computer system does not generate a response to the event such as a vibration, audible alert, and/or displayed element). Displaying the notification of the event without providing a notification of the event at the second computer system provides improved security and privacy by suppressing the display of content regarding the event at the second computer system (which may be visible to others) and instead displaying a notification of the event at the first computer system.

In some embodiments, in response to detecting termination of using the video information captured by the one or more cameras (e.g., 650-2) of the second computer system (e.g., 650) to generate the video feed (e.g., 612-2) for the first computer system (e.g., 601) (e.g., the second computer system is a multi-function device such as a smartphone or tablet and is being used for a purpose (e.g., performing an operation or executing an application) that does not involve use of the camera, a user has stopped using the camera of the second computer system, or a user is using the camera for another purpose), the first computer system selects (e.g., automatically, without user input) video information captured by one or more cameras (e.g., 601-2 or 604) of a computer system other than the second computer system for use to generate a video feed (e.g., 612-1 or 612-3) for the first computer system (e.g., automatically switching to a different camera (e.g., a default or a previously selected camera) to provide the video feed). Selecting video information captured by one or more cameras of the computer system other than the second computer system for use to generate a video feed for the first computer system in response to detecting termination of using the video information captured by the camera of the second computer system causes the first computer system to automatically switch the video feed to a different camera. In some embodiments, in response to detecting termination of using the video information captured by the one or more cameras (e.g., 650-2) of the second computer system (e.g., 650) to generate the video feed (e.g., 612-2) for the first computer system, the first computer system displays a video feed from a camera of a different computer system, a representation of paused video feed from the one or more cameras of the second computer system, and/or an indication that the camera of the different computer system is selected to provide the video feed for the first computer system.

In some embodiments, the first computer system (e.g., 601) displays, via the one or more display generation components (e.g., 601), an indication (e.g., 632-1, 632-2, 632-3, and/or 632-4) (e.g., an icon, affordance, graphical element, and/or text) of one or more functions (e.g., an image blur function (e.g., background blur and/or foreground blur), an image lighting function, and/or an object tracking function) of the one or more cameras (e.g., 650-2) of the second computer system (e.g., 650), wherein the indication of the one or more functions is visually associated with (e.g., displayed adjacent to and/or at least partially overlapping) a representation (e.g., 612-2, 656, and/or 662) of the video information captured by the one or more cameras of the second computer system (e.g., a camera preview or a view of video information captured by the one or more cameras of the second computer system). Displaying an indication of one or more functions of the one or more cameras of the second computer system visually associated with a representation of the video information captured by the one or more cameras of the second computer system provides feedback about the capabilities of the second computer system for modifying the video feed generated at the first computer system.

In some embodiments, the representation (e.g., 612-2, 656, and/or 662) of the video information captured by the one or more cameras (e.g., 650-2) of the second computer system (e.g., 650) is a preview (e.g., 612-2 in FIG. 6K) of the video feed (e.g., 612-2) captured by the one or more cameras of the second computer system displayed at the first computer system (e.g., 601) (e.g., in an application user interface (e.g., 610)) before a live video communication session is active. In some embodiments, the representation of the video information captured by the one or more cameras of the second computer system is a video feed (e.g., 612-2) captured by the one or more cameras of the second computer system displayed at the first computer system (e.g., in an application user interface (e.g., 610)) while a live video communication session is active (e.g., 656 and/or 662).

In some embodiments, the indication of one or more functions of the one or more cameras (e.g., 650-2) of the second computer system (e.g., 650) includes an indication (e.g., 632-4) of a surface display function (e.g., an icon, affordance, graphical element, and/or text that is displayed overlapping at least a first portion of the representation of the video information captured by the one or more cameras of the second computer system). The first computer system (e.g., 601) receives a set of one or more inputs (e.g., 605-13 or 605-15) corresponding to selection of the surface display function. In response to receiving the set of one or more inputs corresponding to selection of the surface display function, the first computer system ceases display of at least a second portion (in some embodiments, the second portion includes at least a portion of the first portion of the representation of the video information) of the representation (e.g., 662) of the video information captured by the one or more cameras (e.g., 650-2) of the second computer system (e.g., 650), and displays, at a location (e.g., on the display generation component, in the system user interface, and/or in an application user interface) that corresponds to (e.g., is or includes) the second portion of the representation of the video information captured by the one or more cameras (e.g., 650-2) of the second computer system (e.g., 650), a surface view that includes a representation (e.g., 674) of a portion of the video information of the one or more cameras of the second computer system that is modified (e.g., adjusted, manipulated, cropped, and/or corrected) to include a view of a surface (e.g., 675) positioned (e.g., located and/or detected) within a field-of-view of the one or more cameras of the second computer system (e.g., replacing at least a portion of the video feed from the one or more cameras of the second computer system with the surface view). Displaying the surface view at the location that corresponds to the second portion of the representation of video information captured by the one or more cameras of the second computer system causes the first computer system to automatically replace at least a portion of the camera preview with a view of a surface detected within the field-of-view of the one or more cameras of the second computer system.

In some embodiments, the representation of the video information captured by the one or more cameras (e.g., 650-2) of the second computer system (e.g., 650) is a video feed (e.g., 612-2 and/or 662) of the user of the first and/or second computer system (also referred to as a self view). In some embodiments, the surface view (e.g., 674) is displayed overlapping in front of a portion of the self view (e.g., as shown in FIG. 6Q). In some embodiments, the surface view is provided by one or more cameras (e.g., 601-2 or 604) of a computer system other than the second computer system. For example, the surface view is a modified view of a video feed (that includes the surface) provided by a camera (e.g., 601-2) of the first computer system (e.g., 601) or provided by a camera of a third computer system (e.g., a separate camera such as a webcam (e.g., 604)).

In some embodiments, the surface view (e.g., 674) is displayed concurrently with at least a third portion of the representation (e.g., 662) of the video information captured by the one or more cameras (e.g., 650-2) of the second computer system (e.g., 650) (e.g., the surface view is displayed concurrently with the camera preview or a portion thereof). Displaying the surface view concurrently with the third portion of the representation of the video information captured by the one or more cameras of the second computer system provides feedback about a state of the second computer system (e.g., a state in which the second computer system is providing video information that is used to display two portions of a video feed at the first computer system).

In some embodiments, while displaying the surface view (e.g., 674) at a first displayed location and displaying a fourth portion of the representation (e.g., 662) of the video information captured by the one or more cameras (e.g., 650-2) of the second computer system (e.g., 650) at a second displayed location, the first computer system (e.g., 601) receives an input (e.g., 605-14) directed to the representation (e.g., 662) of the video information (e.g., an input directed to the fourth portion of the representation of the vide information and/or an input directed to the surface view). In response to receiving the input directed to the representation of the video information, the first computer system displays the surface view at the second displayed location and displays the fourth portion of the representation of the video information at the first displayed location (e.g., swapping the displayed locations of the surface view and the self view)

(e.g., as shown in FIG. 6R). Displaying the surface view at the second displayed location and displaying the fourth portion of the representation of the video information at the first displayed location in response to receiving the input directed to the representation of the video information enables the first computer system to swap the displayed locations of the respective portions of a video feed without displaying additional controls.

In some embodiments, selecting (e.g., tapping and/or clicking on) the surface view causes the first computer system (e.g., 601) to swap the displayed locations of the surface view (e.g., 674) and the camera preview (e.g., 622). In some embodiments, selecting the camera preview causes the first computer system to swap the displayed locations of the surface view and the camera preview. In some embodiments, a subsequent selection of the surface view or camera preview causes the first computer system to reverse the swapped displayed locations of the surface view and camera preview. In some embodiments, the surface view is displayed in an enlarged state, and the self view is displayed in a shrunken state and overlapping a portion of the enlarged surface view. In some embodiments, in response to receiving a selection of the surface view or the self view, the computer system displays the self view having the enlarged state and the surface view having a shrunken state and overlapping a portion of the enlarged self view.

Note that details of the processes described above with respect to method 700 (e.g., FIGS. 7A and 7B) are also applicable in an analogous manner to the methods described below. For example, methods 800 and/or 1000 optionally includes one or more of the characteristics of the various methods described above with reference to method 700. For example, a video feed, camera source, and/or visual effect can be selected for a respective computer system using any of the techniques discussed with respect to method 700. For brevity, these details are not repeated.

FIG. 8 is a flow diagram illustrating a method for managing camera sharing between devices using a computer system in accordance with some embodiments. Method 800 is performed at a first computer system (e.g., 100, 300, 500, 601, and/or 602) (e.g., a first device, a desktop computer, a laptop computer, a smartphone, and/or a tablet) that is in communication with (e.g., includes and/or is connected to) one or more display generation components (e.g., 601-1) (e.g., a display controller, a touch-sensitive display system, a projector, a display screen, a display monitor, and/or a holographic display) and one or more input devices (e.g., 601-3 and/or 601-4) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, the first computer system is in communication with a first camera (e.g., 601-2 and/or 604) (e.g., an infrared camera, a depth camera, and/or a visible light camera). Some operations in method 800 are, optionally, combined, the orders of some operations are, optionally, changed, and some operations are, optionally, omitted.

As described below, method 800 provides an intuitive way for managing camera sharing between devices. The method reduces the cognitive burden on a user for managing camera sharing between devices, thereby creating a more efficient human-machine interface. For battery-operated computing devices, enabling a user to manage camera sharing between devices faster and more efficiently conserves power and increases the time between battery charges.

At method 800, the first computer system (e.g., 601) receives (802), via the one or more input devices (e.g., 601-3 and/or 601-4), a request (e.g., 605-1, 605-2, 605-3, 605-4, and/or 605-11) (e.g., a set of one or more inputs and/or instructions) to display a video feed interface (e.g., 625, 620, and/or 610) for the first computer system (e.g., a system interface, a video conference interface, a camera application interface, and/or a video camera selection interface). In some embodiments, the request is an instruction to display the video feed interface and/or to update display of the video feed interface based on a detected change at the first computer system and/or a second computer system (e.g., 650) such as, for example, detecting the second computer system and/or a change in a set of criteria for displaying one or more aspects of the video feed interface.

In response to receiving the request (e.g., 605-1, 605-2, 605-3, 605-4, and/or 605-11) to display the video feed interface, the first computer system (e.g., 601) displays (804) the video feed interface, including: in accordance with a determination that a second computer system (e.g., 650) (e.g., an external computer system, a second device different from the first device, and/or a smartphone) meets a first set of one or more criteria (e.g., the second computer system has previously provided a video feed for the first computer system, the second computer system has a particular orientation (e.g., on edge), the second computer system has a particular state of operation, the second computer system meets stability criteria (no motion for 1-5 seconds, no motion for more than 1 second, and/or no motion for 2-7 seconds), the second computer system is logged into the same user account as the first computer system, the second computer system is connected to the first computer system in a particular manner, and/or a frequency of use of the second computer system for providing the video feed for the first computer system meets frequency criteria), wherein the first set of one or more criteria includes a requirement that the second computer system is within a first threshold distance (e.g., 626-1 and/or 626-2) (e.g., 2.5 feet, 2.2 feet, 2 feet, 1.8 feet, 1.5 feet, 1 foot, 0.8 feet, or 0.5 feet) of the first computer system in order for the first set of one or more criteria to be met, the first computer system displays (806) (e.g., automatically and/or without requiring additional user input) the video feed interface (e.g., 625, 620, and/or 610) with content (e.g., 612-2, 625-3, 620-4, 630-1, 630-2, 630-3, 630-4, 632-1, 632-2, 632-3, and/or 632-4) corresponding to the second computer system (e.g., video data captured using one or more cameras of the second computer system and/or image data captured using one or more cameras of the second computer system, a selectable option for selecting the second computer system as a video output option, and/or a selectable option for applying a visual effect to a video feed provided by one or more cameras of the second computer system). In accordance with a determination that a second computer system (e.g., 650) does not meet the first set of one or more criteria, the first computer system displays (808) (e.g., automatically and/or without requiring additional user input) the video feed interface without content corresponding to the second computer system. Displaying the video feed interface with or without content corresponding to the second computer system in accordance with a determination of whether or not a second computer system meets the first set of one or more criteria enables the first computer system to automatically connect the second computer system as a camera or a selectable option for activating the camera when proximity and other criteria are met, while also preserving privacy by not automatically activating the camera, and potentially disabling the ability to connect as a camera, based on proximity of the second computer system and other criteria.

In some embodiments, the request to display the video feed interface (e.g., 625, 620, and/or 610) includes a request (e.g., 605-2, 605-4, and/or 605-11) to display a video camera selection interface (e.g., 620 and/or 625) (e.g., a menu, pop-up, or other graphical element that includes a list and/or representations of one or more cameras that can be selected for outputting video content), and the content corresponding to the second computer system (e.g., 650) includes a camera selection option (e.g., 620-4 and/or 625-3) that is selectable to cause the first computer system (e.g., 601) to output (e.g., via the one or more display generation components) a video feed (e.g., 612-2) generated using one or more cameras (e.g., 650-2) of the second computer system. Displaying the video camera selection interface with or without a camera selection option that is selectable to cause the first computer system to output a video feed generated using one or more cameras of the second computer system causes the first computer system to automatically display the video camera selection interface with or without the camera selection option without requiring additional input from a user of the first or second computer system.

In some embodiments, while the first computer system (e.g., 601) is not outputting a video feed (e.g., 612-2) generated using one or more cameras (e.g., 650-2) of the second computer system (e.g., 650), the first computer system receives an input (e.g., 605-9) corresponding to a selection of the camera selection option (e.g., 625-3) and, in response to receiving the input corresponding to the selection of the camera selection option, the first computer system outputs a video feed (e.g., 612-2) generated using one or more cameras of the second computer system.

In some embodiments, displaying the video feed interface (e.g., 625, 620, and/or 610) includes: in accordance with a determination that the second computer system (e.g., 650) meets a second set of one or more criteria (in some embodiments, the second set of criteria includes the first set of criteria), wherein the second set of one or more criteria includes a requirement that the second computer system is within a second threshold distance (e.g., 626-1) of the first computer system (e.g., 601), different from (e.g., greater than or less than) the first threshold distance (e.g., 626-2), in order for the second set of one or more criteria to be met, the first computer system displays the video camera selection interface (e.g., 625, 620, and/or 610) with the camera selection option (e.g., 625-3 and/or 620-4) that is selectable to cause the first computer system to output (e.g., via the one or more display generation components) the video feed (e.g., 612-2) generated using the one or more cameras (e.g., 650-2) of the second computer system. In accordance with a determination that the second computer system does not meet the second set of one or more criteria, the first computer system displays the video camera selection interface without the camera selection option (e.g., similar to as shown in FIG. 6C and/or FIG. 6D). Displaying the video camera selection interface with or without the camera selection option in accordance with a determination that the second computer system is within a second threshold distance of the first computer system causes the first computer system to automatically include the camera selection option in the display video camera selection interface without requiring additional input from a user of the first or second computer system and preserves privacy by avoiding a video feed being streamed from the camera of the second computer system when the user is not near the computer system that is receiving the video feed.

In some embodiments, the request to display the video feed interface (e.g., 625, 620, and/or 610) includes a request (e.g., 605-10) to start (e.g., enable, initiate, activate, and/or commence) a live video communication session (e.g., a video conference), and the content corresponding to the second computer system (e.g., 650) includes a representation of video information (e.g., 656, 612-2, 662, and/or 674) (e.g., video data, image data, a camera preview, and/or a live camera feed) captured by one or more cameras (e.g., 650-2) of the second computer system. Displaying the video feed interface with or without a representation of video information captured by one or more cameras of the second computer system causes the first computer system to automatically display the video feed interface with or without the video feed from the second computer system without requiring additional input from a user of the first or second computer system.

In some embodiments, the representation of video information includes (e.g., is) a view (e.g., 612-2 in FIGS. 6G, 6H, 6I, 6K, and/or 6L) of video information (e.g., a camera preview, a preview of the video feed) captured by the one or more cameras (e.g., 650-2) of the second computer system (e.g., 650) before the video information is shared with a live video communication session (e.g., before the live video communication session is started, before the user joins the live video communication session, and/or before video of the user is shared with the live video communication session).

In some embodiments, the representation of video information (e.g., 656, 612-2, 662, and/or 674) includes a representation (e.g., 600-1a) of a subject (e.g., 600-1) (e.g., a user of the first computer system and/or the second computer system) positioned within a field-of-view of the one or more cameras (e.g., 650-2) of the second computer system (e.g., 650) while the live video communication session is active (e.g., after the live video communication session has started, and before it has ended).

In some embodiments, displaying the video feed interface (e.g., 625, 620, and/or 610) includes: in accordance with a determination that the second computer system (e.g., 650) meets a third set of one or more criteria (in some embodiments, the third set of criteria includes the first set of one or more criteria), wherein the third set of one or more criteria includes a requirement that the one or more cameras (e.g., 650-2) of the second computer system are available (e.g., enabled, configured, capable, and/or within range of the first computer system) to capture video information in order for the third set of one or more criteria to be met, the first computer system (e.g., 601) displays the video feed interface including the representation of video information (e.g., 656, 612-2, 662, and/or 674) captured by the one or more cameras of the second computer system; and in accordance with a determination that the second computer system does not meet the third set of one or more criteria, the first computer system displays the video feed interface including a representation of video information (e.g., 612-1 and/or 612-3) captured by one or more cameras (e.g., 601-2) of the first computer system (e.g., a camera that is integrated into the first computer system, a camera that is integrated into a monitor or display generation component of the first computer system, and/or a camera (e.g., 604) that is connected to the first computer system via a wired connection (e.g., a cable)) (e.g., without including the representation of video information captured by the one or more cameras of the second computer system). Displaying the video feed interface including the representation of video information captured by the one or more cameras of the second computer system or including the representation of video information captured by one or more cameras of the first computer system, based on whether the second computer system is available, causes the first computer system to automatically select the video feed from the first computer system or the second computer system based on availability of the second computer system without requiring additional input from a user of the first or second computer system.

In some embodiments, the first set of one or more criteria includes a criterion that is based on an orientation of the second computer system (e.g., 650) (e.g., a requirement that the second computer system has a respective orientation (e.g., within a threshold amount (e.g., within 5°, 10°, 15°, 20°, 25°, 30°, 35°, or 40°) of a landscape orientation and/or perpendicular to a gravitational force) in order for the first set of one or more criteria to be met). Displaying the video feed interface (e.g., 625, 620, and/or 610) with or without content corresponding to the second computer system based on whether the second computer system has a respective orientation causes the first computer system to automatically include or exclude the content corresponding to the second computer system based on the orientation of the second computer system without requiring additional input from a user of the first or second computer system.

In some embodiments, the first set of one or more criteria includes a criterion that is based on a user account that is associated with the first computer system (e.g., 601) (e.g., a requirement that the second computer system (e.g., 650) is associated with (e.g., signed into and/or logged onto) a user account that is associated with the first computer system in order for the first set of one or more criteria to be met). Displaying the video feed interface (e.g., 625, 620, and/or 610) with or without content corresponding to the second computer system based on whether the second computer system is associated with a user account that is associated with the first computer system provides improved security and/or privacy by ensuring that data (e.g., video information) is only shared with devices associated with a common user account.

In some embodiments, the second computer system (e.g., 650) is configured to provide video information captured by one or more cameras (e.g., 650-2) of the second computer system to a first remote computer system that is associated with the user account for use in generating a video feed (e.g., 612-2) for the first remote computer system and to provide video information captured by one or more cameras of the second computer system to a second remote computer system that is associated with the user account for use in generating a video feed for the second remote computer system (e.g., the second computer system is configured to provide video information for generating video feeds at remote computer systems that are signed into a same user account as the second computer system). Providing the video information to the first and second remote computer systems that are associated with the user account that is associated with the first computer system for use in generating a video feed for the respective first and second remote computer systems provides improved security and/or privacy by ensuring that the video information is only shared with devices associated with a common user account.

In some embodiments, the first set of one or more criteria includes a criterion that is based on a respective state of the second computer system (e.g., 650) (e.g., a requirement that the second computer system is in a respective state (e.g., an active state or a passive state) in order for the first set of one or more criteria to be met). Displaying the video feed interface (e.g., 625, 620, and/or 610) with or without content corresponding to the second computer system based on whether the second computer system is in a respective state causes the first computer system to automatically include or exclude the content corresponding to the second computer system based on the state of the second computer system without requiring additional input from a user of the first or second computer system. In some embodiments, the first set of one or more criteria is met when the second computer system (e.g., 650) is in a passive state. In some embodiments, the passive state is a state in which a display component of the second computer system is off and/or in a low-power state, a locked state, or a sleep state. In some embodiments, the first set of one or more criteria is met when the second computer system is in an active state (e.g., a state in which the device is displaying a home screen or an application user interface and/or the device has detected user interaction with a currently displayed user interface within a threshold period of time such as 1, 5, 10, 30, or 60 seconds). In some embodiments, the active state is a state in which a display component of the second computer system is on, in a full-power state.

In some embodiments, the first set of one or more criteria includes use history criteria (e.g., criteria that is met (or not) based on a history of use of the second computer system (e.g., 650) for providing video information that is used to generate a video feed (e.g., 612-2) for the first computer system (e.g., 601)) that is based on whether the second computer system (e.g., 650) has previously been used to provide video information for generating a video feed (e.g., 612-2) for the first computer system (e.g., 601). Displaying the video feed interface (e.g., 625, 620, and/or 610) with or without content corresponding to the second computer system based on whether the second computer system has previously been used to provide video information for generating a video feed for the first computer system causes the first computer system to automatically include or exclude the content corresponding to the second computer system based on use history of the second computer system without requiring additional input from a user of the first or second computer system.

In some embodiments, the use history criteria is met when the second computer system (e.g., 650) has previously been used to provide video information for generating a video feed (e.g., 612-2) for the first computer system (e.g., 601). For example, the first computer system does not automatically select the second computer system as a system camera (e.g., a camera for providing a video feed for applications operating at the first computer system and/or a preferred video feed source for the first computer system) unless the user has previously manually selected the camera (e.g., 650-2) of the second computer system as a system camera for the first computer system. In some embodiments, the use history criteria provides different (e.g., more stringent, smaller, and/or shorter) thresholds for automatically selecting the camera of the second computer system as a system camera for the first computer system if the camera has not been previously manually selected (e.g., ever or within a threshold amount of time such as, 1 day, 1 week, 1 month, or 1 year) as the system camera, than if it has previously been selected as the system camera. For example, in some embodiments, the first computer system automatically selects the camera of the second computer system as a system camera for the first computer system if the camera of the second computer system has previously been used as the system camera and is within a threshold distance (e.g., 626-1) of the first computer system. However, if the camera of the second computer system has not been previously used as the system camera, the camera is not automatically selected as the system camera and, instead, can be selected by a manual selection of the camera by a user of the first computer system.

In some embodiments, the use history criteria includes a criterion that is based on use of the second computer system (e.g., 650) for providing video information for generating a video feed (e.g., 612-2) for the first computer system (e.g., 601) meeting a usage threshold (e.g., a requirement that is met when the second computer system has been used to provide video information for generating a video feed for the first computer system a threshold number of times and/or a threshold number of times within an amount of time, such as once, more than once, once a day, once a week, once a month, twice a week, or twice a month). Displaying the video feed interface (e.g., 625, 620, and/or 610) with or without content corresponding to the second computer system based on a usage threshold of using the second computer system to provide video information for generating a video feed for the first computer system causes the first computer system to automatically include or exclude the content corresponding to the second computer system based on a frequency of use of the second computer system without requiring additional input from a user of the first or second computer system.

In some embodiments, the use history criteria is met when the second computer system (e.g., 650) has been used at least one time to provide video information that is used to generate a video feed (e.g., 612-2) at the first computer system (e.g., 601). For example, in some embodiments, the first computer system automatically selects the camera (e.g., 650-2) of the second computer system as a system camera for the first computer system if the camera of the second computer system has previously been used at least one time as the system camera and is within a threshold distance (e.g., 626-1) of the first computer system. However, if the camera of the second computer system has not been previously used at least one time as the system camera, the camera is not automatically selected as the system camera and, instead, can be selected by a manual selection of the camera by a user of the first computer system.

In some embodiments, the use history criteria includes a criterion that is based on selection of the second computer system (e.g., 650) as a preferred video feed source (e.g., a requirement that is met when the second computer system has been selected (and/or is currently selected) (e.g., manually selected by a user of the first computer system and/or the second computer system) as a preferred video feed source (e.g., via a selection in a menu or settings UI of the first computer system (e.g., 601) and/or via a selection in a menu or settings UI of the second computer system)). Displaying the video feed interface (e.g., 625, 620, and/or 610) with or without content corresponding to the second computer system based on whether the second computer system has been selected as a preferred video feed source causes the first computer system to automatically include or exclude the content corresponding to the second computer system based on user preference of using the second computer system as a video feed source without requiring additional input from a user of the first or second computer system.

In some embodiments, the use history criteria is met when the second computer system (e.g., 650) has been selected as a preferred video feed source for the first computer system (e.g., 601). For example, in some embodiments, the first computer system automatically selects the camera (e.g., 650-2) of the second computer system as a system camera for the first computer system if the camera of the second computer system has previously been selected as a preferred video feed source for the first computer system and the second computer system is within a threshold distance (e.g., 626-1) of the first computer system. However, if the camera of the second computer system has not been previously selected as a preferred video feed source, the camera is not automatically selected as the system camera and, instead, can be selected by a manual selection of the camera by a user of the first computer system.

In some embodiments, the first set of one or more criteria includes motion criteria (e.g., criteria that is met (or not) based on a magnitude and/or direction of movement of the second computer system) that is based on detected movement of the second computer system (e.g., 650) (e.g., based on whether the second computer system is stationary or substantially stationary). Displaying the video feed interface (e.g., 625, 620, and/or 610) with or without content corresponding to the second computer system based on detected movement of the second computer system causes the first computer system to automatically include or exclude the content corresponding to the second computer system based on movement of the second computer system without requiring additional input from a user of the first or second computer system.

In some embodiments, the movement of the second computer system (e.g., 650) is detected by the second computer system and/or the first computer system (e.g., 601). In some embodiments, the motion criteria is met when the second computer system is moving within a threshold range of movement (e.g., the second computer system is stationary or substantially stationary). For example, in some embodiments, the first computer system automatically selects the camera (e.g., 650-2) of the second computer system as a system camera for the first computer system if the camera of the second computer system is stationary or substantially stationary (and is within a threshold distance (e.g., 626-1)). However, if the camera of the second computer system is not stationary or substantially stationary, the camera is not automatically selected as the system camera and, instead, can be selected by a manual selection of the camera by a user of the first computer system.

In some embodiments, the motion criteria includes a criterion that is based on the second computer system (e.g., 650) having movement within a threshold range of movement (e.g., the second computer system has been stationary or substantially stationary) for at least a threshold amount of time (e.g., a requirement that is met when the second computer system is stationary (or determined to be stationary) (e.g., the second computer system does not move or moves less than a threshold amount of movement)) for at least a threshold amount of time (e.g., 2 seconds, 5 seconds, 10 seconds, 20 seconds, 30 seconds, 45 seconds, 60 seconds, or 90 seconds). Displaying the video feed interface (e.g., 625, 620, and/or 610) with or without content corresponding to the second computer system based on whether the second computer system is stationary for at least a threshold amount of time causes the first computer system to automatically include or exclude the content corresponding to the second computer system based on movement of the second computer system without requiring additional input from a user of the first or second computer system.

In some embodiments, the motion criteria is met when the second computer system (e.g., 650) is moving within a threshold range of movement (e.g., the second computer system is stationary or substantially stationary) for at least a threshold amount of time (e.g., 2 seconds, 5 seconds, 10 seconds, or 20 seconds). For example, in some embodiments, the first computer system (e.g., 601) automatically selects the camera (e.g., 650-2) of the second computer system as a system camera for the first computer system if the camera of the second computer system is stationary or substantially stationary for the threshold amount of time (and is within a threshold distance (e.g., 626-1)). However, if the camera of the second computer system is not stationary or substantially stationary for the threshold amount of time, the camera is not automatically selected as the system camera and, instead, can be selected by a manual selection of the camera by a user of the first computer system.

In some embodiments, the first set of one or more criteria includes a criterion that is based on the first computer system (e.g., 601) having a wired connection or a wireless connection with the second computer system (e.g., 650) (e.g., a requirement that the second computer system is connected to the first computer system via a wired connection or a wireless connection in order for the first set of one or more criteria to be met). Displaying the video feed interface (e.g., 625, 620, and/or 610) with or without content corresponding to the second computer system based on whether the second computer system is connected to the first computer system via a wired or wireless connection causes the first computer system to automatically include or exclude the content corresponding to the second computer system based on a connection between the second computer system and the first computer system without requiring additional input from a user of the first or second computer system.

In some embodiments, the first computer system (e.g., 601) automatically selects the camera (e.g., 650-2) of the second computer system (e.g., 650) as a system camera for the first computer system if the second computer system is connected to the first computer system via a wired connection. In some embodiments, if the second computer system is connected to the first computer system via a wireless connection, the camera is not automatically selected as the system camera and, instead, can be selected by a manual selection of the camera by a user of the first computer system. In some embodiments, if the second computer system is connected to the first computer system via a wireless connection, the camera of the second computer system is automatically selected as the system camera for the first computer system if other criteria are met (e.g., use history criteria, motion criteria, proximity criteria, and/or a state of the second computer system).

In some embodiments, the first computer system (e.g., 601) receives the request to display the video feed interface (e.g., 625, 620, and/or 610) for the first computer system (e.g., 601) while the first computer system is in communication with the second computer system (e.g., 650) (e.g., via a wired or wireless connection).

In some embodiments, the first computer system (e.g., 601) is in communication with an audio generation component (e.g., a speaker and/or a bone conduction audio output device). While displaying the video feed interface (e.g., 625, 620, and/or 610) with content (e.g., 612-2, 656, 662, and/or 674) corresponding to the second computer system (e.g., 650), the first computer system outputs, via the audio generation component, audio data (e.g., sound) based on sound detected using one or more microphones of the second computer system. Outputting audio data based on sound detected using one or more microphones of the second computer system while displaying the video feed interface with content corresponding to the second computer system causes the first computer system to automatically select the second computer system as an audio source for a video feed without requiring additional input from a user of the first or second computer system.

In some embodiments, while the video feed interface (e.g., 625, 620, and/or 610) is displayed with content (e.g., 612-2, 656, 662, and/or 674) corresponding to the second computer system (e.g., 650), the second computer system (e.g., one or more microphones of the second computer system) is selected as an audio source for a video feed (e.g., 612-2) at the first computer system (wherein the video feed is provided by one or more cameras (e.g., 650-2) of the second computer system). In some embodiments, while the video feed interface is displayed without content corresponding to the second computer system, a microphone of the first computer system is selected as an audio source.

In some embodiments, the first set of one or more criteria includes a requirement that an automatic-camera-switching setting (e.g., 624-1) (e.g., a setting that, when enabled, allows an application providing (or configured to provide) a video feed to automatically (without user input) select a camera from which to display a video feed, display a video feed from a camera, and/or switch from using a video feed from one camera to using a video feed from another camera when criteria is met) is enabled for a respective application (e.g., a live video communication application, a presentation application, and/or a camera application) used to display the video feed interface (e.g., 625, 620, and/or 610) with content (e.g., 612-2, 656, 662, and/or 674) corresponding to the second computer system (e.g., 650) in order for the first set of one or more criteria to be met. Including a requirement that the automatic-camera-switching setting is enabled for a respective application used to display the video feed interface with content corresponding to the second computer system in order for the first set of one or more criteria to be met provides improved security and/or privacy by allowing a user of the computer system to enable or disable a setting for automatically switching a camera used to generate a video feed at the first computer system.

In some embodiments, different applications can have different settings (e.g., 624-1) for allowing (or not allowing) a camera to be automatically selected or to automatically switch to a different camera for the respective application. In some embodiments, when the automatic-camera-switching setting is enabled for an application, the first computer system (e.g., 601) automatically selects the camera (e.g., 650-2) of the second computer system (e.g., 650) as a video feed (e.g., 612-2) for the application when criteria is met (e.g., a first camera becomes unavailable for use, the second computer system is within proximity of the first computer system, motion criteria is met for the second computer system, use history criteria is met, and/or the second computer system has a particular state in which the camera can be selected for use at the first computer system). In some embodiments, when the automatic-camera-switching setting is not enabled for an application, the first computer system does not automatically select the camera of the second computer system as a video feed for the application and, instead, the camera can be selected by a manual selection from a user of the first computer system. For example, when the automatic-camera-switching criteria are met for the second computer system if the user selects a first application with the automatic-camera-switching enabled, the one or more cameras of the second computer system are used as a video feed for the first application, but if the user selects a second application with the automatic-camera-switching disabled, the one or more cameras of the second computer system are not automatically used as a video feed for the second application. In contrast, when the automatic-camera-switching criteria are not met for the second computer system, the one or more cameras of the second computer system are not automatically used as a video feed without regard to whether or not the automatic-camera-switching setting for first application or the second application is enabled. Additionally, in some embodiments, different thresholds are used for the automatic-camera-switching criteria (e.g., different thresholds for device orientation and/or proximity), so that the one or more cameras of the second computer system are automatically used as a video feed for the first application but not for the second application. In some embodiments, the applications can pick the thresholds and, in other embodiments, the user can pick the thresholds that are used for different applications.

Note that details of the processes described above with respect to method 800 (e.g., FIG. 8) are also applicable in an analogous manner to the methods described above and/or below. For example, methods 700 and/or 1000 optionally includes one or more of the characteristics of the various methods described above with reference to method 800. For example, the methods can incorporate any of the techniques discussed with respect to method 800 for selecting a camera and/or video feed for use based on criteria. For brevity, these details are not repeated.

FIGS. 9A-9K illustrate exemplary user interfaces for managing camera sharing between devices, in accordance with some embodiments. The user interfaces in these figures are used to illustrate the processes described below, including the processes in FIG. 10. In some embodiments, the techniques described above can be performed using the devices depicted in FIGS. 9A-9K. For example, the phone in FIGS. 9A-9K is connected to the computer system and selected as a video feed source in a manner similar to that discussed above with respect to FIGS. 6A-6R. Similarly, the techniques described below can be performed using the devices depicted in FIGS. 6A-6R.

FIGS. 9A-9K depict computer system 901 (referred to as John's laptop) (similar to John's computer system 601) and Jane's computer system 902 (similar to Jane's computer system 602) during a video conference. John's computer system 901 includes display 901-1, camera 901-2, keyboard 901-3, and trackpad 901-4. Jane's computer system 902 includes display 902-1, camera 902-2, keyboard 902-3, and trackpad 902-4. John's computer system 901 and Jane's computer system 902 include one or more elements of devices 100, 300, and/or 500, such as speakers, a microphone, memory, and a processor, for example. John's computer system 901 is connected to device 950 (referred to as John's phone) (similar to device 650), and is using the video information captured by camera 950-2 (similar to camera 650-2) of device 950 to provide a video feed for the video conference, in a manner similar to that discussed above with respect to FIGS. 6A-6R. Device 950 includes touch-sensitive display 950-1, camera 950-2, and camera 950-3. Device 950 includes one or more elements of devices 100, 300, and/or 500, such as speakers, a microphone, memory, and a processor, for example. In some embodiments, John's device 950 can be used as a video feed source for multiple different devices all signed into the same user account. For example, device 950 and computer system 901 are signed into John's user account, so device 950 can be used as a video feed source for computer system 901. If John has a second device such as a second computer or a tablet that is also signed into John's user account, then device 950 can also be used as a video feed source for the second device. In the embodiments provided herein, the techniques are depicted using one or more laptops and phones; however, other devices can be used such as a tablet, desktop computer, and/or other computer systems. For example, computer system 901 can be a desktop computer instead of a laptop. As another example, a tablet can be used in place of a phone for device 950.

Figure 9D:
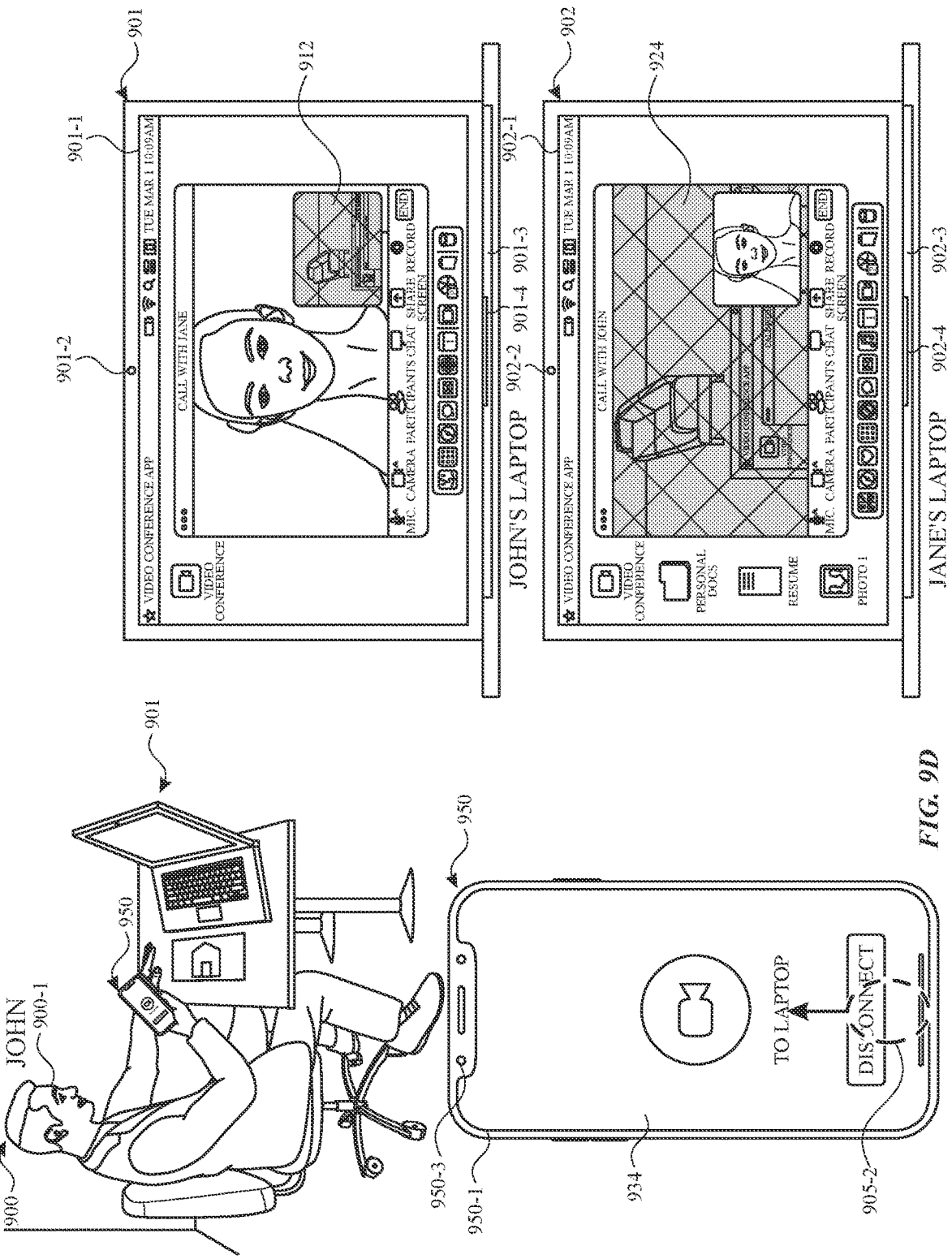

During some portions of the video conference, John's device 950 is mounted to John's computer system 901 in a landscape orientation with a back-side view of device 950 being shown, for example, as depicted in FIG. 9A. During some portions of the video conference, John is holding device 950, and device 950 is depicted as being unmounted from the laptop, for example, as shown in FIG. 9D. In addition to depicting device 950 in a mounted or unmounted configuration, FIGS. 9A-9K provide a schematic view 950a of device 950. The schematic view depicts a front-side view of device 950, which shows display 950-1 and camera 950-3 (e.g., a front-facing or front-side camera), and represents the state of device 950 during a respective portion of the video conference, including depicting inputs (e.g., touch inputs at display 950-1) received at device 950. For example, in FIG. 9A, schematic view 950a indicates that display 950-1 is inactive (e.g., turned off, in a sleep state, and/or a low-power state) while device 950 is mounted to John's computer system 901 and being used for the video conference.

In FIG. 9A, John's computer system 901 displays, via display 901-1, video conference application interface 910 (similar to video conference application interface 610), which includes self view 908, showing video feed 912 generated using camera 950-2 of John's device 950. Video feed 912 includes a representation 900-1a of John in environment 900. In the embodiment shown in FIG. 9A, John has enabled various camera effects, such as the camera blur and lighting effects discussed above with respect to FIGS. 6A-6R. Video conference application interface 910 also includes Jane's video feed 914, which is the video feed generated using camera 902-2 of Jane's computer system 902 and includes representation 914-1 of Jane. Jane's computer system 902 displays, via display 902-1, video conference application interface 920 (similar to video conference application interface 910), which includes self view 928, showing video feed 922 generated using camera 902-2 of Jane's computer system 902. Video feed 922 includes a representation Jane. Video conference application interface 920 also includes John's video feed 924, which is the video feed generated using camera 950-2 of John's device 950 (and transmitted to Jane's computer system 902 from John's computer system 901). Video feed 924 includes representation 924-1 of John and includes the camera effects enabled by John.

In some embodiments, the behavior of device 950 is modified when it is being used as a video feed source for computer system 901. For example, as shown in FIG. 9A, when device 950 is being used for the video feed source during the video conference, device 950 turns off display 950-1 or places display 950-1 in a low-power or sleep state, which conserves battery of device 950 and reduces burn-in and general wear and tear on display 950-1. Additionally, device 950 modifies typical notification behavior such as, for example, displaying notifications and generating audio and haptic alerts. For example, in FIG. 9B, device 950 receives a phone call from "Mom" while phone 950 is being used as a video feed source for the video conference at computer system 901. When the call is detected, device 950 suppresses the notification at device 950 by keeping display 950-1 turned off, and does not generate other alert behavior such as generating an audio alert or a haptic alert, both of which could interfere with the use of device 950 as a video feed source during the video conference by introducing unwanted noise and vibrations into the audio and video feeds of the video conference. In some embodiments, notification behavior at device 950 is modified, rather than suppressed. For example, a notification is displayed at device 950, but the audio and/or haptic alerts are suppressed (e.g., not provided). In some embodiments, device 950 displays the notification without generating the audio and/or haptic alerts when device 950 is connected to computer system 901, but is not currently being used as a video feed source. In some embodiments, the notifications are provided at computer system 901, instead of device 950. For example, in FIG. 9B, computer system 901 displays notification 930, informing John of the incoming call from Mom at device 950. In some embodiments, John can accept the call by selecting accept option 930-1 or decline the call by selecting decline option 930-2. In some embodiments, when the call is accepted, the call with Mom is transferred to device 950. In some embodiments, when the call is accepted, the call with Mom is enabled at computer system 901 (which, optionally, pauses the video conference and/or the use of device 950 as the video feed source for the video conference). The call is an example of one type of event for which a notification can be suppressed, not provided, and/or modified at device 950. Notifications of other events can be suppressed and/or modified such as, for example, a low battery notification, an incoming video conference request, an alarm, a timer, a received message, and the like. In some embodiments, when an event is received at device 950 while the device is being used as a video feed source at computer system 901, and device 950 is picked up, moved, or an input (e.g., a tap input) is detected at device 950, device 950 displays a notification for the event. In some embodiments, the notification is displayed over a status user interface, such as status user interface 934, which is described in greater detail below.

In FIG. 9B, while device 950 is being used as the video feed source for the video conference, device 950 detects input 905-1 on display 950-1. In response to detecting input 905-1, device 950 wakes display 950-1 and displays status interface 934, as shown in FIG. 9C. Status interface 934 includes indicators 936 such as text and/or images that indicate that device 950 is currently being used as a video source at computer system 901. Status interface 934 also includes disconnect option 938, which is selectable to disconnect device 950 from computer system 901, thereby terminating use of device 950 as a video feed source at computer system 901. In some embodiments, when use of device 950 is terminated, computer system 901 pauses or mutes a video feed displayed at computer system 901, switches the video feed to a default image, switches the video feed to a different camera feed available at computer system 901 (if an automatic-camera-switching setting (similar to setting 624-1) is enabled for the video conference application), terminates the video conference, or a combination thereof. Status interface 934 provides improved privacy and security controls by informing the user that video information is being transmitted from device 950 to computer system 901 (specifically, that the camera of device 950 is being used as a video feed source), and provides the user with an easily accessible option to terminate the connection.

In FIG. 9C, John's device 950 continues to provide the video feed while displaying status user interface 934, as indicated by video feeds 912 and 924. In some embodiments, however, device 950 mutes or pauses the video feed in response to the wake input 905-1 at display 950-1.

In FIG. 9D, John is holding device 950, as depicted in the schematic view of John 900-1 in environment 900. In some embodiments, computer system 901 pauses the video feed, switches the video feed to a different image or camera feed, or disconnects the device when the device is being moved around or if the device is moved beyond a threshold distance from computer system 901. In the embodiment depicted in FIG. 9D, however, device 950 remains connected to computer system 901 and continues to be used as the video feed source, as shown in video feeds 912 and 924, even as John moves the device around (e.g., rotating, turning, and moving) while picking it up. Device 950 detects input 905-2, which is a gesture for displaying a home screen at device 950.

Figure 9F:
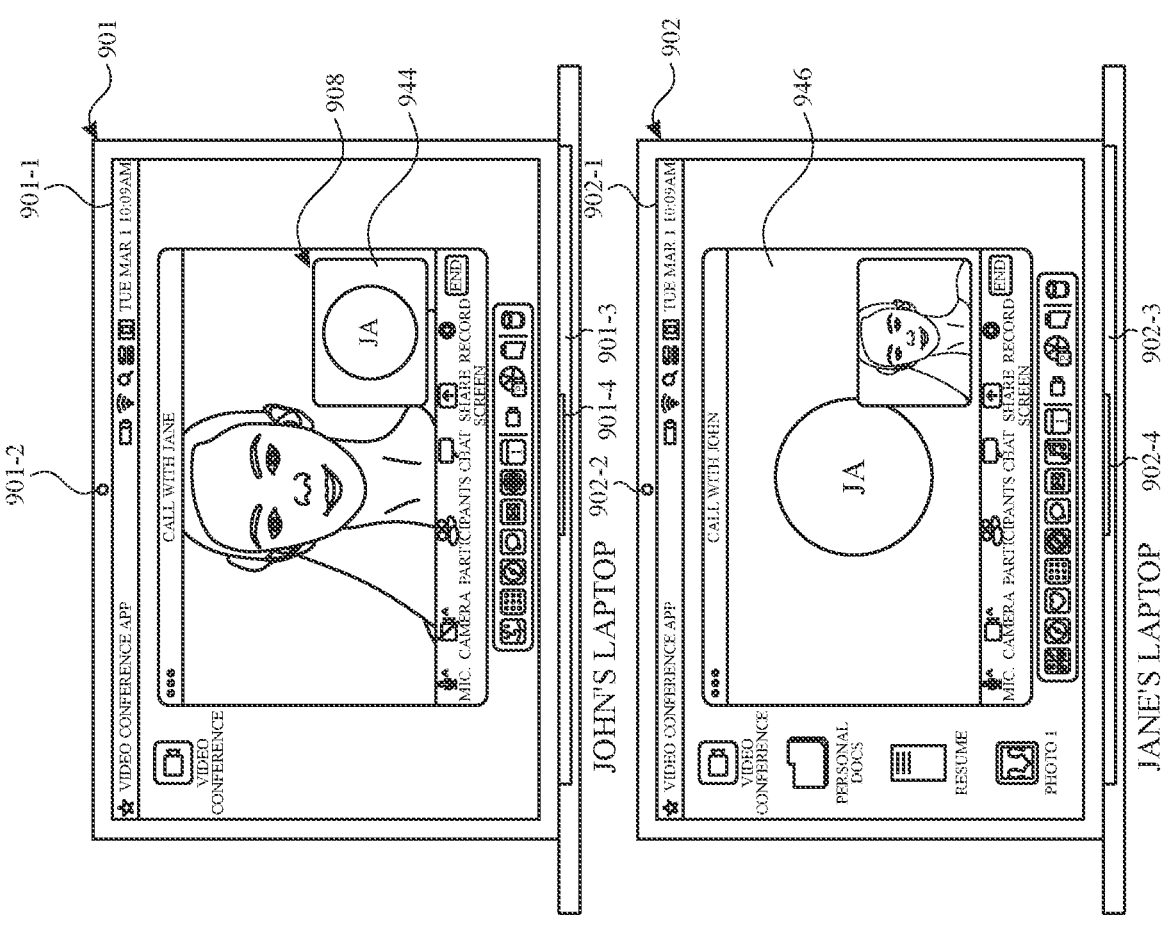

In response to input 905-2, device 950 displays home screen 940 and mutes (or pauses) the video feed for the video conference application, while remaining connected to computer system 901, as shown in FIG. 9E. When the video feed is muted at computer system 901, camera control 948 is modified to indicate the camera feed is muted, and self view 908 is updated to display a different image. In the embodiment depicted in FIG. 9E, John's computer system 901 displays John's initials 944, and Jane's computer system 902 displays John's initials 946, instead of the live video feed from device 950. In some embodiments, the audio feed remains active for the video conference, while the video feed is muted. In some embodiments, computer system 901 switches to a different video feed, if available, instead of displaying John's initials. In some embodiments, pausing or muting the video feed allows John to remain connected to the video conference while he uses his phone. For example, in FIG. 9E John selects messages icon 942 via input 905-3, and device 950 displays messages interface 952, as shown in FIG. 9F, while device 950 remains connected to computer system 901, and computer system 901 continues to display John's initials while the video feed is muted.

Figure 9G:
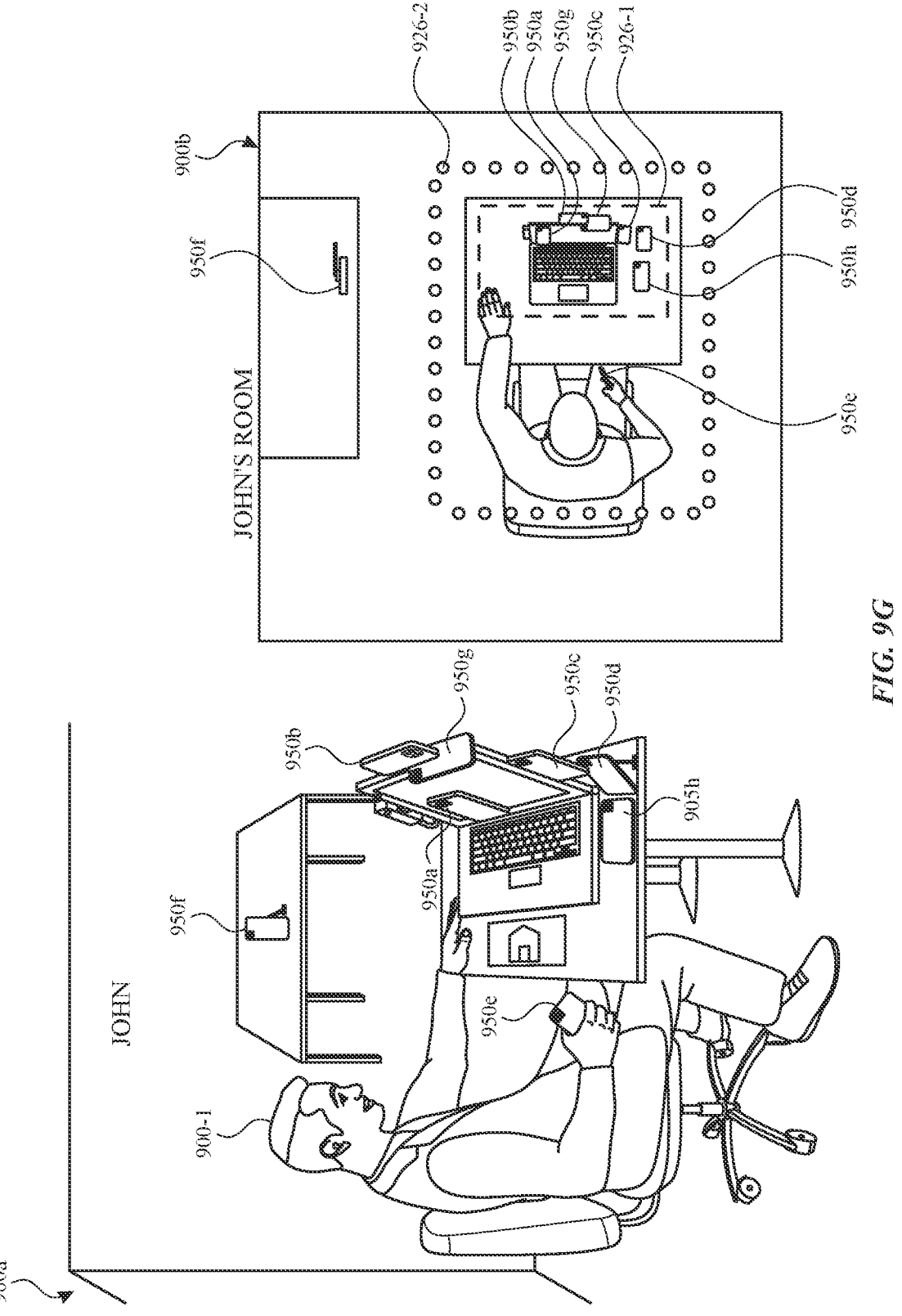

In the embodiments described herein, John's computer system 901 can select John's device 950 as a video feed source when criteria are met, similar to the manner in which device 650 is selected as a video feed source for computer system 601, as discussed above with respect to FIGS. 6A-6R. For example, FIG. 9G illustrates two schematic views of environment 900, similar to the schematic views provided in FIG. 6E. View 900a is a profile view of environment 900, similar to that shown in FIG. 9D, and view 900b is an overhead view of environment 900. Environment 900 is depicted in FIG. 9G with multiple representations of device 950, each representing an example location, position, and/or orientation of device 950 in environment 900, with the representations shown in the two different views (900a and 900b). View 900b also shows boundary lines representing different distance thresholds from computer system 901 within which device 950 can be selected for a video feed at computer system 901 (as described in greater detail with respect to FIGS. 6A-6R). Outer boundary 926-2 represents a proximity boundary within which device 950 can be selected (e.g., manually or automatically) as a video source at computer system 901 when other criteria are met. Inner boundary 926-1 represents a proximity boundary within which computer system 901 can automatically (or, in some instances, manually) select device 950 as a video source when other criteria are met. In some embodiments, when device 950 is inside outer boundary 926-2, but outside of inner boundary 926-1, device 950 can be selected manually, but not automatically, as a video feed source for computer system 901 when other criteria are met. In some embodiments, device 950 can be located inside inner boundary 926-1, but is not automatically selected by computer system 901 if other criteria are not met such as, for example, if device 950 has not previously been connected to computer system 901, device 950 is not currently connected to computer system 901, device 950 is not stationary for at least a threshold amount of time, device 950 has not previously been selected as a camera for computer system 901, device 950 has not been selected as a preferred or default camera for computer system 901, device 950 and computer system 901 are not signed in to the same user account, computer system 901 and/or device 950 are not turned on, and/or other criteria are not met. In some embodiments, device 950 can be located inside inner boundary 926-1 and can be selected manually, but not automatically, based on other criteria being met or not met. For example, if device 950 is within inner boundary 926-1, but has not been previously selected as a video feed source for computer system 901, is not stationary for a threshold amount of time, does not have a particular orientation, and/or is not selected as a default or preferred camera, device 950 can be selected as a video feed source manually, but is not automatically selected by computer system 901. Similarly, device 950 can be located inside outer boundary 926-2 and not be selectable by computer system 901 as a camera source if the other criteria are not met. In some embodiments, some criteria prevents device 950 from being selectable as a video source for computer system 901, regardless of other criteria being met. For example, if other criteria are met, but device 950 is located outside of outer boundary 926-2, device 950 may not be selectable (e.g., manually or automatically) as a video feed source for computer system 901. As another example, if computer system 901 or 950 is turned off, or if either of the devices has been configured not to communicate with one another, device 950 may not be selectable as a video feed source for computer system 901, even if other criteria are met. The criteria described herein is not an exhaustive list of criteria, nor are all listed criteria required to be met for device 950 to be selected (e.g., manually and/or automatically) as a video feed source for computer system 901, unless specifically noted otherwise. Furthermore, combinations of the criteria described herein can be used including, in some embodiments, using the described criteria in combination with other criteria.

The representations of device 950 are provided to demonstrate example scenarios for which some criteria are met and some criteria are not met for selecting device 950 as a video source for computer system 901. The different scenarios represent some of the criteria discussed above, but is not an exhaustive representation of the different combinations of criteria used to enable use of device 950 as a video feed source for computer system 901. Representation 950a represents a scenario where device 950 is propped in front of computer system 901 and is available to be automatically selected as a video feed source for computer system 901 because device 950 is located within inner boundary 926-1 and device 950 meets other criteria for being automatically selected such as, for example, being stationary and in portrait orientation with camera 950-2 facing John 900-1. Representation 950b represents a scenario where device 950 is mounted to the top of computer system 901 (similar to as shown in FIGS. 9A-9C) and is available to be automatically selected as a video feed source for computer system 901 because device 950 is located within inner boundary 926-1 and device 950 meets other criteria for being automatically selected such as, for example, being stationary and in landscape orientation with camera 950-2 facing John 900-1. Representation 950c represents a scenario where device 950 is mounted to the side of computer system 901 and is available to be automatically selected as a video feed source for computer system 901 because device 950 is located within inner boundary 926-1 and device 950 meets other criteria for being automatically selected, similar to representation 950a. Representation 950d represents a scenario where device 950 is propped next to computer system 901 and is available to be automatically selected as a video feed source for computer system 901 because device 950 is located within inner boundary 926-1 and device 950 meets other criteria for being automatically selected, similar to representation 950a.

Representation 950e represents a scenario where device 950 is in John's hand and is located outside of inner boundary 926-1 and inside outer boundary 926-2. Representation 950e is not capable of being automatically selected by computer system 901 at least because representation 950e is outside of inner boundary 926-1. However, because representation 950e is inside outer boundary 926-2, device 950 is capable of being manually selected as the video feed source at computer system 901, if other criteria are met (e.g., both devices are on, both devices are connected to each other, and/or both devices are signed in to a same user account). Some criteria could also prevent device 950 from being automatically selected as a video feed source for computer system 901, even if representation 950e was within inner boundary 926-1 such as, for example, movement of device 950, the angled orientation of device 950 as depicted by representation 950e (not portrait or landscape orientation), and camera 950-2 being positioned away from John 900-1.

Representation 950f represents a scenario where device 950 is propped up on a table outside of outer boundary 926-2, in portrait orientation with camera 950-2 facing towards John 900-1. In this embodiment, because device 950 is located outside of outer boundary 926-2, device 950 is not available to be selected as a video feed source for computer system 901, even though other criteria are met (e.g., device 950 is stationary, in portrait orientation, and with the camera facing the user).

Representation 950g represents a scenario where device 950 is positioned on top of computer system 901, with camera 950-2 facing away from John 900-1 (e.g., facing up and/or towards the ceiling). Although representation 950g is located within inner boundary 926-1 and device 950 is stationary, computer system 901 does not automatically select device 950 as a video feed source because other criteria are not met such as, for example, the camera facing away from John 900-1. In some embodiments, although computer system 901 does not automatically select device 950 in the scenario with representation 950g, the device can be manually selected as a video feed source for computer system 901.

Representation 950h represents a scenario where device 950 is positioned next to computer system 901, inside inner boundary 926-1 with camera 950-2 facing away from John 900-1 (e.g., facing up and/or towards the ceiling). Although representation 950h is located within inner boundary 926-1 and device 950 is stationary, computer system 901 does not automatically select device 950 as a video feed source because other criteria are not met such as, for example, the camera facing away from John 900-1. In some embodiments, although computer system 901 does not automatically select device 950 in the scenario with representation 950h, the device can be manually selected as a video feed source for computer system 901, as described in greater detail above.

In FIG. 9H, John's device 950 displays home screen 940 while the video feed is muted for the video conference. John's computer system 901 detects input 949, selecting camera control 948 to unmute the video feed. In some embodiments, John's device 950 displays controls for the video conference including, for example, controls to mute or unmute the video feed, a view of the video feed (similar to self view 908), and/or controls to mute or unmute audio for the video feed. In some embodiments, the controls can be displayed as part of status interface 934. In some embodiments, if the video feed is unmuted using controls at John's device 950, the video conference application switches to the video feed from John's device 950. In some embodiments, if the video feed is unmuted using controls at computer system 901, the video conference application switches to the video feed from John's device 950, if criteria are met (e.g., John's device is in within a proximity threshold (e.g., 926-1 and/or 926-2), John's device is connected to computer system 901, and/or John's device is not displaying a user interface for a different application (e.g., 952 or an interface for a different application)). In some embodiments, John's device 950 displays an indication that the video conference application is unmuting the video feed, and provides an option that is selectable at device 950 to resume the video feed using camera 950-2. In some embodiments, if the video feed is unmuted using controls at computer system 901, the video conference application switches to a video feed from a different camera, as shown in FIG. 9I.

Figure 9I:
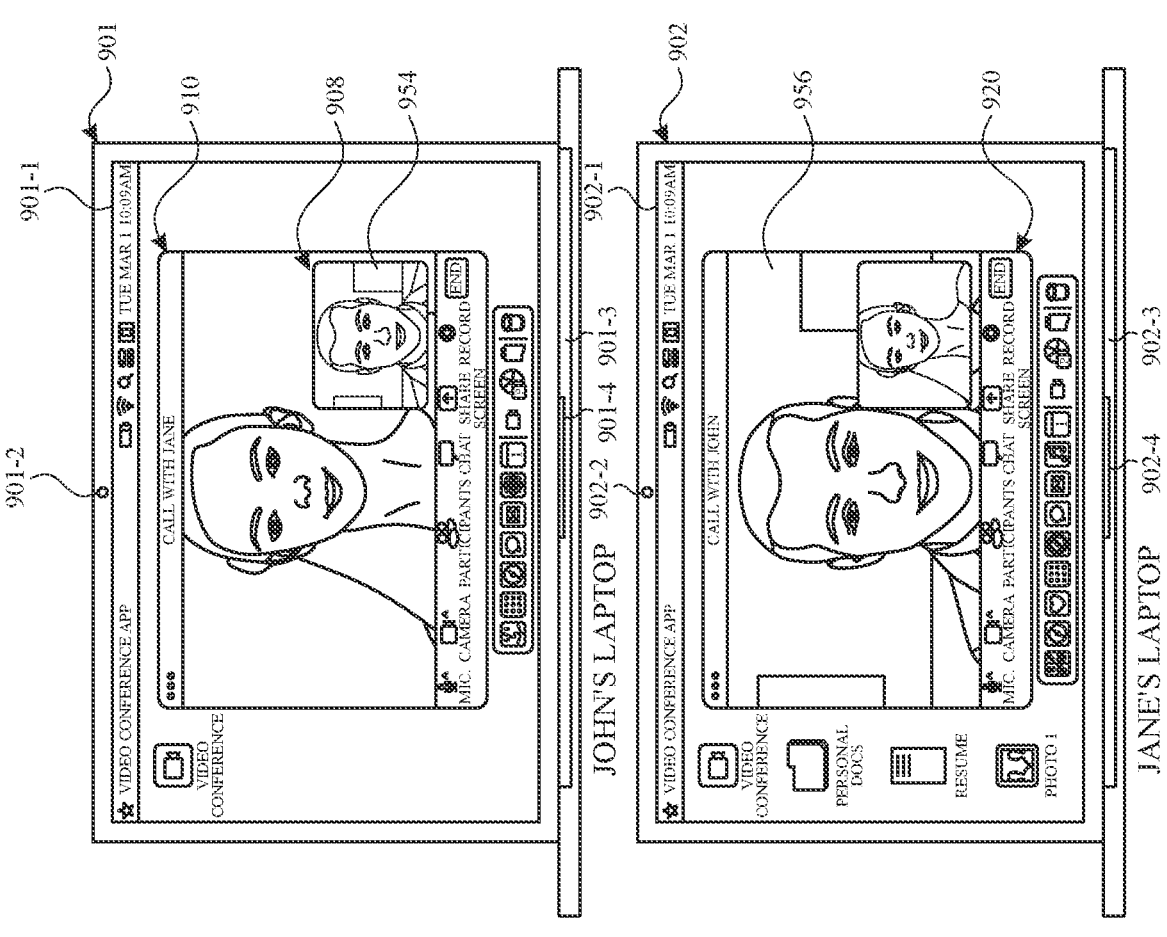

In the embodiment depicted in FIG. 9I, computer system 901 automatically (e.g., without receiving input at computer system 901) switches to a video feed from a different camera because John's device 950 does not meet criteria (e.g., criteria discussed above) for being automatically selected as a video feed source for computer system 901. For example, John's device 950 is the position corresponding to representation 950e, 950f, 950g, or 950h in FIG. 9G when input 949 is detected. As shown in FIG. 9I, the video conference interface 910 shows video feed 954 in self view 908, and video conference interface 920 shows video feed 956. Video feeds 954 and 956 are the video feeds from John's computer system camera 901-2, which was automatically selected by computer system 901 as a video feed source in response to input 949, and in response to determining that John's device 950 did not meet criteria for being automatically selected as the video feed source for the video conference application. In some embodiments, computer system 901 automatically selects a different camera when an automatic-camera-switching setting (similar to setting 624-1 in FIG. 6D) is enabled for the video conference application. In some embodiments, computer system 901 switches to a different camera source in response to a home gesture at device 950, such as input 905-2 in FIG. 9D.

In FIG. 9J, John's device 950 is connected to computer system 901 and is selected as the video feed source, similar to the embodiment shown in FIG. 9C. John's device 950 detects input 905-4 selecting disconnect option 938. In response to input 905-4, John's device disconnects from computer system 901, thereby terminating use of device 950 as a video feed source at computer system 901. Video conference application interface 910 displays John's initials 944 in self view 908, and Jane's computer system displays John's initials 946. In some embodiments, when use of device 950 is terminated, computer system 901 pauses or mutes the video feed displayed at computer system 901, switches the video feed to a default image, switches the video feed to a different camera feed (e.g., 954 and 956) available at laptop, terminates the video conference, or a combination thereof. In some embodiments, in response to input 905-4, John's device 950 disconnects or terminates the video feed provided from device 950 to computer system 901, while remaining connected to computer system 901.

FIG. 10 is a flow diagram illustrating a method for managing camera sharing between devices using a computer system in accordance with some embodiments. Method 1000 is performed at a first computer system (e.g., 100, 300, 500, 650, and/or 950) (e.g., a first device, a smartphone, a tablet, a desktop computer, and/or a laptop computer) that is in communication with (e.g., includes and/or is connected to) one or more cameras (e.g., 950-2 and/or 950-3) (e.g., an infrared camera, a depth camera, and/or a visible light camera) and one or more input devices (e.g., 950-1) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). In some embodiments, the first computer system is in communication with (e.g., includes) one or more display generation components (e.g., 950-1) (e.g., a display controller, a touch-sensitive display system, a projector, a display screen, a display monitor, and/or a holographic display). Some operations in method 1000 are, optionally, combined, the orders of some operations are, optionally, changed, and some operations are, optionally, omitted.

As described below, method 1000 provides an intuitive way for managing camera sharing between devices. The method reduces the cognitive burden on a user for managing camera sharing between devices, thereby creating a more efficient human-machine interface. For battery-operated computing devices, enabling a user to manage camera sharing between devices faster and more efficiently conserves power and increases the time between battery charges.

At method 1000, while the first computer system (e.g., 950) is in a first mode of operation (1002) (e.g., as shown in FIGS. 9A, 9B, 9C, 9D, and/or 9J) (e.g., connected to an external computer system and/or in a state in which a display generation component of the first computer system is in a sleep, locked, and/or low-power state) in which video information (e.g., video data and/or image data) captured by the one or more cameras (e.g., 950-2) of the first computer system is being provided (e.g., captured, transmitted, and/or output) by the first computer system to a second computer system (e.g., 901) (e.g., an external computer system and/or a second device different from the first device) for use in generating a video feed (e.g., 912) for the second computer system (e.g., for display at the second computer system and/or for output at the second computer system), the first computer system performs the following steps in method 1000. In some embodiments, the video feed of the one or more cameras of the first computer system is displayed at the second computer system and, optionally, at a display generation component (e.g., 901-1) of the first computer system.

The first computer system (e.g., 950) receives (1004), via the one or more input devices (e.g., 950-1), a set of one or more inputs (e.g., 905-1, 905-2, 905-3, and/or 905-4) corresponding to (e.g., including and/or directed to) a request to switch a mode of operation of the first computer system.

In response to receiving the set of one or more inputs (e.g., 905-1, 905-2, 905-3, and/or 905-4) corresponding to a request to switch a mode of operation of the first computer system (e.g., 950), and in accordance with a determination that the set of one or more inputs corresponds to (e.g., includes and/or is directed to) a request (e.g., 905-2 and/or 905-4) to switch to a second mode of operation of the first computer system different from the first mode of operation (e.g., a mode in which the video information of the one or more cameras of the first computer system is not being provided to the second computer system and/or in a state in which a display generation component of the first computer system is activated, unlocked, displaying first content, and/or in a full-power state), the first computer system switches (1006) to the second mode of operation of the first computer system (e.g., shown in FIGS. 9E, 9F, 9H, 9I, and/or 9K) (e.g., disconnecting the first computer system from the external computer system, waking up (e.g., activating one or more components of) the first computer system, and/or displaying content (e.g., displaying the video feed, displaying video status information, and/or displaying controls) at a display generation component of the first computer system) and ceases (e.g., pausing and/or stopping) to provide (e.g., capturing, transmitting, and/or outputting) the video information being captured by the one or more cameras (e.g., 950-2) of the first computer system to the second computer system (e.g., 901). Switching to the second mode of operation of the first computer system and ceasing to provide the video information being captured by the one or more cameras of the first computer system to the second computer system, in accordance with a determination that the set of one or more inputs corresponds to a request to switch to a second mode of operation, causes the first computer system to automatically switch to the second mode of operation and cease to provide the video information for use as a video feed at the second computer system without displaying additional controls.

In some embodiments, ceasing to provide the video information being captured by the one or more cameras (e.g., 950-2) of the first computer system (e.g., 950) to the second computer system (e.g., 901) includes pausing the capture of image data by the one or more cameras of the first computer system. In some embodiments, the paused video feed is output (e.g., transmitted and/or displayed) at the second computer system (e.g., 901) and/or a display generation component (e.g., 901-1) of the first computer system. In some embodiments, the video feed stops being displayed at the second computer system (optionally while displaying the paused video feed at the first computer system).

In some embodiments, the first computer system (e.g., 950) is in communication with a display generation component (e.g., 950-1). In some embodiments, the first computer system displays, via the display generation component, video status (e.g., live, active, paused, preview, available, unavailable, connected, and/or disconnected) information (e.g., 934 and/or 936) for the first computer system (e.g., a graphical representation of information related to a status of the first computer system while capturing video information using the one or more cameras of the first computer system). Displaying video status information for the first computer system provides feedback about a state of the first computer system (e.g., a state of providing a video feed for the second computer system) and provides improved security and/or privacy by informing a user about the transmission of video information to a remote computer system.

In some embodiments, the video status information (e.g., 934 and/or 936) is displayed while the first computer system (e.g., 950) is in the first mode of operation. In some embodiments, the video status information is displayed in response to receiving an input (e.g., 905-1) while the first computer system is in the first mode of operation (e.g., an input at the first computer system, an input using a physical input mechanism of the first computer system, and/or a tap input on the display generation component (e.g., 950-1)). In some embodiments, the video status information is displayed while the first computer system is in the second mode of operation. In some embodiments, switching to the second mode of operation includes displaying the video status information for the first computer system.

In some embodiments, the video status information (e.g., 934 and/or 936) for the first computer system (e.g., 950) includes a representation (e.g., 936) of the video feed (e.g., 912) for the second computer system (e.g., 901) (e.g., a view of the video feed, a camera preview, a self view, and/or a surface view). Displaying a representation of the video feed for the second computer system provides feedback about a state of the first computer system (e.g., a state of providing a video feed for the second computer system) and provides improved security and/or privacy by informing a user about the transmission of video information to a remote computer system. In some embodiments, switching to the second mode of operation includes displaying the representation of the video feed for the second computer system.

In some embodiments, the first computer system (e.g., 950) is in communication with a display generation component (e.g., 950-1). In some embodiments, the first computer system displays, via the display generation component, a set of one or more video controls (e.g., a set of one or more selectable graphical user interface objects, elements, affordances, and/or icons) for controlling playback of the video feed (e.g., 912) for the second computer system (e.g., 901) (e.g., controls for sending instructions to the second computer system to enable, disable, and/or modify one or more playback settings for the video information being provided by first computer system to the second computer system for use in generating the video feed for the second computer system). Displaying the set of one or more video controls for controlling playback of the video feed for the second computer system enables the user to quickly disable (e.g., pause or end) the video feed at the first computer system. In some embodiments, the set of one or more video controls is displayed while the first computer system (e.g., 950) is in the first mode of operation. In some embodiments, the set of one or more video controls is displayed in response to receiving an input (e.g., 905-1) while the first computer system is in the first mode of operation (e.g., an input at the first computer system, an input using a physical input mechanism of the first computer system, and/or a tap input on the display generation component (e.g., 950-1)). In some embodiments, the set of one or more video controls is displayed while the first computer system is in the second mode of operation. In some embodiments, switching to the second mode of operation includes displaying the set of one or more video controls for controlling playback of the video feed for the second computer system.

In some embodiments, the set of one or more video controls for controlling playback of the video feed (e.g., 912) for the second computer system (e.g., 901) includes a pause control (e.g., 938 and/or other controls such as a play/pause button) (e.g., a selectable graphical user interface object, element, affordance, and/or icon) that is selectable to pause (or initiate or resume) playback of the video feed at the second computer system (e.g., enabling, disabling, and/or modifying the playback of the video information at the second computer system). Displaying the set of one or more video controls including a pause control that is selectable to pause playback of the video feed at the second computer system provides feedback about a state of the first computer system (e.g., a state of providing a video feed for the second computer system) and reduces the number of inputs needed to pause or initiate playback of the video feed at the second computer system by automatically providing the pause control at the first computer system. In some embodiments, in response to detecting a selection of the pause control, the first computer system (e.g., 950) initiates a process for causing the second computer system (e.g., 901) to cease (e.g., stop or pause) playback of the video feed (e.g., 912) at the second computer system. In some embodiments, in response to detecting a selection of the pause control, the first computer system ceases to capture video information using the one or more cameras (e.g., 950-2) of the first computer system. In some embodiments, in response to detecting a selection of the pause control, the first computer system initiates a process for causing the second computer system to commence (e.g., resume or continue) playback of the video feed at the second computer system. In some embodiments, in response to detecting a selection of the pause control, the first computer system commences providing the video information to the second computer system for use in generating the video feed for the second computer system.

In some embodiments, the set of one or more video controls for the first computer system (e.g., 950) includes a disconnect control (e.g., 938) (e.g., a selectable graphical user interface object, element, affordance, and/or icon) that is selectable to disable a connection (e.g., a wireless connection or a wired connection) between the first computer system and the second computer system (e.g., 901) (e.g., disconnecting the first computer system from the second computer system). Displaying the set of one or more video controls including a disconnect control that is selectable to disable a connection between the first computer system and the second computer system provides feedback about a state of the first computer system (e.g., a state of providing a video feed for the second computer system) and reduces the number of inputs needed to disconnect the first computer system from the second computer system by automatically providing the disconnect control at the first computer system.

In some embodiments, in response to detecting a selection (e.g., 905-4) of the disconnect control (e.g., 938), the first computer (e.g., 950) severs a connection with the second computer system (e.g., 901). In some embodiments, in response to detecting a selection of the disconnect control, the first computer system ceases to provide the video information being captured by the one or more cameras (e.g., 950-2) of the first computer system to the second computer system. In some embodiments, in response to detecting a selection of the disconnect control, the first computer system ceases to capture video information using the one or more cameras of the first computer system.

In some embodiments, the first computer system (e.g., 950) displays, concurrently with the set of one or more video controls for the first computer system, an identification (e.g., 936) (e.g., a graphical representation that identifies the device (e.g., the second computer system and/or a third computer system)) of a device (e.g., 901) (e.g., a computer system) that is being provided the video information captured by the one or more cameras (e.g., 950-2) of the first computer system. Displaying the identification of the device that is being provided the video information captured by the one or more cameras of the first computer system provides feedback about a state of the first computer system (e.g., a state of providing a video feed for the device) and provides improved security and/or privacy by informing a user about the transmission of video information to the device.

In some embodiments, while the first computer system (e.g., 950) is in a third mode of operation different from the first mode of operation (and, in some embodiments, different from the second mode of operation), and in accordance with a determination that a set of proximity criteria has been met, wherein the set of proximity criteria includes a criterion that is met when the first computer system (e.g., 950) is within a predetermined threshold distance (e.g., 926-1 and/or 926-2) (e.g., 2.5 feet, 2.2 feet, 2 feet, 1.8 feet, 1.5 feet, 1 foot, 0.8 feet, or 0.5 feet) from a respective computer system (e.g., 901) that is capable of generating a video feed (e.g., 912) using video information captured by a camera (e.g., 950-2) of a remote computer system (e.g., 950) (e.g., a computer system that is separate, distinct, and/or external from the respective computer system) (e.g., the first computer system), the first computer system switches (automatically and/or without requiring further user input) from the third mode of operation of the first computer system to the first mode of operation. In accordance with a determination that the set of proximity criteria has not been met, the first computer system forgoes switching from the third mode of operation of the first computer system to the first mode of operation. Switching from the third mode to the first mode of operation when the set of proximity criteria has been met causes the computer system to automatically transition to the first mode of operation when the first computer system is within proximity of a computer system that is capable of outputting a video feed from a camera of a remote computer system.

In some embodiments, the first computer system (e.g., 950) is in a low-power state (e.g., a passive, sleep, dimmed, locked, and/or display disabled state) prior to receiving the set of one or more inputs (e.g., 905-1, 905-2, 905-3, and/or 905-4) corresponding to a request to switch a mode of operation of the first computer system. Causing the display generation component to be in a low-power state prior to receiving the set of one or more inputs corresponding to a request to switch a mode of operation of the first computer system conserves the battery of the first computer system by maintaining a low-power state of the display until the display of the first computer system is activated and reduces burn-in and general wear and tear on the display generation component.

In some embodiments, the first computer system (e.g., 950) is in communication with a display generation component (e.g., 950-1) that has a low-power state (e.g., a passive, sleep, dimmed, locked, and/or disabled state) when the first computer system is in the low-power state. In some embodiments, the first computer system transitions from the low-power state (e.g., to an active state) in response to receiving the set of one or more inputs (e.g., 905-1) corresponding to a request to switch a mode of operation of the first computer system. In some embodiments, the active state of the first computer system is a state in which a display component of the first computer system is on, in a full-power state, and/or an always-on state.

In some embodiments, the first computer system (e.g., 950) is in communication with a display generation component (e.g., 950-1). In some embodiments, while the first computer system is in the first mode of operation, the first computer system displays, via the display generation component, a representation (e.g., 936) (e.g., a graphical representation that identifies the device (e.g., the second computer system and/or a third computer system)) of a device (e.g., 901) that is being provided the video information captured by the one or more cameras (e.g., 950-2) of the first computer system. Displaying the representation of the device that is being provided the video information captured by the one or more cameras of the first computer system provides feedback about a state of the first computer system (e.g., a state of providing a video feed for the device) and provides improved security and/or privacy by informing a user about the transmission of video information to the device.

In some embodiments, the representation (e.g., 936) of the device (e.g., 901) that is being provided the video information is displayed in response to the first computer system (e.g., 950) receiving an input (e.g., 905-1) (e.g., an input at the first computer system, an input using a physical input mechanism of the first computer system, and/or a tap input on the display generation component) while the first computer system is in the first mode of operation. In some embodiments, switching to the second mode of operation includes displaying the representation of a device that is being provided the video information captured by the one or more cameras of the first computer system. In some embodiments, switching to the second mode of operation includes ceasing displaying the representation of a device that is being provided the video information captured by the one or more cameras of the first computer system.

In some embodiments, the first computer system (e.g., 950) detects an event at the first computer system (e.g., an incoming call, a low battery of the first computer system, an expiration of a timer, receipt of a message, and/or receipt of a notification). In response to detecting the event at the first computer system, and in accordance with a determination that the first computer system is not in the first mode of operation, the first computer system generates an alert associated with the event (e.g., generating an audible, visual, and/or tactile alert to indicate detection of the event at the first computer system). In accordance with a determination that the first computer system is in the first mode of operation, the first computer system forgoes generating an alert associated with the event (e.g., as shown in FIG. 9B) (or, in some embodiments, modifying the alert associated with the event (e.g., generating a visual alert without an audio alert and/or generating a visual alert without a haptic alert)). Generating or forgoing generating an alert associated with the event based on whether or not the first computer system is in the first mode of operation conserves the battery of the first computer system by forgoing generation of various output responses. In some embodiments, the first mode of operation includes operating in a quiet state. In some embodiments, when in the quiet state, the first computer system suppresses the output of alerts or notifications at the first computer system, does not generate a response to events at the first computer system, and/or has a low-power state (e.g., for a display component of the first computer system).

In some embodiments, forgoing generating the alert associated with the event includes forgoing generating a vibration output (e.g., a vibration that indicates detection of the event at the first computer system (e.g., 950)). Forgoing generating the vibration output when the first computer system is in the first mode of operation conserves the battery of the first computer system by forgoing generation of vibration output and avoids introducing vibrations into the video feed.

In some embodiments, the event is an incoming communication at the first computer system (e.g., an incoming voice and/or video conference) (e.g., as depicted in FIG. 9B). In some embodiments, the event is a low-battery state of the first computer system (e.g., a charge state of a battery powering the first computer system is below a threshold charge value (e.g., 50%, 40%, 30%, 25%, 20%, 18%, 15%, 10%, 7%, 5%, 3%, or 1%)) (e.g., similar to that shown in FIG. 6K).

In some embodiments, the first computer system (e.g., 950) is associated with (e.g., signed into and/or logged onto) a first user account. In some embodiments, the first computer system is configured to provide video information captured by the one or more cameras (e.g., 950-2) of the first computer system to a first remote computer system (e.g., 901) that is associated with the first user account for use in generating a video feed (e.g., 912) for the first remote computer system and to provide video information captured by the one or more cameras of the first computer system to a second remote computer system that is associated with the first user account for use in generating a video feed for the second remote computer system (e.g., the first computer system is configured to provide video information for generating video feeds at remote computer systems that are signed into a same user account as the first computer system). Providing the video information to the first and second remote computer systems that are associated with the first user account for use in generating a video feed for the respective first and second remote computer systems provides improved security and/or privacy by ensuring that the video information is only shared with devices associated with a common user account.

In some embodiments, the first computer system (e.g., 950) is selected as a video source from the second computer system (e.g., 901) (e.g., the first remote computer system, the second remote computer system, or a different computer system). In some embodiments, the first computer system is selected as a video source from a third computer system (e.g., the first remote computer system, the second remote computer system, or a different computer system). In some embodiments, the first computer system provides the video feed (e.g., 912) for the second and third computer systems concurrently. In some embodiments, the first computer system is prevented from providing the video feed to a computer system when the first computer system is providing the video feed to a different computer system. For example, the first computer system is prevented from providing the video feed to the second computer system while the first computer system is providing the video feed to the third computer system. In some embodiments, the first computer system is prevented from providing the video feed to a respective computer system (e.g., the second and/or third computer system) by removing or disabling an option for switching on the respective computer system when the respective computer system is not currently using the video feed, or by stopping providing the video feed to the respective computer system when another computer system starts using the video feed from the first computer system.

In some embodiments, in response to receiving the set of one or more inputs (e.g., 905-1, 905-2, 905-3, and/or 905-4) corresponding to a request to switch a mode of operation of the first computer system (e.g., 950), and in accordance with a determination that the set of one or more inputs corresponds to a request to switch to a fourth mode of operation of the first computer system different from the first mode and the second mode (e.g., a mode in which the video information of the one or more cameras of the first computer system is not being provided to the second computer system and/or in a state in which a display generation component of the first computer system is activated, unlocked, displaying second content different from the first content, and/or in a full-power state), the first computer system switches to the fourth mode of operation of the first computer system (e.g., and, optionally, ceasing to provide the video information being captured by the one or more cameras of the first computer system to the second computer system). Switching to the fourth mode of operation of the first computer system in accordance with a determination that the set of one or more inputs corresponds to a request to switch to the fourth mode of operation causes the first computer system to automatically switch to the fourth mode of operation without displaying additional controls.

In some embodiments, switching to the fourth mode of operation includes displaying video status information (e.g., 934, 936, and/or 938) for the first computer system (e.g., 950). In some embodiments, switching to the fourth mode of operation includes displaying a representation of the video feed for the second computer system (e.g., 901). In some embodiments, switching to the fourth mode of operation includes displaying a set of one or more video controls for controlling playback of the video feed for the second computer system. ISE switching to the fourth mode of operation includes displaying a representation of a device that is being provided the video information captured by the one or more cameras of the first computer system.

In some embodiments, the first computer system (e.g., 950) detects a change in orientation of the first computer system while the first computer system is in the first mode of operation (e.g., detecting the first computer system moving from a vertical orientation to a horizontal orientation or vice versa) (e.g., as depicted in FIG. 9D). In response to detecting the change in orientation of the first computer system while the first computer system is in the first mode of operation, the first computer system continues to provide the video information being captured by the one or more cameras (e.g., 950-2) of the first computer system (e.g., 950) to the second computer system (e.g., 901) for use in generating a video feed (e.g., 901) for the second computer system (e.g., as shown in FIG. 9D). Continuing to provide the video information being captured by the one or more cameras of the first computer system to the second computer system in response to detecting the change in orientation of the first computer system enables the first computer system to continue to provide the video feed for the second computer system while the orientation of the first computer system is changed (e.g., by a user moving, rotating, or otherwise handling the first computer system).

In some embodiments, in response to receiving the set of one or more inputs (e.g., 905-1, 905-2, 905-3, and/or 905-4) corresponding to a request to switch a mode of operation of the first computer system (e.g., 950), and in accordance with a determination that the set of one or more inputs corresponds to a request (e.g., 905-2) to display a system user interface (e.g., 940) (e.g., a home screen and/or a desktop), the first computer system ceases to provide the video information being captured by the one or more cameras (e.g., 950-2) of the first computer system to the second computer system (e.g., 901) (e.g., as shown in FIGS. 9E, 9H, and/or 9I). Ceasing to provide the video information being captured by the one or more cameras of the first computer system to the second computer system when the set of one or more inputs corresponds to a request to display a system user interface enables the user to terminate the video feed from the first computer system without displaying additional controls.

In some embodiments, the home screen (e.g., 940) and/or desktop is a displayed user interface (e.g., user interface 400) that includes user interface objects (e.g., 942) corresponding to respective applications. When a user interface object is activated (e.g., via input 905-3), the first computer system (e.g., 950) displays the respective application (e.g., 952) corresponding to the activated user interface object. In some embodiments, the request to switch a mode of operation of the first computer system is (or includes) a request (e.g., 905-2) to display the system user interface (e.g., 940). In some embodiments, the first computer system ceases to provide the video information being captured by the one or more cameras (e.g., 950-2) of the first computer system to the second computer system (e.g., 901) when the first computer system switches to an application (e.g., 952) that is not an application for providing the video feed (e.g., as shown in FIG. 9F).

Note that details of the processes described above with respect to method 1000 (e.g., FIG. 10) are also applicable in an analogous manner to the methods described above. For example, methods 700 and/or 800 optionally includes one or more of the characteristics of the various methods described above with reference to method 1000. For example, a state of a computer system can be changed based on use of the computer system as a camera and/or video feed for a remote computer system using any of the techniques discussed with respect to method 1000. For brevity, these details are not repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to share video data between electronic devices. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide personalized video settings for the user. Accordingly, use of such personal information data enables users to have calculated control of the video data. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of video data sharing, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, video settings can be set based on non-personal information data or a bare minimum amount of personal information, such as the content being requested by the device associated with a user, other non-personal information available to the electronic devices, or publicly available information.

What is claimed is:

1. A first computer system configured to communicate with one or more display generation components and one or more input devices, comprising:

one or more processors; and memory storing one or more programs configured to be executed by the one or more processors, the one or more programs including instructions for:

displaying, via the one or more display generation components, a system user interface for the first computer system, wherein the system user interface is associated with an option for selecting one or more cameras for use with the first computer system, and wherein displaying the system user interface includes concurrently displaying:

a first camera selection option for selecting video information captured by one or more cameras of a second computer system, that is separate from the first computer system, to generate a video feed for the first computer system;

a second camera selection option for selecting video information captured by one or more cameras of a respective computer system, that is separate from the second computer system, to generate a video feed for the first computer system; and a set of one or more options associated with camera settings for the video information captured by the one or more cameras of the second computer system;

while displaying the system user interface including concurrently displaying the first camera selection option, the second camera selection option, and the set of one or more options associated with camera settings for the video information captured by the one or more cameras of the second computer system, receiving, via the one or more input devices, one or more inputs directed to the system user interface; and in response to receiving the one or more inputs directed to the system user interface:

in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system;

in accordance with a determination that the one or more inputs corresponds to a selection of the first camera selection option, selecting the video information captured by the one or more cameras of the second computer system for use to generate a video feed for the first computer system; and in accordance with a determination that the one or more inputs corresponds to a selection of the second camera selection option, selecting the video information captured by the one or more cameras of the respective computer system for use to generate a video feed for the first computer system.

2. The first computer system of claim 1, wherein the first computer system is in communication with the second computer system via a wireless connection.

3. The first computer system of claim 1, wherein displaying the system user interface for the first computer system includes concurrently displaying the first camera selection option, the second camera selection option, the set of one or more options associated with camera settings for the video information captured by the one or more cameras of the second computer system, and a set of one or more options for controlling system functions of the first computer system.

4. The first computer system of claim 1, the one or more programs further including instructions for:

prior to displaying the system user interface, displaying, via the one or more display generation components, a camera options element;

detecting a selection of the camera options element; and in response to detecting the selection of the camera options element, displaying the system user interface including the set of one or more options associated with camera settings for the video information captured by the one or more cameras of the second computer system.

5. The first computer system of claim 1, wherein the set of one or more options associated with the camera settings for the video information captured by the one or more cameras of the second computer system includes a first set of one or more visual effects options that are selectable to modify a visual effect for the video information captured by the one or more cameras of the second computer system.

6. The first computer system of claim 5, wherein the visual effect is applied by the second computer system.

7. The first computer system of claim 5, wherein the visual effect includes a blurring effect applied to the video information of the one or more cameras of the second computer system being used to generate the video feed for the first computer system.

8. The first computer system of claim 5, wherein the visual effect includes changing a zoom level of the video feed based on subject tracking information.

9. The first computer system of claim 5, wherein the visual effect includes changing a framing of the video feed based on subject tracking information.

10. The first computer system of claim 5, wherein the visual effect includes a simulated lighting effect applied to the video information of the one or more cameras of the second computer system being used to generate the video feed for the first computer system.

11. The first computer system of claim 5, wherein the visual effect includes modifying a portion of the video information of the one or more cameras of the second computer system that corresponds to a surface in a field-of-view of the one or more cameras based on a position of the surface in the portion of the video information relative to the one or more cameras of the second computer system.

12. The first computer system of claim 5, the one or more programs further including instructions for:

after selecting video information captured by a respective camera to generate a video feed for the first computer system, displaying, in the system user interface, a second set of one or more visual effects options different from the first set of one or more visual effects options, wherein the second set of one or more visual effects options are selectable to change a visual effect for the video information captured by the respective camera.

13. The first computer system of claim 1, wherein displaying the system user interface includes displaying status information for a property of the second computer system, wherein the status information changes as the property of the second computer system changes.

14. The first computer system of claim 1, the one or more programs further including instructions for:

prior to displaying the system user interface for the first computer system, receiving a request to display the system user interface for the first computer system; and after receiving the request to display the system user interface for the first computer system:

in accordance with a determination that a first set of criteria is met, displaying the system user interface including the first camera selection option for selecting video information captured by one or more cameras of the second computer system; and in accordance with a determination that the first set of criteria is not met, displaying the system user interface without the first camera selection option for selecting video information captured by one or more cameras of the second computer system.

15. The first computer system of claim 1, the one or more programs further including instructions for:

while the video information captured by the one or more cameras of the second computer system is not selected for use to generate the video feed for the first computer system, receiving data; and in response to receiving the data:

in accordance with a determination that the data indicates that a set of camera selection criteria is met, selecting the video information captured by the one or more cameras of the second computer system for use to generate the video feed for the first computer system.

16. The first computer system of claim 15, wherein the set of camera selection criteria includes a requirement that an automatic-camera-switching setting is enabled for a respective application used to display the video feed for the first computer system in order for the set of camera selection criteria to be met.

17. The first computer system of claim 1, wherein the one or more cameras of the second computer system has a field-of-view that is different from a field-of-view of a camera of the first computer system.

18. The first computer system of claim 1, the one or more programs further including instructions for:

after the video information captured by the one or more cameras of the second computer system has been selected for use to generate the video feed for the first computer system with a setting corresponding to a first set of the one or more options associated with camera settings for the video information captured by the one or more cameras of the second computer system:

while a camera different from the one or more cameras of the second computer system is selected to provide a video feed for the first computer system, receiving an input corresponding to a selection of the first camera selection option; and in response to receiving the input corresponding to the selection of the first camera selection option, selecting the video information captured by the one or more cameras of the second computer system for use to generate the video feed for the first computer system with the setting corresponding to the first set of the one or more options associated with camera settings for the video information captured by the one or more cameras of the second computer system.

19. The first computer system of claim 1, the one or more programs further including instructions for:

receiving data indicating an event at the second computer system; and in response to receiving the data indicating an event at the second computer system, displaying, via the one or more display generation components, a notification of the event, without providing a notification of the event at the second computer system.

20. The first computer system of claim 1, the one or more programs further including instructions for:

in response to detecting termination of using the video information captured by the one or more cameras of the second computer system to generate the video feed for the first computer system, selecting video information captured by one or more cameras of a computer system other than the second computer system for use to generate a video feed for the first computer system.

21. The first computer system of claim 1, the one or more programs further including instructions for:

displaying, via the one or more display generation components, an indication of one or more functions of the one or more cameras of the second computer system, wherein the indication of the one or more functions is visually associated with a representation of the video information captured by the one or more cameras of the second computer system.

22. The first computer system of claim 21, wherein the indication of one or more functions of the one or more cameras of the second computer system includes an indication of a surface display function, the one or more programs further including instructions for:

receiving a set of one or more inputs corresponding to selection of the surface display function; and in response to receiving the set of one or more inputs corresponding to selection of the surface display function:

ceasing display of at least a second portion of the representation of the video information captured by the one or more cameras of the second computer system, and displaying, at a location that corresponds to the second portion of the representation of the video information captured by the one or more cameras of the second computer system, a surface view that includes a representation of a portion of the video information of the one or more cameras of the second computer system that is modified to include a view of a surface positioned within a field-of-view of the one or more cameras of the second computer system.

23. The first computer system of claim 22, wherein the surface view is displayed concurrently with at least a third portion of the representation of the video information captured by the one or more cameras of the second computer system.

24. The first computer system of claim 22, the one or more programs further including instructions for:

while displaying the surface view at a first displayed location and displaying a fourth portion of the representation of the video information captured by the one or more cameras of the second computer system at a second displayed location, receiving an input directed to the representation of the video information, and in response to receiving the input directed to the representation of the video information, displaying the surface view at the second displayed location and displaying the fourth portion of the representation of the video information at the first displayed location.

25. A non-transitory computer-readable storage medium storing one or more programs configured to be executed by one or more processors of a first computer system that is in communication with one or more display generation components and one or more input devices, the one or more programs including instructions for:

displaying, via the one or more display generation components, a system user interface for the first computer system, wherein the system user interface is associated with an option for selecting one or more cameras for use with the first computer system, and wherein displaying the system user interface includes concurrently displaying:

a first camera selection option for selecting video information captured by one or more cameras of a second computer system, that is separate from the first computer system, to generate a video feed for the first computer system;

a second camera selection option for selecting video information captured by one or more cameras of a respective computer system, that is separate from the second computer system, to generate a video feed for the first computer system; and a set of one or more options associated with camera settings for the video information captured by the one or more cameras of the second computer system;

while displaying the system user interface including concurrently displaying the first camera selection option, the second camera selection option, and the set of one or more options associated with camera settings for the video information captured by the one or more cameras of the second computer system, receiving, via the one or more input devices, one or more inputs directed to the system user interface; and in response to receiving the one or more inputs directed to the system user interface:

in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system;

in accordance with a determination that the one or more inputs corresponds to a selection of the first camera selection option, selecting the video information captured by the one or more cameras of the second computer system for use to generate a video feed for the first computer system; and in accordance with a determination that the one or more inputs corresponds to a selection of the second camera selection option, selecting the video information captured by the one or more cameras of the respective computer system for use to generate a video feed for the first computer system.

26. The non-transitory computer-readable storage medium of claim 25, wherein displaying the system user interface for the first computer system includes concurrently displaying the first camera selection option, the second camera selection option, the set of one or more options associated with camera settings for the video information captured by the one or more cameras of the second computer system, and a set of one or more options for controlling system functions of the first computer system.

27. The non-transitory computer-readable storage medium of claim 25, the one or more programs further including instructions for:

prior to displaying the system user interface, displaying, via the one or more display generation components, a camera options element;

detecting a selection of the camera options element; and in response to detecting the selection of the camera options element, displaying the system user interface including the set of one or more options associated with camera settings for the video information captured by the one or more cameras of the second computer system.

28. The non-transitory computer-readable storage medium of claim 25, the one or more programs further including instructions for:

prior to displaying the system user interface for the first computer system, receiving a request to display the system user interface for the first computer system; and after receiving the request to display the system user interface for the first computer system:

in accordance with a determination that a first set of criteria is met, displaying the system user interface including the first camera selection option for selecting video information captured by one or more cameras of the second computer system; and in accordance with a determination that the first set of criteria is not met, displaying the system user interface without the first camera selection option for selecting video information captured by one or more cameras of the second computer system.

29. The non-transitory computer-readable storage medium of claim 25, the one or more programs further including instructions for:

while the video information captured by the one or more cameras of the second computer system is not selected for use to generate the video feed for the first computer system, receiving data; and in response to receiving the data:

in accordance with a determination that the data indicates that a set of camera selection criteria is met, selecting the video information captured by the one or more cameras of the second computer system for use to generate the video feed for the first computer system.

30. The non-transitory computer-readable storage medium of claim 25, the one or more programs further including instructions for:

after the video information captured by the one or more cameras of the second computer system has been selected for use to generate the video feed for the first computer system with a setting corresponding to a first set of the one or more options associated with camera settings for the video information captured by the one or more cameras of the second computer system:

while a camera different from the one or more cameras of the second computer system is selected to provide a video feed for the first computer system, receiving an input corresponding to a selection of the first camera selection option; and in response to receiving the input corresponding to the selection of the first camera selection option, selecting the video information captured by the one or more cameras of the second computer system for use to generate the video feed for the first computer system with the setting corresponding to the first set of the one or more options associated with camera settings for the video information captured by the one or more cameras of the second computer system.

31. The non-transitory computer-readable storage medium of claim 25, the one or more programs further including instructions for:

receiving data indicating an event at the second computer system; and in response to receiving the data indicating an event at the second computer system, displaying, via the one or more display generation components, a notification of the event, without providing a notification of the event at the second computer system.

32. A method, comprising:

at a first computer system that is in communication with one or more display generation components and one or more input devices:

displaying, via the one or more display generation components, a system user interface for the first computer system, wherein the system user interface is associated with an option for selecting one or more cameras for use with the first computer system, and wherein displaying the system user interface includes concurrently displaying:

a first camera selection option for selecting video information captured by one or more cameras of a second computer system, that is separate from the first computer system, to generate a video feed for the first computer system;

a second camera selection option for selecting video information captured by one or more cameras of a respective computer system, that is separate from the second computer system, to generate a video feed for the first computer system; and a set of one or more options associated with camera settings for the video information captured by the one or more cameras of the second computer system;

while displaying the system user interface including concurrently displaying the first camera selection option, the second camera selection option, and the set of one or more options associated with camera settings for the video information captured by the one or more cameras of the second computer system, receiving, via the one or more input devices, one or more inputs directed to the system user interface; and in response to receiving the one or more inputs directed to the system user interface:

in accordance with a determination that the one or more inputs corresponds to a selection of a respective option in the set of one or more options associated with camera settings for the video information captured by the one or more cameras of the second computer system, changing a setting corresponding to the respective option for the one or more cameras of the second computer system when the video information of the one or more cameras of the second computer system is used to generate a video feed for the first computer system;

in accordance with a determination that the one or more inputs corresponds to a selection of the first camera selection option, selecting the video information captured by the one or more cameras of the second computer system for use to generate a video feed for the first computer system; and in accordance with a determination that the one or more inputs corresponds to a selection of the second camera selection option, selecting the video information captured by the one or more cameras of the respective computer system for use to generate a video feed for the first computer system.

33. The method of claim 32, wherein displaying the system user interface for the first computer system includes concurrently displaying the first camera selection option, the second camera selection option, the set of one or more options associated with camera settings for the video information captured by the one or more cameras of the second computer system, and a set of one or more options for controlling system functions of the first computer system.

34. The method of claim 32, further comprising:

prior to displaying the system user interface, displaying, via the one or more display generation components, a camera options element;

detecting a selection of the camera options element; and in response to detecting the selection of the camera options element, displaying the system user interface including the set of one or more options associated with camera settings for the video information captured by the one or more cameras of the second computer system.

35. The method of claim 32, further comprising:

prior to displaying the system user interface for the first computer system, receiving a request to display the system user interface for the first computer system; and after receiving the request to display the system user interface for the first computer system:

in accordance with a determination that a first set of criteria is met, displaying the system user interface including the first camera selection option for selecting video information captured by one or more cameras of the second computer system; and in accordance with a determination that the first set of criteria is not met, displaying the system user interface without the first camera selection option for selecting video information captured by one or more cameras of the second computer system.

36. The method of claim 32, further comprising:

while the video information captured by the one or more cameras of the second computer system is not selected for use to generate the video feed for the first computer system, receiving data; and in response to receiving the data:

in accordance with a determination that the data indicates that a set of camera selection criteria is met, selecting the video information captured by the one or more cameras of the second computer system for use to generate the video feed for the first computer system.

37. The method of claim 32, further comprising:

after the video information captured by the one or more cameras of the second computer system has been selected for use to generate the video feed for the first computer system with a setting corresponding to a first set of the one or more options associated with camera settings for the video information captured by the one or more cameras of the second computer system:

while a camera different from the one or more cameras of the second computer system is selected to provide a video feed for the first computer system, receiving an input corresponding to a selection of the first camera selection option; and in response to receiving the input corresponding to the selection of the first camera selection option, selecting the video information captured by the one or more cameras of the second computer system for use to generate the video feed for the first computer system with the setting corresponding to the first set of the one or more options associated with camera settings for the video information captured by the one or more cameras of the second computer system.

38. The method of claim 32, further comprising:

receiving data indicating an event at the second computer system; and in response to receiving the data indicating an event at the second computer system, displaying, via the one or more display generation components, a notification of the event, without providing a notification of the event at the second computer system.

* * * * *